United States Patent
Mizuno

(10) Patent No.: US 10,410,079 B2
(45) Date of Patent: *Sep. 10, 2019

(54) IMAGE PROCESSING SYSTEM AND IMAGE PROCESSING METHOD

(71) Applicant: MegaChips Corporation, Osaka-shi (JP)

(72) Inventor: Yusuke Mizuno, Osaka (JP)

(73) Assignee: MegaChips Corporation, Osaka-shi (JP)

(*) Notice: Subject to any disclaimer, the term of this patent is extended or adjusted under 35 U.S.C. 154(b) by 67 days.

This patent is subject to a terminal disclaimer.

(21) Appl. No.: 15/712,881

(22) Filed: Sep. 22, 2017

(65) Prior Publication Data

US 2018/0012098 A1 Jan. 11, 2018

Related U.S. Application Data

(63) Continuation of application No. PCT/JP2016/057721, filed on Mar. 11, 2016.

(30) Foreign Application Priority Data

Mar. 31, 2015 (JP) .................. 2015-071365

(51) Int. Cl.
G06K 9/32 (2006.01)
H04N 19/63 (2014.01)
(Continued)

(52) U.S. Cl.
CPC ............ G06K 9/3233 (2013.01); G06T 11/60 (2013.01); H04N 19/122 (2014.11);
(Continued)

(58) Field of Classification Search
CPC .. G06K 9/3233; H04N 19/122; H04N 19/124; H04N 19/167; H04N 19/18;
(Continued)

(56) References Cited

U.S. PATENT DOCUMENTS 6,775,412 B1 8/2004 Nister et al.
7,184,604 B2 2/2007 Mizuno et al.
(Continued)

FOREIGN PATENT DOCUMENTS

JP 2001-520466 10/2001
JP 2002-94991 3/2002
(Continued)

OTHER PUBLICATIONS

International Search Report dated May 24, 2016 in PCT/JP2016/057721, filed on Mar. 11, 2016.
(Continued)

*Primary Examiner* — Katrina R Fujita

(74) *Attorney, Agent, or Firm* — Xsensus, LLP

(57) ABSTRACT

Wavelet transformation is performed on first image data and second image data until a decomposition level becomes a decomposition level based on synthesis control data or the like, and first wavelet coefficient data and second wavelet coefficient data are thereby generated. An ROI coefficient related to an ROI and a non-ROI coefficient in the first wavelet coefficient data are determined on the basis of mask data and the ROI coefficient in the first wavelet coefficient data and a wavelet coefficient in the second wavelet coefficient data are synthesized with each other, and synthesized coefficient data are thereby generated. Inverse wavelet transformation is performed on the synthesized coefficient data until a decomposition level becomes a predetermined end level, and synthetic image data are thereby generated.

62 Claims, 109 Drawing Sheets

(51) Int. Cl.
*H04N 19/122* (2014.01)
*H04N 19/18* (2014.01)
*H04N 19/167* (2014.01)
*H04N 19/124* (2014.01)
*G06T 11/60* (2006.01)

(52) U.S. Cl.
CPC ......... *H04N 19/124* (2014.11); *H04N 19/167* (2014.11); *H04N 19/18* (2014.11); *H04N 19/63* (2014.11); *G06T 2207/10112* (2013.01); *G06T 2207/20064* (2013.01); *G06T 2207/20104* (2013.01)

(58) Field of Classification Search
CPC ............... H04N 19/63; G06T 11/60; G06T 2207/10112; G06T 2207/20064; G06T 2207/20104
See application file for complete search history.

(56) References Cited

U.S. PATENT DOCUMENTS

| | | | |
|---|---|---|---|
| 8,223,207 B2 | 7/2012 | Baba et al. | |
| 2004/0264794 A1 | 12/2004 | Nister et al. | |
| 2005/0175251 A1* | 8/2005 | Taketa | H04N 19/647 382/248 |
| 2005/0271290 A1 | 12/2005 | Nister et al. | |
| 2006/0159357 A1 | 7/2006 | Mizuno | |
| 2006/0222249 A1* | 10/2006 | Hosaka | H04N 19/63 382/235 |
| 2007/0053598 A1 | 3/2007 | Mizuno | |
| 2007/0053599 A1 | 3/2007 | Mizuno | |
| 2007/0053620 A1 | 3/2007 | Mizuno | |
| 2007/0147693 A1 | 6/2007 | Saito | |
| 2007/0217698 A1 | 9/2007 | Son | |
| 2010/0098162 A1* | 4/2010 | Lu | H04N 19/139 375/240.13 |
| 2011/0222787 A1* | 9/2011 | Thiemert | G06K 9/00758 382/225 |
| 2017/0013278 A1* | 1/2017 | Mizuno | H04N 19/172 |

FOREIGN PATENT DOCUMENTS

| | | |
|---|---|---|
| JP | 2003-324613 | 11/2003 |
| JP | 2005-165688 | 6/2005 |
| JP | 2006-93784 | 4/2006 |
| JP | 2006-203409 | 8/2006 |
| JP | 2007-88897 | 4/2007 |
| JP | 2007-104645 | 4/2007 |
| JP | 2007-180801 | 7/2007 |
| JP | 2007-251476 | 9/2007 |
| JP | 2009-199363 | 9/2009 |
| JP | 2013-254291 | 12/2013 |
| WO | WO 99/19839 A1 | 4/1999 |

OTHER PUBLICATIONS

"Information technology—JPEG 2000 image coding system: Core coding system", International Standard ISO/IEC 15444-1, ITU-T Recommendation, T.800, 2002, pp. 209.

* cited by examiner

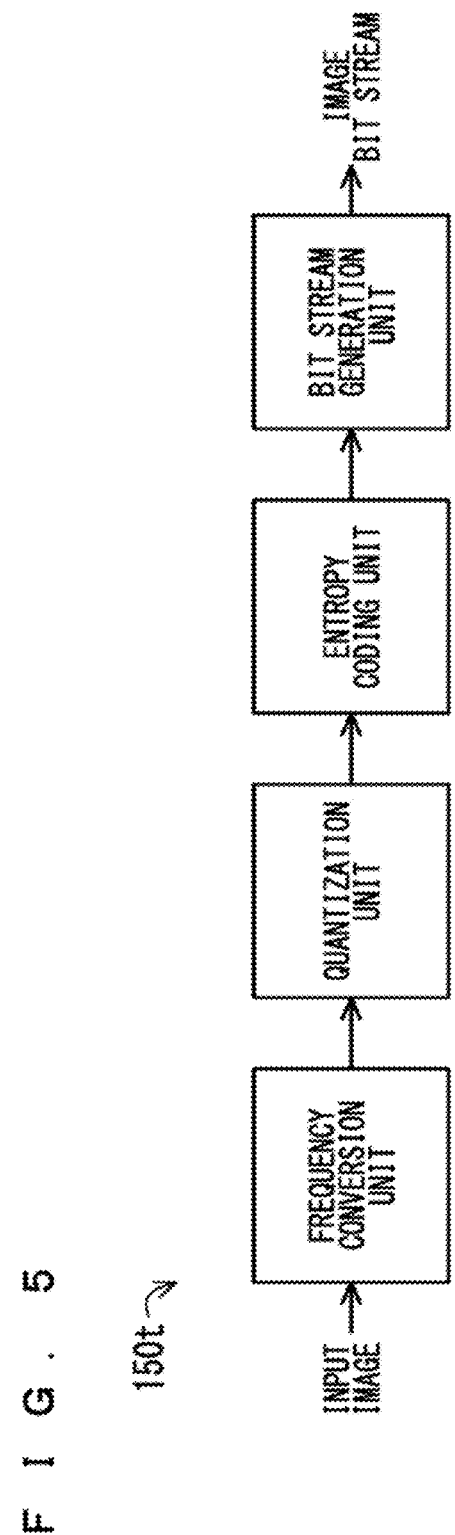

F I G . 1 7
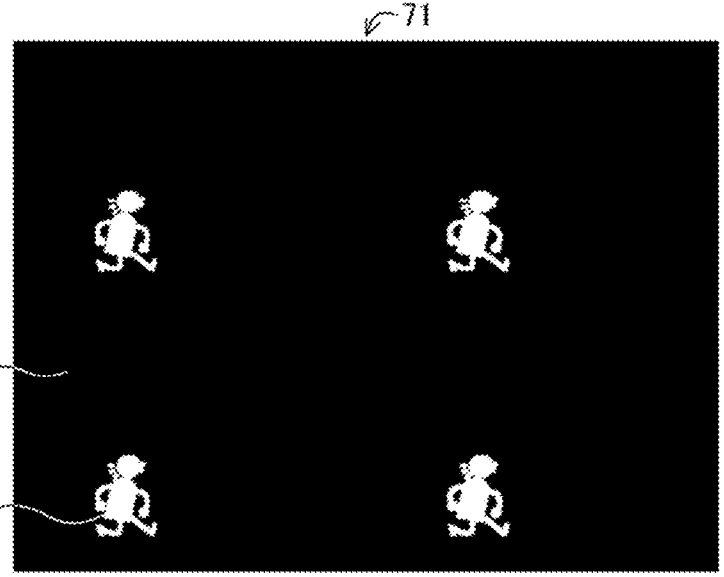
F I G . 1 8
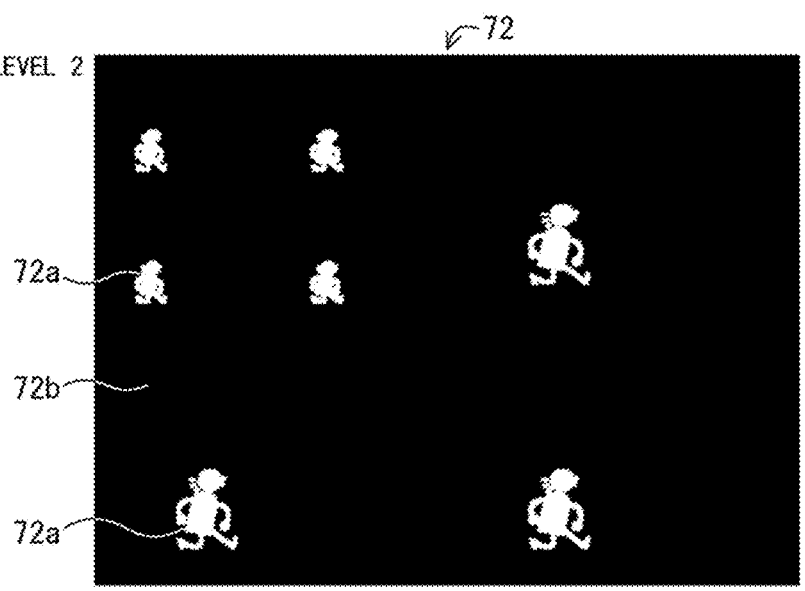

F I G. 2 1
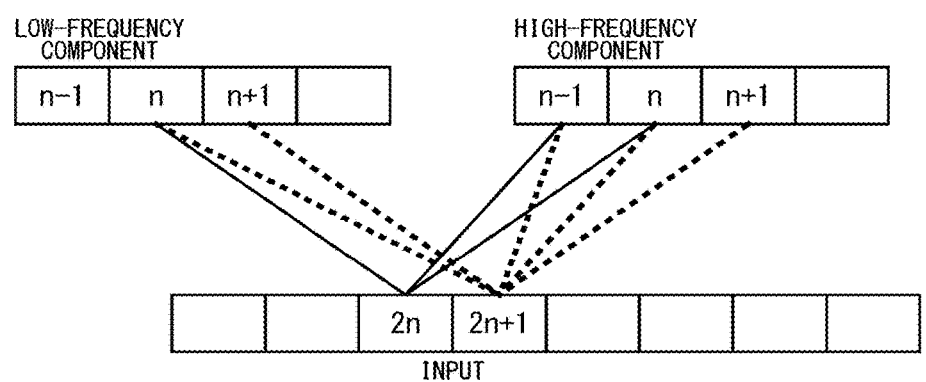

FIRST TARGET IMAGE (ORIGINAL IMAGE)

TARGET MASK (ORIGINAL MASK)

DEVELOPED MASK (DECOMPOSITION LEVEL 1)

DEVELOPED MASK (DECOMPOSITION LEVEL 2)

DEVELOPED MASK (DECOMPOSITION LEVEL 3)

SECOND TARGET IMAGE (ORIGINAL IMAGE)

SYNTHETIC IMAGE (FOR COMPARISON, WITHOUT WAVELET TRANSFORMATION)

SYNTHETIC IMAGE (SYNTHESIS AT DECOMPOSITION LEVEL 1)

SYNTHETIC IMAGE (SYNTHESIS AT DECOMPOSITION LEVEL 2)

SYNTHETIC IMAGE (SYNTHESIS AT DECOMPOSITION LEVEL 3)

SYNTHETIC IMAGE (SYNTHESIS AT DECOMPOSITION LEVEL 5)

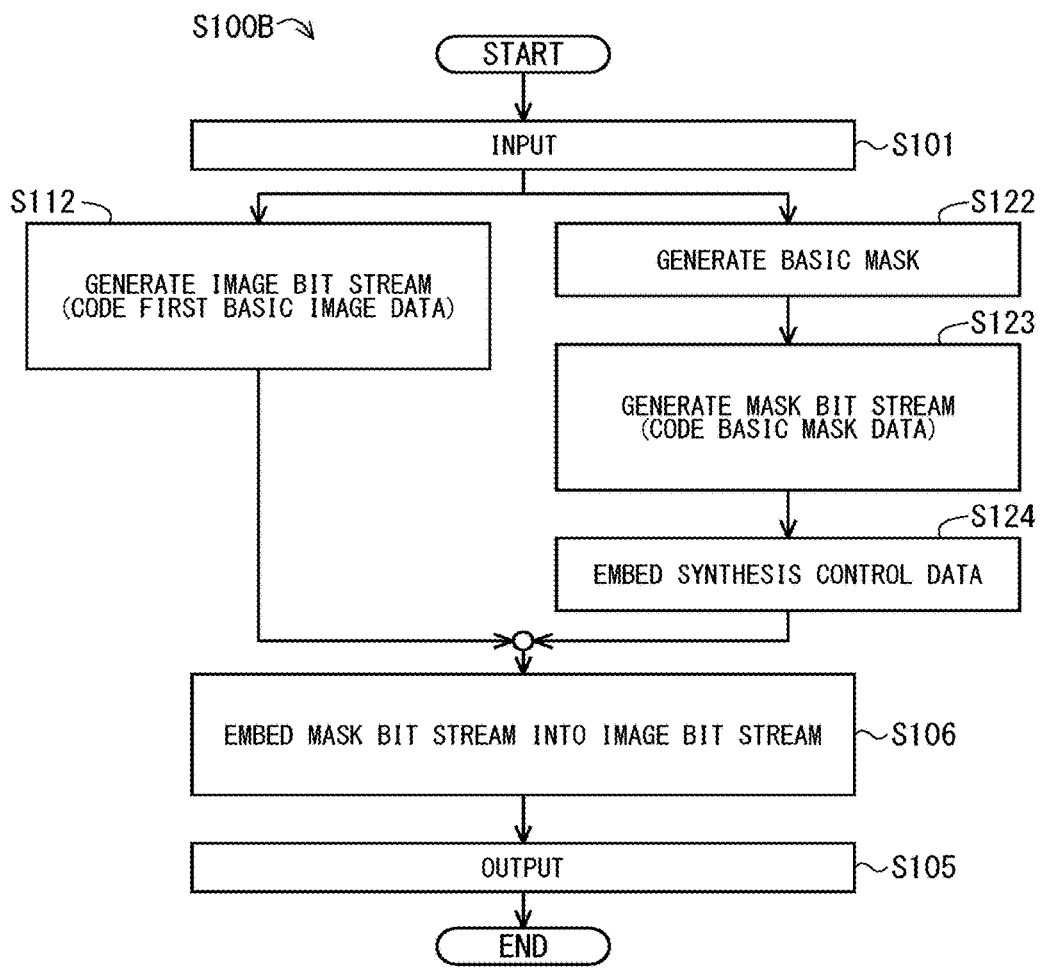
F I G . 4 3

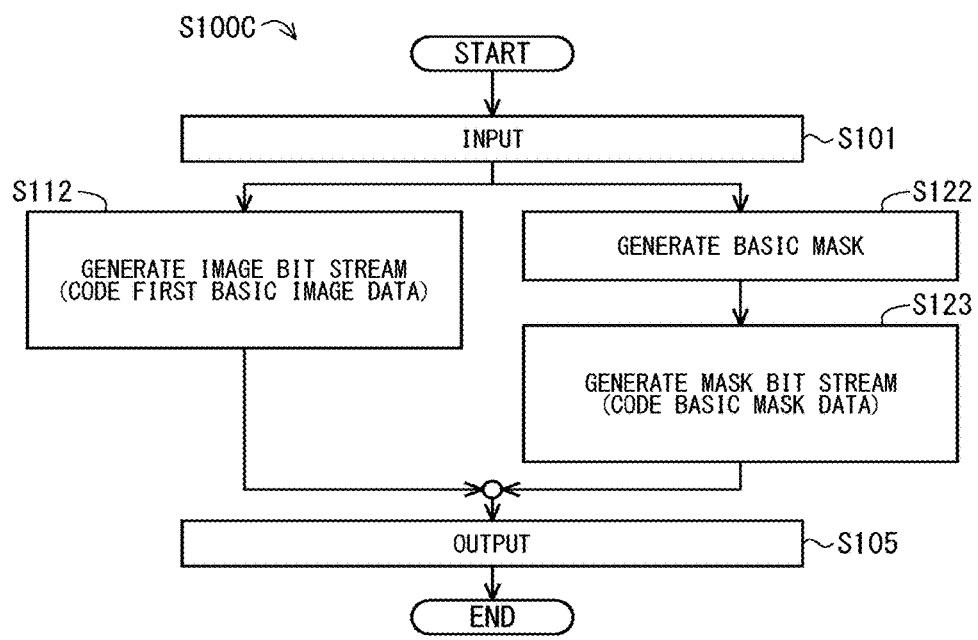
F I G . 4 6

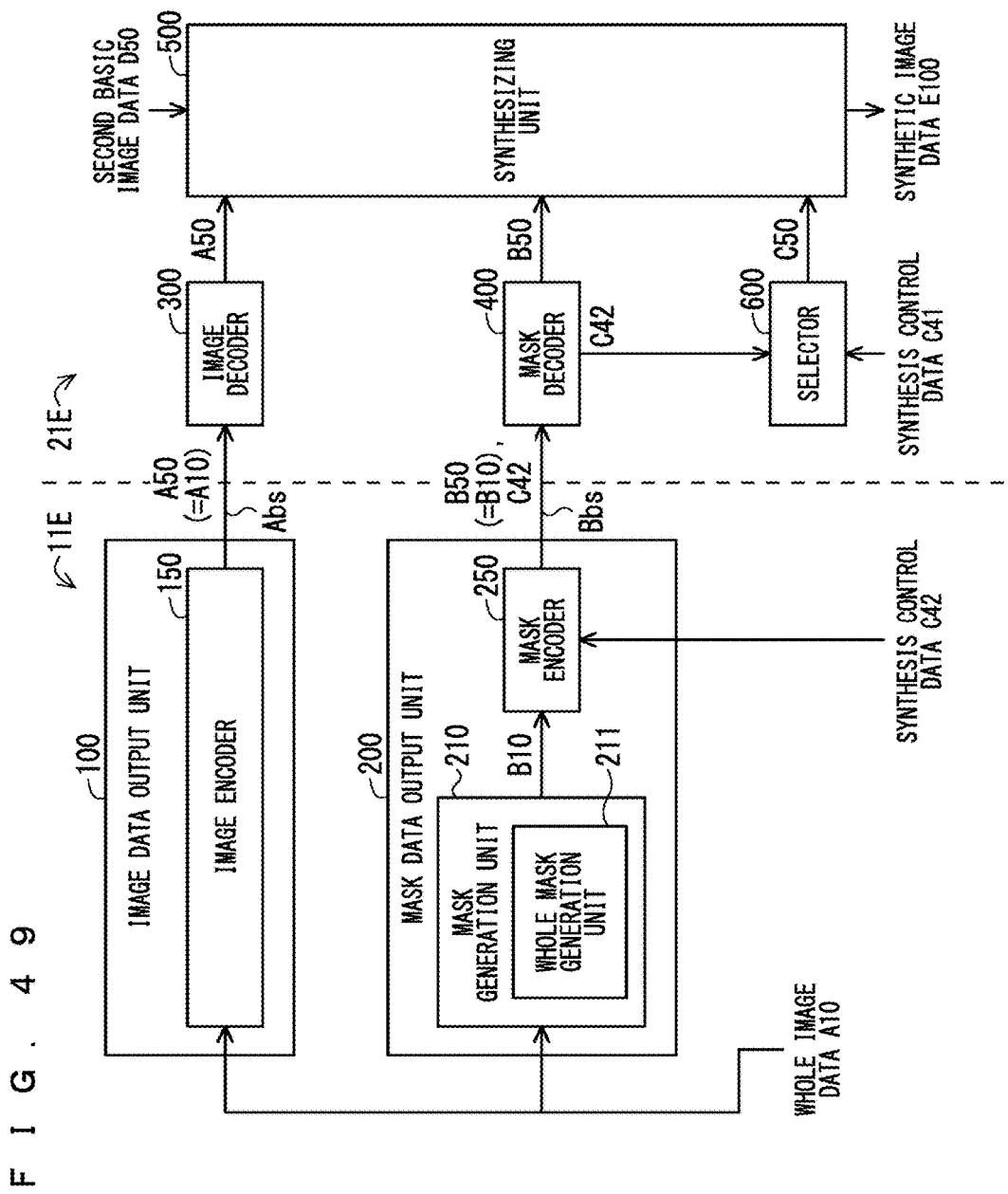
F I G . 4 9

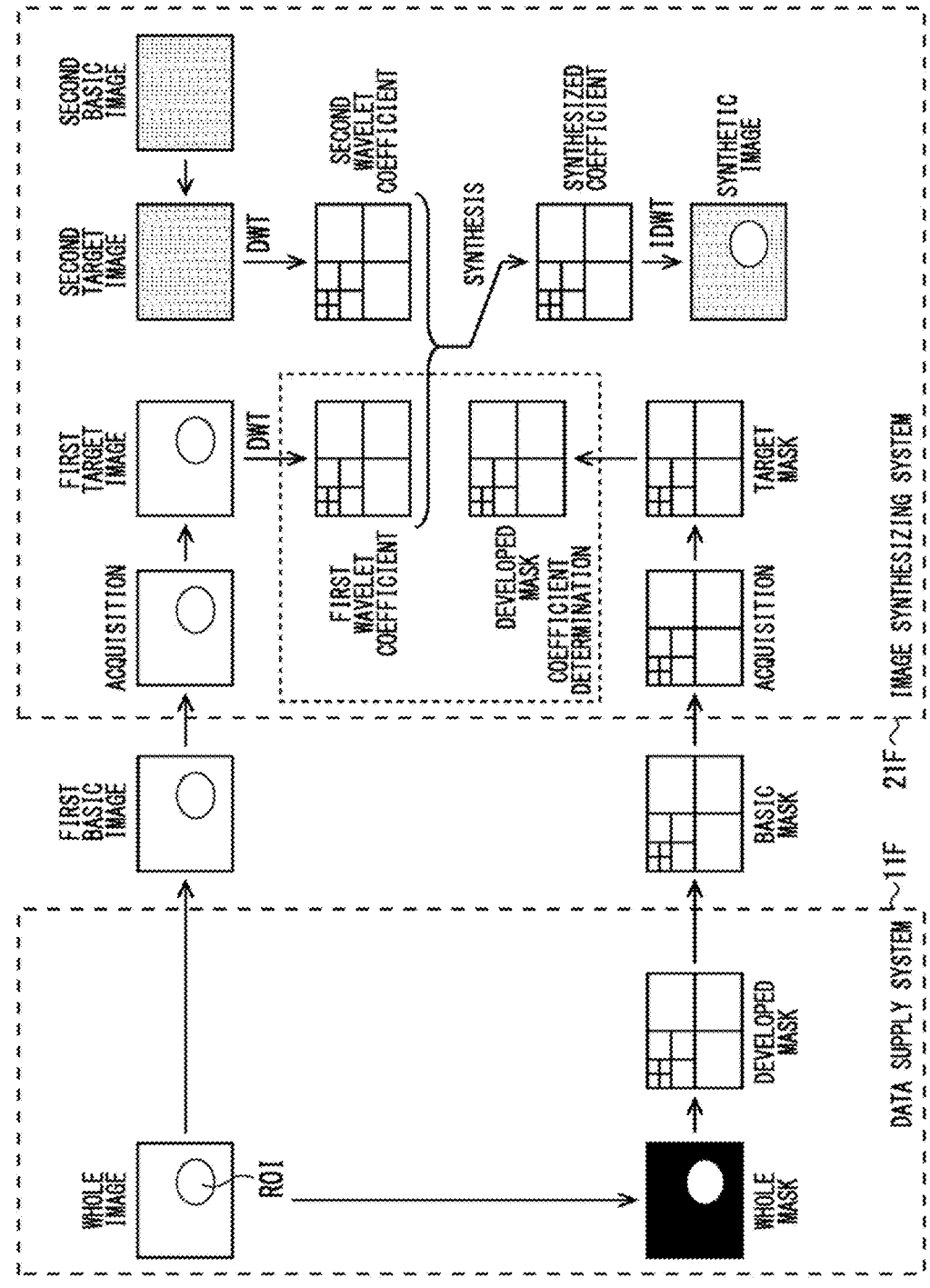

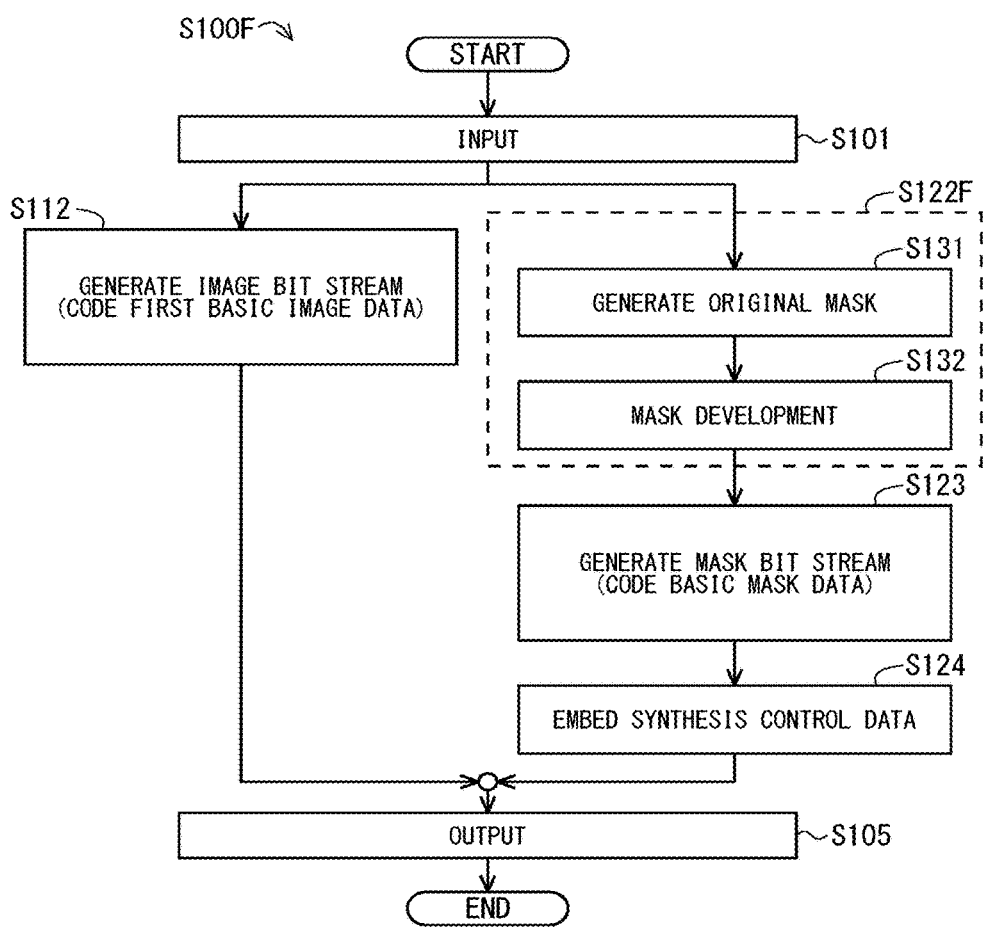
F I G . 5 3

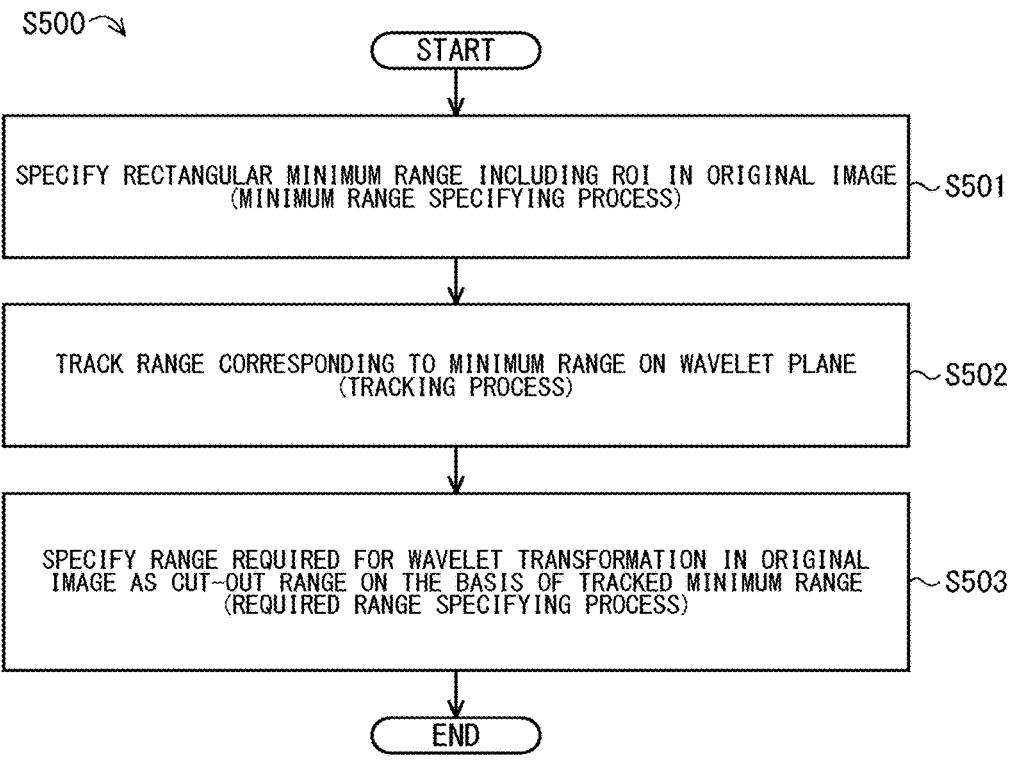
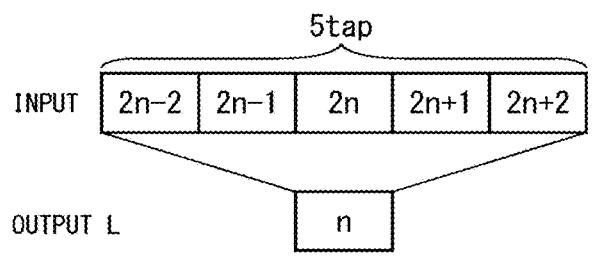

F I G . 6 2
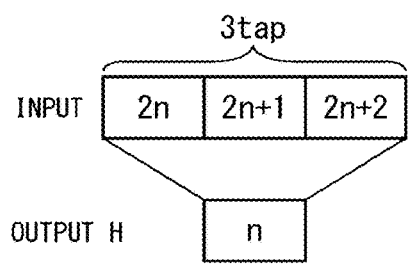
F I G . 6 3
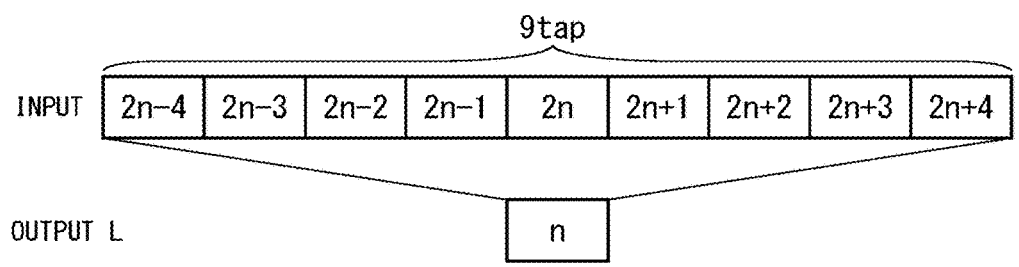
F I G . 6 4
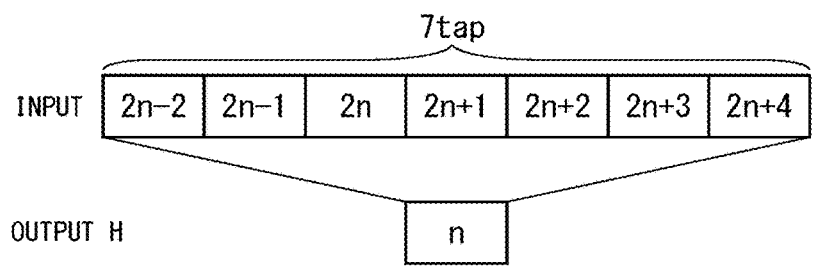

F I G. 7 5
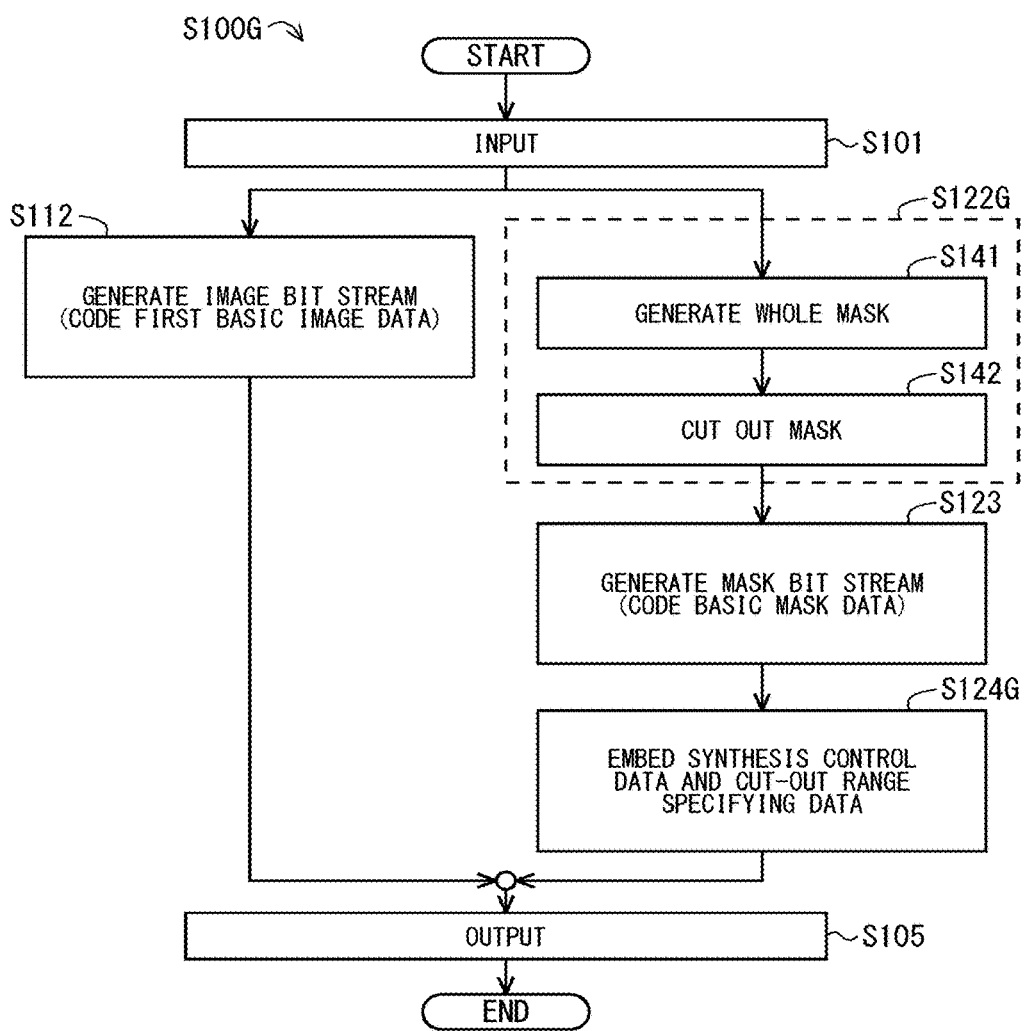

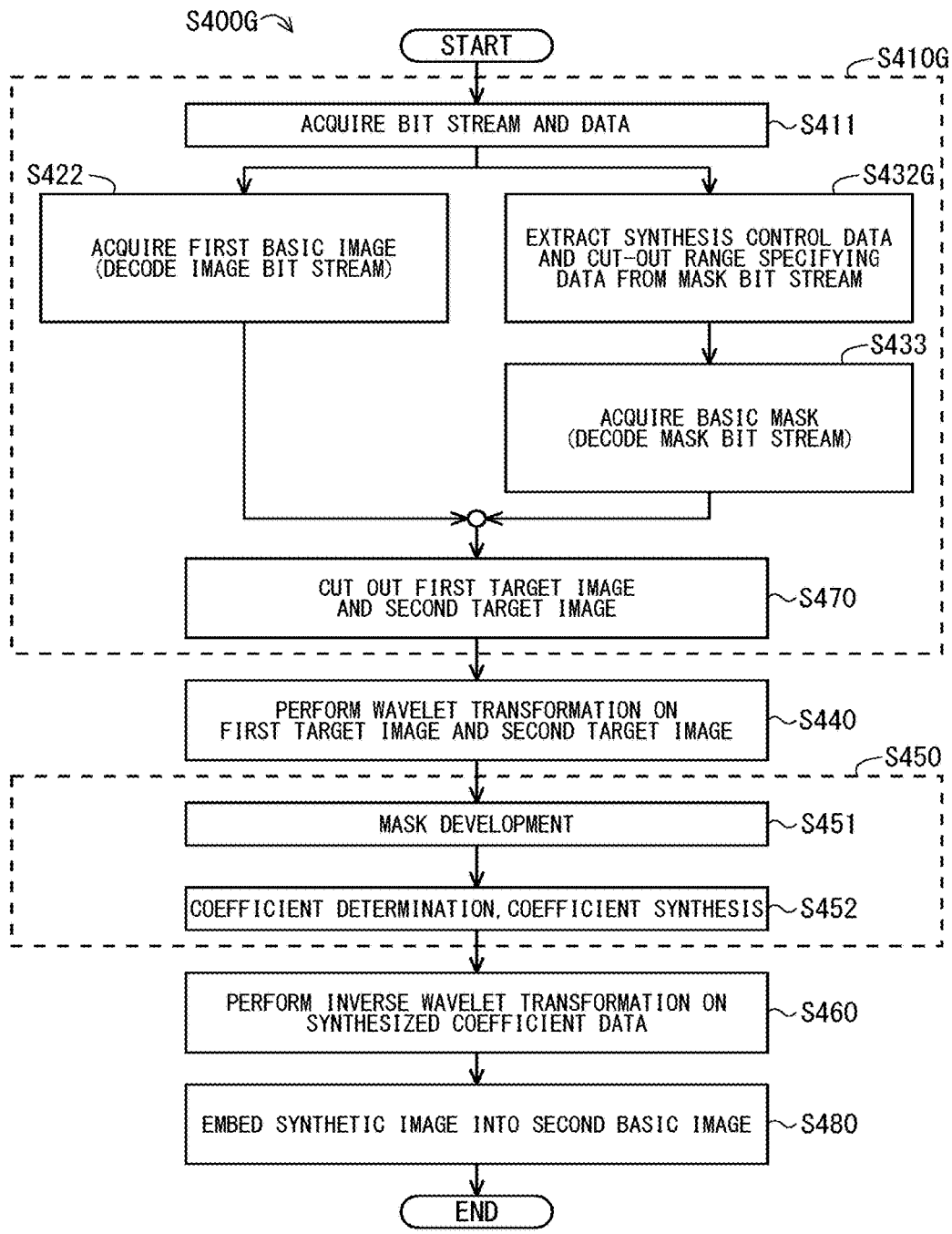

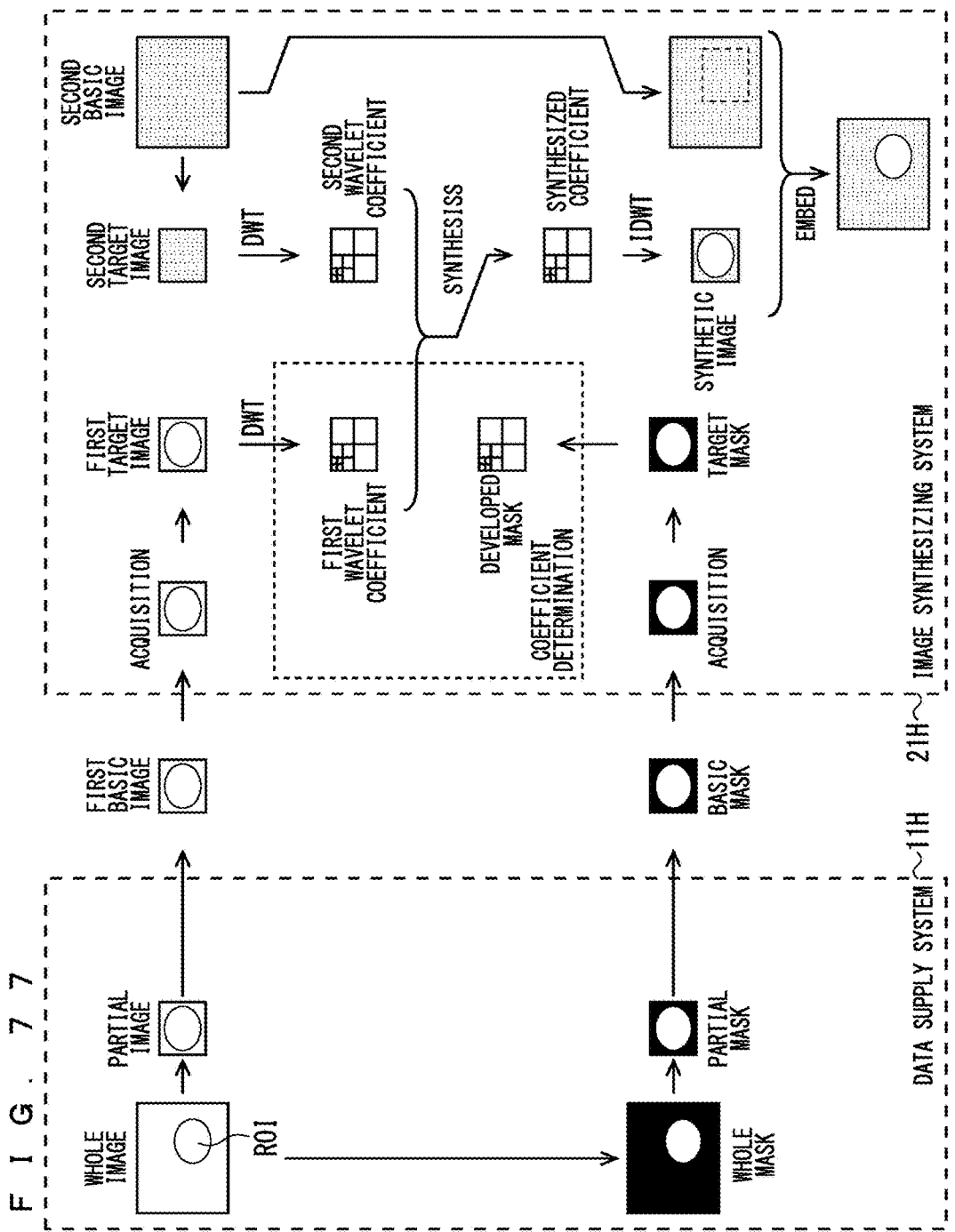
F I G. 77

F I G . 7 9
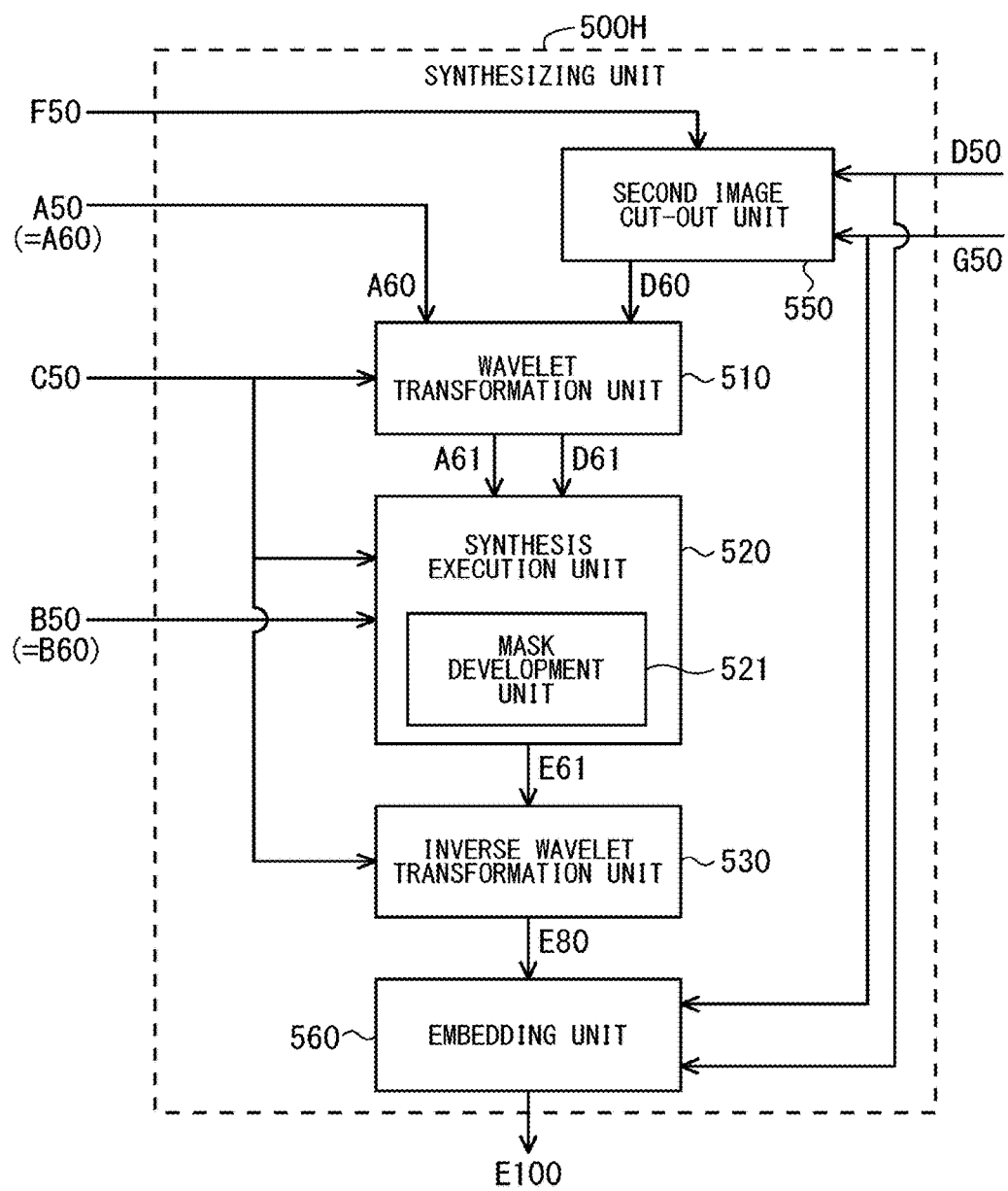

F I G. 9 3
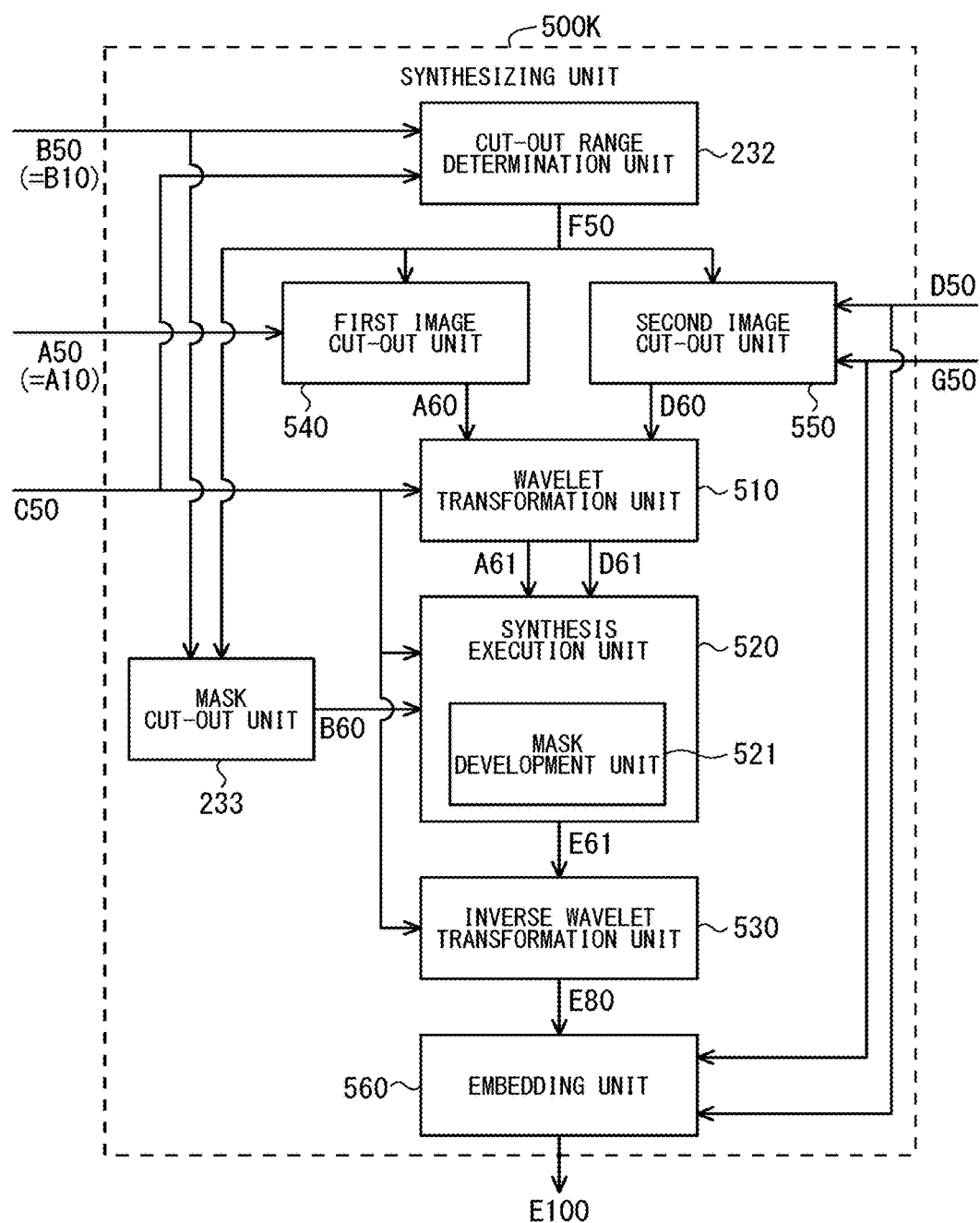

F I G . 9 6
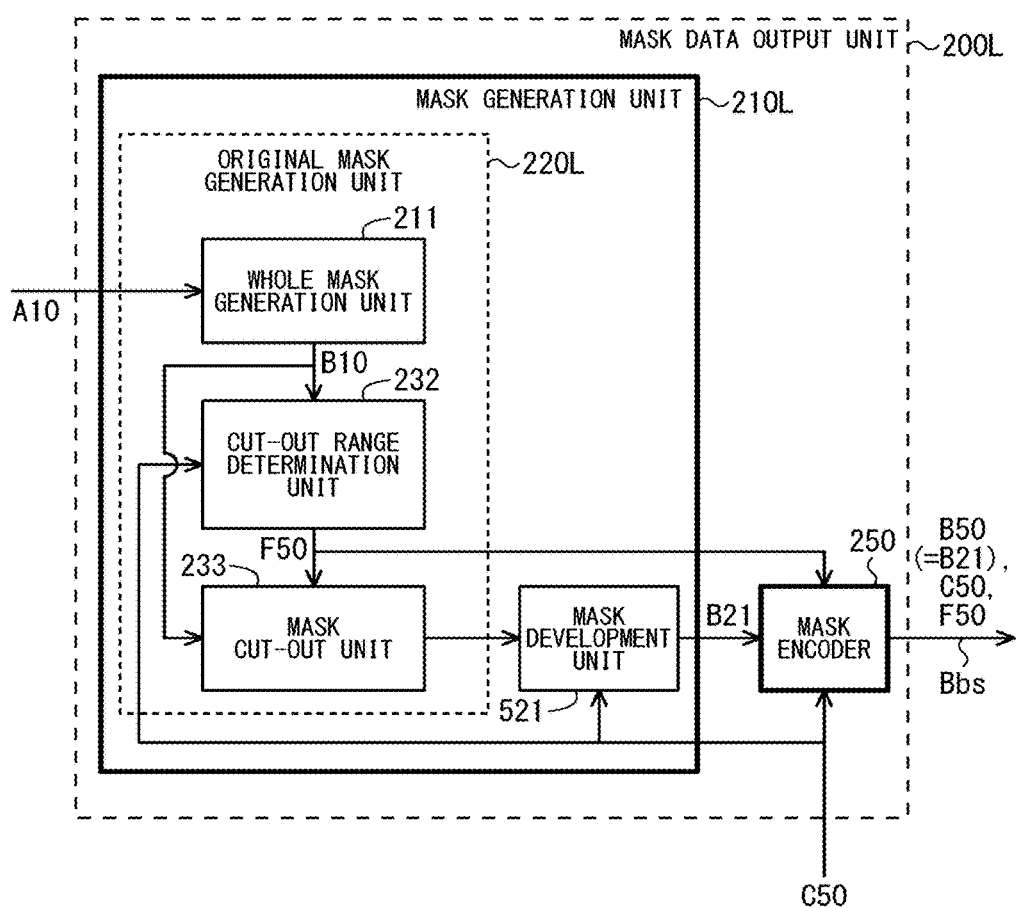

F I G . 9 7
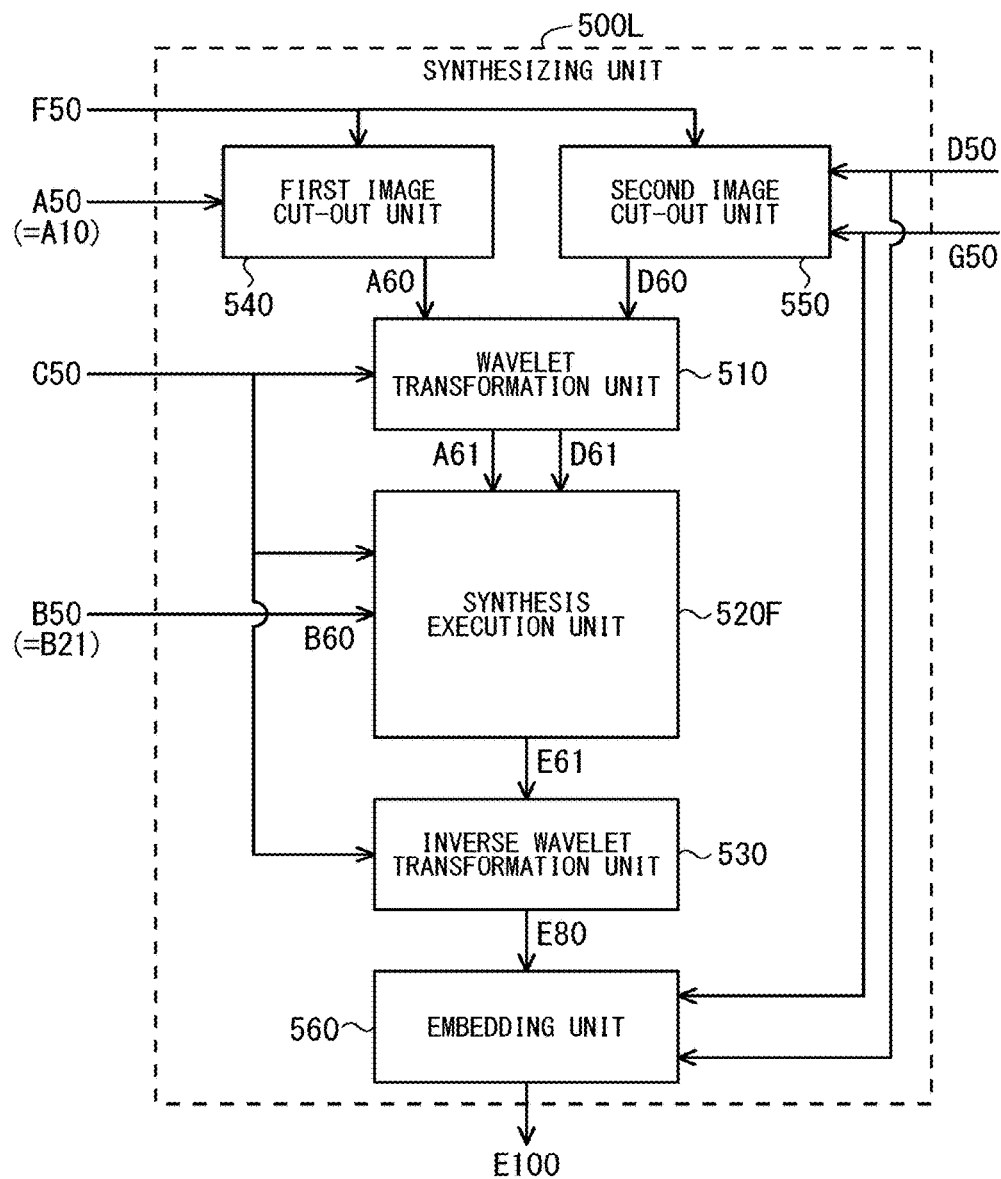

F I G . 1 0 5
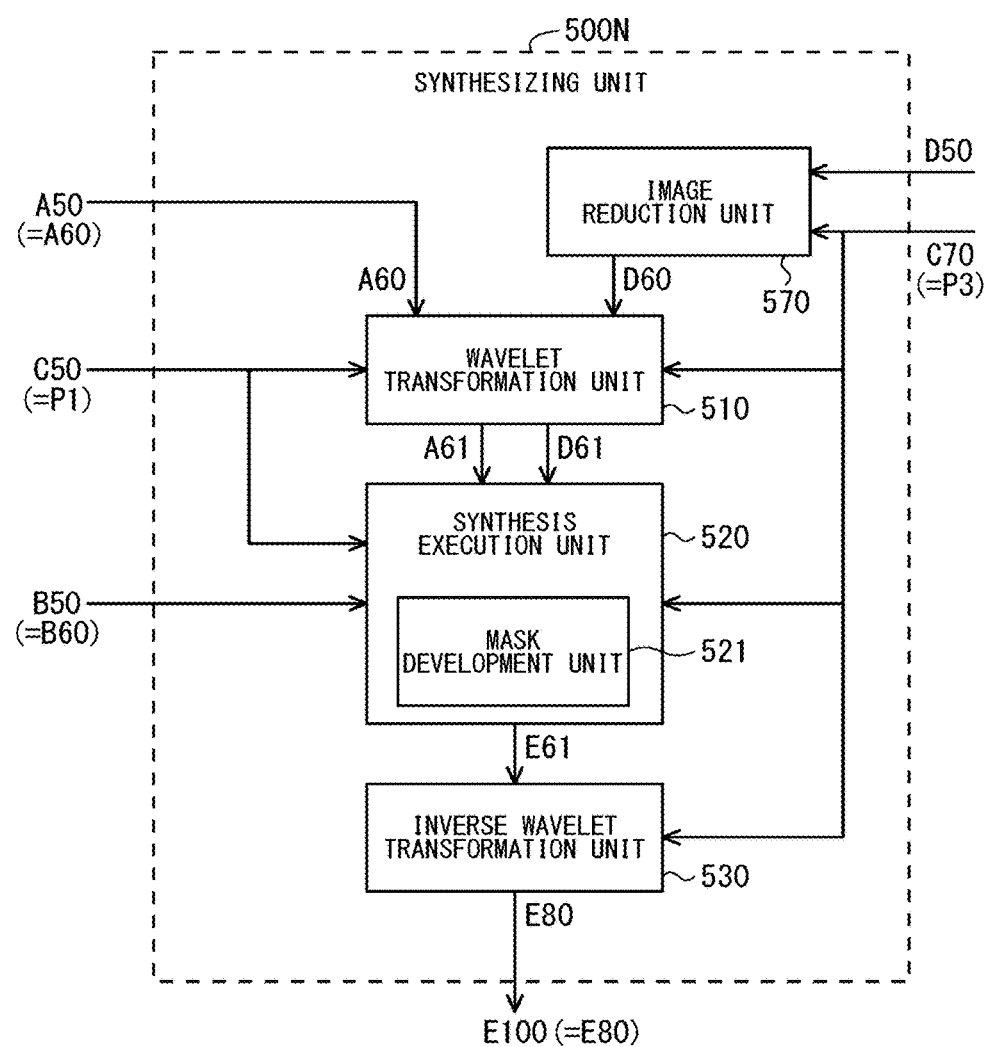

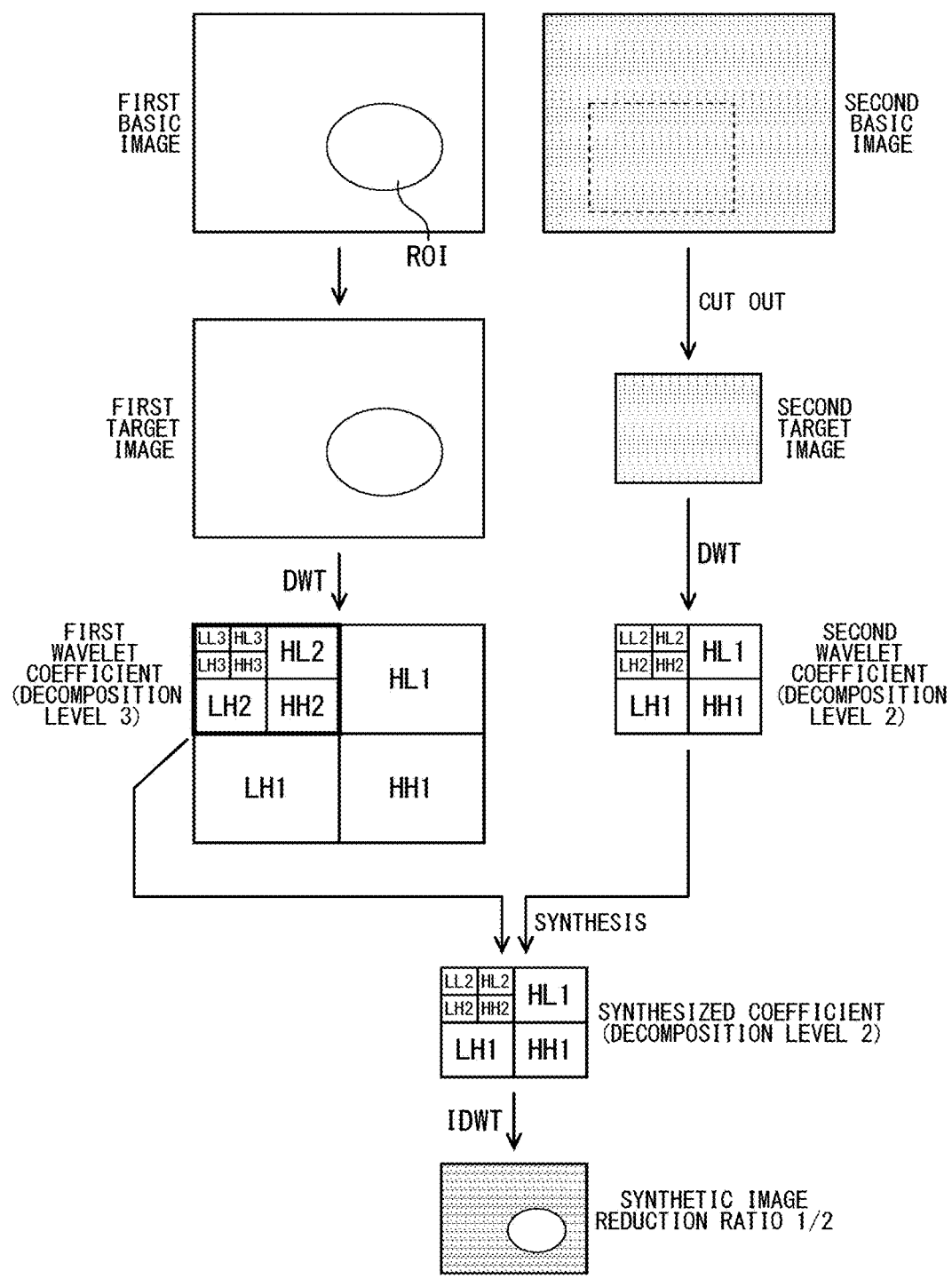
F I G . 1 0 7

F I G. 1 0 8
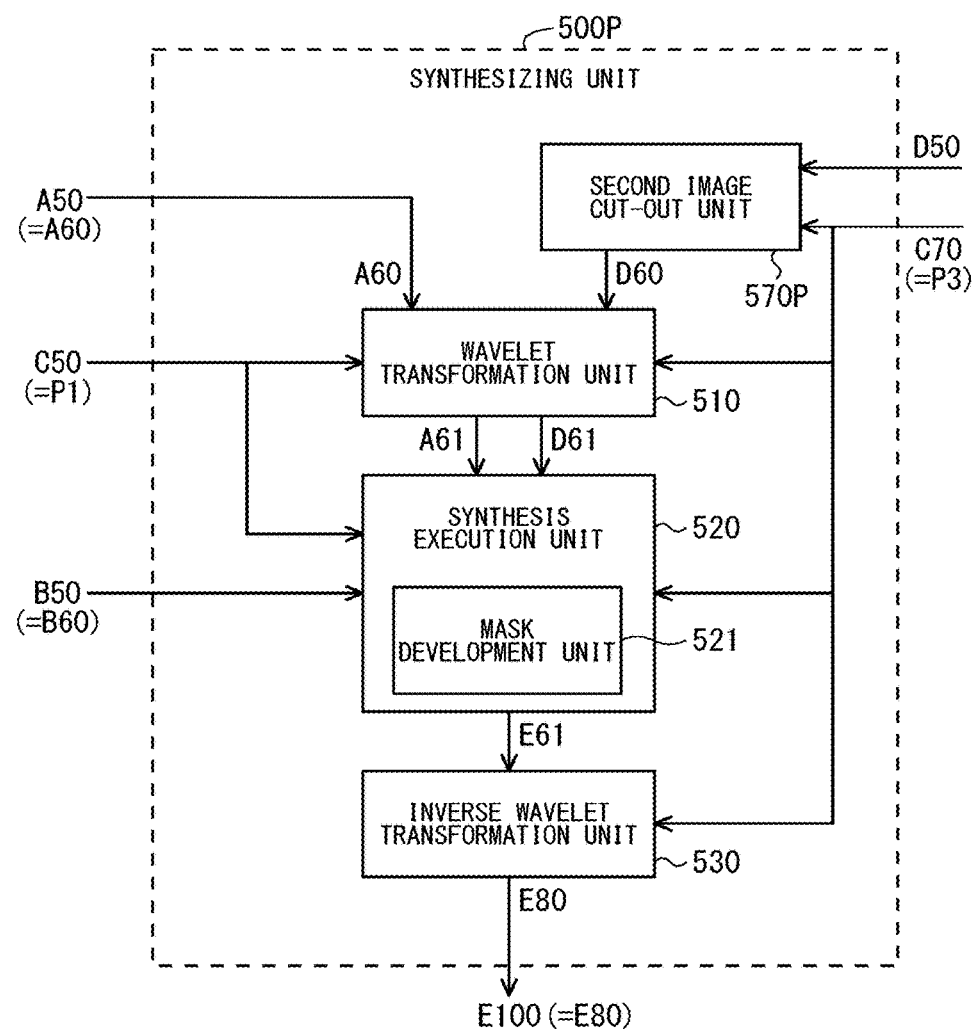

F I G . 1 1 3
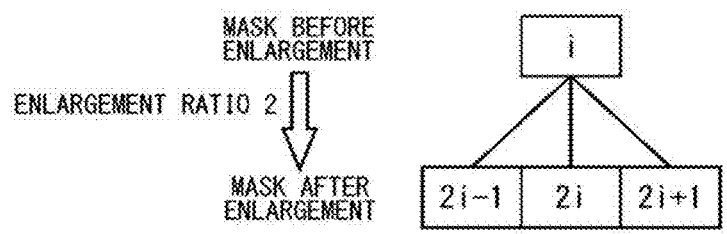
F I G . 1 1 4
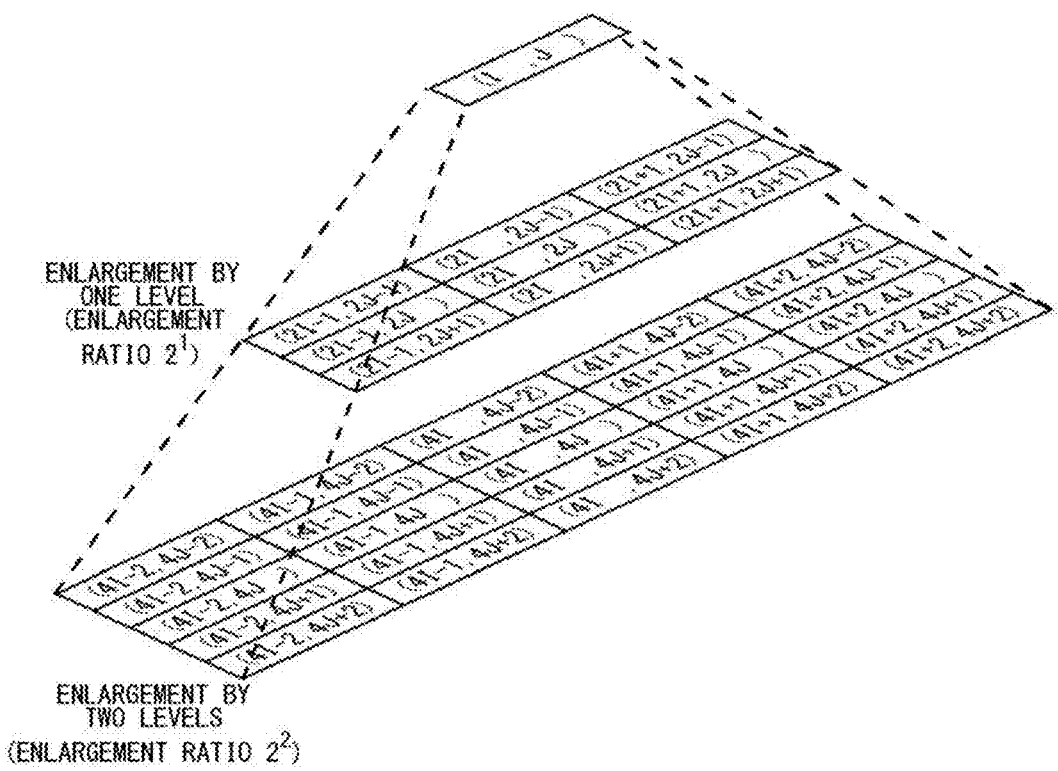

F I G . 1 1 5
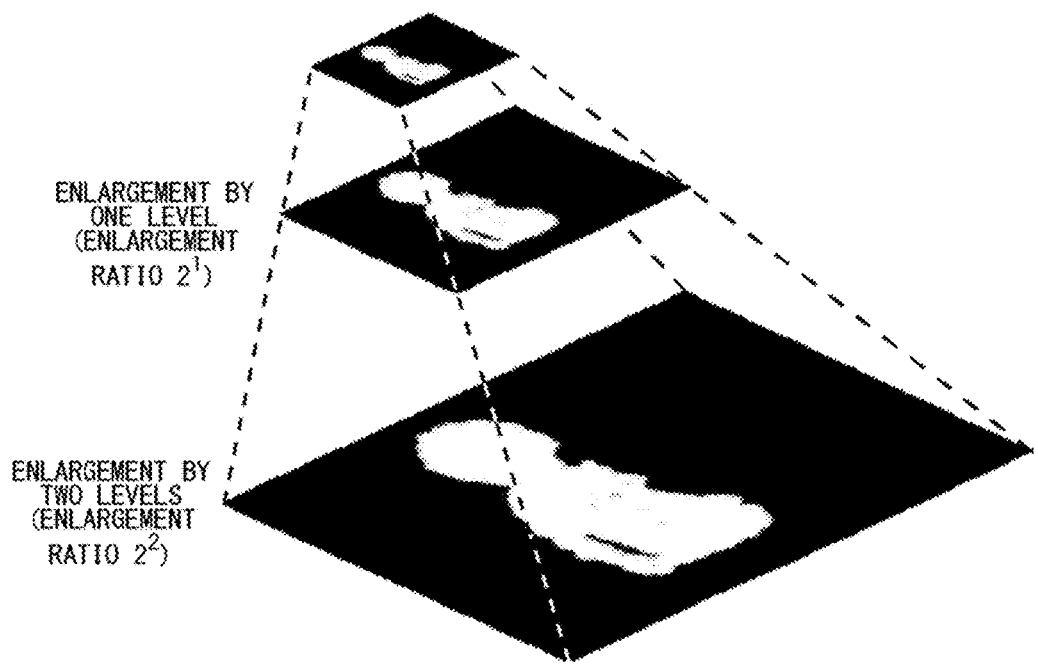
F I G . 1 1 6
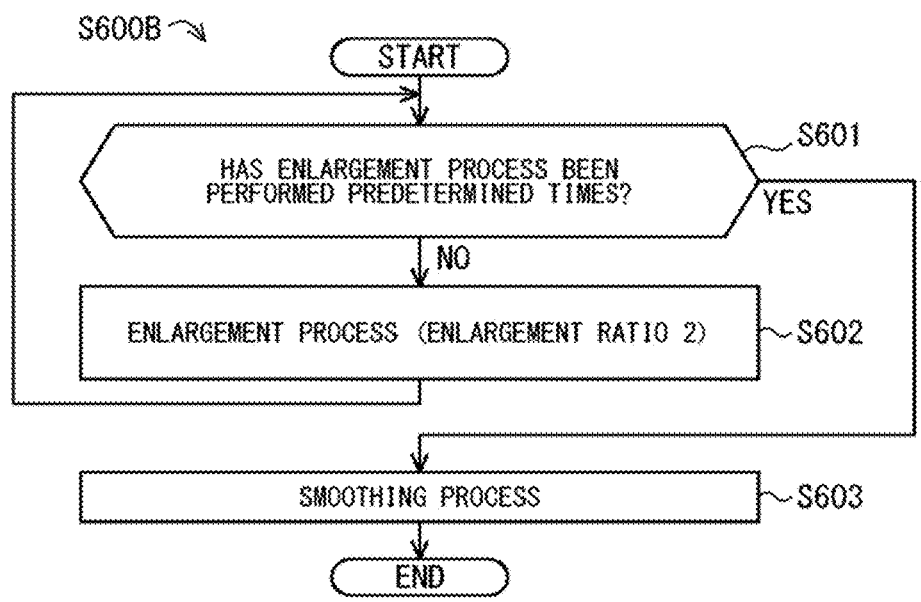

F I G . 1 1 7
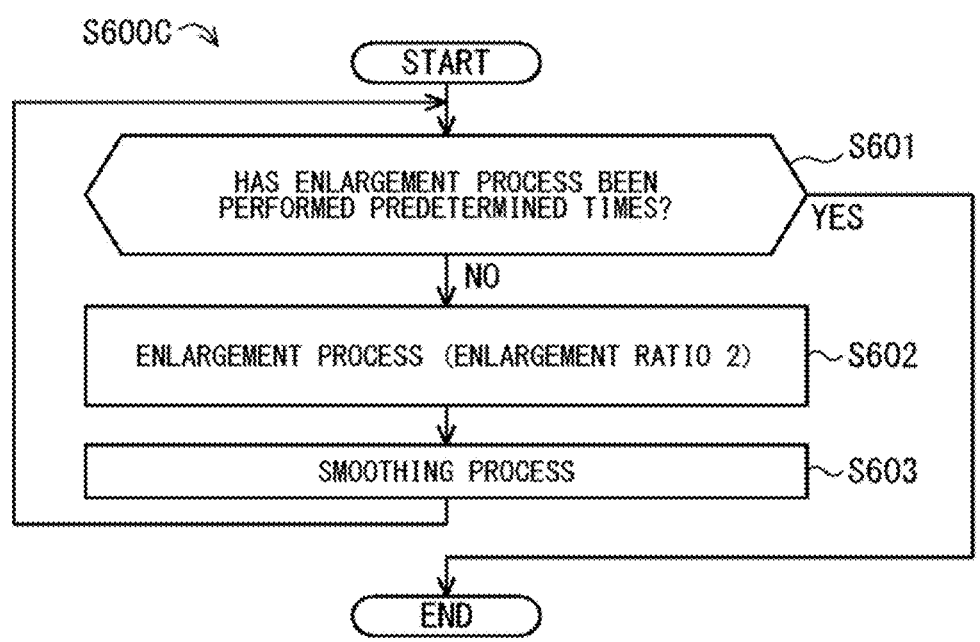
F I G . 1 1 8
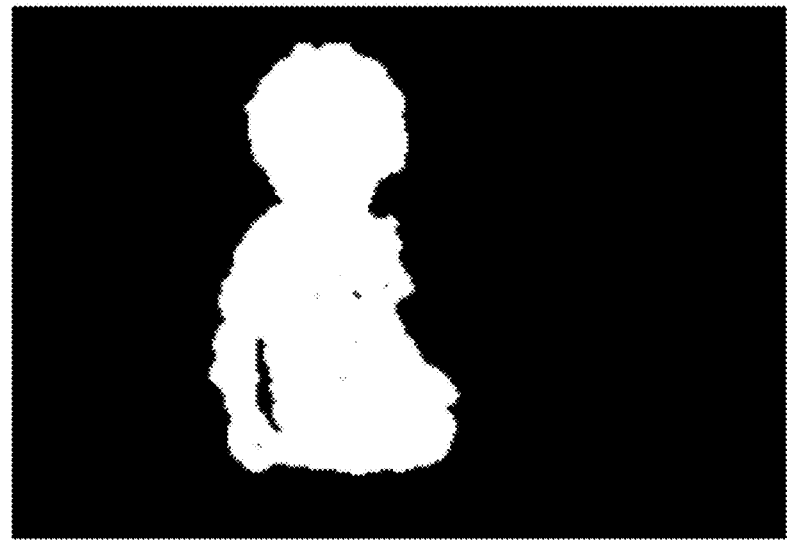
WITHOUT SMOOTHING

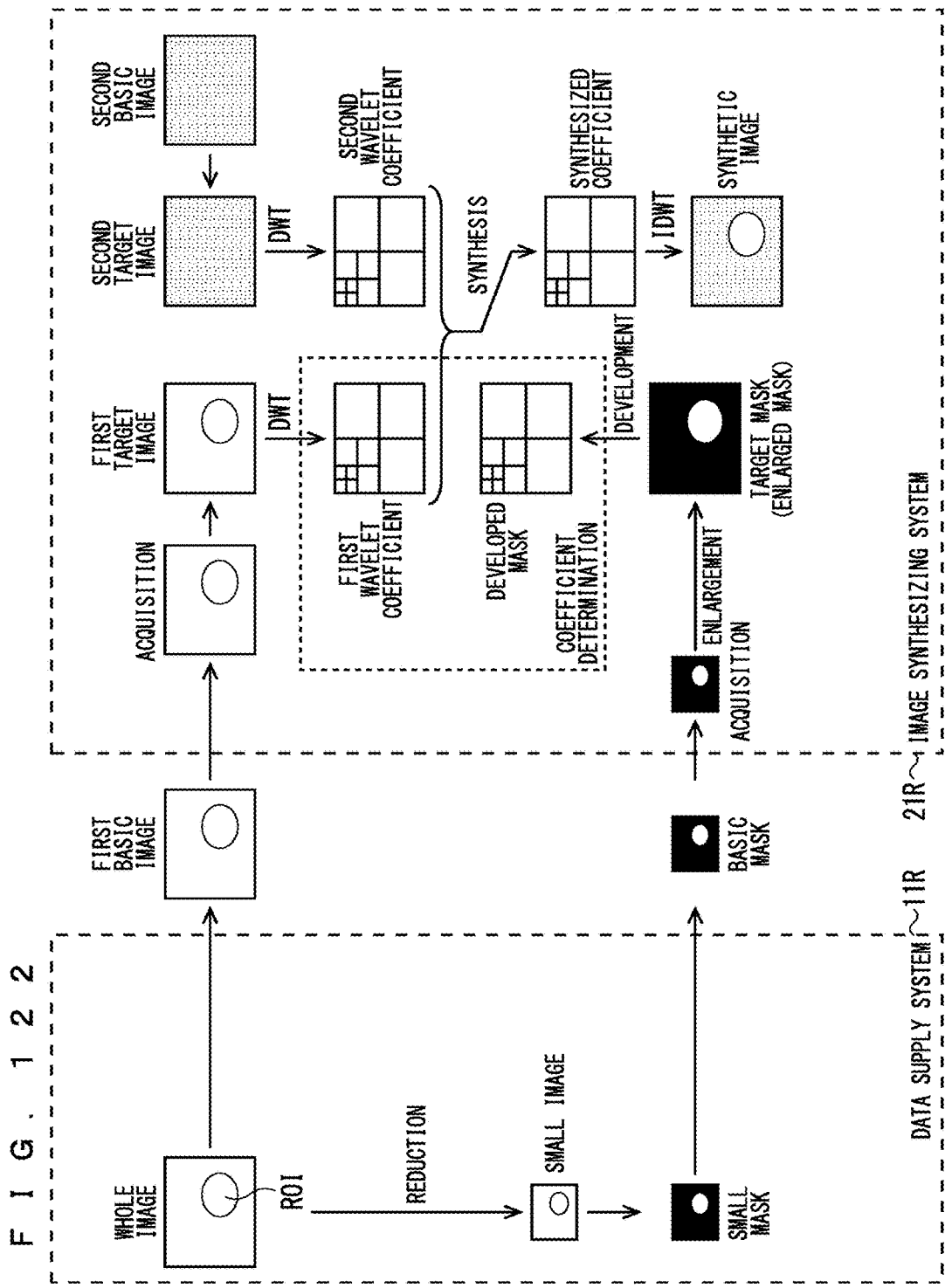
F I G. 1 2 2

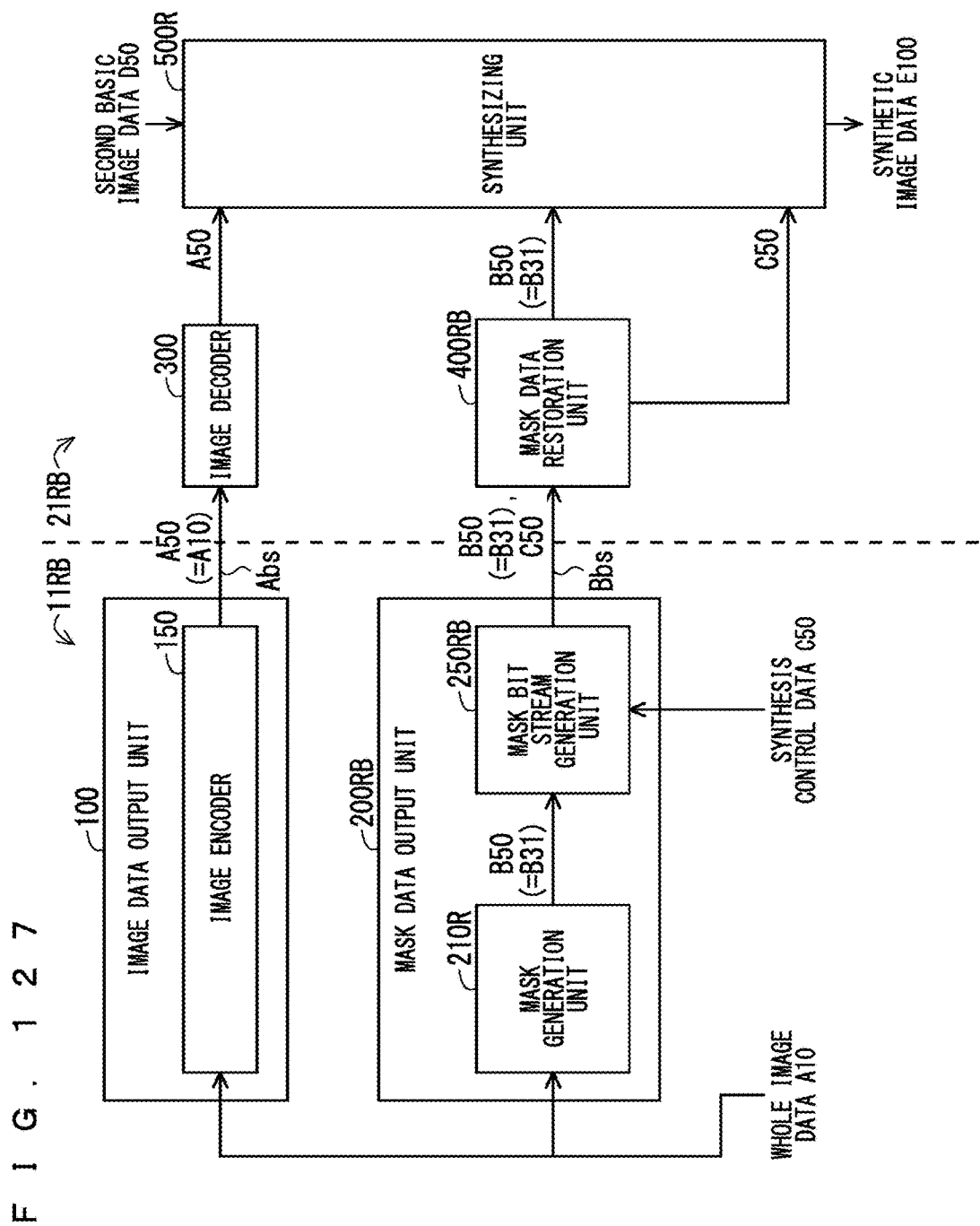
F I G . 1 2 7

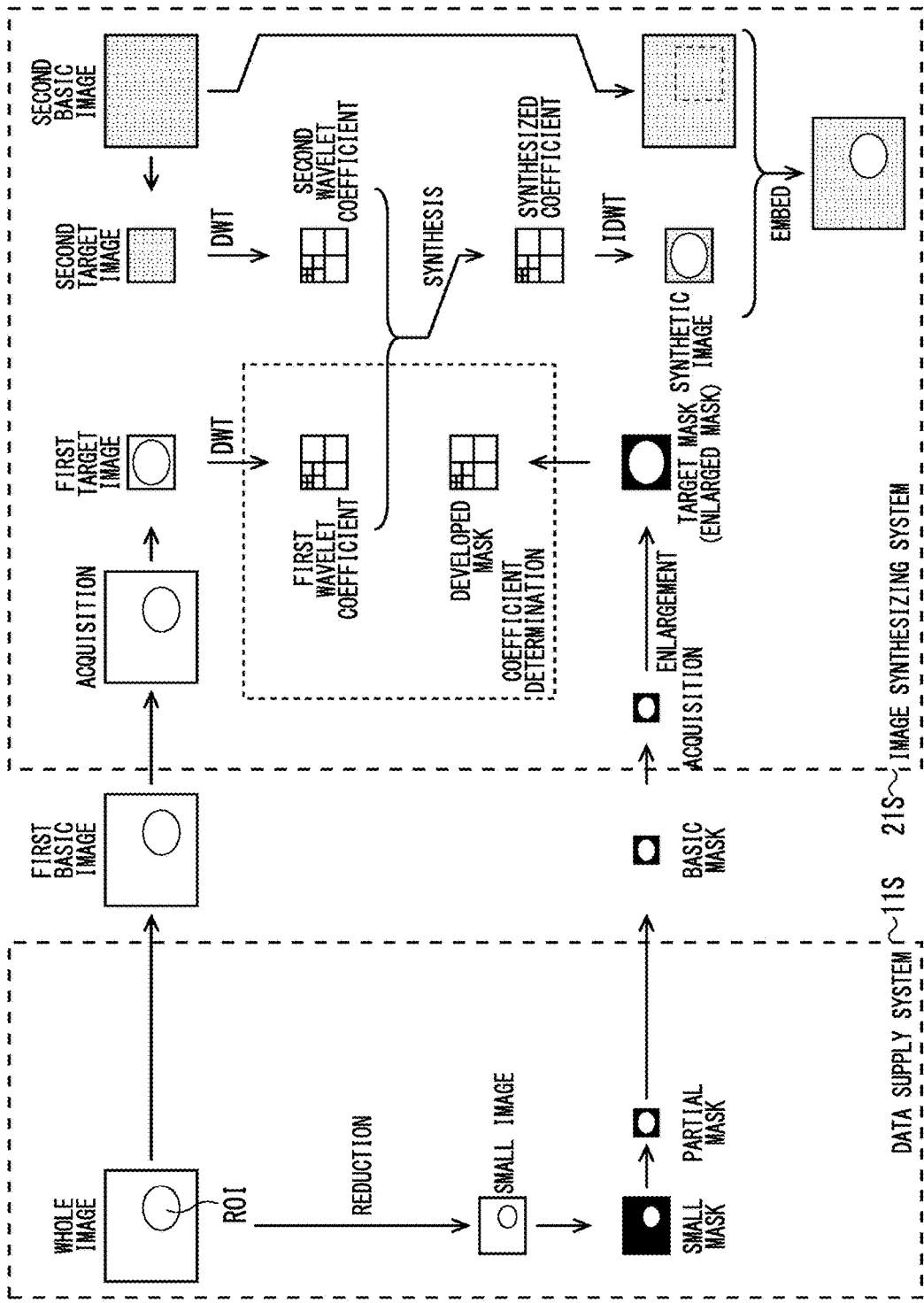

FIG. 132
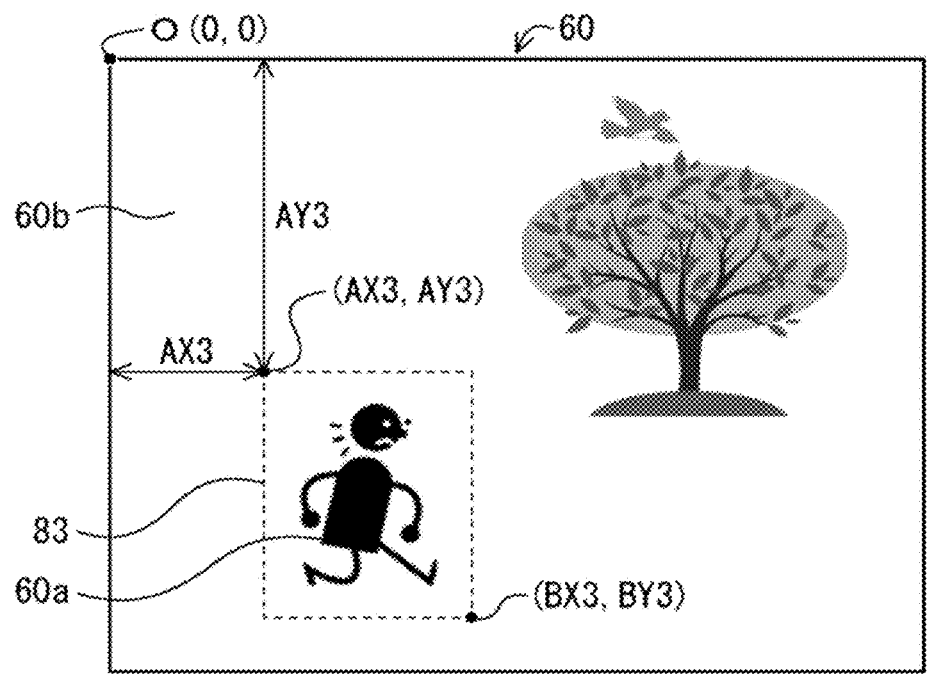
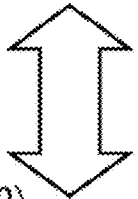
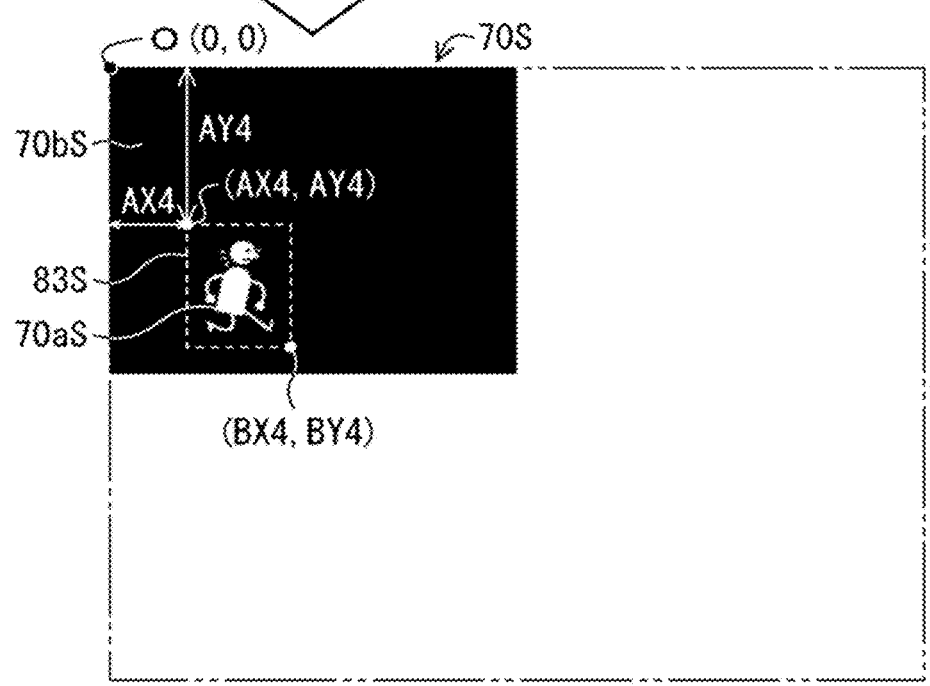

IMAGE PROCESSING SYSTEM AND IMAGE PROCESSING METHOD

BACKGROUND OF THE INVENTION

Field of the Invention

The present invention relates to an image processing system and an image processing method.

Description of the Background Art

In Japanese Patent Application Laid Open Gazette Nos. 2013-254291, 2007-088897, and 2006-093784, disclosed is a technique for detecting a moving body in a moving image. Further, in Japanese Patent Application Laid Open Gazette Nos. 2009-199363 and 2005-165688, disclosed is a technique using a particle filter to track a moving body. By using such a moving body detection technique, the moving body in the image can be cut out as an ROI (Region Of Interest).

Further, another technique is well known where with a still image captured by a digital camera as an object, a foreground image and a background image are separated from the whole image by a graph cut method. By using such an image separation technique, the foreground image can be cut out as an ROI.

SUMMARY

As described above, various techniques for automatically setting an ROI have been developed. It is thought to be still technically difficult, however, to detect a desired region to be set as an ROI with high accuracy.

For example, it is difficult to correctly determine a contour of an ROI, in other words, a border between an ROI and a non-ROI. For this reason, an ROI is sometimes set to have a portion which locally protrudes from the desired region, or conversely, to have a portion in which the desired region is locally eroded. Further, an ROI is sometimes set to have a defect in the desired region. In other words, though the entire desired region should be originally set as an ROI, it is determined that there is a non-ROI in the desired region, and then the non-ROI forms the defect of the ROI. Even when an insufficient ROI having such a defective portion on the contour thereof and/or in the inside thereof is synthesized with another image, it may be felt that the synthetic image is unnatural.

It is an object of the present invention to provide a technique that makes it possible to generate a synthetic image having a repaired ROI even when an insufficient ROI is used and further to adjust the state of synthesis. It is another object of the present invention to provide its relevant techniques.

According to the present invention, for example, provided are first to eightieth aspects described below.

The present invention is intended for an image processing system. According to a first aspect of the present invention, the image processing system includes image synthesizing circuitry configured to synthesize an ROI (Region Of Interest) in a first target image and a second target image. The second target image is a similar figure to the first target image and the similarity ratio of the second target image to the first target image is not larger than 1. The image synthesizing circuitry is further configured to acquire first basic image data, basic mask data, second basic image data, and synthesis control data. The first basic image data are data of a first basic image that is a source of the first target image. The basic mask data are data of a basic mask that is a source of a target mask to be used to determine the ROI and a non-ROI in a range of the first target image. The second basic image data are data of a second basic image that is a source of the second target image. The synthesis control data are data to be used to control the state of synthesis. The image synthesizing circuitry is further configured to generate first wavelet coefficient data by performing wavelet transformation on first target image data which are data of the first target image until a decomposition level becomes a specified decomposition level specified by the synthesis control data. The image synthesizing circuitry is further configured to generate second wavelet coefficient data by performing the wavelet transformation on second target image data which are data of the second target image until a decomposition level becomes a decomposition level which depends on the specified decomposition level and the similarity ratio. When it is assumed that the specified decomposition level of the first wavelet coefficient data is P1, the decomposition level of the second wavelet coefficient data is P2, and the similarity ratio is $1/2^{P3}$, $P2=P1-P3$. The image synthesizing circuitry is further configured to generate synthesized coefficient data having the same image size and decomposition level as those of the second wavelet coefficient data by performing a coefficient determination process and a coefficient synthesis process. In the coefficient determination process, an ROI coefficient related to the ROI and a non-ROI coefficient related to the non-ROI in the first wavelet coefficient data are determined on the basis of target mask data which are data of the target mask. In the coefficient synthesis process, the ROI coefficient in the first wavelet coefficient data and a wavelet coefficient in the second wavelet coefficient data are synthesized. The image synthesizing circuitry is further configured to generate synthetic image data by performing inverse wavelet transformation on the synthesized coefficient data until the decomposition level becomes a predetermined end level.

According to a second aspect of the present invention, the image processing system of the first aspect further includes data supply circuitry configured to output the first basic image data and the basic mask data.

According to a third aspect of the present invention, in the image processing system of the first aspect, the image synthesizing circuitry is configured to acquire the synthesis control data through the same medium as that used to supply the first basic image data and the basic mask data.

According to a fourth aspect of the present invention, the image processing system of the third aspect further includes data supply circuitry configured to output the first basic image data, the basic mask data, the synthesis control data through a wireless or wired communication medium.

According to a fifth aspect of the present invention, in the image processing system of the first aspect, the image synthesizing circuitry is configured to acquire the synthesis control data through a medium different from that used to supply the first basic image data and the basic mask data.

According to a sixth aspect of the present invention, in the image processing system of the fifth aspect, the image synthesizing circuitry is configured to acquire the first basic image data and the basic mask data through a wireless or wired communication medium or an external memory medium and acquire the synthesis control data from a user through an operating medium provided on the side of the image synthesizing circuitry.

According to a seventh aspect of the present invention, the image processing system of the fifth or sixth aspect further includes data supply circuitry configured to output the first basic image data and the basic mask data through a wireless or wired communication medium.

According to an eighth aspect of the present invention, in the image processing system of any one of the first to seventh aspects, the image synthesizing circuitry is configured to selectively use one of a plurality of pieces of synthesis control data.

According to a ninth aspect of the present invention, in the image processing system of the eighth aspect, the plurality of pieces of synthesis control data include first synthesis control data supplied by user input to an operating medium provided on the side of the image synthesizing circuitry and second synthesis control data supplied through a medium different from the operating medium. The image synthesizing circuitry is configured to preferentially use the first synthesis control data.

According to a tenth aspect of the present invention, in the image processing system of any one of the first to ninth aspects, the image synthesizing circuitry is configured to acquire an image bit stream which is a coded bit stream of the first basic image data, acquire the first basic image data by decoding the image bit stream, acquire a mask bit stream which is a bit stream of the basic mask data, and restore the basic mask data from the mask bit stream by using an algorithm independent of the decoding of the image bit stream. The image synthesizing circuitry is further configured to acquire the image bit stream and the mask bit stream as different bit streams.

According to an eleventh aspect of the present invention, the image processing system of the tenth aspect further includes data supply circuitry configured to output the first basic image data and the basic mask data. The data supply circuitry is further configured to generate the image bit stream by coding the first basic image data, generate the basic mask data by using an algorithm independent of the coding of the first basic image data, and generate the mask bit stream from the basic mask data. The first basic image data are outputted from the data supply circuitry as the image bit stream. The basic mask data are outputted from the data supply circuitry as the mask bit stream. The data supply circuitry is further configured to output the image bit stream and the mask bit stream as different bit streams.

According to a twelfth aspect of the present invention, in the image processing system of the tenth aspect, the synthesis control data are supplied to the image synthesizing circuitry, being embedded in a region in the mask bit stream, which has no effect on the basic mask data. The image synthesizing circuitry is configured to extract the synthesis control data from the mask bit stream.

According to a thirteenth aspect of the present invention, the image processing system of the twelfth aspect further includes data supply circuitry configured to output the first basic image data and the basic mask data. The data supply circuitry is further configured to generate the image bit stream by coding the first basic image data, generate the basic mask data by using an algorithm independent of the coding of the first basic image data, and generate the mask bit stream from the basic mask data. The data supply circuitry is further configured to embed the synthesis control data into the region in the mask bit stream. The first basic image data are outputted from the data supply circuitry as the image bit stream. The basic mask data and the synthesis control data are outputted from the data supply circuitry as the mask bit stream. The data supply circuitry is further configured to output the image bit stream and the mask bit stream as different bit streams.

According to a fourteenth aspect of the present invention, in the image processing system of any one of the first to ninth aspects, the image synthesizing circuitry is configured to acquire an image bit stream which is a coded bit stream of the first basic image data, acquire the first basic image data by decoding the image bit stream, acquire a mask bit stream which is a bit stream of the basic mask data, and restore the basic mask data from the mask bit stream by using an algorithm independent of the decoding of the image bit stream. The mask bit stream is supplied to the image synthesizing circuitry, being embedded in a region in the image bit stream, which has no effect on the first basic image data. The image synthesizing circuitry is further configured to extract the mask bit stream from the image bit stream.

According to a fifteenth aspect of the present invention, the image processing system of the fourteenth aspect further includes data supply circuitry configured to output the first basic image data and the basic mask data. The data supply circuitry is further configured to generate the image bit stream by coding the first basic image data, generate the basic mask data by using an algorithm independent of the coding of the first basic image data, and generate the mask bit stream from the basic mask data. The first basic image data are outputted from the data supply circuitry as the image bit stream. The basic mask data are outputted from the data supply circuitry as the mask bit stream. The data supply circuitry is further configured to embed the mask bit stream into the region in the image bit stream, to thereby output the image bit stream and the mask bit stream as a single bit stream.

According to a sixteenth aspect of the present invention, in the image processing system of the fourteenth aspect, the synthesis control data are supplied to the image synthesizing circuitry, being embedded in the region in the image bit stream. The image synthesizing circuitry is configured to extract the synthesis control data from the image bit stream.

According to a seventeenth aspect of the present invention, the image processing system of the sixteenth aspect further includes data supply circuitry configured to output the first basic image data and the basic mask data. The data supply circuitry is further configured to generate the image hit stream by coding the first basic image data, generate the basic mask data by using an algorithm independent of the coding of the first basic image data, and generate the mask bit stream from the basic mask data. The first basic image data are outputted from the data supply circuitry as the image bit stream. The basic mask data are outputted from the data supply circuitry as the mask bit stream. The data supply circuitry is further configured to embed the mask bit stream and the synthesis control data into the region in the image bit stream, to thereby output the image bit stream, the mask bit stream, and the synthesis control data as a single bit stream.

According to an eighteenth aspect of the present invention, in the image processing system of any one of the first to seventeenth aspects, the coefficient synthesis process is a first coefficient synthesis process for substituting the non-ROI coefficient in the first wavelet coefficient data with a corresponding wavelet coefficient in the second wavelet coefficient data, or a second coefficient synthesis process for embedding the ROI coefficient in the first wavelet coefficient data into a corresponding position in the second wavelet coefficient data.

According to a nineteenth aspect of the present invention, in the image processing system of any one of the first to eighteenth aspects, the basic mask is an original mask whose target is an original image which is an image not being subjected to the wavelet transformation yet. The original mask indicates which of the ROI and the non-ROI to which each pixel in the original image belongs and has an ROI corresponding portion corresponding to the ROI in the original image and a non-ROI corresponding portion corresponding to the non-ROI therein. The image synthesizing circuitry is configured to generate a developed mask for the first wavelet coefficient data by performing a mask development process for developing the ROI corresponding portion and the non-ROI corresponding portion of the target mask included in the basic mask, for each band component included in the first wavelet coefficient data, and perform the coefficient determination process on the basis of the distinction between the ROI corresponding portion and the non-ROI corresponding portion in the developed mask.

According to a twentieth aspect of the present invention, the image processing system of the nineteenth aspect further includes data supply circuitry configured to output the first basic image data and the basic mask data. The data supply circuitry is further configured to generate the original mask for a range of the first basic image, and output data of the original mask as the basic mask data.

According to a twenty-first aspect of the present invention, in the image processing system of any one of the first to eighteenth aspects, the basic mask is a developed mask for the first wavelet coefficient data. The developed mask is a mask generated by performing a mask development process for developing an original mask whose target is an original image which is an image not being subjected to the wavelet transformation yet, for each band component included in the first wavelet coefficient data. The original mask indicates which of the ROI and the non-ROI to which each pixel in the original image belongs and has an ROI corresponding portion corresponding to the ROI in the original image and a non-ROI corresponding portion corresponding to the non-ROI therein. The image synthesizing circuitry is configured to perform the coefficient determination process on the basis of the distinction between the ROI corresponding portion and the non-ROI corresponding portion which are developed into the developed mask.

According to a twenty-second aspect of the present invention, the image processing system of the twenty-first aspect further includes data supply circuitry configured to output the first basic image data and the basic mask data. The data supply circuitry is further configured to generate the original mask for a range of the first basic image, generate the developed mask by performing the mask development process on the original mask, and output data of the developed mask as the basic mask data.

According to a twenty-third aspect of the present invention, in the image processing system of any one of the first to twenty-second aspects, the image synthesizing circuitry is configured to use a whole range of the first basic image as the first target image and use a whole range of the basic mask as the target mask.

According to a twenty-fourth aspect of the present invention, the image processing system of the twenty-third aspect further includes data supply circuitry configured to output the first target image data as the first basic image data, generate the target mask for a range of the first target image, and output the target mask data as the basic mask data.

According to a twenty-fifth aspect of the present invention, the image processing system of the twenty-third aspect further includes data supply circuitry configured to cut out the first target image from a whole image including the ROI, output the first target image data as the first basic image data, generate the target mask for a range of the first target image, and output the target mask data as the basic mask data.

According to a twenty-sixth aspect of the present invention, in the image processing system of the twenty-fifth aspect, the data supply circuitry is configured to generate whole mask data which are data of a whole mask to be used to determine the ROI and the non-ROI in a range of the whole image on the basis of whole image data which are data of the whole image, perform a cut-out range determination process for determining a cut-out range which is a range of the first target image in the whole image, on the basis of the whole mask data and the synthesis control data, to thereby generate cut-out range specifying data to be used to specify the cut-out range, cut out data within the cut-out range in the whole mask data, for the basic mask data, on the basis of the cut-out range specifying data, and cut out data within the cut-out range in the whole image data, as the first basic image data, on the basis of the cut-out range specifying data.

According to a twenty-seventh aspect of the present invention, in the image processing system of any one of the first to twenty-second aspects, the image synthesizing circuitry is configured to use part of the first basic image as the first target image and use a whole range of the basic mask as the target mask. The image synthesizing circuitry is further configured to acquire cut-out range specifying data to be used to specify a cut-out range which is a range of the first target image in the first basic image, and cut out data within the cut-out range in the first basic image data, as the first target image data, on the basis of the cut-out range specifying data.

According to a twenty-eighth aspect of the present invention, the image processing system of the twenty-seventh aspect further includes data supply circuitry configured to output whole image data which are data of a whole image whose portion includes the first target image, as the first basic image data, generate the target mask for a range of the first target image, and output the target mask data as the basic mask data. The data supply circuitry is further configured to generate whole mask data which are data of a whole mask to be used to determine the ROI and the non-ROI in a range of the whole image on the basis of the whole image data, perform a cut-out range determination process for determining a cut-out range which is a range of the first target image in the whole image, on the basis of the whole mask data and the synthesis control data, to thereby generate the cut-out range specifying data, cut out data within the cut-out range in the whole mask data, for the basic mask data, on the basis of the cut-out range specifying data. The data supply circuitry is further configured to output the cut-out range specifying data.

According to a twenty-ninth aspect of the present invention, in the image processing system of any one of the first to twenty-second aspects, the image synthesizing circuitry is configured to use part of the first basic image as the first target image and use part of the basic mask as the target mask. The image synthesizing circuitry is further configured to acquire cut-out range specifying data to be used to specify a cut-out range which is a range of the first target image in the first basic image, cut out data within the cut-out range in the basic mask data, for the target mask data, on the basis of the cut-out range specifying data, and cut out data within the cut-out range in the first basic image data, as the first target image data, on the basis of the cut-out range specifying data.

According to a thirtieth aspect of the present invention, the image processing system of the twenty-ninth aspect further includes data supply circuitry configured to output whole image data which are data of a whole image whose portion includes the first target image, as the first basic image data, and generate and output the basic mask data for a range of the whole image. The data supply circuitry is further configured to generate whole mask data which are data of a whole mask to be used to determine the ROI and the non-ROI in a range of the whole image on the basis of the whole image data, and perform a cut-out range determination process for determining a cut-out range which is a range of the first target image in the whole image, on the basis of the whole mask data and the synthesis control data, to thereby generate the cut-out range specifying data. The data supply circuitry is further configured to output the cut-out range specifying data.

According to a thirty-first aspect of the present invention, in the image processing system of any one of the first to twenty-second aspects, the image synthesizing circuitry is configured to use a whole range of the first basic image as the first target image and use part of the basic mask as the target mask. The image synthesizing circuitry is further configured to acquire cut-out range specifying data to be used to specify a cut-out range which is a range of the target mask in the basic mask, and cut out data within the cut-out range in the basic mask data, for the target mask data, on the basis of the cut-out range specifying data.

According to a thirty-second aspect of the present invention, the image processing system of the thirty-first aspect further includes data supply circuitry configured to cut out the first target image from a whole image including the ROI, output the first target image data as the first basic image data, and generate and output the basic mask data for a range of the whole image. The data supply circuitry is further configured to generate whole mask data which are data of a whole mask to be used to determine the ROI and the non-ROI in a range of the whole image on the basis of whole image data which are data of the whole image, perform a cut-out range determination process for determining a cut-out range which is a range of the first target image in the whole image, on the basis of the whole mask data and the synthesis control data to thereby generate cut-out range specifying data, and cut out data within the cut-out range in the whole image data, as the first basic image data, on the basis of the cut-out range specifying data. The data supply circuitry is further configured to output the cut-out range specifying data.

According to a thirty-third aspect of the present invention, in the image processing system of any one of the first to twenty-second aspects, the image synthesizing circuitry is configured to use part of the first basic image as the first target image and use part of the basic mask as the target mask. The image synthesizing circuitry is further configured to perform a cut-out range determination process for determining a cut-out range which is a range of the first target image in the first basic image, on the basis of the basic mask data and the synthesis control data, to thereby generate cut-out range specifying data to be used to specify the cut-out range, cut out data within the cut-out range in the basic mask data, for the target mask data, on the basis of the cut-out range specifying data, and cut out data within the cut-out range in the first basic image data, as the first target image data, on the basis of the cut-out range specifying data.

According to a thirty-fourth aspect of the present invention, the image processing system of the first aspect further includes data supply circuitry configured to output the first basic image data and the basic mask data. The data supply circuitry is further configured to generate a small image by reducing a whole image including the ROI, generate a small mask whose target is the small image, generate an enlarged mask by enlarging the small mask to have the same image size as that of the whole image, and output data of the enlarged mask as the basic mask data.

According to a thirty-fifth aspect of the present invention, in the image processing system of the first aspect, the basic mask is a whole of a small mask whose target is a reduced image of the first basic image or part of the small mask, which includes a ROI corresponding portion. The image synthesizing circuitry is configured to generate an enlarged mask by enlarging the basic mask to have the same image size as that of the first target image, and use the enlarged mask as the target mask.

According to a thirty-sixth aspect of the present invention, the image processing system of the thirty-fifth aspect further includes data supply circuitry configured to generate a small image by reducing a whole image including the ROI, generate the small mask whose target is the small image, and output the whole of or the part of the small mask as the basic mask.

According to a thirty-seventh aspect of the present invention, in the image processing system of any one of the thirty-fourth to thirty-sixth aspects, the reduction ratio of the small mask to the first basic image is $1/2^R$ (R is a natural number). The data supply circuitry is configured to generate the enlarged mask by performing an enlargement process R times with an enlargement ratio of 2 on the small mask. In the enlargement process, when the i-th data (i is an integer) are associated with the ROI in a mask before being subjected to enlargement, the $\{2i-1\}$th data to $\{2i+1\}$th data are associated with the ROI in the mask after being subjected to enlargement.

According to a thirty-eighth aspect of the present invention, in the image processing system of the thirty-seventh aspect, the data supply circuitry is configured to perform a smoothing process on the mask after being subjected to enlargement at the point in time when the enlargement process is finished at least once among the R-times executions.

According to a thirty-ninth aspect of the present invention, in the image processing system of the thirty-sixth aspect, the data supply circuitry is configured to perform a cut-out range determination process on the basis of data of the enlarged mask and the synthesis control data. The data supply circuitry is further configured to determine a cut-out range which is a range of the first target image in the whole image and a small mask cut-out range which corresponds to the cut-out range in the small mask in the cut-out range determination process. The data supply circuitry is further configured to generate cut-out range specifying data to be used to specify the cut-out range and small mask cut-out range specifying data to be used to specify the small mask cut-out range. The data supply circuitry is further configured to cut data within the small mask cut-out range in data of the small mask, for the basic mask data, on the basis of the small mask cut-out range specifying data. The data supply circuitry is further configured to output the cut-out range specifying data.

According to a fortieth aspect of the present invention, in the image processing system of the thirty-sixth aspect, the data supply circuitry is configured to output a coded bit stream of the basic mask data which are data of the whole of or the part of the small mask as a mask bit stream. The image synthesizing circuitry is configured to acquire the basic mask by decoding the mask bit stream.

According to a forty-first aspect of the present invention, in the image processing system of the thirty-sixth aspect, the data supply circuitry is configured to generate a bit stream of the basic mask data as a mask bit stream without coding the basic mask data which are data of the whole of or the part of the small mask. The image synthesizing circuitry is configured to restore the basic mask from the mask bit stream.

According to a forty-second aspect of the present invention, in the image processing system of any one of the first to thirty-third aspects, the image synthesizing circuitry is configured to set a similar figure range in the second basic image, which is a similar figure to the first target image with the similarity ratio, and cut out data within the similar figure range in the second basic image data as the second target image data.

According to a forty-third aspect of the present invention, in the image processing system of the forty-second aspect, the image synthesizing circuitry is configured to embed the synthetic image data obtained by performing the inverse wavelet transformation until the decomposition level becomes 0, into the similar figure range in the second basic image data.

According to a forty-fourth aspect of the present invention, in the image processing system of any one of the first to thirty-third aspects, the image synthesizing circuitry is configured to generate the second target image by reducing at least part of the second basic image.

According to a forty-fifth aspect of the present invention, the image processing system of the first aspect further includes a memory and mask generation circuitry which are connected to the image synthesizing circuitry via a bus. The memory is configured to store therein whole image data which are data of a whole image that is a source of the first basic image, and the second basic image data. The mask generation circuitry is configured to generate the basic mask data on the basis of the whole image data.

According to a forty-sixth aspect of the present invention, the image processing system includes data supply circuitry configured to output data to be used for an image synthesis process for synthesizing an ROI (Region Of Interest) in a first target image and a second target image. The second target image is a similar figure to the first target image and the similarity ratio of the second target image to the first target image is not larger than 1. The image synthesis process includes a wavelet transformation process. In the wavelet transformation process, first wavelet coefficient data are generated by performing wavelet transformation on first target image data which are data of the first target image until a decomposition level becomes a specified decomposition level. In the wavelet transformation process, second wavelet coefficient data are generated by performing the wavelet transformation on second target image data which are data of the second target image until a decomposition level becomes a decomposition level which depends on the specified decomposition level and the similarity ratio. When it is assumed that the specified decomposition level of the first wavelet coefficient data is P1, the decomposition level of the second wavelet coefficient data is P2, and the similarity ratio is $1/2^{P3}$, $P2=P1-P3$. The image synthesis process further includes a synthesis execution process. The synthesis execution process includes a coefficient determination process and a coefficient synthesis process. In the coefficient determination process, an ROI coefficient related to the ROI and a non-ROI coefficient related to a non-ROI in the first wavelet coefficient data are determined on the basis of target mask data which are data of a target mask to be used to determine the ROI and the non-ROI in a range of the first target image. In the coefficient synthesis process, the ROI coefficient in the first wavelet coefficient data and a wavelet coefficient in the second wavelet coefficient data are synthesized. In the synthesis execution process, synthesized coefficient data having the same image size and decomposition level as those of the second wavelet coefficient data are thereby generated. The image synthesis process further includes an inverse wavelet transformation process. In the inverse wavelet transformation process, synthetic image data are generated by performing inverse wavelet transformation on the synthesized coefficient data until the decomposition level becomes a predetermined end level. The data supply circuitry is further configured to generate an image bit stream which is a coded bit stream of first basic image data which are data of a first basic image that is a source of the first target image by coding the first basic image data, generate basic mask data which are data of a basic mask that is a source of the target mask by using an algorithm independent of the coding of the first basic image data, and generate a mask bit stream which is a bit stream of the basic mask data. The data supply circuitry is further configured to output the first basic image data as the image bit stream, output the basic mask data as the mask bit stream, and output the synthesis control data to be used to specify the specified decomposition level in the wavelet transformation.

According to a forty-seventh aspect of the present invention, in the image processing system of the forty-sixth aspect, the data supply circuitry is configured to output the image bit stream and the mask bit stream as different bit streams.

According to a forty-eighth aspect of the present invention, in the image processing system of the forty-seventh aspect, the data supply circuitry is configured to embed the synthesis control data into a region in the mask bit stream, which has no effect on the basic mask data.

According to a forty-ninth aspect of the present invention, in the image processing system of the forty-sixth aspect, the data supply circuitry is configured to embed the mask bit stream into a region in the image bit stream, which has no effect on the first basic image data, to thereby output the image bit stream and the mask bit stream as a single bit stream.

According to a fiftieth aspect of the present invention, in the image processing system of the forty-ninth aspect, the data supply circuitry is configured to embed the mask bit stream and the synthesis control data into the region in the image bit stream, to thereby output the image bit stream, the mask bit stream, and the synthesis control data as a single bit stream.

According to a fifty-first aspect of the present invention, in the image processing system of any one of the forty-sixth to fiftieth aspects, the basic mask is an original mask whose target is an original image which is an image not being subjected to the wavelet transformation yet. The original mask indicates which of the ROI and the non-ROI to which each pixel in the original image belongs and has an ROI corresponding portion corresponding to the ROI in the original image and a non-ROI corresponding portion corresponding to the non-ROI therein. The data supply circuitry is configured to generate the original mask for a range of the first basic image, and output data of the original mask as the basic mask data.

According to a fifty-second aspect of the present invention, in the image processing system of any one of the forty-sixth to fiftieth aspects, the basic mask is a developed mask for the first wavelet coefficient data. The developed mask is a mask generated by performing a mask development process for developing an original mask whose target is an original image which is an image not being subjected to the wavelet transformation yet, for each band component included in the first wavelet coefficient data. The data supply circuitry is configured to generate the original mask for a range of the first basic image, and generate the developed mask by performing the mask development process on the original mask, and output data of the developed mask as the basic mask data.

According to a fifty-third aspect of the present invention, in the image processing system of any one of the forty-sixth to fifty-second aspects, the data supply circuitry is configured to output the first target image data as the first basic image data, generate the target mask for a range of the first target image, and output the target mask data as the basic mask data.

According to a fifty-fourth aspect of the present invention, in the image processing system of any one of the forty-sixth to fifty-second aspects, the data supply circuitry is configured to cut out the first target image from a whole image including the ROI, output the first target image data as the first basic image data, generate the target mask for a range of the first target image, and output the target mask data as the basic mask data.

According to a fifty-fifth aspect of the present invention, in the image processing system of the fifty-fourth aspect, the data supply circuitry is configured to generate whole mask data which are data of a whole mask to be used to determine the ROI and the non-ROI in a range of the whole image on the basis of whole image data which are data of the whole image, perform a cut-out range determination process for determining a cut-out range which is a range of the first target image in the whole image, on the basis of the whole mask data and the synthesis control data to thereby generate cut-out range specifying data to be used to specify the cut-out range, cut out data within the cut-out range in the whole mask data, for the basic mask data, on the basis of the cut-out range specifying data, and cut out data within the cut-out range in the whole image data, as the first basic image data, on the basis of the cut-out range specifying data.

According to a fifty-sixth aspect of the present invention, in the image processing system of any one of the forty-sixth to fifty-second aspects, the data supply circuitry is configured to output whole image data which are data of a whole image whose portion includes the first target image, as the first basic image data, generate the target mask for a range of the first target image, and output the target mask data as the basic mask data. The data supply circuitry is further configured to generate whole mask data which are data of a whole mask to be used to determine the ROI and the non-ROI in a range of the whole image on the basis of the whole image data, perform a cut-out range determination process for determining a cut-out range which is a range of the first target image in the whole image, on the basis of the whole mask data and the synthesis control data, to thereby generate cut-out range specifying data to be used to specify the cut-out range, and cut out data within the cut-out range in the whole mask data, for the basic mask data, on the basis of the cut-out range specifying data. The data supply circuitry is further configured to output the cut-out range specifying data.

According to a fifty-seventh aspect of the present invention, in the image processing system of any one of the forty-sixth to fifty-second aspects, the data supply circuitry is configured to output whole image data which are data of a whole image whose portion includes the first target image, as the first basic image data, and generate and output the basic mask data for a range of the whole image. The data supply circuitry is further configured to generate whole mask data which are data of a whole mask to be used to determine the ROI and the non-ROI in a range of the whole image on the basis of the whole image data, and perform a cut-out range determination process for determining a cut-out range which is a range of the first target image in the whole image, on the basis of the whole mask data and the synthesis control data, to thereby generate cut-out range specifying data to be used to specify the cut-out range. The data supply circuitry is further configured to output the cut-out range specifying data.

According to a fifty-eighth aspect of the present invention, in the image processing system of any one of the forty-sixth to fifty-second aspects, the data supply circuitry is configured to cut out the first target image from a whole image including the ROI, output the first target image data as the first basic image data, and generate and output the basic mask data for a range of the whole image. The data supply circuitry is further configured to generate whole mask data which are data of a whole mask to be used to determine the ROI and the non-ROI in a range of the whole image on the basis of whole image data which are data of the whole image, perform a cut-out range determination process for determining a cut-out range which is a range of the first target image in the whole image, on the basis of the whole mask data and the synthesis control data, to thereby generate cut-out range specifying data to be used to specify the cut-out range, and cut out data within the cut-out range in the whole image data, as the first basic image data, on the basis of the cut-out range specifying data. The data supply circuitry is further configured to output the cut-out range specifying data.

According to a fifty-ninth aspect of the present invention, in the image processing system of the forty-sixth aspect, the data supply circuitry is configured to generate a small image by reducing a whole image including the ROI, and generate a small mask whose target is the small image.

According to a sixtieth aspect of the present invention, in the image processing system of the fifty-ninth aspect, the data supply circuitry is configured to generate an enlarged mask by enlarging the small mask to have the same image size as that of the whole image.

According to a sixty-first aspect of the present invention, in the image processing system of the sixtieth aspect, the data supply circuitry is configured to generate the small image by reducing the whole image with a reduction ratio of $1/2^R$ (R is a natural number), and generate the enlarged mask by performing an enlargement process R times with an enlargement ratio of 2 on the small mask. In the enlargement process, when the i-th data (i is an integer) are associated with the ROI in a mask before being subjected to enlargement, the $\{2i-1\}$th data to $\{2i+1\}$th data are associated with the ROI in the mask after being subjected to enlargement.

According to a sixty-second aspect of the present invention, in the image processing system of the sixty-first aspect, the data supply circuitry is configured to perform a smoothing process on the mask after being subjected to enlargement at the point in time when the enlargement process is finished at least once among the R-times executions.

According to a sixty-third aspect of the present invention, in the image processing system of any one of the sixtieth to sixty-second aspects, the data supply circuitry is configured to perform a cut-out range determination process on the basis of data of the enlarged mask and the synthesis control data. The data supply circuitry is further configured to determine a cut-out range which is a range of the first target image in the whole image and a small mask cut-out range which corresponds to the cut-out range in the small mask in the cut-out range determination process. The data supply circuitry is further configured to generate cut-out range specifying data to be used to specify the cut-out range and small mask cut-out range specifying data to be used to specify the small mask cut-out range. The data supply circuitry is further configured to cut data within the small mask cut-out range out of data of the small mask, for the basic mask data, on the basis of the small mask cut-out range specifying data. The data supply circuitry is further configured to output the cut-out range specifying data.

According to a sixty-fourth aspect of the present invention, in the image processing system of the fifty-ninth or sixty-third aspect, the data supply circuitry is configured to acquire the basic mask data which are data of a whole of the small mask or a cut-out portion out of the small mask, and generate a coded bit stream of the basic mask data as the mask bit stream.

According to a sixty-fifth aspect of the present invention, in the image processing system of the fifty-ninth or sixty-third aspect, the data supply circuitry is configured to generate a bit stream of the basic mask data as the mask bit stream without coding the basic mask data which are data of a whole of the small mask or a cut-out portion out of the small mask.

According to a sixty-sixth aspect of the present invention, in the image processing system of any one of the forty-sixth to sixty-fifth aspects, the data supply circuitry is configured to perform the wavelet transformation process, the synthesis execution process, and the inverse wavelet transformation process.

According to a sixty-seventh aspect of the present invention, in the image processing system of the sixty-sixth aspect, the image synthesizing circuitry is configured to acquire second basic image data which are data of a second basic image that is a source of the second target image, set a similar figure range in the second basic image, which is a similar figure to the first target image with the similarity ratio, and cut out data within the similar figure range in the second basic image data as the second target image data.

According to a sixty-eighth aspect of the present invention, in the image processing system of the sixty-seventh aspect, the image synthesizing circuitry is configured to embed the synthetic image data obtained by performing the inverse wavelet transformation until the decomposition level becomes 0, into the similar figure range in the second basic image data.

According to a sixty-ninth aspect of the present invention, in the image processing system of the sixty-sixth aspect, the image synthesizing circuitry is configured to acquire second basic image data which are data of a second basic image that is a source of the second target image, and generate the second target image by reducing at least part of the second basic image.

According to a seventieth aspect of the present invention, in the image processing system of any one of the nineteenth, twenty-first, twenty-second, and fifty-second aspects, in the mask development process, performed is a basic process for converting a first mask for a first wavelet plane into a second mask for a second wavelet plane having a decomposition level which is one-level higher than that of the first wavelet plane, on the basis of a mask development condition. The specified decomposition level specified by the synthesis control data is not smaller than 2, the basic process is performed recursively in accordance with a method of the wavelet transformation until the decomposition level of the second wavelet plane becomes the specified decomposition level. The mask development condition in the case of using a 5×3 filter in the wavelet transformation, where n is an integer, includes a first condition and a second condition. The first condition is a condition that when the 2n-th data on the first wavelet plane are associated with the ROI by the first mask, the second mask is formed so that the n-th data of a low-frequency component and the {n−1}th data and the n-th data of a high-frequency component on the second wavelet plane may be associated with the ROI. The second condition is a condition that when the {2n+1}th data on the first wavelet plane are associated with the ROI by the first mask, the second mask is formed so that the n-th data and the {n+1}th data of the low-frequency component and the {n−1}th data to the {n+1}th data of the high-frequency component on the second wavelet plane may be associated with the ROI.

According to a seventy-first aspect of the present invention, in the image processing system of any one of the nineteenth, twenty-first, twenty-second, and fifty-second aspects, in the mask development process, performed is a basic process for converting a first mask for a first wavelet plane into a second mask for a second wavelet plane having a decomposition level which is one-level higher than that of the first wavelet plane, on the basis of a mask development condition. The specified decomposition level specified by the synthesis control data is not smaller than 2, the basic process is performed recursively in accordance with a method of the wavelet transformation until the decomposition level of the second wavelet plane becomes the specified decomposition level. The mask development condition in the case of using a Daubechies 9×7 filter in the wavelet transformation, where n is an integer, includes a third condition and a fourth condition. The third condition is a condition that when the 2n-th data on the first wavelet plane are associated with the ROI by the first mask, the second mask is formed so that the {n−1}th data to the {n+1}th data of a low-frequency component and the {n−2}th data to the {n+1}th data of a high-frequency component on the second wavelet plane may be associated with the ROI. The fourth condition is a condition that when the {2n+1}th data on the first wavelet plane are associated with the ROI by the first mask, the second mask is formed so that the {n−1}th data to the {n+2}th data of the low-frequency component and the {n−2}th data to the {n+2}th data of the high-frequency component on the second wavelet plane may be associated with the ROI.

According to a seventy-second aspect of the present invention, in the image processing system of any one of the twenty-sixth, twenty-eighth, thirtieth, thirty-second, thirty-third, and fifty-fifth to fifty-eighth aspects, the cut-out range determination process includes a minimum range specifying process, a tracking process, and a required range specifying process. In the minimum range specifying process, a rectangular minimum range including the ROI is specified on the basis of an original mask whose target is an original image before the cut-out. In the tracking process, a range corresponding to the minimum range is specified as a tracked minimum range in a highest-order band component which is decomposed most in a final wavelet plane of the specified decomposition level specified by the synthesis control data. In the required range specifying process, specified is which range of the original image before the cut-out, in which data required to calculate a wavelet coefficient within the tracked minimum range exist. The range specified in the required range specifying process is set to the cut-out range.

According to a seventy-third aspect of the present invention, in the image processing system of the thirty-ninth or sixty-third aspect, the cut-out range determination process includes a minimum range specifying process, a tracking process, a required range specifying process, and a small mask required range specifying process. In the minimum range specifying process, a rectangular minimum range including the ROI in the whole image is specified on the basis of the enlarged mask. In the tracking process, a range corresponding to the minimum range is specified as a tracked minimum range in a highest-order band component which is decomposed most in a final wavelet plane of the specified decomposition level specified by the synthesis control data. In the required range specifying process, specified is which range of the whole image, in which data required to calculate a wavelet coefficient within the tracked minimum range exist. In the small mask required range specifying process, specified is which range of the small mask to which the range specified in the required range specifying process corresponds. The range specified in the required range specifying process is set to the cut-out range. The range specified in the small mask required range specifying process is set to the small mask cut-out range.

According to a seventy-fourth aspect of the present invention, in the image processing system of the seventy-third aspect, assuming that upper-left end coordinates of the cut-out range are (AX3, AY3), lower-right end coordinates of the cut-out range are (BX3, BY3), upper-left end coordinates of the small mask cut-out range are (AX4, AY4), lower-right end coordinates of the small mask cut-out range are (BX4, BY4), and the reduction ratio of the small mask to the whole image is $1/2^R$ (R is a natural number), in the small mask required range specifying process, respective values of the AX3, the AY3, the BX3, and the BY3 are right-shifted by R bits and respective values which are obtained by the right-shift are set to the AX4, the AY4, the BX4, and the BY4.

According to a seventy-fifth aspect of the present invention, in the image processing system of any one of the seventy-second to seventy-fourth aspects, the wavelet transformation is a method of recursively decomposing a lowest-frequency band component included in a wavelet plane of each decomposition level. The highest-order band component is a lowest-frequency band component in the final wavelet plane.

According to a seventy-sixth aspect of the present invention, in the image processing system of any one of the seventy-second to seventy-fifth aspects, assuming that upper-left end coordinates of the minimum range are (AX1, AY1), lower-right end coordinates of the minimum range are (BX1, BY1), upper-left end coordinates of the tracked minimum range are (AX2, AY2), lower-right end coordinates of the tracked minimum range are (BX2, BY2), upper-left end coordinates of the cut-out range are (AX3, AY3), and lower-right end coordinates of the cut-out range are (BX3, BY3), a 5×3 filter is used in the wavelet transformation, in the minimum range specifying process, the AX1, the AY1, the BX1, and the BY1 are obtained. In the tracking process, a first recursive process in which when the AX1 is an even number, AX1/2 is set to new AX1, and when the AX1 is an odd number, {AX1−1}/2 is set to new AX1 is performed a specified number of times which is specified by the synthesis control data, and the AX1 that is finally obtained is set to the AX2. In the tracking process, a second recursive process in which when the AY1 is an even number, AY 1/2 is set to new AY1, and when the AY1 is an odd number, {AY1−1}/2 is set to new AY1 is performed the specified number of times, and the AY1 that is finally obtained is set to the AY2. In the tracking process, a third recursive process in which when the BX1 is an even number, BX1/2 is set to new BX1, and when the BX1 is an odd number, {BX1+1}/2 is set to new BX1 is performed the specified number of times, and the BX1 that is finally obtained is set to the BX2. In the tracking process, a fourth recursive process in which when the BY1 is an even number, BY1/2 is set to new BY1, and when the BY1 is an odd number, {BY1+1}/2 is set to new BY1 is performed the specified number of times, and the BY1 that is finally obtained is set to the BY2. In the required range specifying process, a fifth recursive process in which {AX2×2−2} is set to new AX2 is performed the specified number of times, and the AX2 that is finally obtained is set to the AX3. In the required range specifying process, a sixth recursive process in which {AY2×2−2} is set to new AY2 is performed the specified number of times, and the AY2 that is finally obtained is set to the AY3. In the required range specifying process, a seventh recursive process in which {BX2×2+2} is set to new BX2 is performed the specified number of times, and the BX2 that is finally obtained is set to the BX3. In the required range specifying process, an eighth recursive process in which {BY2×2+2} is set to new BY2 is performed the specified number of times, and the BY2 that is finally obtained is set to the BY3.

According to a seventy-seventh aspect of the present invention, in the image processing system of any one of the seventy-second to seventy-fifth aspects, assuming that upper-left end coordinates of the minimum range are (AX1, AY1), lower-right end coordinates of the minimum range are (BX1, BY1), upper-left end coordinates of the tracked minimum range are (AX2, AY2), lower-right end coordinates of the tracked minimum range are (BX2, BY2), upper-left end coordinates of the cut-out range are (AX3, AY3), and lower-right end coordinates of the cut-out range are (BX3, BY3), a Daubechies 9×7 filter is used in the wavelet transformation, in the minimum range specifying process, the AX1, the AY1, the BX1, and the BY1 are obtained. In the tracking process, a ninth recursive process in which when the AX1 is an even number, {AX1/2−1} is set to new AX1, and when the AX1 is an odd number, {AX1−3}/2 is set to new AX1 is performed a specified number of times which is specified by the synthesis control data, and the AX1 that is finally obtained is set to the AX2. In the tracking process, a tenth recursive process in which when the AY1 is an even number, {AY1/2−1} is set to new AY1, and when the AY1 is an odd number, {AY1−3}/2 is set to new AY1 is performed the specified number of times, and the AY1 that is finally obtained is set to the AY2. In the tracking process, an eleventh recursive process in which when the BX1 is an even number, {BX1+2}/2 is set to new BX1, and when the BX1 is an odd number, {BX1+3}/2 is set to new BX1 is performed the specified number of times, and the BX1 that is finally obtained is set to the BX2. In the tracking process, a twelfth recursive process in which when the BY1 is an even number, {BY1+2}/2 is set to new BY1, and when the BY1 is an odd number, {BX1+3}/2 is set to new BY1 is performed the specified number of times, and the BY1 that is finally obtained is set to the BY2. In the required range specifying process, a thirteenth recursive process in which {AX2×2−4} is set to new AX2 is performed the specified number of times, and the AX2 that is finally obtained is set to the AX3. In the required range specifying process, a fourteenth recursive process in which {AY2×2−4} is set to new AY2 is performed the specified number of times, and the AY2 that is finally obtained is set to the AY3. In the required range specifying process, a fifteenth recursive process in which {BX2×2−1−4} is set to new BX2 is performed the specified number of times, and the BX2 that is finally obtained is set to the BX3. In the required range specifying process, a sixteenth recursive process in which {BY2×2+4} is set to new BY2 is performed the specified number of times, and the BY2 that is finally obtained is set to the BY3.

The present invention is also intended for an image processing method. According to a seventy-eighth aspect of the present invention, the image processing method includes acquiring first target image data, target mask data, second target image data, and synthesis control data. The first target image data are data of a first target image having an ROI (Region Of Interest). The target mask data are data of a target mask to be used to determine the ROI and a non-ROI in a range of the first target image. The second target image data are data of a second target image which is a similar figure to the first target image and has a similarity ratio not larger than 1 to the first target image. The synthesis control data are data to be used to control the state of synthesis between the ROI in the first target image and the second target image. The image processing method further includes generating first wavelet coefficient data by performing wavelet transformation on the first target image data until a decomposition level becomes a specified decomposition level specified by the synthesis control data, and generating second wavelet coefficient data by performing the wavelet transformation on the second target image data until a decomposition level becomes a decomposition level which depends on the specified decomposition level and the similarity ratio. When it is assumed that the specified decomposition level of the first wavelet coefficient data is P1, the decomposition level of the second wavelet coefficient data is P2, and the similarity ratio is $1/2^{P3}$, P2=P1−P3. The image processing method further includes generating synthesized coefficient data having the same image size and decomposition level as those of the second wavelet coefficient data by performing a coefficient determination process and a coefficient synthesis process. In the coefficient determination process, an ROI coefficient related to the ROI and a non-ROI coefficient related to the non-ROI in the first wavelet coefficient data are determined on the basis of the target mask data. In the coefficient synthesis process, the ROI coefficient in the first wavelet coefficient data and a wavelet coefficient in the second wavelet coefficient data are synthesized. The image processing method further includes generating synthetic image data by performing inverse wavelet transformation on the synthesized coefficient data until the decomposition level becomes a predetermined end level.

According to a seventy-ninth aspect of the present invention, the image processing method of the seventy-eighth aspect further includes supplying the first target image data and the target mask data. The supply of the first target image data and the target mask data includes generating an image bit stream which is a coded bit stream of first basic image data which are data of a first basic image that is a source of the first target image by coding the first basic image data, generating basic mask data which are data of a basic mask that is a source of the target mask by using an algorithm independent of the coding of the first basic image data, and generating a mask bit stream which is a bit stream of the basic mask data. The first target image data are supplied as the image bit stream, and the target mask data are supplied as the mask bit stream.

According to an eightieth aspect of the present invention, in the image processing method of the seventy-ninth aspect, the acquisition of the first target image data, the target mask data, the second target image data, and the synthesis control data includes acquiring the first basic image data by decoding the image bit stream and acquiring the first target image data from the first basic image data, and acquiring the basic mask data from the mask bit stream by using an algorithm independent of the decoding of the image bit stream and acquiring the target mask data from the basic mask data.

According to the above first aspect of the present invention, for example, the synthesis between the ROI in the first target image and the second target image is performed by using the first wavelet coefficient data and the second wavelet coefficient data into which the first target image data and the second target image data are converted, respectively. Further, the determination of the ROI in the first target image is performed by determining the ROI coefficient in the first wavelet coefficient data. Therefore, even when an insufficient ROI is used, a repaired ROI can be provided in the synthetic image. In other words, an excellent synthetic image can be achieved as compared with the case where the first target image data and the second target image data are synthesized without any processing performed. Further, by controlling the decomposition level of the wavelet transformation with the synthesis control data, it is possible to adjust the state of synthesis (repair of the ROI, extension of the ROI, and the like). Furthermore, it is also possible to adjust the image size of the synthetic image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a block diagram showing an image encoder (for still image) in accordance with the first preferred embodiment;

FIG. 17 is a view showing a developed mask (decomposition level 1) in accordance with the first preferred embodiment;

FIG. 18 is a view showing a developed mask (decomposition level 2) in accordance with the first preferred embodiment;

FIG. 21 is a diagram showing the mask development process in a case where a 5×3 filter is used for wavelet transformation in accordance with the first preferred embodiment;

FIG. 43 is a flowchart showing an operation of a data supply system in accordance with the second preferred embodiment;

FIG. 46 is a flowchart showing an operation of a data supply system in accordance with the third preferred embodiment;

FIG. 49 is a block diagram showing an image processing system in accordance with a fifth preferred embodiment;

FIG. 52 is a conceptual diagram showing image synthesis in accordance with the sixth preferred embodiment;

FIG. 53 is a flowchart showing an operation of a data supply system in accordance with the sixth preferred embodiment;

FIG. 60 is a flowchart showing a cut-out range determination process in accordance with the seventh preferred embodiment;

FIGS. 61 and 62 are views each showing a range of pixels required to obtain an output by one pixel in the wavelet transformation in accordance with the seventh preferred embodiment (5×3 filter);

FIGS. 63 and 64 are views each showing a range of pixels required to obtain an output by one pixel in the wavelet transformation in accordance with the seventh preferred embodiment (Daubechies 9×7 filter);

FIG. 75 is a flowchart showing an operation of a data supply system in accordance with the seventh preferred embodiment;

FIG. 76 is a flowchart showing an operation of an image synthesizing system in accordance with the seventh preferred embodiment;

FIG. 77 is a conceptual diagram showing image synthesis in accordance with an eighth preferred embodiment;

FIG. 79 is a block diagram showing a synthesizing unit in accordance with the eighth preferred embodiment;

FIG. 93 is a block diagram showing a synthesizing unit in accordance with the eleventh preferred embodiment;

FIG. 96 is a block diagram showing a mask data output unit in accordance with the twelfth preferred embodiment;

FIG. 97 is a block diagram showing a synthesizing unit in accordance with the twelfth preferred embodiment;

FIG. 105 is a block diagram showing a synthesizing unit in accordance with the fourteenth preferred embodiment;

FIG. 107 is a conceptual diagram showing image synthesis in accordance with a fifteenth preferred embodiment;

FIG. 108 is a block diagram showing a synthesizing unit in accordance with the fifteenth preferred embodiment;

FIG. 113 is a diagram showing the mask enlargement process in accordance with the sixteenth preferred embodiment (one-dimensionally shown);

FIG. 114 is a diagram showing the mask enlargement process in accordance with the sixteenth preferred embodiment (two-dimensionally shown);

FIG. 115 is a view showing the mask enlargement process in accordance with the sixteenth preferred embodiment (two-dimensionally shown);

FIG. 116 is a flowchart showing a case where a smoothing process is performed after the final mask enlargement process in accordance with the sixteenth preferred embodiment;

FIG. 117 is a flowchart showing a case where the smoothing process is performed after every execution of the mask enlargement process in accordance with the sixteenth preferred embodiment;

FIG. 118 is a view showing an exemplary enlarged mask in accordance with the sixteenth preferred embodiment (in a case where no smoothing process is performed);

FIG. 122 is a conceptual diagram showing image synthesis in accordance with a seventeenth preferred embodiment;

FIG. 127 is a block diagram showing an image processing system in a case where basic mask data is not coded and decoded in accordance with the seventeenth preferred embodiment;

FIG. 128 is a conceptual diagram showing image synthesis in accordance with an eighteenth preferred embodiment;

FIG. 129 is a block diagram showing a mask data output unit in accordance with the eighteenth preferred embodiment;

FIG. 130 is a block diagram showing a synthesizing unit in accordance with the eighteenth preferred embodiment;

FIG. 131 is a flowchart showing a cut-out range determination process in accordance with the eighteenth preferred embodiment;

FIG. 132 is a conceptual diagram showing a small mask required range specifying process in accordance with the eighteenth preferred embodiment;

FIG. 133 is a flowchart showing the small mask required range specifying process in accordance with the eighteenth preferred embodiment;

FIG. 134 is a flowchart showing an operation of a data supply system in accordance with the eighteenth preferred embodiment;

FIGS. 135 and 136 are flowcharts showing an operation of an image synthesizing system in accordance with the eighteenth preferred embodiment;

FIG. 137 is a conceptual diagram showing the image synthesis in accordance with the eighteenth preferred embodiment;

FIG. 138 is a block diagram showing an image processing system in accordance with a nineteenth preferred embodiment; and FIG. 139 is a hardware configuration diagram showing an image processing apparatus in accordance with the nineteenth preferred embodiment.

DESCRIPTION OF THE PREFERRED EMBODIMENTS

The First Preferred Embodiment

<Overview of System>

Figure 1:
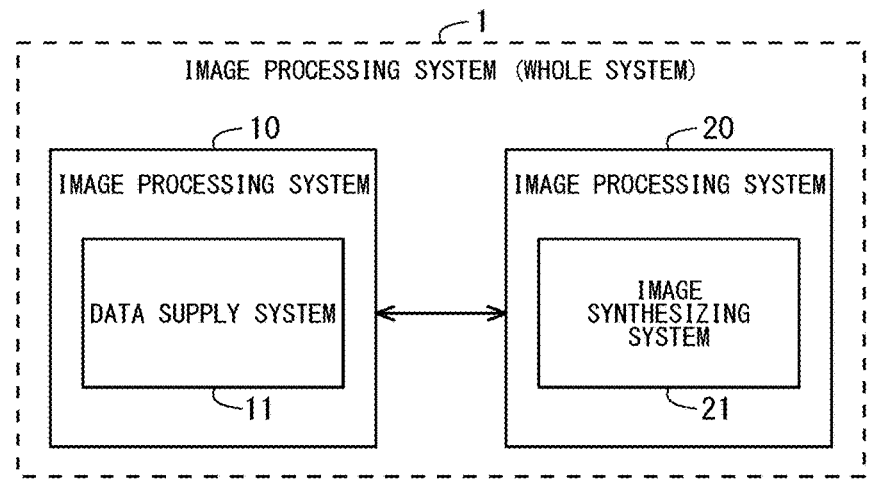
FIG. 1 is a conceptual diagram showing an image processing system in accordance with a first preferred embodiment.

FIG. 1 is a conceptual diagram showing an image processing system 1 in accordance with the first preferred embodiment. As shown in FIG. 1, the image processing system 1 includes two image processing systems 10 and 20. One image processing system 10 includes a data supply system 11, and the other image processing system 20 includes an image synthesizing system 21. The image synthesizing system 21 performs an image synthesis process. The data supply system 11 outputs data to be used in the image synthesis process. Hereinafter, sometimes, the image processing system 1 is referred to as a whole system 1, the data supply system 11 is referred to as a supply system 11, and the image synthesizing system 21 is referred to as a synthesizing system 21.

The image processing system 10 may be constituted of only the supply system 11 or may further include other processing system(s). Similarly, the image processing system 20 may be constituted of only the synthesizing system 21 or may further include other processing system(s). Further, as can be seen from FIG. 1, the supply system 11 is included in the image processing system 10 and also included in the whole system 1. Similarly, the synthesizing system 21 is included in the image processing system 20 and also included in the whole system 1.

The image processing systems 10 and 20 are each provided as a semiconductor integrated circuit. Specifically, various functions and processings of the image processing systems 10 and 20 are implemented by the circuits, in other words, by hardware. Some of or all of the functions and processings, however, may be implemented by a program which causes a microprocessor to function, in other words, by software.

<Example of Whole System 1>

Figure 2:
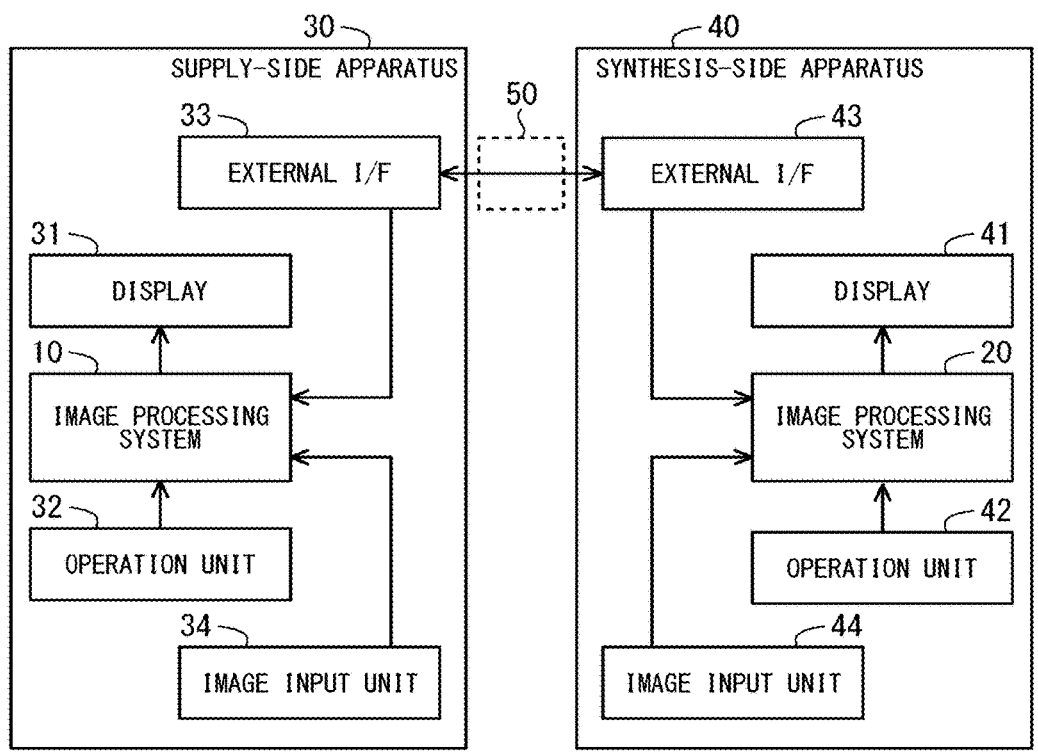
FIG. 2 is a block diagram showing the image processing system in accordance with the first preferred embodiment.

FIG. 2 shows an application example of the whole system 1. In the example of FIG. 2, the image processing system 10 is provided in a data supply-side apparatus 30, and the image processing system 20 is provided in an image synthesis-side apparatus 40. Hereinafter, the data supply-side apparatus 30 is sometimes referred to as a supply-side apparatus 30, and the image synthesis-side apparatus 40 is sometimes referred to as a synthesis-side apparatus 40. Though it is assumed that a user of the supply-side apparatus 30 is different from that of the synthesis-side apparatus 40, this is only one exemplary case.

The supply-side apparatus 30 includes a display 31, an operation unit 32, an external interface 33, and an image input unit 34, as well as the image processing system 10. The synthesis-side apparatus 40 includes a display 41, an operation unit 42, an external interface 43, and an image input unit 44, as well as the image processing system 20. Hereinafter, the external interfaces 33 and 43 are sometimes referred to as I/Fs 33 and 43.

Though the displays 31 and 41 are formed of, for example, liquid crystal displays, the displays 31 and 41 may be formed of different types of display devices. The operation units 32 and 42 are operating media by which a user inputs instructions, data, and the like to the apparatuses 30 and 40, in other words, to the image processing systems 10 and 20. The operation units 32 and 42 are each constituted of one or some of a keyboard, a mouse, a button, a switch, and the like.

The I/F 33 is a part for performing input/output of signals between the supply-side apparatus 30 and the outside of the apparatus. Similarly, the I/F 43 is a part for performing input/output of signals between the synthesis-side apparatus 40 and the outside of the apparatus. By using the I/Fs 33 and 43, transfer of information (data, instructions, and the like) can be achieved between the supply-side apparatus 30 and the synthesis-side apparatus 40.

Specifically, the I/Fs 33 and 43 include communication interfaces, and communication between the supply-side apparatus 30 and the synthesis-side apparatus 40 can be thereby achieved by using the I/Fs 33 and 43. As the communication method between the supply-side apparatus 30 and the synthesis-side apparatus 40, any one of wired communication, wireless communication, and combination thereof may be adopted. The information transfer between the supply-side apparatus 30 and the synthesis-side apparatus 40 is performed through a medium 50. When such a communication as described above is performed, the medium 50 is a wired or wireless communication medium (in other words, communication channel).

The I/Fs 33 and 43 may each include an interface for external memory medium, as well as or instead of the communication interface. In such a case, the information transfer between the supply-side apparatus 30 and the synthesis-side apparatus 40 can be performed through the external memory medium, and the external memory medium corresponds to the medium 50 which is interposed between the supply-side apparatus 30 and the synthesis-side apparatus 40.

The image input unit 34 is formed of a digital camera. Alternatively, the image input unit 34 may be a memory device which supplies image data. The image input unit 44 also has the same constitution as the image input unit 34. Further, the image input units 34 and 44 may be formed of different types of devices.

The respective constitutions of the supply-side apparatus 30 and the synthesis-side apparatus 40 are not limited to those shown in FIG. 2. Specifically, some of the above-described constituent elements may be omitted or additional constituent element(s) may be provided.

<Exemplary Supply System 11 and Exemplary Synthesizing System 21>

Figure 3:
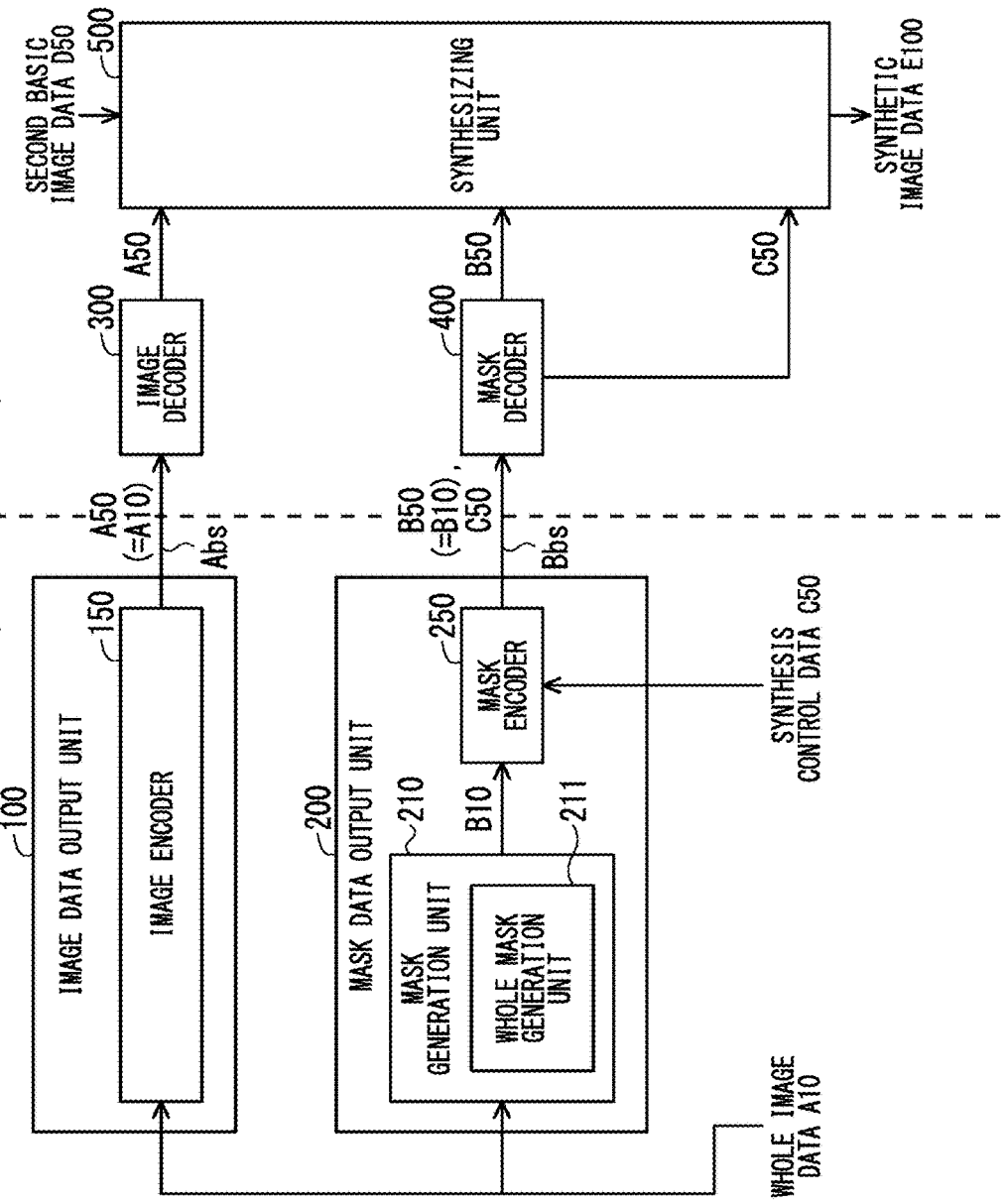
FIG. 3 is another block diagram showing the image processing system in accordance with the first preferred embodiment.

FIG. 3 more specifically shows respective exemplary constitutions of the supply system 11 and the synthesizing system 21. In FIG. 3, for avoiding complicated illustration, the displays 31 and 41 and the like are omitted. As shown in FIG. 3, the supply system 11 includes an image data output unit 100 and a mask data output unit 200. The image data output unit 100 includes an image encoder 150, and the mask data output unit 200 includes a mask generation unit 210 and a mask encoder 250. The synthesizing system 21 includes an image decoder 300, a mask decoder 400, and a synthesizing unit 500.

<Image Data Output Unit 100>

The image data output unit 100 acquires whole image data A10 which are data of a whole image and outputs first basic image data A50 which are data of a first basic image. The whole image data A10 are supplied, for example, from the image input unit 34 or another system in the image processing system 10. The first basic image data A50 are outputted from the supply system 11.

The whole image provides a main image including an ROI (Region Of Interest), for image synthesis to be performed in the synthesizing system 21. In other words, the whole image includes the ROI. The first basic image is an image to be outputted from the image data output unit 100, and the first basic image is a portion including the ROI in the whole image or a whole of the whole image. In other words, the whole image is an image serving as a source of the first basic image. In the first preferred embodiment, the image data output unit 100 outputs a whole range of the whole image as the first basic image (see FIG. 26 described later).

Though described later, it is assumed that a range of the first basic image, which is to become a target to be synthesized in the synthesizing unit 500, is referred to as a first target image. The first target image is a portion including the ROI in the first basic image supplied to the synthesizing system 21 or the whole of the first basic image. In consideration of the above relation between the first basic image and the whole image, the first target image is a portion including the ROI in the whole image or the whole of the whole image. In other words, the whole image and the first basic image are each an image serving as a source of the first target image.

Further, the whole image, the first basic image, and the first target image may be each an image captured by the digital camera or the like, or computer graphics.

As described above, the image data output unit 100 includes the image encoder 150. The image encoder 150 codes the first basic image data A50 which are output data, to thereby generate a coded bit stream Abs of the first basic image data A50. The coded bit stream Abs is sometimes referred to as an image bit stream Abs. The image bit stream Abs is outputted from the I/F 33 to the outside of the supply-side apparatus 30.

The image encoder 150 can be any one of various image encoders, for example, an encoder in conformity with any one of the already-known codec standards (H. 264, MPEG (Moving Pictures Experts Group), JPEG (Joint Photographic Experts Group), JPEG2000, and the like). In other words, the specification of the image encoder 150 is not particularly limited.

Figure 4:
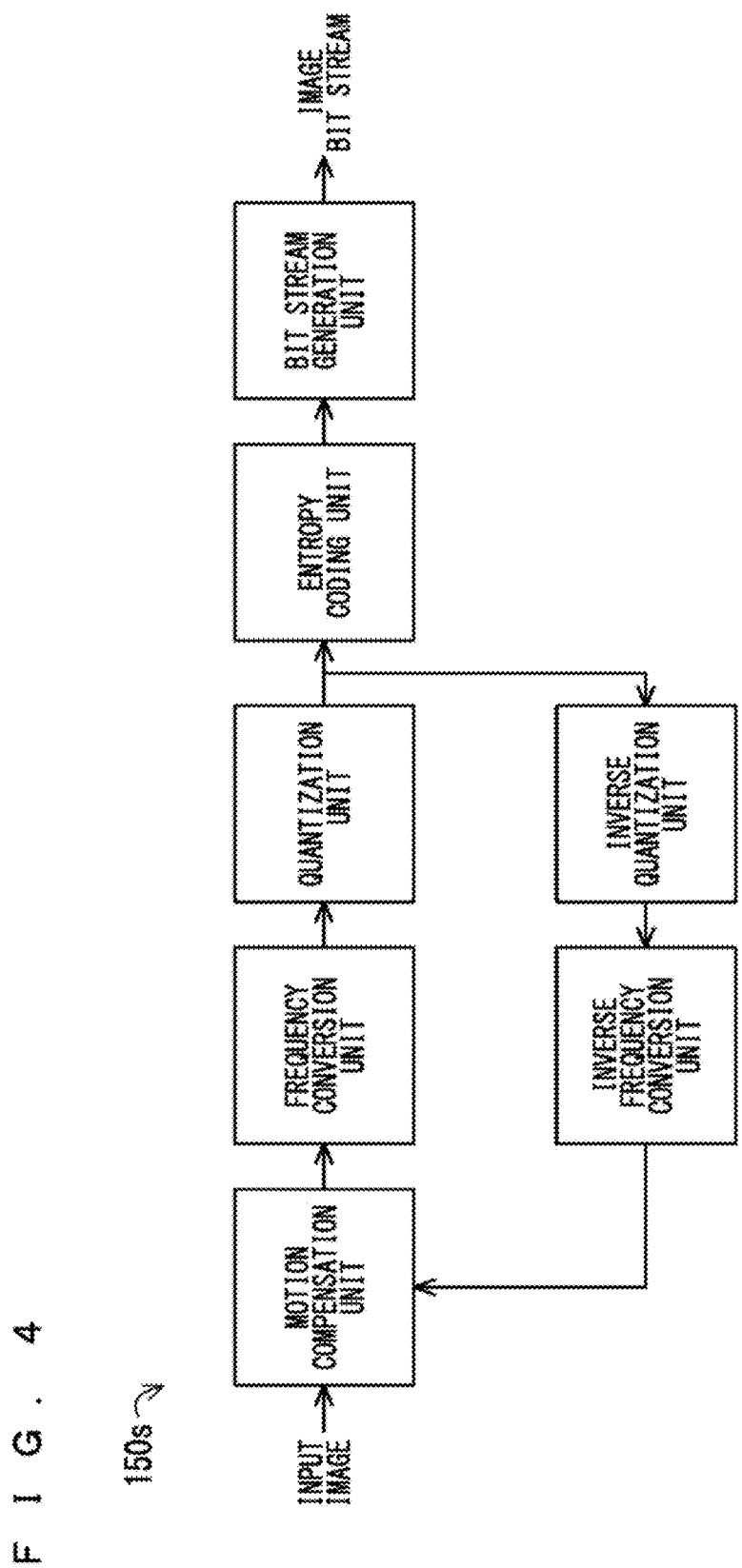
FIG. 4 is a block diagram showing an image encoder (for moving image) in accordance with the first preferred embodiment.

FIG. 4 is a block diagram showing an exemplary case where a general-type image encoder 150s for moving image is used as the image encoder 150. In the image encoder 150s, a motion compensation unit performs motion compensation on an input image (specifically, an image of each of frames constituting a moving image). The image after being subjected to the motion compensation is frequency-converted by a frequency conversion unit, and thereafter is quantized by a quantization unit. The quantized data are coded by an entropy coding unit. The coded data are converted by a bit stream generation unit into a bit stream in conformity with the codec specification of the image encoder 150s. On the other hand, in order to feed back to the motion compensation unit, the quantized data generated by the quantization unit are inverse-quantized by an inverse quantization unit and inverse-frequency converted by an inverse frequency conversion unit. The inverse-frequency converted data are inputted to the motion compensation unit. The motion compensation unit calculates a motion difference between two consecutive frames, and the calculation result is inputted to the frequency conversion unit.

FIG. 5 is a block diagram showing an exemplary case where a general-type image encoder 150t for still image is used as the image encoder 150. The image encoder 150t has a constitution in which the motion compensation unit, the inverse quantization unit, and the inverse frequency conversion unit are omitted from the image encoder 150s of FIG. 4. In other words, an inputted still image is converted by the frequency conversion unit, the quantization unit, the entropy coding unit, and the bit stream generation unit into a bit stream in conformity with the codec specification of the image encoder 150t.

<Mask Data Output Unit 200>

With reference back to FIG. 3, the mask data output unit 200 acquires the whole image data A10, generates basic mask data B50 which are data of a basic mask on the basis of the whole image data A10, and outputs the basic mask data B50. The basic mask data B50 are outputted from the supply system 11.

As described above, the mask data output unit 200 includes the mask generation unit 210 and the mask encoder 250. As shown in FIG. 3, the mask generation unit 210 includes a whole mask generation unit 211. The whole mask generation unit 211 generates whole mask data B10 which are data of a whole mask on the basis of the whole image data A10.

The whole mask is a mask to be used to determine the ROI and the non-ROI in the whole range of the whole image. The basic mask is a mask to be outputted from the mask data output unit 200 and a mask for a range of the basic image. As described above, in the first preferred embodiment, since it is assumed that the whole range of the whole image is the first basic image, the basic mask is a mask for the range of the whole image (see FIG. 26 described later). Though described later, it is assumed that the mask for a range of the first target image is referred to as a target mask. In other words, the whole mask is a mask serving as a source of the basic mask and the target mask, and the basic mask is a mask serving as a source of the target mask.

The mask encoder 250 acquires the whole mask data B10 as the basic mask data B50 which are output data, and codes the basic mask data B50, to thereby generate a coded bit stream Bbs of the basic mask data B50. This coded bit stream Bbs is sometimes referred to as a mask bit stream Bbs. The mask bit stream Bbs is outputted from the I/F 33 to the outside of the supply-side apparatus 30.

The mask generation unit 210 can be implemented by various mask generation techniques. For example, a technique for detecting a moving body in a moving image is well known, and by using the moving body detection technique, a mask in which the moving body in the moving image is set as an ROI can be generated. As to the moving body detection technique, for example, see Japanese Patent Application Laid Open Gazette Nos. 2013-254291, 2007-088897, and 2006-093784. Further, in Japanese Patent Application Laid Open Gazette Nos. 2009-199363 and 2005-165688, for example, disclosed is a technique using a particle filter to track a moving body. By using such a moving body tracking technique, it is possible to increase the moving body detection accuracy and reduce the amount of computation.

Further, another technique is well known where with a still image captured by a digital camera as an object, a foreground image and a background image are separated from the whole image by a graph cut method. When the mask generation unit 210 is implemented by using such an image separation technique, a mask in which the foreground image is set as the ROI can be generated.

Furthermore, the mask generation unit 210 performs the preprocessing as appropriate in the mask generation. When the whole image data A10 are captured image data (Bayer data) which are captured by a digital camera, for example, the Bayer data are converted into RGB color data. When the whole image has a large size, a reduction process is performed to reduce the amount of computation. Further, in order to extract the feature value, color space conversion into black and white, YUV, HSV, or the like is performed.

Figure 6:
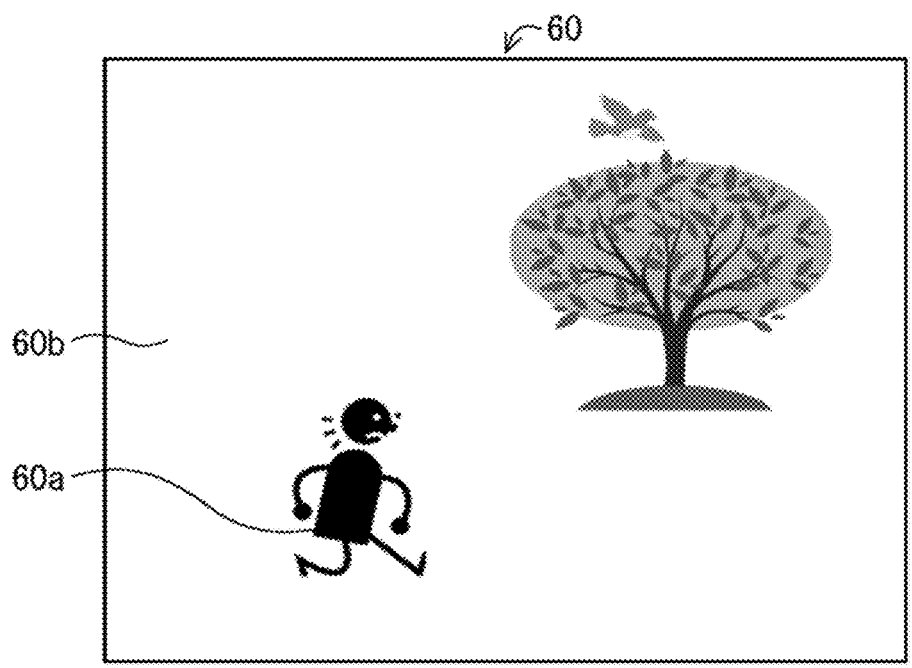
FIG. 6 is a view showing an exemplary whole image in accordance with the first preferred embodiment.

FIG. 6 shows an exemplary whole image 60. In the whole image 60, it is assumed that the part of a moving person is set as an ROI 60a and the other part is set as a non-ROI 60b.

Figure 7:
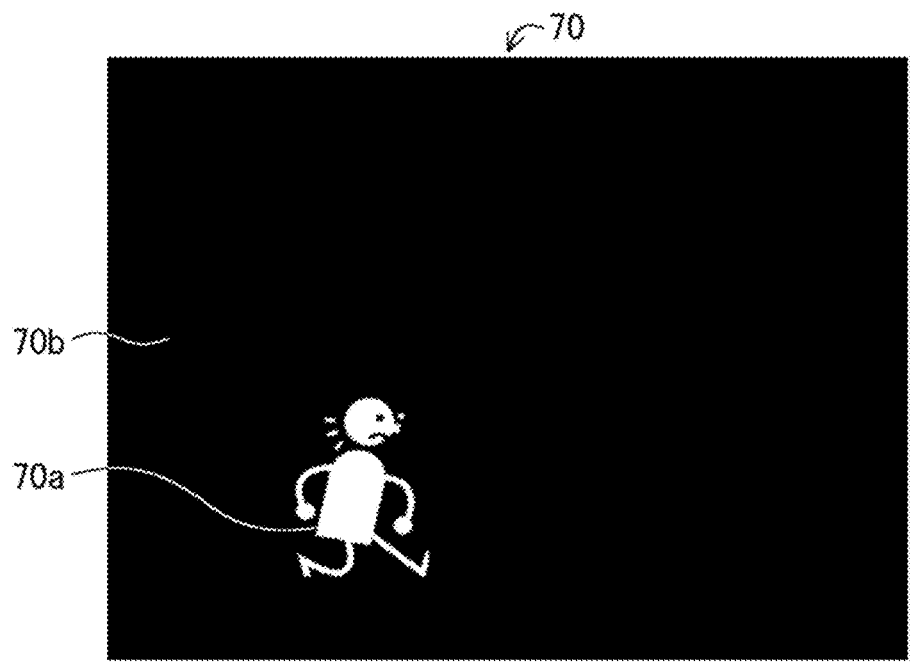
FIG. 7 is a view showing an exemplary whole mask in accordance with the first preferred embodiment.

FIG. 7 shows a whole mask 70 corresponding to the whole range of the whole image 60. The whole mask 70 can be understood as an image indicating whether each pixel in the whole image 60 belongs to the ROI 60a or the non-ROI 60b. The whole mask 70 has an ROI corresponding portion 70a and a non-ROI corresponding portion 70b corresponding to the ROI 60a and the non-ROI 60b in the whole image 60, respectively. In FIG. 7, the white portion is the ROI corresponding portion 70a and the black portion is the non-ROI corresponding portion 70b.

Further, in the moving image, the whole mask 70 may be generated for all the frame images or may be generated, for example, for every certain number of frames or every certain times. The same applies to a case where still images are sequentially inputted.

The mask encoder 250 can be any one of various image encoders. Herein, the whole mask 70 (inputted to the mask encoder 250 as the basic mask) has only to be divided into an ROI corresponding portion 70a and a non-ROI corresponding portion 70b. For this reason, the whole mask 70 is basically a binary image. In consideration of this point, the mask encoder 250 can be an encoder in conformity with a codec standard used for a facsimile. As the codec standard used for a facsimile, used is JBIG (Joint Bi-level Image Experts Group), JBIG2, MH (Modified Huffman), MR (Modified READ (Relative Element Address Designate)), MMR (Modified Modified READ), or the like.

Figure 8:
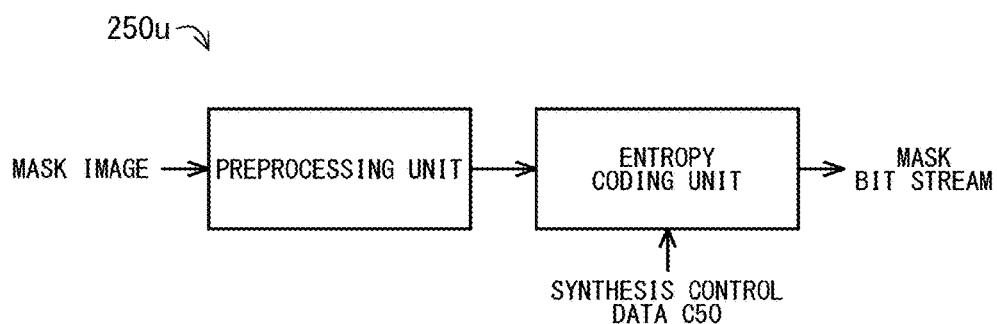
FIG. 8 is a block diagram showing a mask encoder in accordance with the first preferred embodiment.

FIG. 8 is a block diagram showing an exemplary case where a general-type image encoder 250u for facsimile is used as the mask encoder 250. In the image encoder 250u, a preprocessing unit performs predetermined preprocessing (for example, run-length processing) on an inputted mask image. The image after being subjected to the preprocessing is coded by the entropy coding unit, and the entropy coding unit outputs a coded bit stream in conformity with the codec specification of the image encoder 250u. As the entropy coding, used is arithmetic coding, variable length coding, or the like. Further, since the mask is a binary image, a compression ratio to some degree can be obtained, for example, by the run-length processing (i.e., run-length coding) even when such a high-level coding as the entropy coding or the like is not used.

Particularly, as shown in FIG. 3, the mask encoder 250 acquires synthesis control data C50 to be used to control the state of synthesis and embeds the synthesis control data C50 as additional information into the mask bit stream Bbs. Specifically, the mask bit stream Bbs has a region which has no effect on the basic mask data B50, and the entropy coding unit embeds the synthesis control data C50 into the region. As such a region of the mask bit stream Bbs, for example, a header region is used. The synthesis control data C50 are supplied to the supply system 11 by user input to the operation unit 32 provided on the side of the supply system 11.

Herein, the mask encoder 250 is an example of a mask bit stream generation unit 250 for generating the mask bit stream Bbs which is a bit stream of the basic mask data B50 (the whole mask data B10 in the exemplary constitution of FIG. 3) in conformity with a predetermined specification. Further, the coded bit stream Bbs is an example of the mask bit stream Bbs. In other words, the mask bit stream Bbs may be a bit stream of uncoded data. In such a case, a bit stream generation specification without coding is adopted. Since the mask is a binary image, as described above, the data size of the basic mask is smaller than that of the first basic image in most cases. For this reason, even when the basic mask data B50 are not coded, practicality to some degree can be obtained. Further, the amount of computation on coding can be reduced.

<First Basic Image Data A50 and Basic Mask Data B50>

In the above-described constitution of the supply system 11, the first basic image data A50 are outputted to the outside of the supply-side apparatus 30 (therefore, to the outside of the supply system 11) as the image bit stream Abs. Further, the basic mask data B50 are outputted to the outside of the supply-side apparatus 30 as the mask bit stream Bbs. Furthermore, the synthesis control data C50 are outputted, together with the basic mask data B50, to the outside of the supply-side apparatus 30 as the mask bit stream Bbs. Particularly, the image bit stream Abs and the mask bit stream Bbs are outputted to the outside of the supply-side apparatus 30 as different bit streams.

Further, in the above-described constitution of the supply system 11, the mask generation unit 210 generates the basic mask data B50 by using an algorithm independent of the coding (coding algorithm) of the first basic image data A50. For reference purposes, in accordance with the Max-shift method which is an optional function of JPEG 2000, for example, an algorithm for generating information specifying the ROI (in other words, information on the mask) is incorporated in a coding algorithm for image data. Therefore, in the supply system 11, the basic mask data B50 are generated by an algorithm different from the Max-shift method or the like.

<Operation of Supply System 11>

Figure 9:
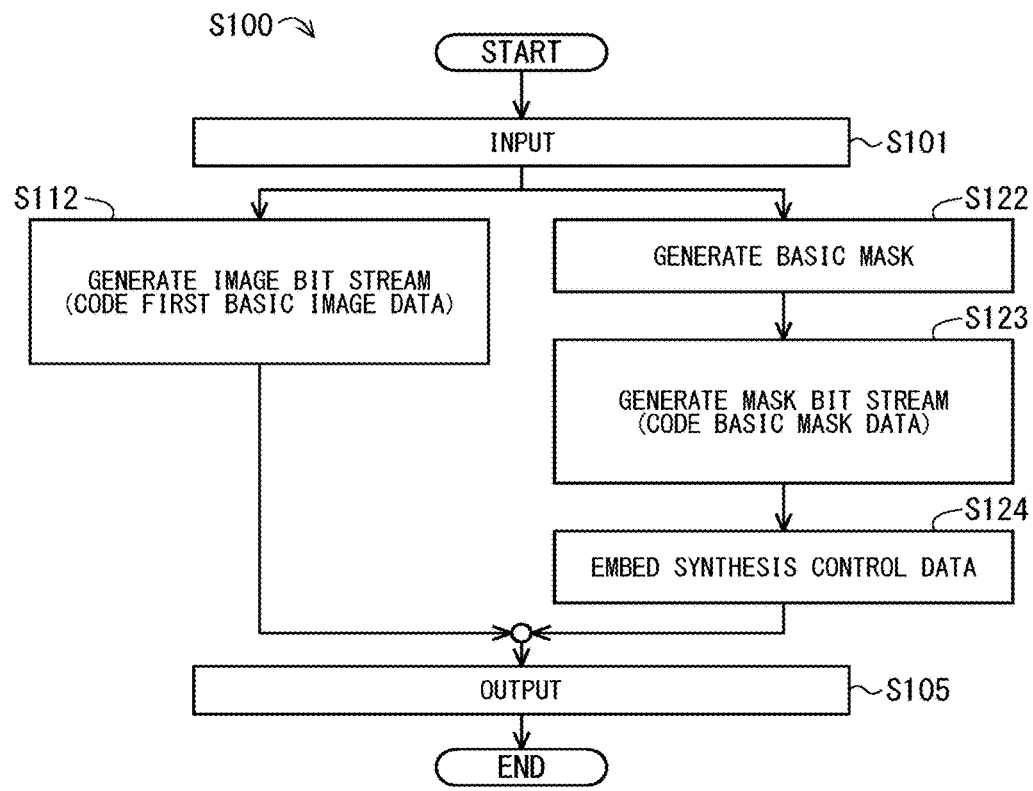
FIG. 9 is a flowchart showing an operation of a data supply system in accordance with the first preferred embodiment.

FIG. 9 is a flowchart showing an operation of the supply system 11. In an operation flow S100 of FIG. 9, when the whole image data A10 are inputted to the supply system 11 (Step S101), in the image data output unit 100, the image encoder 150 acquires the whole image data A10 and codes the whole image data A10 as the first basic image data A50, to thereby generate the image bit stream Abs (Step S112).

On the other hand, in the mask data output unit 200, the mask generation unit 210 generates the whole mask data B10 as the basic mask data B50 on the basis of the whole image data A10 (Step S122). Then, the mask encoder 250 acquires the whole mask data B10 as the basic mask data B50 and codes the basic mask data B50, to thereby generate the mask bit stream Bbs (Step S123). After that, the mask encoder 250 embeds the synthesis control data C50 into the mask bit stream Bbs (Step S124).

Then, the image bit stream Abs is outputted from the image data output unit 100 and the mask bit stream Bbs is outputted from the mask data output unit 200 (Step S105).

Further, though Step S112 is performed concurrently with Steps S122 to S124 in FIG. 9, Step S112 and Steps S122 to S124 may be performed sequentially. Further, the synthesis control data C50 may be inputted in Step S101, or the synthesis control data C50 which are inputted in advance and held may be used in Step S124.

<Medium 50>

The first basic image data A50, the basic mask data B50, and the synthesis control data C50 are outputted from the supply system 11 through the I/F 33 and inputted to the synthesizing system 21 through the I/F 43. At that time, a medium 50 (see FIG. 2) is used. It is assumed herein that the first basic image data A50, the basic mask data B50, and the synthesis control data C50 are supplied to the synthesizing system 21 through the same medium 50 (for example, a communication medium or an external memory medium). Different media 50, however, may be used. For example, the communication medium may be used to supply the first basic image data A50 and the external memory medium may be used to supply the basic mask data B50 and the synthesis control data C50.

<Image Decoder 300>

With reference back to FIG. 3, the image decoder 300 acquires the image bit stream Abs and decodes the image bit stream Abs, to thereby acquire the first basic image data A50. The image decoder 300 has only to correspond to the image encoder 150, and the image decoder 300 can be any one of various image decoders, for example, a decoder in conformity with the already-known codec standard. In other words, the specification of the image decoder 300 is not particularly limited.

Figure 10:
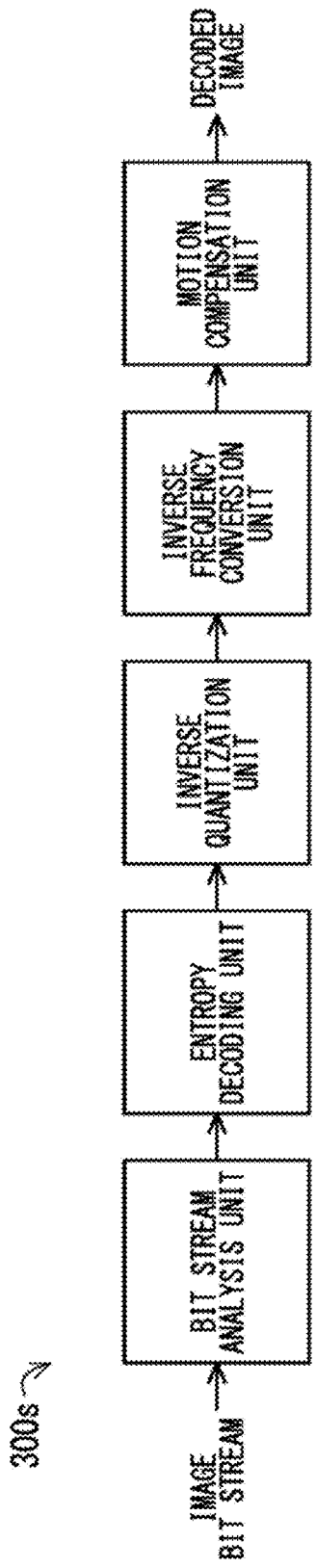
FIG. 10 is a block diagram showing an image decoder (for moving image) in accordance with the first preferred embodiment.

FIG. 10 is a block diagram showing an exemplary case where a general-type image decoder 300s for moving image is used as the image decoder 300. In the image decoder 300s, the image bit stream Abs is analyzed by a bit stream analysis unit, decoded by an entropy decoding unit, inverse-quantized by the inverse quantization unit, and inverse-frequency converted by the inverse frequency conversion unit. After that, the motion compensation unit performs the motion compensation by using the correlation with the two consecutive frames, to thereby generate decoded image data, i.e., the first basic image data A50.

Figure 11:
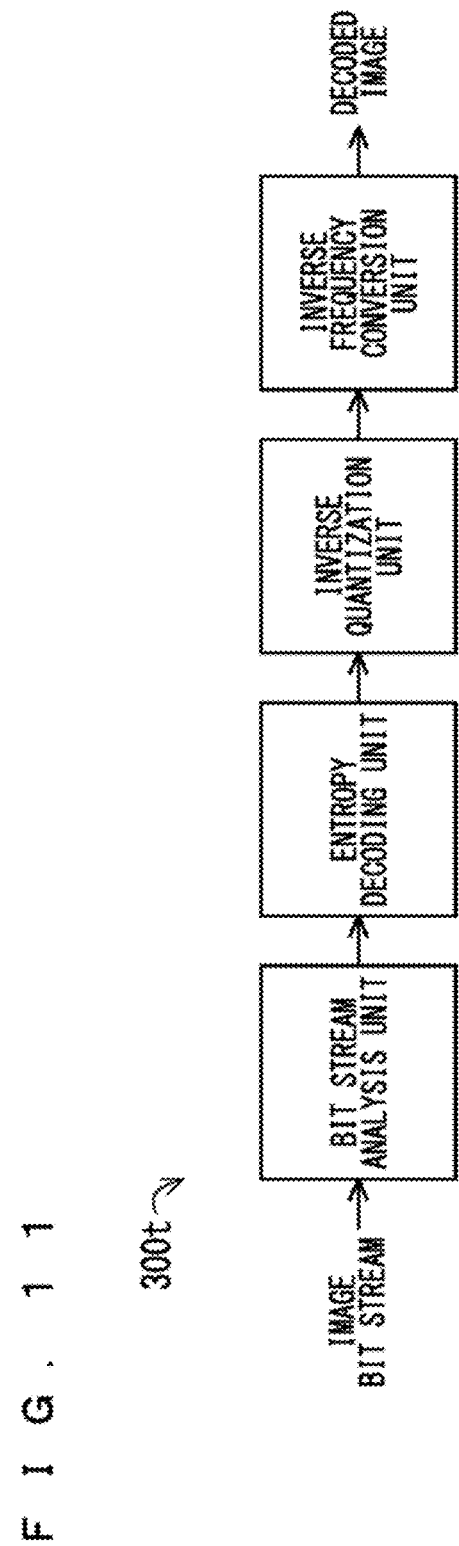
FIG. 11 is a block diagram showing an image decoder (for still image) in accordance with the first preferred embodiment.

FIG. 11 is a block diagram showing an exemplary case where a general-type image decoder 300t for still image is used as the image decoder 300. The image decoder 300t has a constitution in which the motion compensation unit is omitted from the image decoder 300s of FIG. 10. In other words, the first basic image data A50 are acquired from the image bit stream Abs by using the bit stream analysis unit, the entropy decoding unit, the inverse quantization unit, and the inverse frequency conversion unit.

<Mask Decoder 400>

The mask decoder 400 acquires the mask bit stream Bbs and decodes the mask bit stream Bbs, to thereby acquire the basic mask data B50. Herein, as described above, the supply system 11 outputs the mask bit stream Bbs as a bit stream different from the image bit stream Abs. For this reason, the synthesizing system 21 acquires the mask bit stream Bbs and the image bit stream Abs as the different bit streams.

Figure 12:
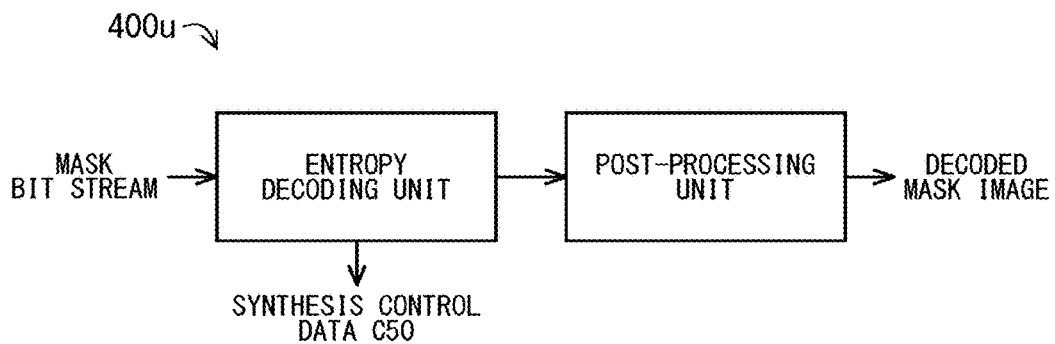
FIG. 12 is a block diagram showing a mask decoder in accordance with the first preferred embodiment.

The mask decoder 400 has only to correspond to the mask encoder 250, and the mask decoder 400 can be any one of various image decoders. In other words, the specification of the mask decoder 400 is not particularly limited. Herein, as the mask decoder 400, an exemplary case where a general-type image decoder for facsimile is used will be taken. FIG. 12 is a block diagram showing an exemplary case where a general-type image decoder 400u for facsimile is used. In the image decoder 400u, the mask bit stream Bbs is decoded by the entropy decoding unit, and a post-processing unit performs a predetermined post-processing on the decoded data.

Herein, the entropy decoding unit analyzes the mask bit stream Bbs before decoding. In the analysis, checked is whether or not data are embedded in a predetermined region of the mask bit stream Bbs. Then, when data are embedded, the entropy decoding unit extracts the data. Herein, since the synthesis control data C50, being embedded in the mask bit stream Bbs, are acquired by the synthesizing system 21, the entropy decoding unit extracts the synthesis control data C50.

Further, the mask decoder 400 decodes the mask bit stream Bbs by using an algorithm independent of the decoding of the image bit stream Abs performed in the image decoder 300.

Herein, the mask decoder 400 is an example of a mask data restoration unit 400 for restoring the basic mask data B50 from the mask bit stream Bbs by using the algorithm independent of the decoding of the image bit stream Abs. As described above, the mask bit stream Bbs may not be a coded bit stream. In such a case, a data restoration specification without decoding is adopted, and the amount of computation on decoding can be reduced.

<Synthesizing Unit 500>

With reference back to FIG. 3, the synthesizing unit 500 acquires the first basic image data A50, the basic mask data B50, the synthesis control data C50, and the second basic image data D50, and performs image synthesis by using these data, to thereby output synthetic image data E100 which are data of a synthetic image. A second basic image provides a background image for the image synthesis.

A second basic image data D50 which are data of the second basic image are supplied, for example, from the image input unit 44 provided on the side of the synthesizing system 21 or another system in the image processing system 20 (see FIG. 1). Further, the second basic image and a second target image described later may be each an image captured by the digital camera or the like, or computer graphics.

Figure 13:
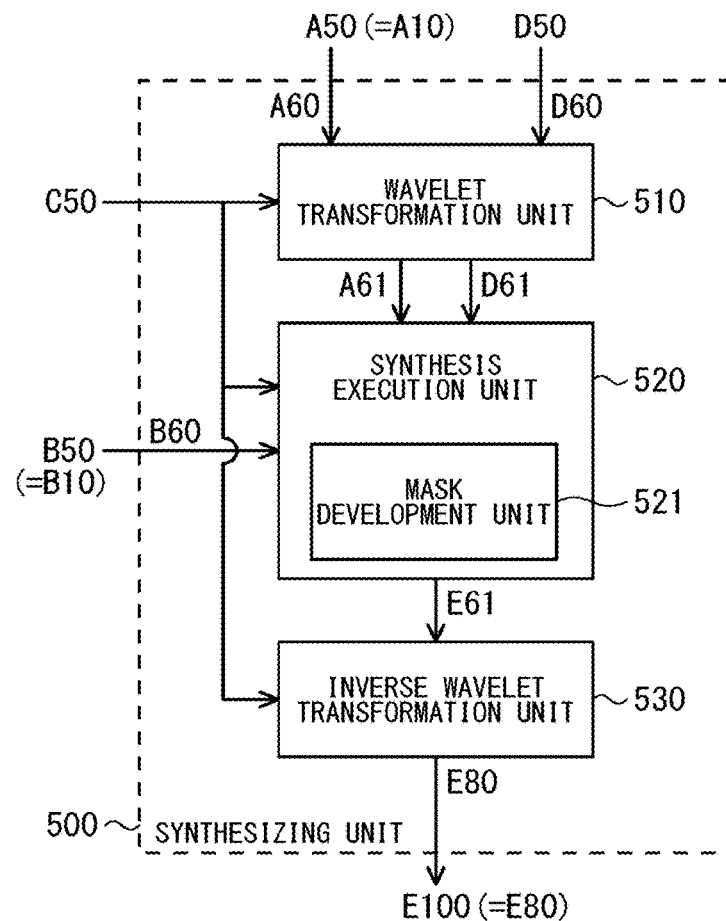
FIG. 13 is a block diagram showing a synthesizing unit in accordance with the first preferred embodiment.

FIG. 13 shows an exemplary constitution of the synthesizing unit 500. As shown in FIG. 13, the synthesizing unit 500 includes a wavelet transformation unit 510, a synthesis execution unit 520, and an inverse wavelet transformation unit 530.

<Wavelet Transformation Unit 510>

The wavelet transformation unit 510 performs integer-type or real-number-type discrete wavelet transformation (DWT) on each of first target image data A60 which are data of the first target image and second target image data D60 which are data of the second target image, and outputs a transformation coefficient obtained as the result of the DWT. Hereinafter, the transformation coefficient is sometimes referred to as, for example, a wavelet transformation coefficient or a wavelet coefficient.

The first target image is an image of a range of the first basic image, on which the wavelet transformation is performed. In the first preferred embodiment, in the synthesizing unit 500, the whole range of the first basic image is handled as the first target image, and therefore the first basic image data A50 are processed as the first target image data A60 (see FIG. 26 described later). Similarly, the second target image is an image of a range of the second basic image, on which the wavelet transformation is performed. In other words, the second basic image is an image serving as a source of the second target image. In the first preferred embodiment, in the synthesizing unit 500, the whole range of the second basic image is handled as the second target image, and therefore the second basic image data D50 are processed as the second target image data D60 (see FIG. 26 described later).

Herein, a case will be described, where the second target image has the same shape and size as those of the first target image, i.e., where the second target image is congruent with the first target image. Further, in comparison between the images, for example, an expression that the images are congruent with each other basically means that entire outer shapes of the images are congruent with each other. In other words, it is assumed that whether or not specific indications of the images are included in comparison targets depends on the purpose of the comparison and the like.

It is assumed that data (a group of wavelet coefficients) generated by performing the wavelet transformation on the first target image data A60 are referred to as first wavelet coefficient data A61. Similarly, it is assumed that data (a group of wavelet coefficients) generated by performing the wavelet transformation on the second target image data D60 are referred to as second wavelet coefficient data D61.

In the wavelet transformation, two-dimensional image data are decomposed into a high-frequency component and a low-frequency component. The frequency decomposition is also termed, for example, band division or band decomposition. Each of the band components obtained by the frequency decomposition (i.e., each of the low-frequency component and the high-frequency component) is also referred to as a sub-band. Herein, following the basic scheme of JPEG 2000, adopted is an octave division scheme in which only the band components on the low-frequency side obtained by the frequency decomposition both in the vertical and horizontal directions are recursively band-divided. The number of executions of the recursive band division is termed a decomposition level.

The decomposition level of the wavelet transformation is specified by the synthesis control data C50. Herein, an exemplary case where the value specified by the synthesis control data C50 is "3" will be described. In this case, the wavelet transformation unit 510 performs the wavelet transformation of the decomposition level 3.

Figure 14:
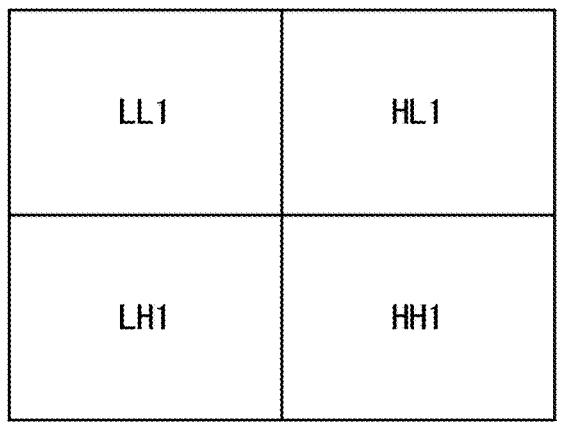
FIG. 14 is a view showing a Mallat-type wavelet plane (decomposition level 1) in accordance with the first preferred embodiment.
Figure 15:
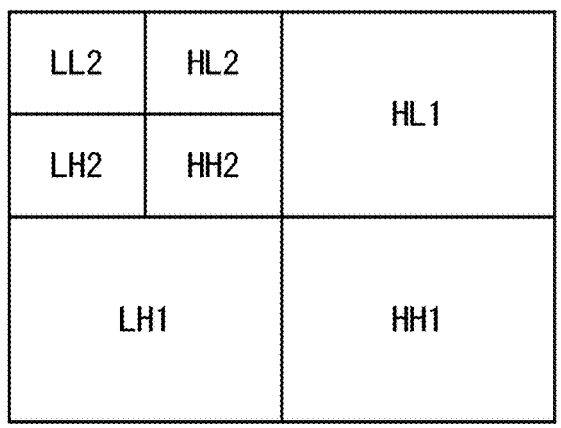
FIG. 15 is a view showing a Mallat-type wavelet plane (decomposition level 2) in accordance with the first preferred embodiment.
Figure 16:
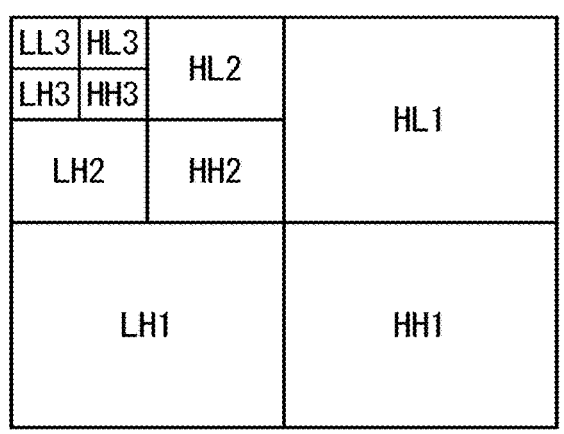
FIG. 16 is a view showing a Mallat-type wavelet plane (decomposition level 3) in accordance with the first preferred embodiment.

FIGS. 14 to 16 are views showing Mallat-type wavelet planes 61 to 63 in the two-dimensional wavelet transformation, respectively. In the exemplary cases of FIGS. 14 to 16, at the decomposition level 1 (see FIG. 14), the input image (two-dimensional image) is subjected to the frequency decomposition with respect to both the vertical and horizontal directions. The image is thereby decomposed into four band components HH1, HL1, LH1, and LL1, as shown in the wavelet plane 61 of FIG. 14. The band component LL1 obtained at the decomposition level 1 is further decomposed into four band components HH2, HL2, LH2, and LL2 at the decomposition level 2 (see the wavelet plane 62 of FIG. 15). The band component LL2 obtained at the decomposition level 2 is further decomposed into four band components HH3, HL3, LH3, and LL3 at the decomposition level 3 (see the wavelet plane 63 of FIG. 16). Further, the specified value of the decomposition level which is specified by the synthesis control data C50 is not limited to "3".

As to the notation on the two-dimensional wavelet transformation, for example, HL1 is a band component consisting of a horizontal high-frequency component H and a vertical low-frequency component L at the decomposition level 1. The notation is generalized as "XYm" (Each of X and Y is either one of H and L. m is an integer not smaller than 1). Specifically, a band component consisting of a horizontal band component X and a vertical band component Y at a decomposition level m is represented as "XYm".

Herein, each of the wavelet planes (see FIGS. 14 to 16) is a data group in which calculation result data of the wavelet transformation is two-dimensionally arrayed, being associated with an arrangement of pixels in an original image (an image which is not subjected to the wavelet transformation yet). For example, in a region represented as the band component LL1 on the wavelet plane, the calculation result data (LL component data) obtained by using a pixel in the original image as a pixel of interest are arranged corresponding to the position of the pixel of interest in the original image. Further, the wavelet plane is sometimes termed a wavelet space, a wavelet region, or a wavelet image.

At the decomposition level 1, the band component LL1 corresponds to essential information of the image. Further, with the band component LL1, it is possible to provide an image having a size that is 1/4 the image obtained before the decomposition (in other words, an image obtained by reducing the image before the decomposition with a reduction ratio of 1/2). The band component HL1 corresponds to information of an edge extending in the vertical direction, and the band component LH1 corresponds to information of an edge extending in the horizontal direction. The band component HH1 corresponds to information of an edge extending in an oblique direction. The same applies to those at other decomposition levels. For example, the band components LL2, HL2, LH2, and HH2 at the decomposition level 2 have the same relationship as that of the band components LL1, HL1, LH1, and HH1 in a case where the band component LL1 obtained before the decomposition is regarded as the original image.

Hereinafter, when the original image which is not subjected to the wavelet transformation yet corresponds to the decomposition level 0, the original image is sometimes referred to as a wavelet plane of decomposition level 0.

Further, it is assumed that the band component which is decomposed most in the wavelet plane is referred to as a highest-order band component. Specifically, in the wavelet plane 63 of decomposition level 3 (see FIG. 16), the highest-order band components are LL3, HL3, LH3, and HH3. In generalized notation, in the wavelet plane of decomposition level k, the highest-order band components are LLk, HLk, LHk, and HHk. Furthermore, among the band components obtained by decomposition performed the same number of times, it is assumed that the band component LL is referred to as a lowest-frequency band component and the band component HH is referred to as a highest-frequency band component.

In the Mallat-type wavelet transformation, as described above, the LL component is recursively decomposed both in the horizontal and vertical directions the same number of times. Further, in the Mallat-type wavelet transformation, as described later, the band component is synthesized in a reverse procedure of the decomposition. It is not necessary, however, that the L component and the H component in each of the horizontal and vertical directions are decomposed and synthesized the same number of times. In other words, wavelet transformation which is different in type from the Mallat-type one may be used.

Further, description will be made on an exemplary case where the upper left end in the original image and the wavelet plane is adopted as a point of origin of a coordinate system and it is assumed that the point of origin is 0, an L-component output of the wavelet transformation is an even number, and an H-component output thereof is an odd number. It may be assumed, however, that the L-component output is an odd number and the H-component output is an even number. The wavelet planes (see FIGS. 14 to 16) are each a conceptual plane in which the even-numbered and odd-numbered outputs of the wavelet transformation are relocated for each band component.

<Synthesis Execution Unit 520>

The synthesis execution unit 520 performs a coefficient determination process for determining a coefficient related to the ROI in the first wavelet coefficient data A61 (hereinafter, referred to also as an ROI coefficient) and another coefficient related to the non-ROI in the first wavelet coefficient data A61 (hereinafter, referred to also as a non-ROI coefficient). Then, the synthesis execution unit 520 performs a coefficient synthesis process for synthesizing the ROI coefficient in the first wavelet coefficient data A61 and a wavelet coefficient in the second wavelet coefficient data D61, to thereby generate synthesized coefficient data E61.

<Coefficient Determination Process>

The coefficient determination process is performed on the basis of target mask data B60 which are data of the target mask to be used for determining the ROI and the non-ROI in the range of the first target image. In the first preferred embodiment, since the whole range of the first basic image is the first target image, the basic mask for the range of the first basic image serves as the target mask for the range of the first target image (see FIG. 26 described later).

The coefficient determination process is performed on the first wavelet coefficient data A61 as described above. On the other hand, in the first preferred embodiment, the target mask is targeted to the first target image which is the original image (an image which is not subjected to the wavelet transformation yet). For this reason, the synthesis execution unit 520 includes a mask development unit 521.

Herein, it is assumed that the mask whose target is the original image is referred to as an original mask. It can be understood that the original mask is an image indicating which of the ROI and the non-ROI to which each pixel in the original image belongs. The original mask has an ROI corresponding portion corresponding to the ROI in the original image and a non-ROI corresponding portion corresponding to the non-ROI therein. The whole mask 70 (see FIG. 7) is the original mask, and in the first preferred embodiment, the basic mask and the target mask are each also the original mask.

The mask development unit 521 develops the ROI corresponding portion and the non-ROI corresponding portion in the original mask for each band component included in the first wavelet coefficient data A61 (in other words, for each band component included in the wavelet plane corresponding to the first wavelet coefficient data A61). By performing such a mask development process, a developed mask which is a mask for the first wavelet coefficient data A61 is generated. As to the mask development, for example, see Japanese Patent Application Laid Open Gazette No. 2006-203409 and Japanese Unexamined Patent Application Publication (Translation of PCT Application) No. 2001-520466, and INTERNATIONAL STANDARD ISO/IEC 15444-1 ITU-T RECOMMENDATION T.800 Information technology—JPEG 2000 image coding system: Core coding system Annex H-Coding of images with regions of interest.

Figure 19:
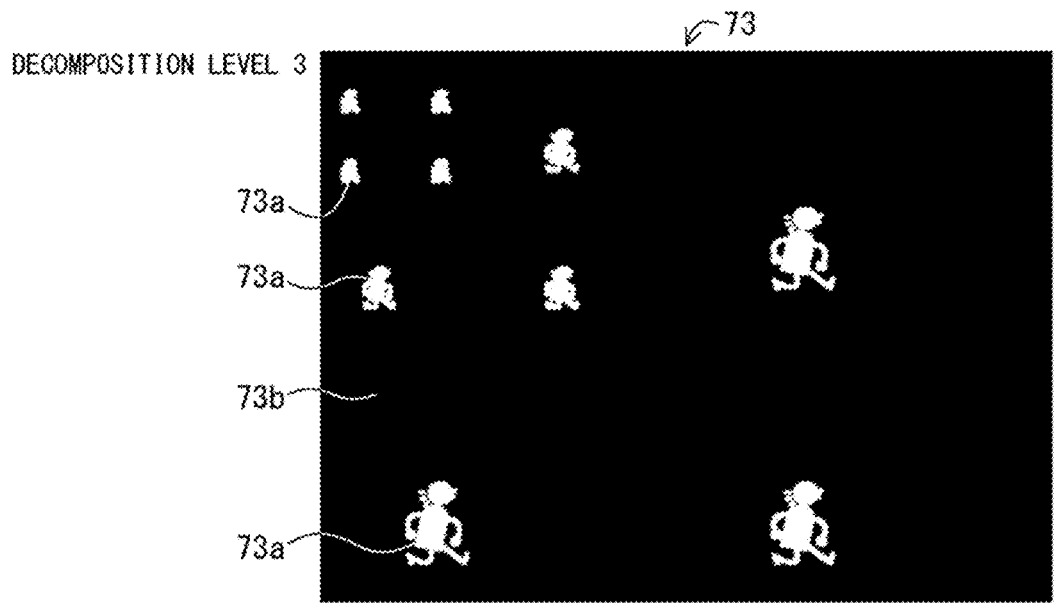
FIG. 19 is a view showing a developed mask (decomposition level 3) in accordance with the first preferred embodiment.

FIGS. 17 to 19 are views showing developed masks 71, 72, and 73 in which the whole mask 70 of FIG. 7 is developed on the wavelet planes 61 to 63 (see FIGS. 14 to 16) of decomposition levels 1, 2, and 3, respectively. In the developed masks 71, 72, and 73, the ROI corresponding portions 71*a*, 72*a*, and 73*a* are represented in white, and the non-ROI corresponding portions 71*b*, 72*b*, and 73*b* are represented in black.

Figure 20:
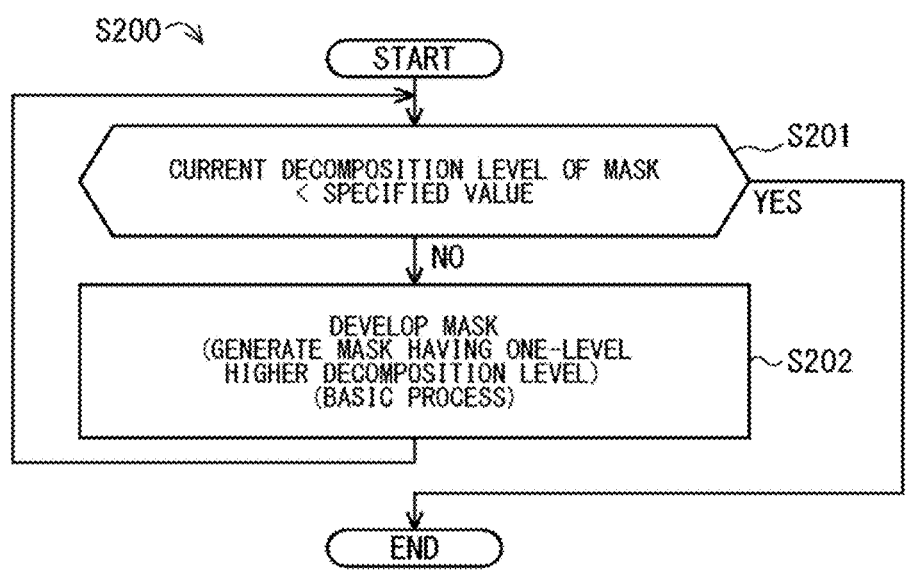
FIG. 20 is a flowchart showing a mask development process in accordance with the first preferred embodiment.

FIG. 20 is a flowchart showing the mask development process. In the mask development process S200 of FIG. 20, performed is a process S202 of increasing the decomposition level of the mask by one level (hereinafter, referred to also as a basic process). When the decomposition level specified by the synthesis control data C50 is 2 or higher, the basic process S202 is repeated until the mask having the specified decomposition level is obtained (see Step S201).

In the basic process S202, a first mask for a first wavelet plane is converted into a second mask for a second wavelet plane having a decomposition level which is one-level higher than that of the first wavelet plane. Further, when the first mask to be developed is the original mask, the above-described first wavelet plane corresponds to the original image before the wavelet transformation. By representing the original image as the wavelet plane of decomposition level 0, as described above, it can be understood that the first wavelet plane also includes the original image.

The basic process S202 is recursively repeated. Specifically, by setting the second mask to a next first mask, the basic process S202 is performed again. Further, the basic process S202 is repeated in accordance with the method (scheme) of the wavelet transformation. When the above-described Mallat-type method is adopted (see FIGS. 14 to 16), for example, in the wavelet plane, only the lowest-frequency band component LL is recursively decomposed.

For this reason, the mask development is also recursively performed only on the part corresponding to the band component LL.

The basic process S202 is performed on the basis of a predetermined mask development condition, and the mask development condition depends on the number of taps of a filter used for the wavelet transformation.

When a 5×3 filter is used in an arithmetic operation of the wavelet transformation, for example, the mask development condition includes two conditions (referred to as a first condition and a second condition) based on FIG. 21. In the 5×3 filter, a low-pass filter on the decomposition side has five taps and a high-pass filter on the decomposition side has three taps.

The first condition: When the even-numbered (represented as the 2n-th where n is an integer) data on the first wavelet plane are associated with the ROI by the first mask, the second mask is formed so that the n-th data of the low-frequency component (corresponding to output data on the low-pass filter side) on the second wavelet plane may be associated with the ROI. Along with that, the second mask is formed so that the {n−1}th data and the n-th data of the high-frequency component (corresponding to output data on the high-pass filter side) on the second wavelet plane may be associated with the ROI.

The second condition: When the {2n+1}th data on the first wavelet plane are associated with the ROI by the first mask, the second mask is formed so that the n-th data and the {n+1}th data of the low-frequency component and the {n−1}th data to the {n+1}th data of the high-frequency component on the second wavelet plane may be associated with the ROI.

Figure 22:
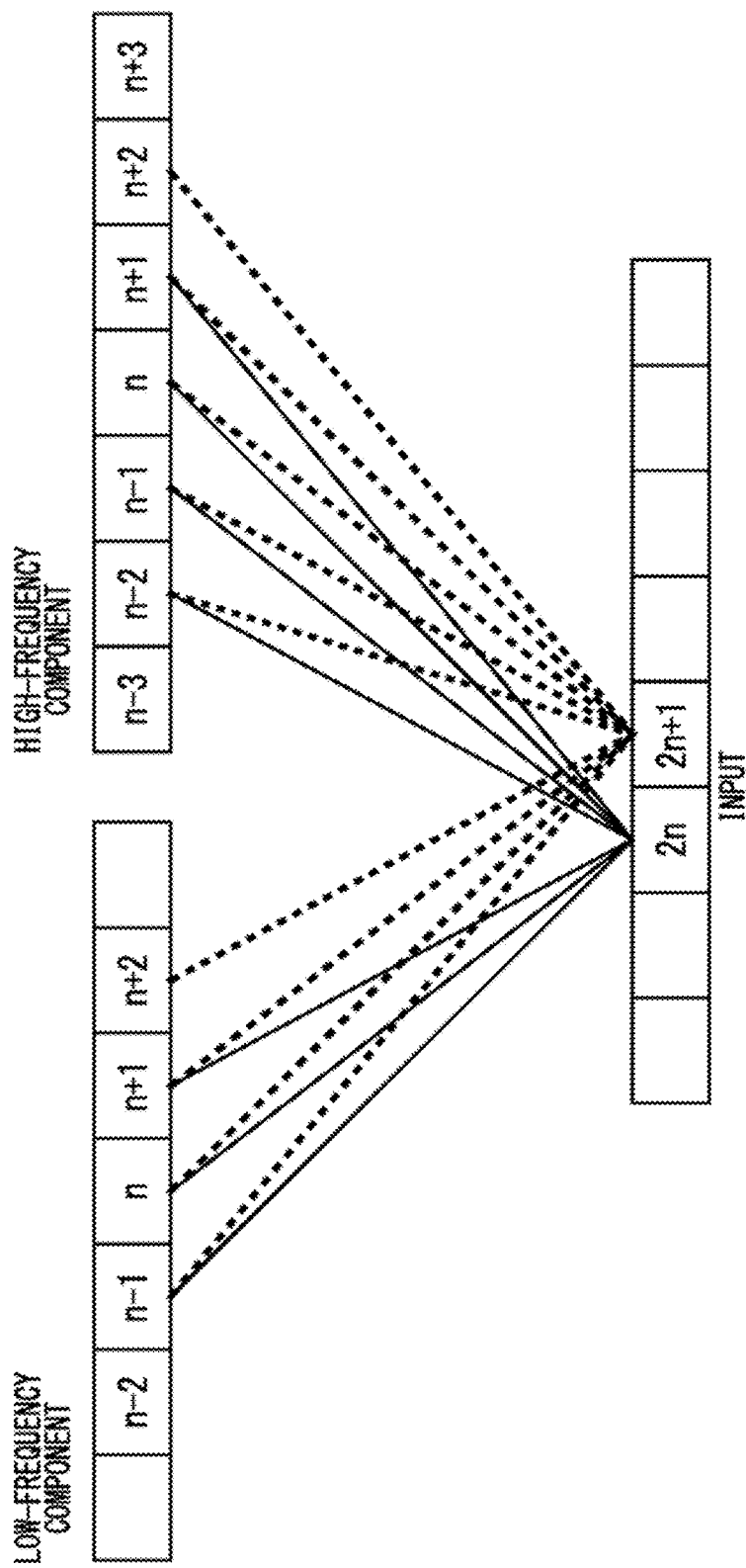
FIG. 22 is a diagram showing the mask development process in a case where a Daubechies 9×7 filter is used for the wavelet transformation in accordance with the first preferred embodiment.

Further, when a Daubechies 9×7 filter is used in an arithmetic operation of the wavelet transformation, the mask development condition includes two conditions (referred to as a third condition and a fourth condition) based on FIG. 22. In the Daubechies 9×7 filter, a low-pass filter on the decomposition side has nine taps and a high-pass filter on the decomposition side has seven taps.

The third condition: When the 2n-th data on the first wavelet plane are associated with the ROI by the first mask, the second mask is formed so that the {n−1}th data to the {n+1}th data of the low-frequency component and the {n−2}th data to the {n+1}th data of the high-frequency component on the second wavelet plane may be associated with the ROI.

The fourth condition: When the {2n+1}th data on the first wavelet plane are associated with the ROI by the first mask, the second mask is formed so that the {n−1}th data to the {n+2}th data of the low-frequency component and the {n−2}th data to the {n+2}th data of the high-frequency component on the second wavelet plane may be associated with the ROI.

When the decomposition level specified by the synthesis control data C50 is 3, the synthesis execution unit 520 performs the coefficient determination process on the basis of the distinction between the ROI corresponding portion 73a and the non-ROI corresponding portion 73b in the developed mask 73 (see FIG. 19).

<Coefficient Synthesis Process>

As described above, the synthesis execution unit 520 performs the coefficient synthesis process for synthesizing the ROI coefficient in the first wavelet coefficient data A61 and the wavelet coefficient in the second wavelet coefficient data D61, to thereby generate the synthesized coefficient data E61.

Figure 23:
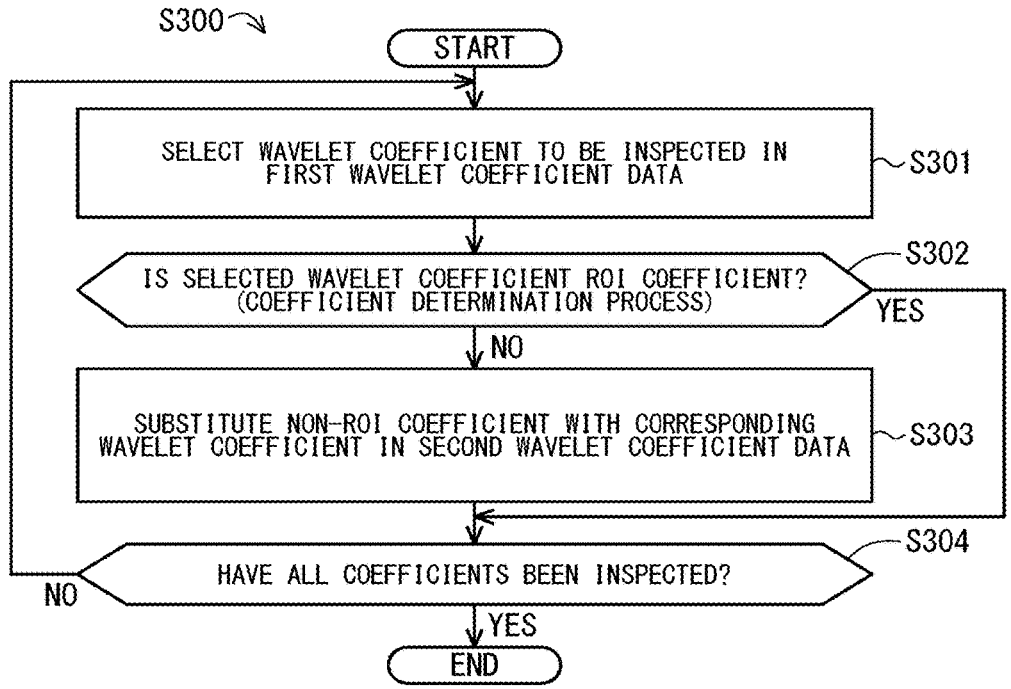
FIG. 23 is a flowchart showing a coefficient synthesis process (first coefficient synthesis process) in accordance with the first preferred embodiment.

Specifically, when data at a position on the wavelet plane in accordance with the first wavelet coefficient data A61 are not the ROI coefficient (in other words, the non-ROI coefficient), the non-ROI coefficient is substituted with data which are present at the same position on the wavelet plane in accordance with the second wavelet coefficient data D61. The first wavelet coefficient data A61 are thereby converted into the synthesized coefficient data E61. FIG. 23 is a flowchart showing the coefficient synthesis process. In a coefficient synthesis process S300 of FIG. 23, first, one wavelet coefficient to be used as an inspection target is selected out of the first wavelet coefficient data A61 (Step S301). Then, it is determined whether the inspection target coefficient thereof is the ROI coefficient or the non-ROI coefficient (Step S302). In other words, in Step S302, the coefficient determination process is performed.

When the inspection target coefficient is the non-ROI coefficient, the inspection target coefficient is substituted with the corresponding wavelet coefficient in the second wavelet coefficient data D61 (Step S303). On the other hand, when the inspection target coefficient is the ROI coefficient, Step S303 is not performed. Steps S301 to S303 are repeated until the inspections of all the wavelet coefficients in the first wavelet coefficient data A61 are finished (Step S304).

Figure 24:
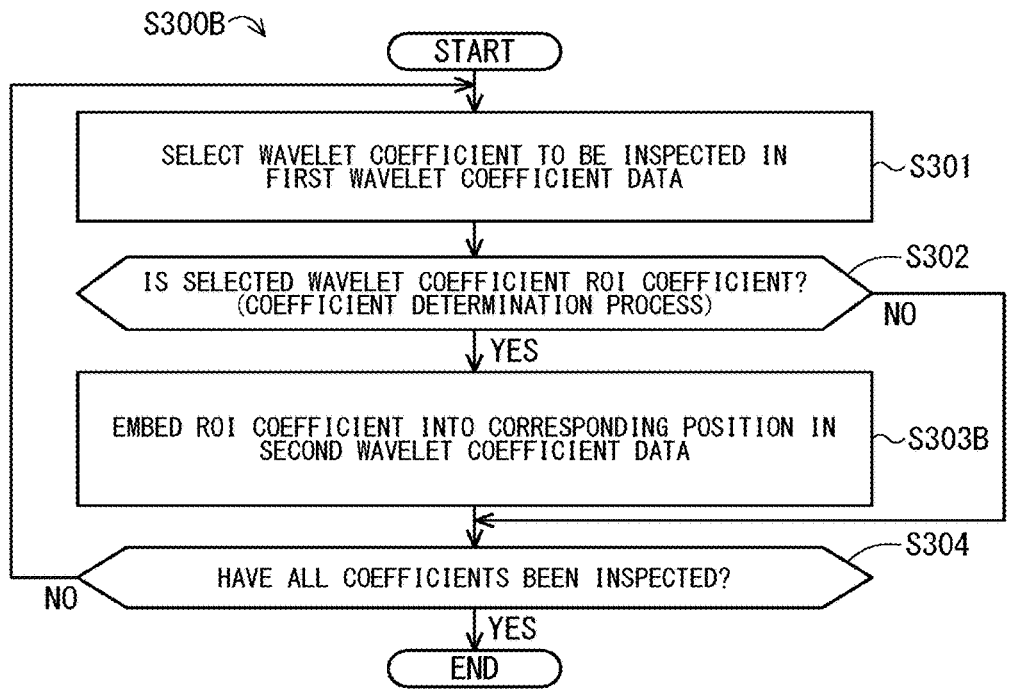
FIG. 24 is a flowchart showing another coefficient synthesis process (second coefficient synthesis process) in accordance with the first preferred embodiment.

FIG. 24 is a flowchart showing another coefficient synthesis process. In another coefficient synthesis process S300B of FIG. 24, Step S303B is provided, instead of the above Step S303. Specifically, when it is determined that the inspection target coefficient is the ROI coefficient in coefficient determination process S302, the ROI coefficient in the first wavelet coefficient data A61 is embedded into the corresponding position in the second wavelet coefficient data D61 in Step S303B. The second wavelet coefficient data D61 are thereby converted into the synthesized coefficient data E61.

Thus, for the synthesis between the ROI coefficient in the first wavelet coefficient data A61 and the wavelet coefficient in the second wavelet coefficient data D61, there are two kinds of specific methods (referred to as a first coefficient synthesis process and a second coefficient synthesis process).

The first coefficient synthesis process (see Step S300 of FIG. 23): the non-ROI coefficient in the first wavelet coefficient data A61 is substituted with the corresponding wavelet coefficient in the second wavelet coefficient data D61.

The second coefficient synthesis process (see Step S300B of FIG. 24): the ROI coefficient in the first wavelet coefficient data A61 is embedded into the corresponding position in the second wavelet coefficient data D61.

<Inverse Wavelet Transformation Unit 530>

With reference back to FIG. 13, the inverse wavelet transformation unit 530 performs the inverse wavelet transformation (IDWT) on the synthesized coefficient data E61 generated by the synthesis execution unit 520 until the decomposition level becomes 0. From the synthesized coefficient data E61, synthetic image data E80 are thereby generated. In the first preferred embodiment, the synthetic image data E80 are outputted from the synthesizing unit 500, to thereby become synthetic image data E100 which are output data.

The inverse wavelet transformation is an inverse processing of the wavelet transformation performed by the wavelet transformation unit 510. In the inverse wavelet transformation, the band components are synthesized recursively. The number of executions of synthesis in the inverse wavelet transformation is termed a synthesis level. Further, it is assumed that the synthesis level in a state before the inverse wavelet transformation is represented as 0. When the decomposition level specified by the synthesis control data C50 is 3, for example, the decomposition level of 3 corresponds to the synthesis level of 0.

By causing the display 41 to perform a display operation on the basis of the synthetic image data E100, displayed is the synthetic image between the ROI in the first target image and the second target image.

<Operation of Synthesizing System 21>

Figure 25:
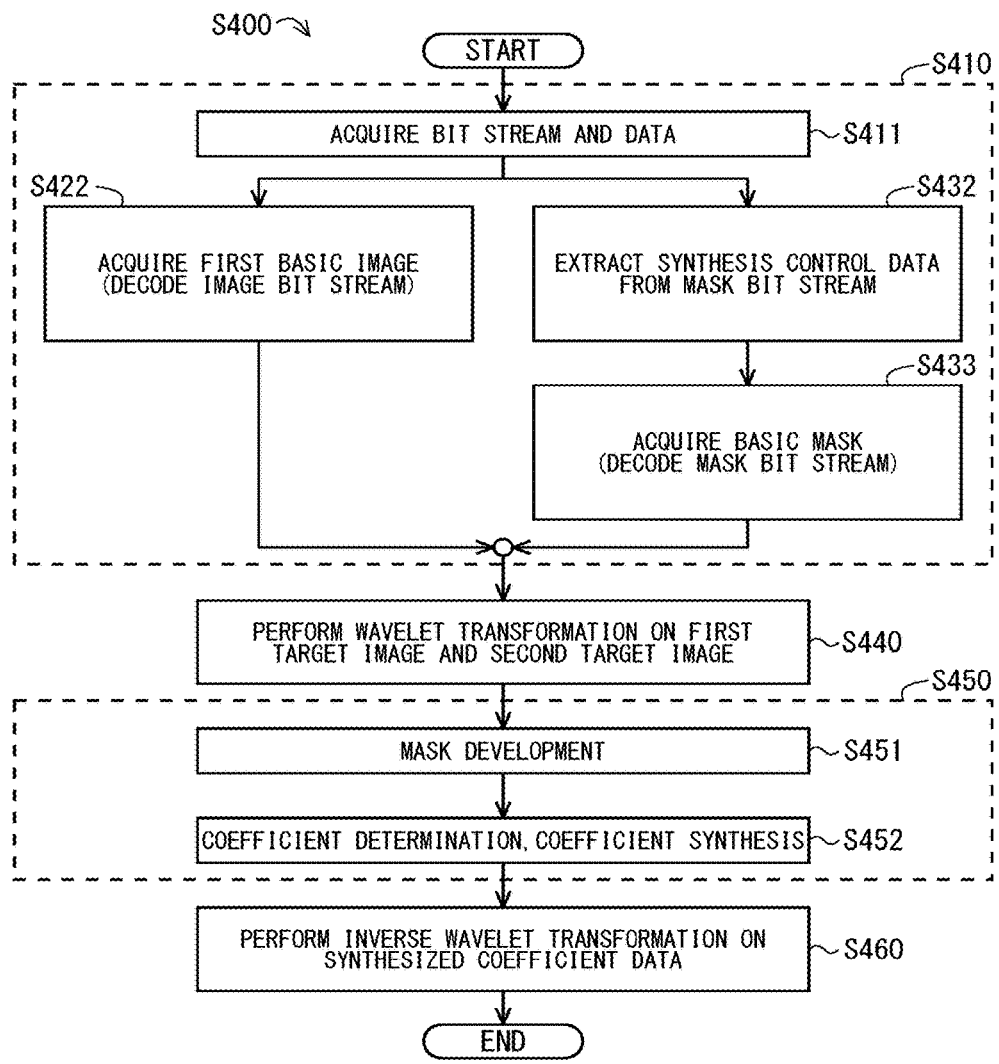
FIG. 25 is a flowchart showing an operation of an image synthesizing system in accordance with the first preferred embodiment.
Figure 26:
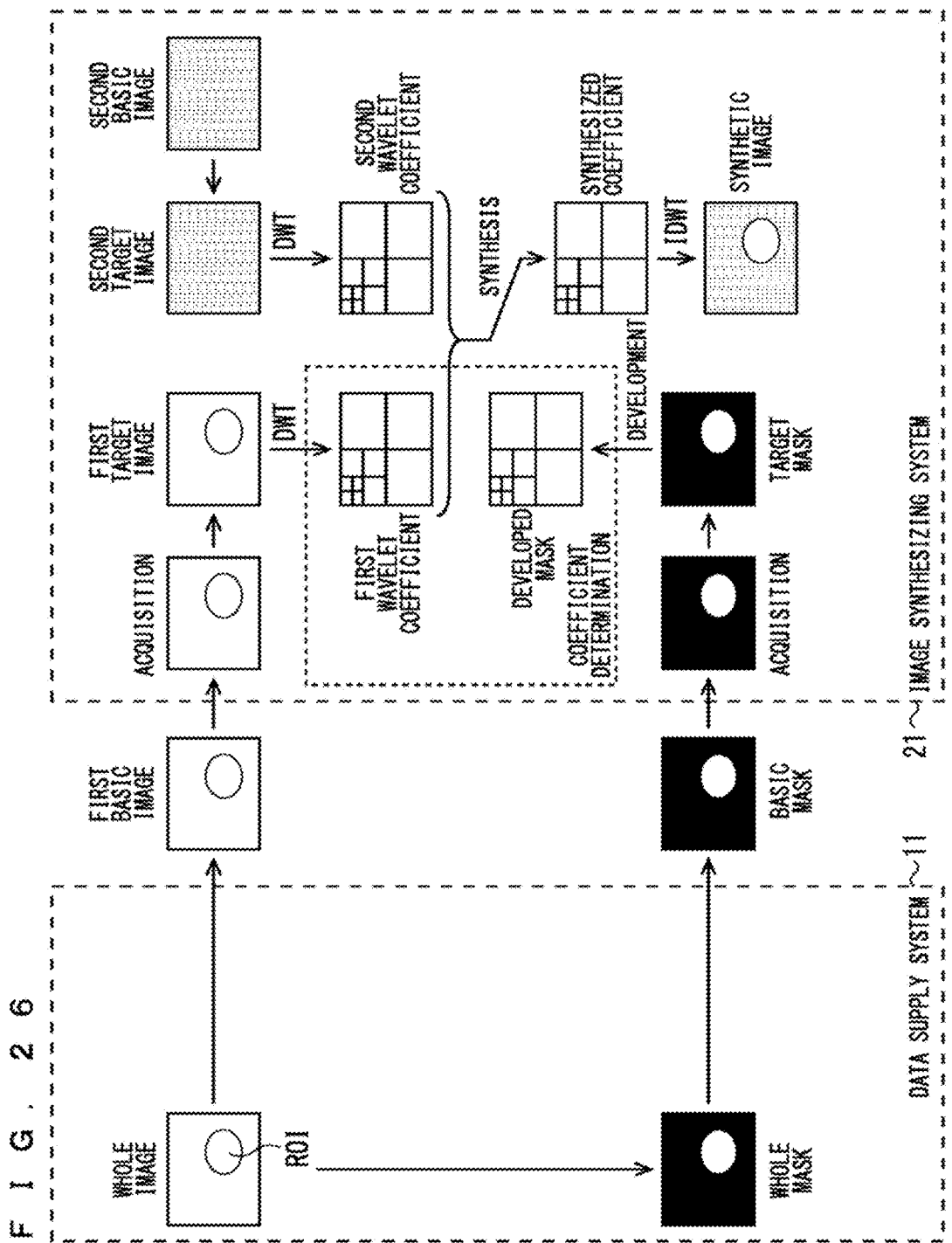
FIG. 26 is a conceptual diagram showing image synthesis in accordance with the first preferred embodiment.

FIG. 25 is a flowchart showing an operation of the synthesizing system 21. Further, FIG. 26 is a conceptual diagram showing the image synthesis. An operation flow S400 of FIG. 25 is broadly divided into Step S410 for a data acquisition process, Step S440 for a wavelet transformation process, Step S450 for a synthesis execution process, and Step S460 for an inverse wavelet transformation process.

In the data acquisition step S410, when the image bit stream Abs, the mask bit stream Bbs, and the second basic image data D50 are inputted to the synthesizing system 21 (Step S411), the image decoder 300 decodes the image bit stream Abs, to thereby acquire the first basic image data A50 (Step S422). On the other hand, the mask decoder 400 extracts the synthesis control data C50 from the mask bit stream Bbs (Step S432). After that, the mask decoder 400 decodes the mask bit stream Bbs, to thereby acquire the basic mask data B50 (Step S433).

Herein, as shown in FIG. 26, in the first preferred embodiment, the whole range of the first basic image is handled as the first target image, the whole range of the basic mask is handled as the target mask, and the whole range of the second basic image is handled as the second target image. For this reason, the first basic image data A50, the basic mask data B50, and the second basic image data D50 are handled as the first target image data A60, the target mask data B60, and the second target image data D60, respectively, in the synthesizing unit 500 (see FIG. 13).

In the wavelet transformation step S440, the wavelet transformation unit 510 performs the wavelet transformation on the first target image data A60 and the second target image data D60 until the decomposition level becomes the decomposition level specified by the synthesis control data C50. From the first target image data A60 and the second target image data D60, the first wavelet coefficient data A61 and the second wavelet coefficient data D61 are thereby generated, respectively.

In the synthesis execution step S450, the mask development unit 521 generates developed mask data of decomposition level specified by the synthesis control data C50 on the basis of the target mask data B60 (Step S451). As to the mask development, see the mask development process step S200 of FIG. 20. Then, the synthesis execution unit 520 performs the coefficient determination process and the coefficient synthesis process, to thereby generate the synthesized coefficient data E61 (Step S452).

In the inverse wavelet transformation step S460, the inverse wavelet transformation unit 530 performs the inverse wavelet transformation on the synthesized coefficient data E61, to thereby generate the synthetic image data E80 (to become the output data E100 in the first preferred embodiment).

Further, though Step S422 is performed concurrently with Steps S432 to S433 in FIG. 25, Step S422 and Steps S432 to S433 may be performed sequentially. Furthermore, Steps S440 and S451 may be performed concurrently.

<Effects>

In the first preferred embodiment, the synthesis between the ROI in the first target image and the second target image is performed by using the first wavelet coefficient data A61 and the second wavelet coefficient data D61. Further, the determination of the ROI in the first target image is performed by determining the ROI coefficient in the first wavelet coefficient data A61. The coefficient determination is performed on the basis of the target mask data B60, more specifically, on the basis of the developed mask data (generated on the basis of the target mask data B60) for the first wavelet coefficient data A61.

In the wavelet transformation and the inverse wavelet transformation, not only the information of the pixel of interest to be processed but also the information of surrounding pixels are used. The same applies to the generation of the developed mask for the wavelet coefficient. In the first preferred embodiment, for this reason, a more excellent synthetic image can be achieved as compared with the case where the first target image data and the second target image data themselves are synthesized. In other words, even when an insufficient ROI having any defective portion on the contour thereof and/or in the inside thereof is used (that is to say, even when an original mask for such an insufficient ROI is used), it is possible to provide a repaired ROI on the synthetic image.

Further, by controlling the decomposition level of the wavelet transformation with the synthesis control data C50, it is possible to adjust the state of synthesis (repair of the ROI, extension of the ROI, and the like).

Figure 27:
FIG. 27 is a view showing an exemplary first target image in accordance with the first preferred embodiment.
Figure 28:
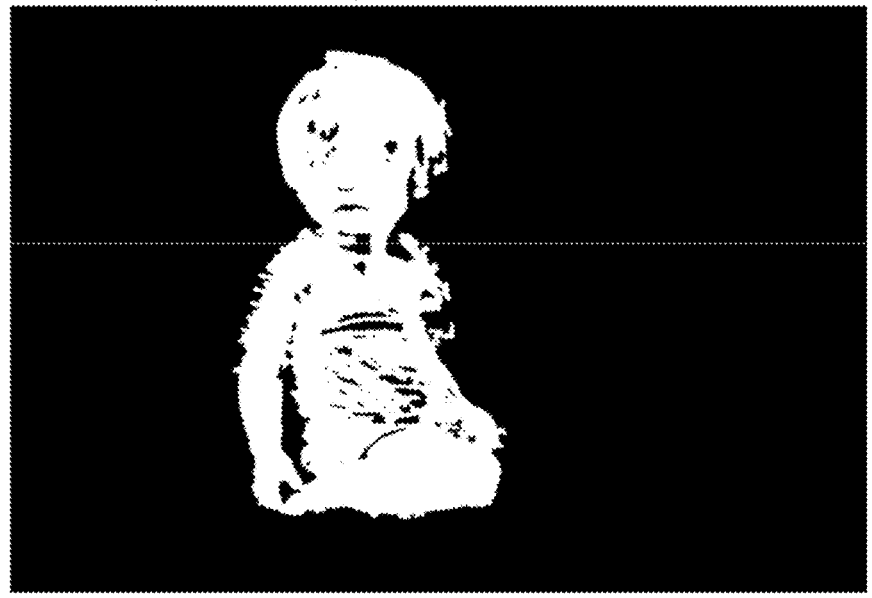
FIG. 28 is a view showing an exemplary target mask in accordance with the first preferred embodiment.
Figure 29:
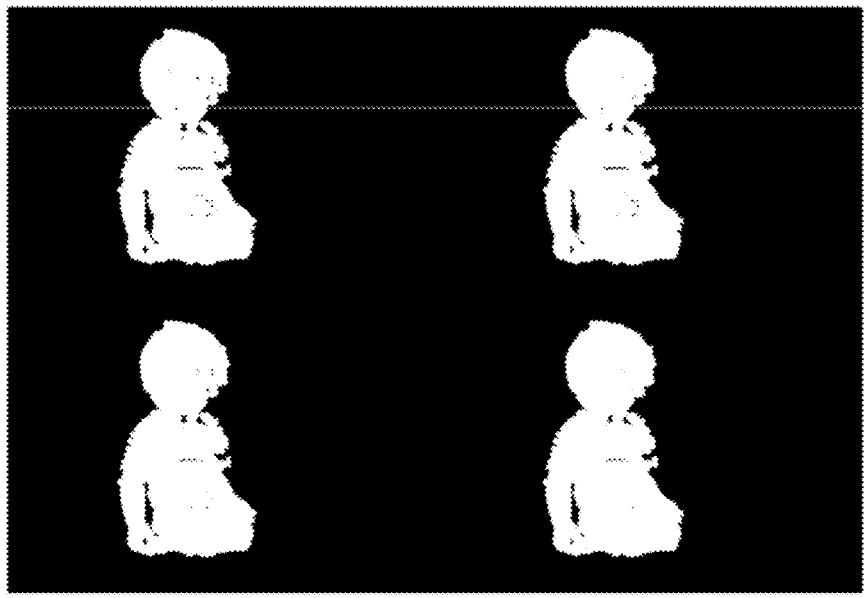
FIG. 29 is a view showing a developed mask (decomposition level 1) in accordance with the first preferred embodiment.
Figure 30:
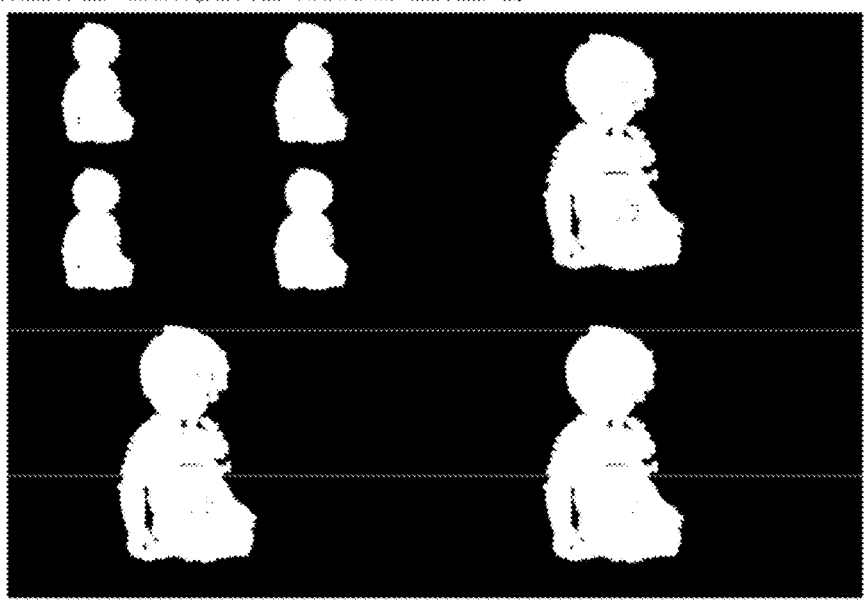
FIG. 30 is a view showing a developed mask (decomposition level 2) in accordance with the first preferred embodiment.
Figure 31:
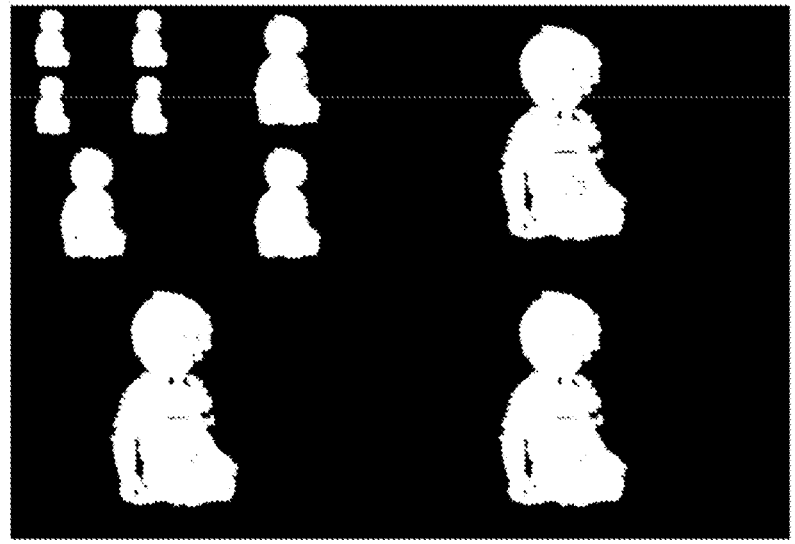
FIG. 31 is a view showing a developed mask (decomposition level 3) in accordance with the first preferred embodiment.
Figure 32:
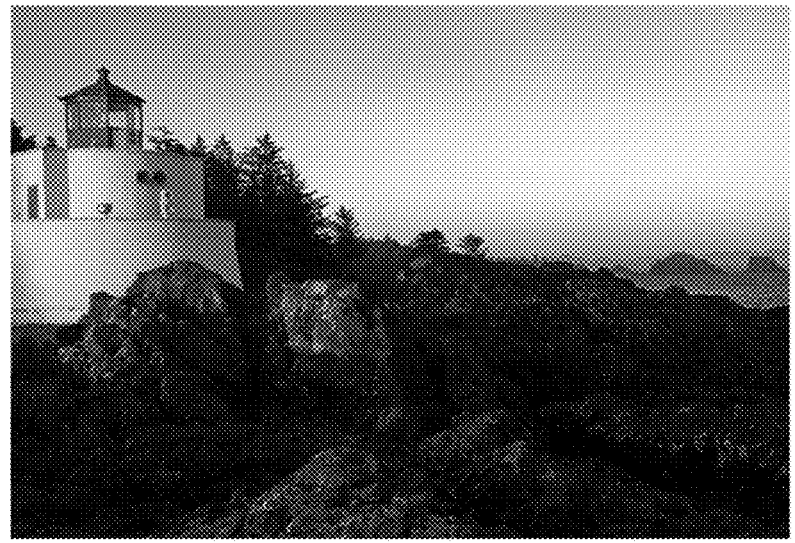
FIG. 32 is a view showing an exemplary second target image in accordance with the first preferred embodiment.

FIGS. 27 to 37 show specific examples. FIG. 27 shows an exemplary first target image, and in FIG. 27, it is assumed that the portion showing a child is an ROI. FIG. 28 shows an original mask corresponding to FIG. 27. FIGS. 29 to 31 show developed masks of decomposition levels 1, 2, and 3, respectively, which are generated from the original mask (also the target mask in the first preferred embodiment) shown in FIG. 28. In FIGS. 28 to 31, the white portion is an ROI corresponding portion and the black portion is a non-ROI corresponding portion. FIG. 32 shows an exemplary second target image.

Figure 33:
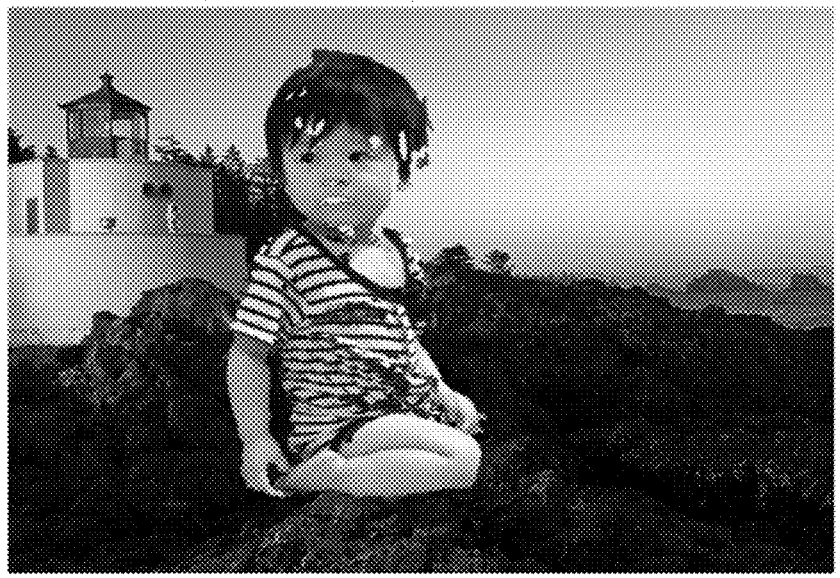
FIG. 33 is a view showing an exemplary synthetic image for comparison not in accordance with the first preferred embodiment.
Figure 34:
FIG. 34 is a view showing an exemplary synthetic image (decomposition level 1) in accordance with the first preferred embodiment.
Figure 35:
FIG. 35 is a view showing an exemplary synthetic image (decomposition level 2) in accordance with the first preferred embodiment.
Figure 36:
FIG. 36 is a view showing an exemplary synthetic image (decomposition level 3) in accordance with the first preferred embodiment.
Figure 37:
FIG. 37 is a view showing an exemplary synthetic image (decomposition level 5) in accordance with the first preferred embodiment.

FIG. 33 shows a synthetic image not in accordance with the first preferred embodiment. Specifically, the ROI is cut out from the image of FIG. 27 on the basis of the mask of FIG. 28, and the cut-out ROI and the image of FIG. 32 are synthesized with each other and the synthetic image of FIG. 33 is thereby obtained. On the other hand, FIGS. 34 to 36 show images obtained by synthesis in accordance with the first preferred embodiment. FIGS. 34 to 36 correspond to the images obtained by synthesis at the decomposition levels 1, 2, and 3, respectively. Further, for information, FIG. 37 shows an image obtained by synthesis at the decomposition level 5.

From FIG. 28, it can be seen that it is difficult to accurately determine the contour of the ROI (herein, the contour of the child) by an automatic setting technique for the ROI. For example, the contour of the right arm of the child is not accurate. Further, in the ROI, non-ROIs forming defects are found. For this reason, as shown in FIG. 33, in the synthetic image not in accordance with the first preferred embodiment, unnatural portions are marked.

On the other hand, in the synthetic images of FIGS. 34 to 36, defective portions on the contour thereof and/or in the inside thereof are repaired. Further, as the decomposition level for executing synthesis becomes higher, higher repair effects are obtained.

Furthermore, as can be seen from FIGS. 34 to 36 and 37, as the decomposition level for executing synthesis becomes higher, the range to be cut out from the first target image of FIG. 27 becomes wider. So to speak, the original ROI (child part) is extended to the outside and in every direction, and as the decomposition level for executing synthesis becomes higher, the extended portion becomes wider. Further, as the decomposition level for executing synthesis becomes higher, it is possible to blur the boundary between the extended portion and the second target image.

In consideration of these merits, in the first preferred embodiment, it is possible to eliminate the necessity to use any high-cost techniques for setting the ROI. In other words, an excellent synthetic image can be generated at low cost.

Herein, the generation of the mask is performed by using an algorithm independent of the coding of the first basic image. Further, the decoding of the basic mask data in the synthesizing system 21 is performed by using an algorithm independent of the decoding of the first basic image. For this reason, it is possible to increase the degree of freedom of choice for the image encoder 150 and the image decoder 300.

The Second Preferred Embodiment

Figure 38:
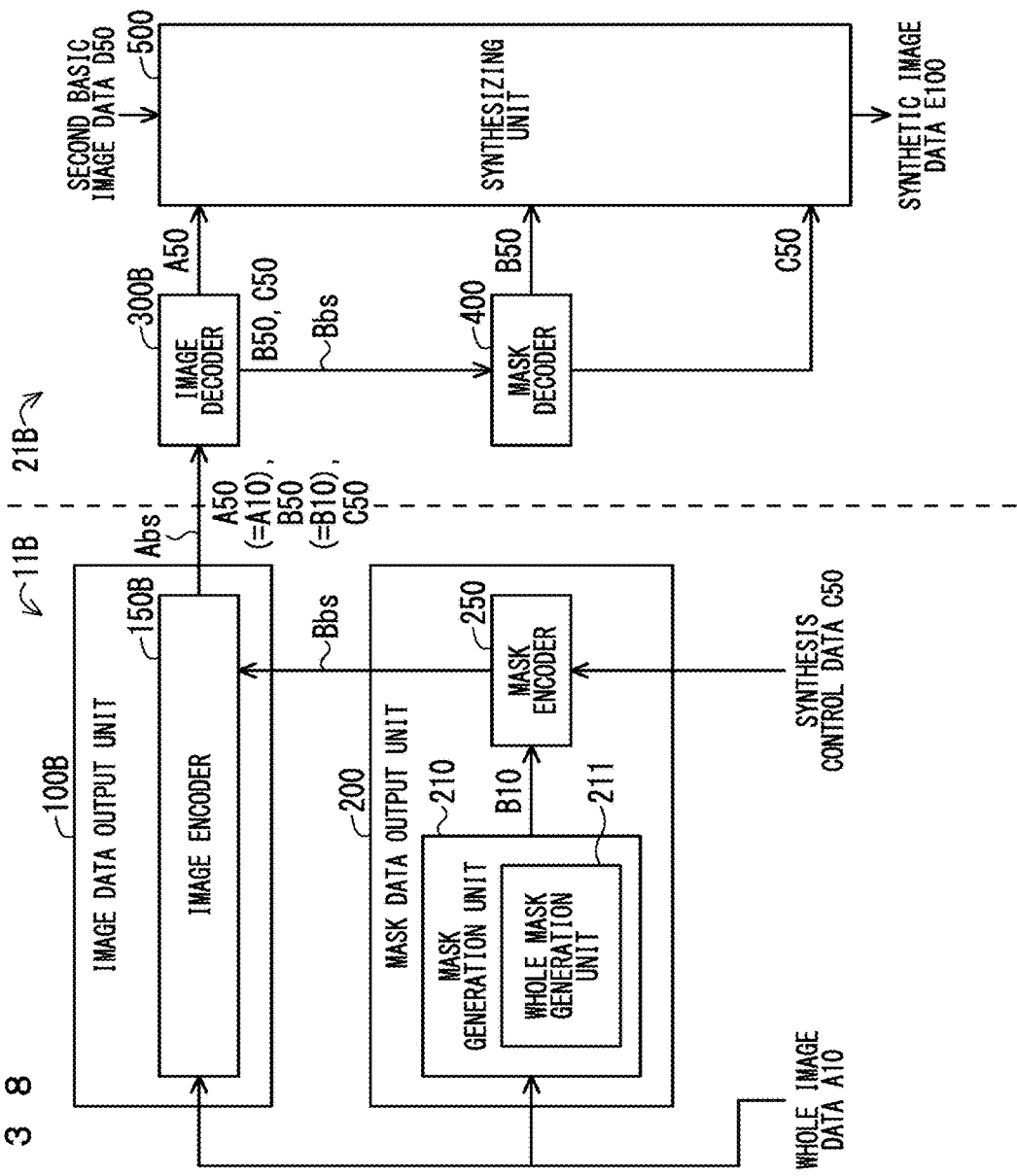
FIG. 38 is a block diagram showing an image processing system in accordance with a second preferred embodiment.

FIG. 38 shows an exemplary constitution of a supply system 11B and a synthesizing system 21B in accordance with the second preferred embodiment. Instead of the supply system 11 and the synthesizing system 21 in accordance with the first preferred embodiment, the supply system 11B and the synthesizing system 21B can be applied to the image processing system 1, 10, 20, or the like.

The supply system 11B and the synthesizing system 21B basically have the same constitution as those of the supply system 11 and the synthesizing system 21 of the first preferred embodiment (see FIG. 3), but have the following different points. In the supply system 11B, instead of the image data output unit 100, an image data output unit 100B having an image encoder 150B is provided. In the synthesizing system 21B, instead of the image decoder 300, an image decoder 300B is provided.

The image encoder 150B acquires the mask bit stream Bbs from the mask encoder 250 and embeds the mask bit stream Bbs as the additional information into the image bit stream Abs. Specifically, the image bit stream Abs has a region which has no effect on the first basic image data A50, and the mask bit stream Bbs is embedded into the region. Any other operation of the image encoder 150B is the same as that of the image encoder 150.

As the above region of the image bit stream Abs, for example, a comment region in a format of the coded stream can be used. Alternatively, instead of or additionally to the comment region, an application marker (APP marker) region may be used.

Figure 39:
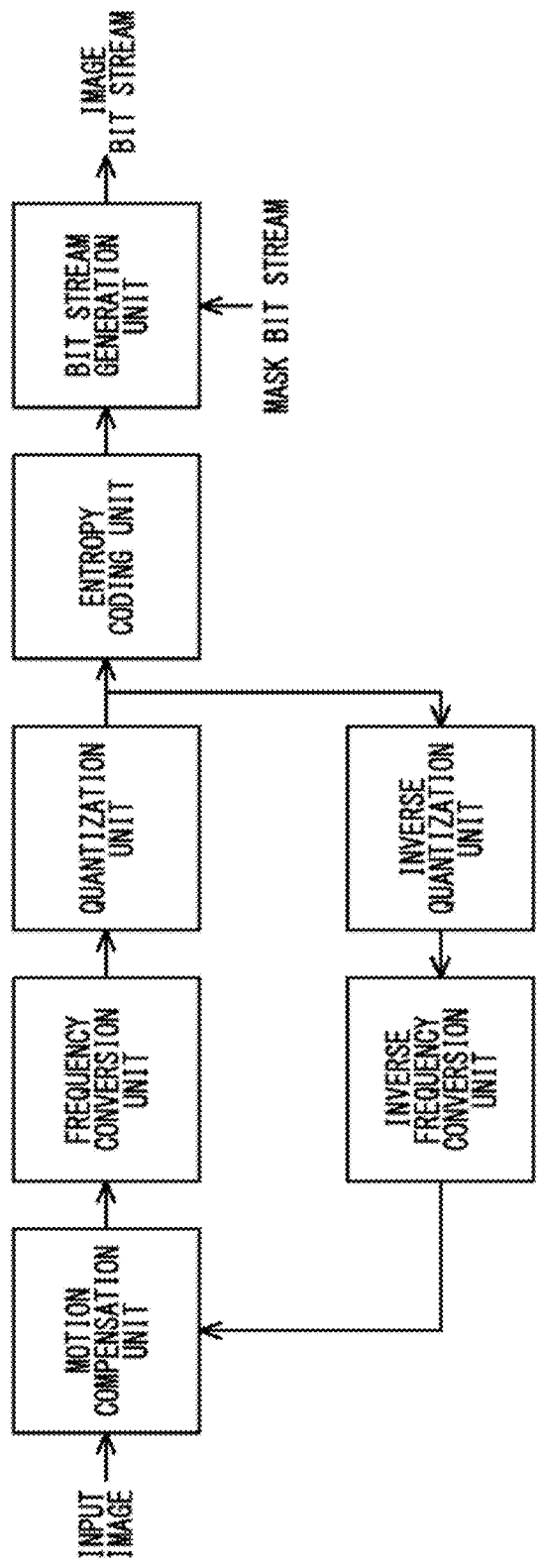
FIG. 39 is a block diagram showing an image encoder (for moving image) in accordance with the second preferred embodiment.

FIG. 39 is a block diagram showing an exemplary case where a general-type image encoder 150u for moving image is used as the image encoder 150B. In the image encoder 150u, the bit stream generation unit embeds the mask bit stream Bbs into the image bit stream Abs. Other constituent elements of the image encoder 150u are identical to those of the image encoder 150s of FIG. 4.

Figure 40:
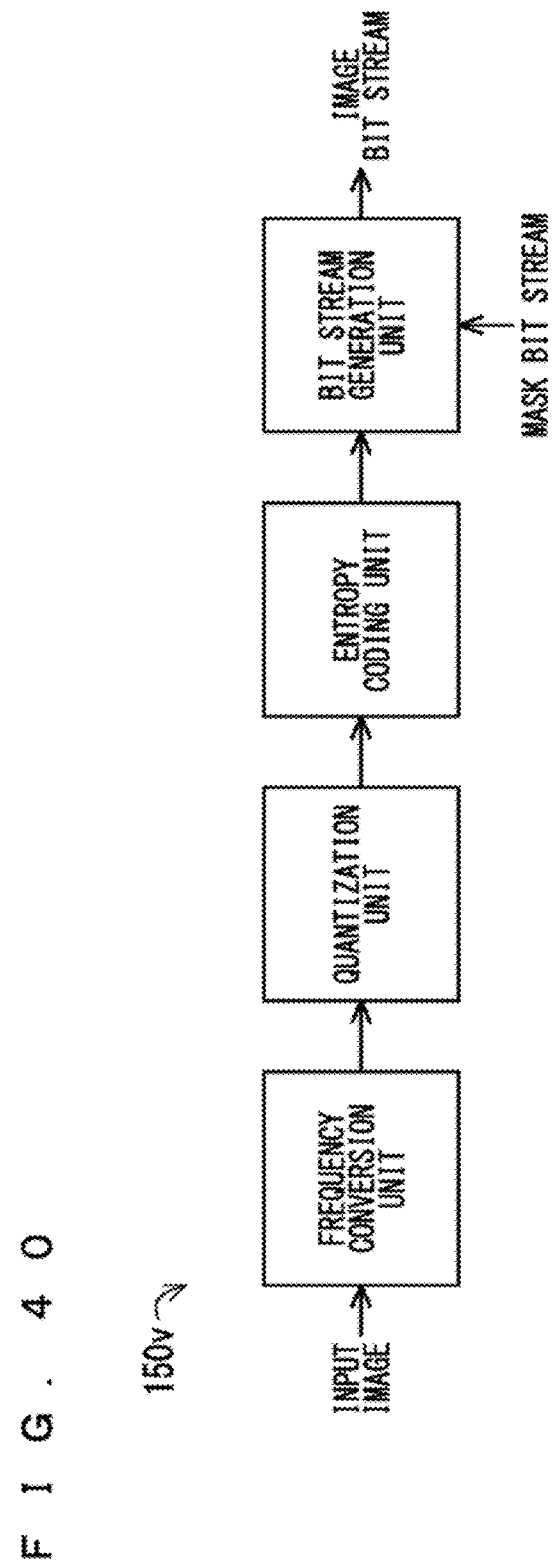
FIG. 40 is a block diagram showing an image encoder (for still image) in accordance with the second preferred embodiment.

FIG. 40 is a block diagram showing an exemplary case where a general-type image encoder 150v for still image is used as the image encoder 150B. In the image encoder 150v, the bit stream generation unit embeds the mask bit stream Bbs into the image bit stream Abs. Other constituent elements of the image encoder 150v are identical to those of the image encoder 150t of FIG. 5.

With reference back to FIG. 38, the image decoder 300B acquires the image bit stream Abs, extracts the mask bit stream Bbs from the image bit stream Abs, and supplies the mask bit stream Bbs to the mask decoder 400. Any other operation of the image decoder 300B is the same as that of the image decoder 300.

Figure 41:
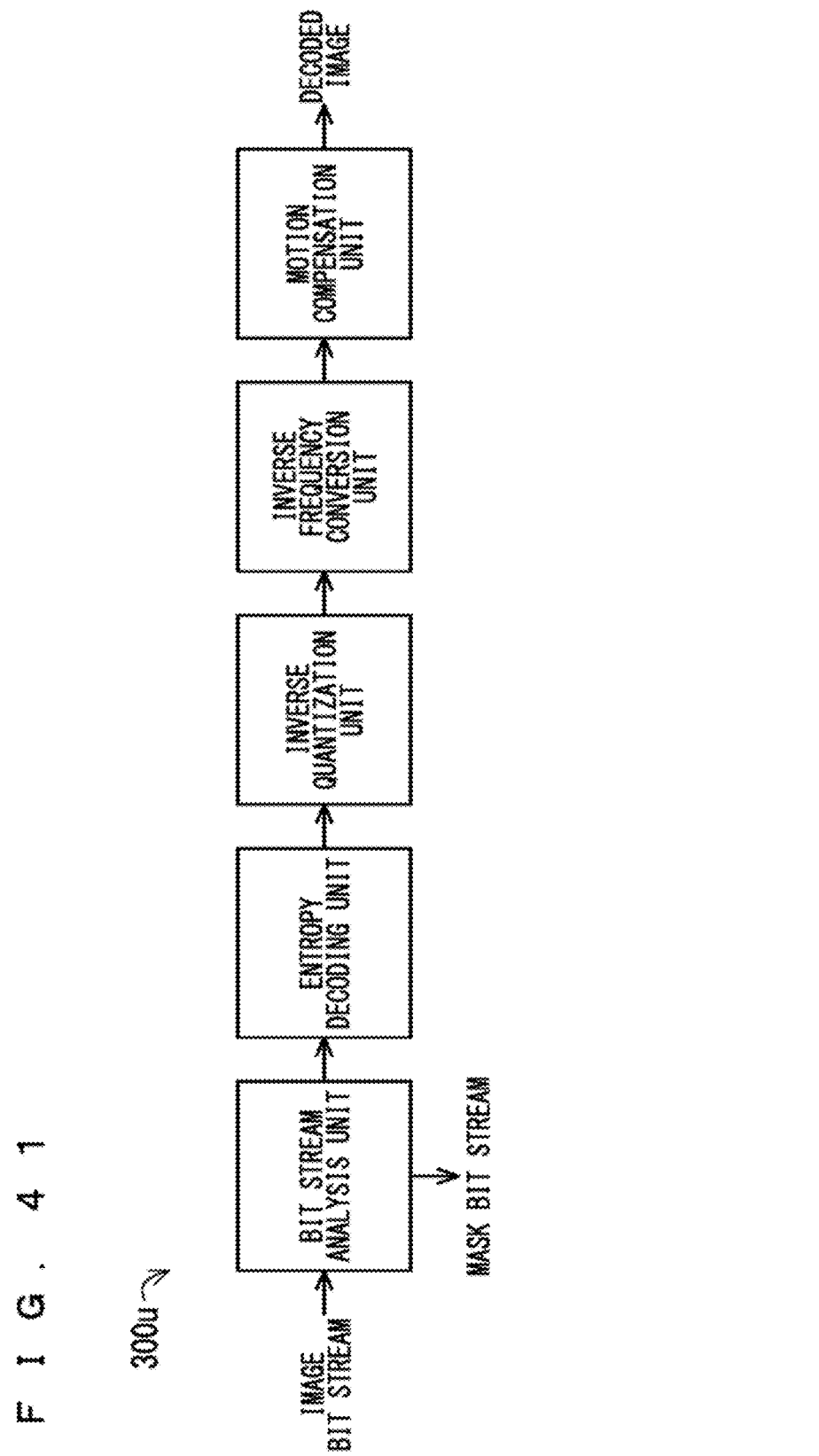
FIG. 41 is a block diagram showing an image decoder (for moving image) in accordance with the second preferred embodiment.

FIG. 41 is a block diagram showing an exemplary case where a general-type image decoder 300u for moving image is used as the image decoder 300B. In the image decoder 300u, the bit stream analysis unit extracts the mask bit stream Bbs from the image bit stream Abs. Other constituent elements of the image decoder 300u are identical to those of the image decoder 300s of FIG. 10.

Figure 42:
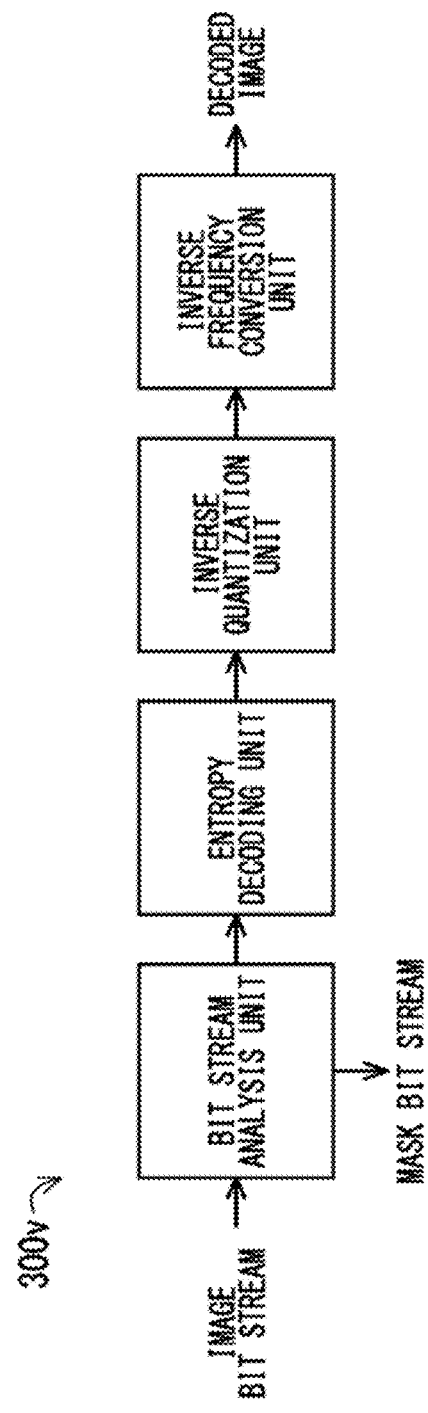
FIG. 42 is a block diagram showing an image decoder (for still image) in accordance with the second preferred embodiment.

FIG. 42 is a block diagram showing an exemplary case where a general-type image decoder 300v for still image is used as the image decoder 300B. In the image decoder 300v, the bit stream analysis unit extracts the mask bit stream Bbs from the image bit stream Abs. Other constituent elements of the image decoder 300v are identical to those of the image decoder 300t of FIG. 11.

In the second preferred embodiment, the image bit stream Abs and the mask bit stream Bbs are outputted from the supply system 11B as a single bit stream and acquired by the synthesizing system 21B. Like in the first preferred embodiment, however, the first basic image data A50 and the basic mask data B50 are present as different data. This is because the algorithm for generating the basic mask data B50 is independent of the algorithm for coding the first basic image data A50, like in the first preferred embodiment.

Herein, the synthesis control data C50 is embedded in the mask bit stream Bbs. For this reason, the first basic image data A50, the basic mask data B50, and the synthesis control data C50 are outputted from the supply system 11B as a single bit stream and acquired by the synthesizing system 21B. In this case, the image encoder 150B embeds both the mask bit stream Bbs (in other words, the basic mask data B50) and the synthesis control data C50 into the image bit stream Abs. Further, the image decoder 300B extracts both the mask bit stream Bbs and the synthesis control data C50 from the image bit stream Abs.

Furthermore, the image encoder 150B may acquire the synthesis control data C50, not being embedded in the mask bit stream Bbs (therefore, acquire the synthesis control data C50 and the mask bit stream Bbs separately) and embed both the synthesis control data C50 and the mask bit stream Bbs into the above region of the image bit stream Abs.

FIG. 43 is a flowchart showing an operation of the supply system 11B. In an operation flow S100B of FIG. 43, Step S106 is added to the operation flow S100 (see FIG. 9) of the first preferred embodiment. In Step S106, the image encoder 150B embeds the mask bit stream Bbs into the image bit stream Abs.

Figure 44:
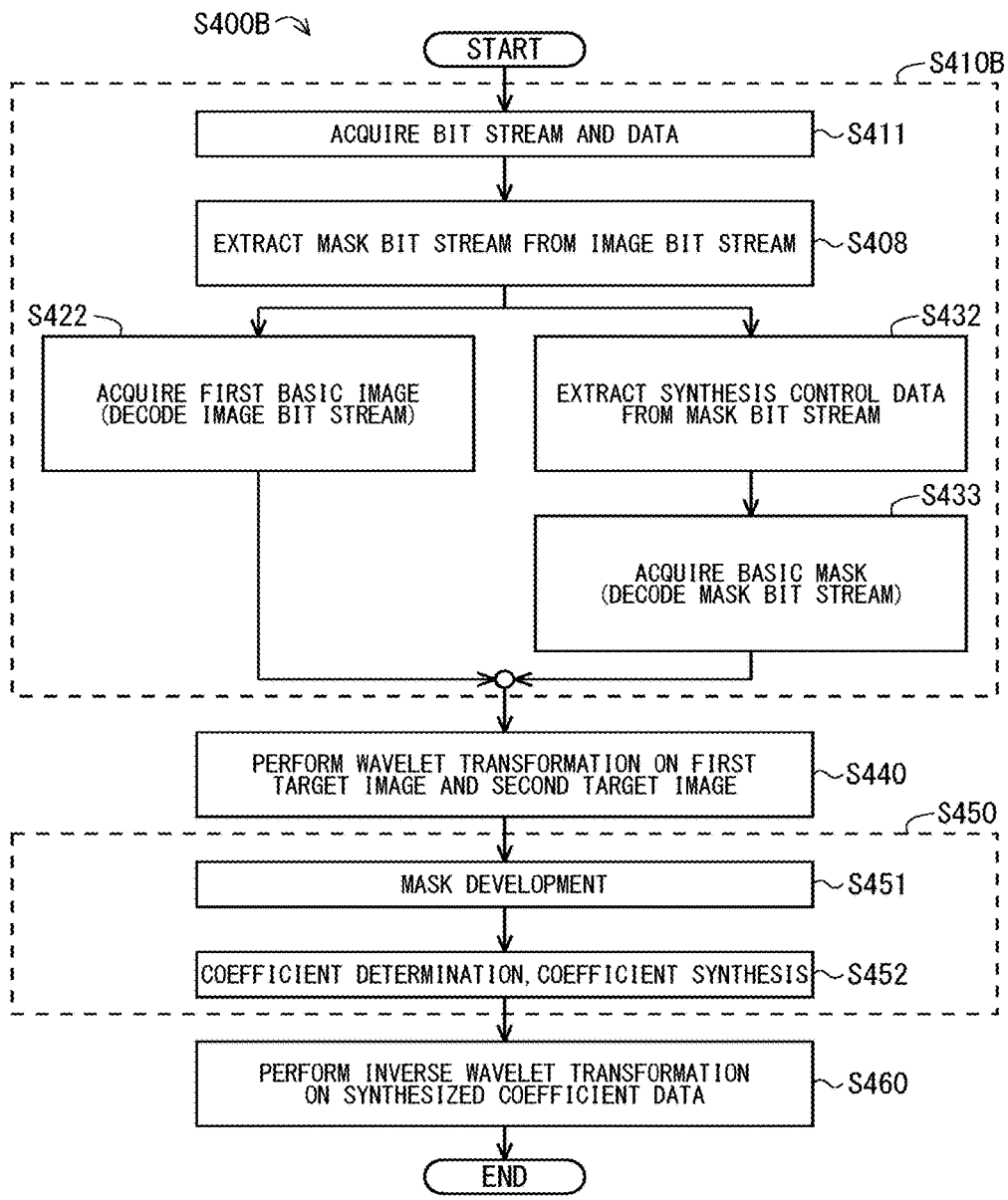
FIG. 44 is a flowchart showing an operation of an image synthesizing system in accordance with the second preferred embodiment.

FIG. 44 is a flowchart showing an operation of the synthesizing system 21B. An operation flow S400B of FIG. 44 is basically the same as the operation flow S400 (see FIG. 25) in accordance with the first preferred embodiment but has the following different points. Instead of the data acquisition step S410, data acquisition step S410B in which Step S408 is added is provided. In Step S408, the image decoder 300B extracts the mask bit stream Bbs from the image bit stream Abs.

In the second preferred embodiment, it is possible to produce the same effects as those of the first preferred embodiment. Particularly, in the second preferred embodiment, the mask bit stream Bbs is embedded in the region of the image bit stream Abs, which has no effect on the first basic image data A50. For this reason, it is possible to produce the same effects as those of the first preferred embodiment while ensuring the backward compatibility for the already-existing coded stream.

The Third Preferred Embodiment

Figure 45:
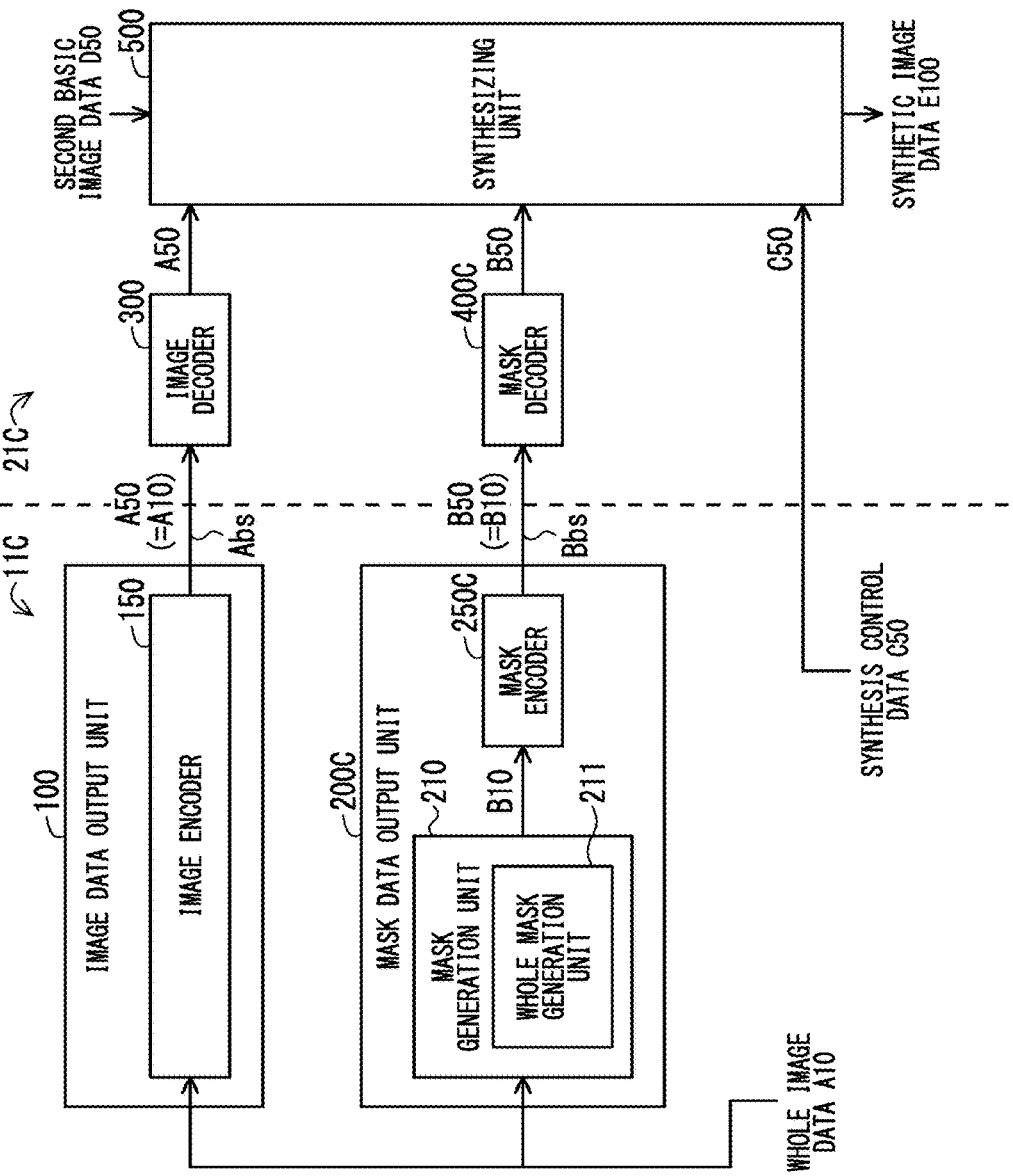
FIG. 45 is a block diagram showing an image processing system in accordance with a third preferred embodiment.

FIG. 45 shows an exemplary constitution of a supply system 11C and a synthesizing system 21C in accordance with the third preferred embodiment. Instead of the supply system 11 and the synthesizing system 21 in accordance with the first preferred embodiment, the supply system 11C and the synthesizing system 21C can be applied to the image processing system 1, 10, 20, or the like.

The supply system 11C and the synthesizing system 21C basically have the same constitution as those of the supply system 11 and the synthesizing system 21 of the first preferred embodiment (see FIG. 3), but have the following different points. In the supply system 11C, instead of the mask data output unit 200, a mask data output unit 200C is provided and the mask data output unit 200C has a mask encoder 250C instead of the mask encoder 250. In the synthesizing system 21C, instead of the mask decoder 400, a mask decoder 400C is provided.

In the supply system 11C, the synthesis control data C50 inputted by a user are outputted, not being embedded in the mask bit stream Bbs. For this reason, the mask encoder 250C does not embed the synthesis control data C50 and the mask decoder 400C does not extract the synthesis control data C50.

FIG. 46 is a flowchart showing an operation of the supply system 11C. In an operation flow S100C of FIG. 46, Step S124 is omitted from the operation flow S100 (see FIG. 9) of the first preferred embodiment. Further, in Step S105, the image bit stream Abs, the mask bit stream Bbs, and the synthesis control data C50 are outputted.

Figure 47:
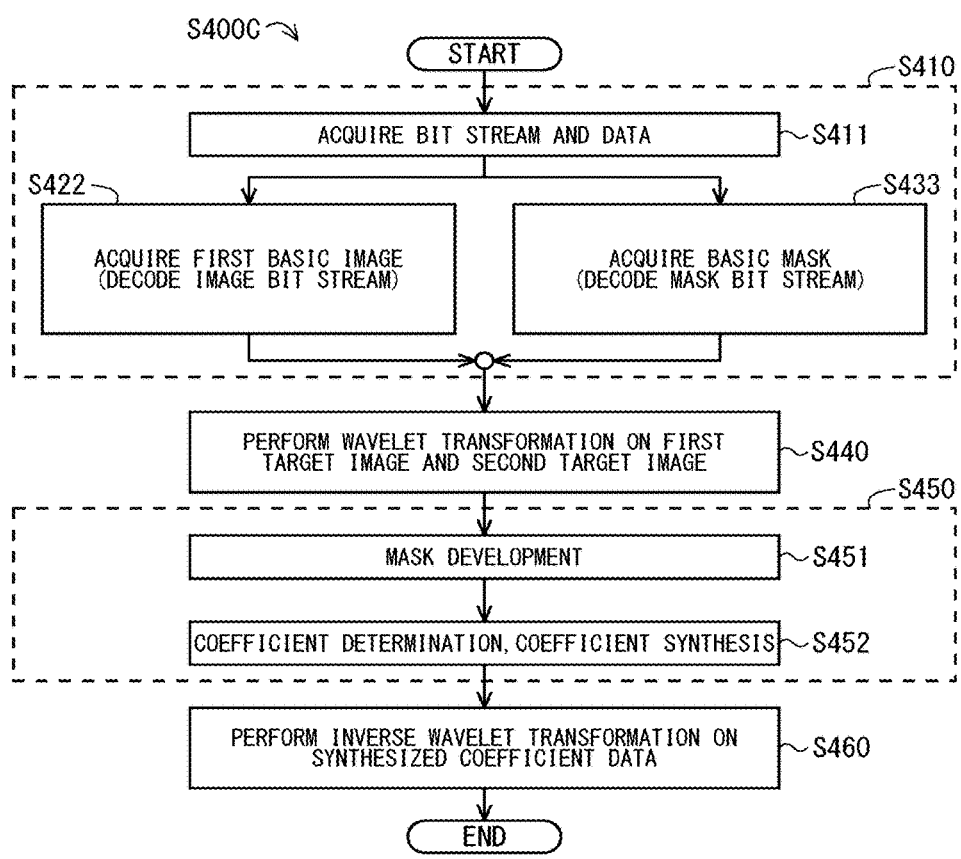
FIG. 47 is a flowchart showing an operation of an image synthesizing system in accordance with the third preferred embodiment.

FIG. 47 is a flowchart showing an operation of the synthesizing system 21C. In an operation flow S400C of FIG. 47, Step S432 is omitted from the operation flow S400 (see FIG. 25) of the first preferred embodiment. Further, in Step S411, the image bit stream Abs, the mask bit stream Bbs, and the synthesis control data C50 are acquired.

It is assumed herein that the first basic image data A50, the basic mask data B50, and the synthesis control data C50 are supplied to the synthesizing system 21C through the same medium 50 (for example, the communication medium or the external memory medium). Different media 50, however, may be used. For example, the communication medium may be used to supply the first basic image data A50 and basic mask data B50 and the external memory medium may be used to supply the synthesis control data C50.

In the third preferred embodiment, it is possible to produce the same effects as those of the first preferred embodiment and the like.

The Fourth Preferred Embodiment

Figure 48:
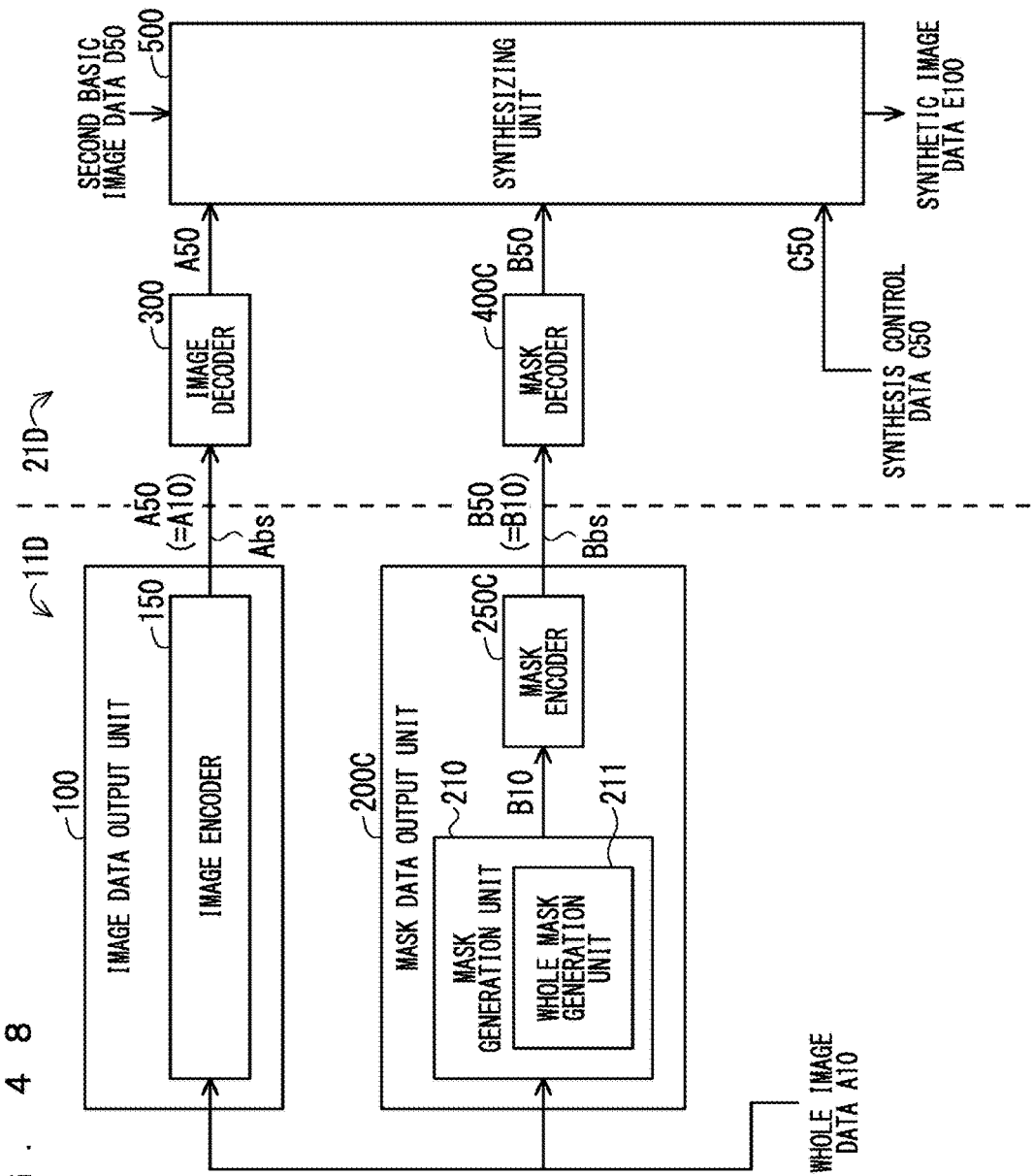
FIG. 48 is a block diagram showing an image processing system in accordance with a fourth preferred embodiment.

FIG. 48 shows an exemplary constitution of a supply system 11D and a synthesizing system 21D in accordance with the fourth preferred embodiment. Instead of the supply system 11 and the synthesizing system 21 in accordance with the first preferred embodiment, the supply system 11D and the synthesizing system 21D can be applied to the image processing system 1, 10, 20, or the like.

The supply system 11D and the synthesizing system 21D basically have the same constitution as those of the supply system 11C and the synthesizing system 21C of the third preferred embodiment (see FIG. 45), but have the following different points. In the fourth preferred embodiment, the synthesis control data C50 are supplied to the synthesizing system 21D by user input to the operation unit 42 (see FIG. 2) provided on the side of the synthesizing system 21D. On the other hand, the first basic image data A50 and the basic mask data B50 are supplied to the synthesizing system 21D through the medium 50 (for example, the communication medium or the external memory medium), like in the third preferred embodiment. In other words, the synthesizing system 21D acquires the synthesis control data C50 through a medium different from the medium through which the first basic image data A50 and the basic mask data B50 are supplied.

In the fourth preferred embodiment, it is possible to produce the same effects as those of the first preferred embodiment and the like. Particularly, in the fourth preferred embodiment, since the synthesis control data C50 can be inputted on the side of the synthesizing system 21D, the state of synthesis can be adjusted on the side of the synthesizing system 21D.

The Fifth Preferred Embodiment

FIG. 49 shows an exemplary constitution of a supply system 11E and a synthesizing system 21E in accordance with the fifth preferred embodiment. Instead of the supply system 11 and the synthesizing system 21 in accordance with the first preferred embodiment, the supply system 11E and the synthesizing system 21E can be applied to the image processing system 1, 10, 20, or the like.

As can be seen from the comparison of FIG. 49 with FIG. 3, the supply system 11E is the same as the supply system 11 of the first preferred embodiment. On the other hand, in the synthesizing system 21E, a selector 600 is added. Other constituent elements of the synthesizing system 21E are identical to those of the synthesizing system 21 of the first preferred embodiment.

The selector 600 selectively supplies one of a plurality of pieces of synthesis control data to the synthesizing unit 500. In the exemplary constitution of FIG. 49, two pieces of synthesis control data C41 and C42 are inputted to the selector 600, and either of the two pieces of synthesis control data are outputted as the synthesis control data C50 and supplied to the synthesizing unit 500.

The first synthesis control data C41 are supplied to the selector 600 when a user of the synthesizing system 21E inputs the data to the operation unit 42 (see FIG. 2) provided on the side of the synthesizing system 21E.

The second synthesis control data C42 are supplied to the selector 600 from the supply system 11E through the medium 50. More specifically, the second synthesis control data C42 are embedded into the mask bit stream Bbs in the supply system 11E, and the mask bit stream Bbs is supplied to the mask decoder 400 through the medium 50. Then, the second synthesis control data C42 are extracted by the mask decoder 400 and inputted to the selector 600. In other words, the second synthesis control data C42 are supplied to the synthesizing unit 500 through a medium different from the medium through which the first synthesis control data C41 are supplied.

The selector 600 is set to preferentially select and output the first synthesis control data C41. Like in the fourth preferred embodiment, it is thereby possible to adjust the state of synthesis on the side of the synthesizing system 21E. On the other hand, when the first synthesis control data C41 are not inputted, since the second synthesis control data C42 are outputted, it is possible to save any labor on the side of the synthesizing system 21E.

The priority in selection of a plurality of synthesis control data may be fixed or may be changeable. It can be assumed that the change of the priority in selection is performed, for example, by either one or both of the operation unit 42 provided on the side of the synthesizing system 21E and the operation unit 32 provided on the side of the supply system 11.

In the fifth preferred embodiment, it is possible to also produce the same effects as those of the first preferred embodiment and the like. Further, the fifth preferred embodiment can be combined with the second preferred embodiment and the like.

The Sixth Preferred Embodiment

Figure 50:
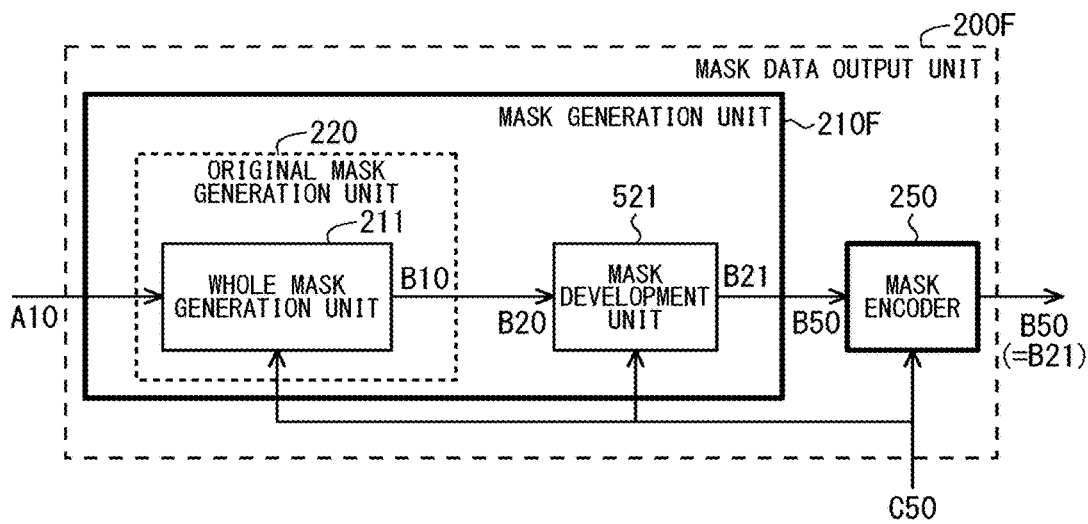
FIG. 50 is a block diagram showing a mask data output unit in accordance with a sixth preferred embodiment.
Figure 51:
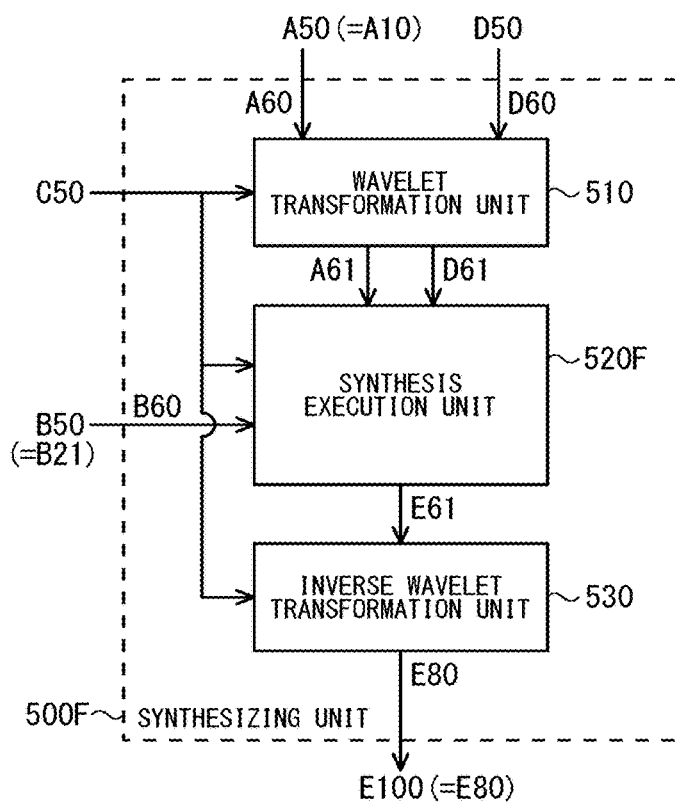
FIG. 51 is a block diagram showing a synthesizing unit in accordance with the sixth preferred embodiment.

FIG. 50 shows an exemplary constitution of a mask data output unit 200F and FIG. 51 shows an exemplary constitution of a synthesizing unit 500F in accordance with the sixth preferred embodiment. FIG. 52 is a conceptual diagram showing the image synthesis in a supply system 11F and a synthesizing system 21F in accordance with the sixth preferred embodiment. Herein, it is assumed that the mask data output unit 200F is combined with the already-described image data output unit 100, to constitute the supply system 11F. Further, it is assumed that the synthesizing unit 500F is combined with the image decoder 300 and the mask decoder 400 which are already described, to constitute the synthesizing system 21F. Instead of the supply system 11 and the synthesizing system 21 in accordance with the first preferred embodiment, the supply system 11F and the synthesizing system 21F can be applied to the image processing system 1, 10, 20, or the like.

As can be seen from the comparison of FIG. 51 with FIG. 13, first, a synthesis execution unit 520F of the synthesizing unit 500F does not have the mask development unit 521. On the other hand, as shown in FIG. 50, the mask development unit 521 is provided in a mask generation unit 210F of the mask data output unit 200F. In other words, in the sixth preferred embodiment, the mask development unit 521 is provided in the supply system 11F.

Further, an original mask generation unit 220 is provided in the mask generation unit 210F. The original mask generation unit 220 generates an original mask for a range of the basic image. In the sixth preferred embodiment, the original mask generation unit 220 includes the already-described whole mask generation unit 211, and the whole mask data B10 generated by the whole mask generation unit 211 are outputted as original mask data B20. The mask development unit 521 performs the already-described mask development process on the original mask data B20, to thereby generate developed mask data B21. The mask development unit 521 acquires the synthesis control data C50 for the mask development process.

In the sixth preferred embodiment, the original mask and the developed mask are generated for the whole range of the whole image, and the developed mask data B21 are outputted from the mask generation unit 210F as the basic mask data B50. The mask encoder 250 codes the developed mask data B21 as the basic mask data B50, to thereby generate the mask bit stream Bbs.

Other constituent elements of the mask data output unit 200F and the synthesizing unit 500F are identical to those of the mask data output unit 200 and the synthesizing unit 500 of the first preferred embodiment, respectively.

FIG. 53 is a flowchart showing an operation of the supply system 11F. In an operation flow S100F of FIG. 53, instead of the basic mask generation step S122 (see FIG. 9), basic mask generation step S122F is provided. Other steps in the operation flow S100F are the same as those of the operation flow S100 of FIG. 9.

According to the basic mask generation step S122F, in Step S131, the original mask generation unit 220 generates the original mask data B20 (original mask generation process), and in Step S132, the mask development unit 521 generates the developed mask data B21 from the original mask data B20 (mask development process). Further, the mask development S132 is the same as the mask development 5451 (see FIG. 25) performed on the side of the synthesizing system 21 in the first preferred embodiment. After that, the developed mask data B21 are processed as the basic mask data B50. In other words, in the next step S123, the developed mask data B21 are coded and the mask bit stream Bbs is thereby generated.

Figure 54:
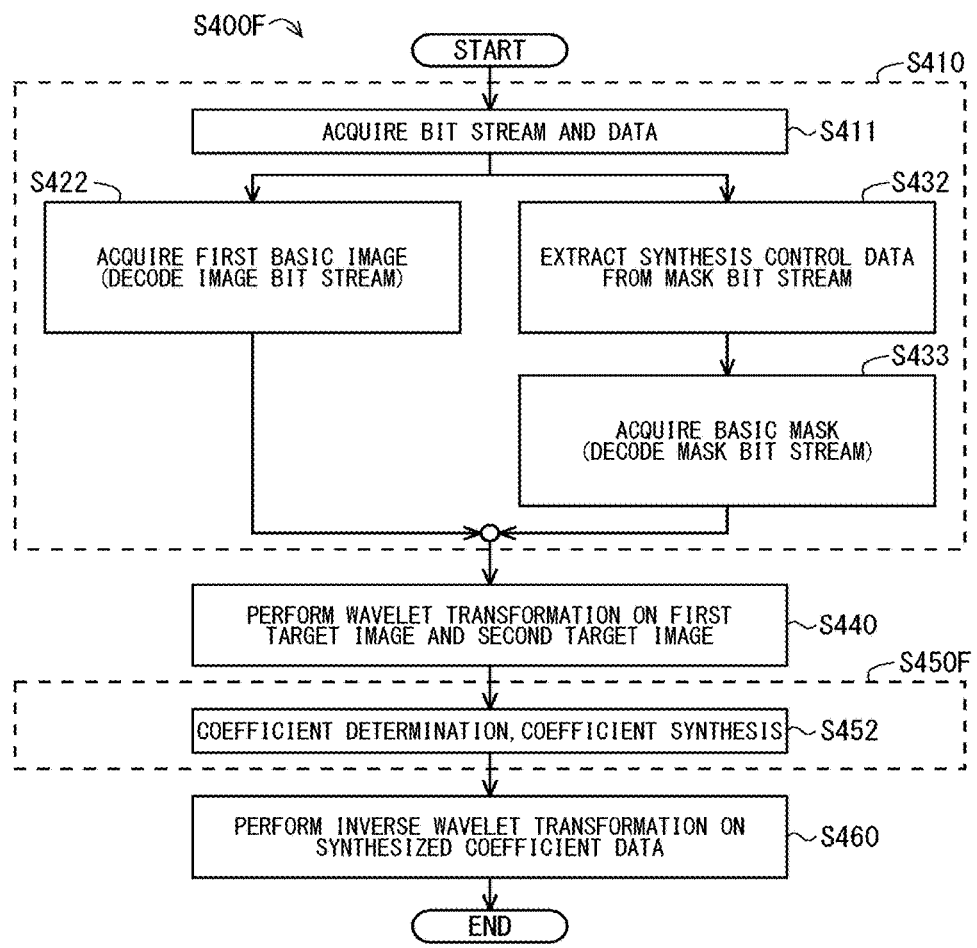
FIG. 54 is a flowchart showing an operation of an image synthesizing system in accordance with the sixth preferred embodiment.

FIG. 54 is a flowchart showing an operation of the synthesizing system 21F. In an operation flow S400F of FIG. 54, instead of the synthesis execution step S450 (see FIG. 25), synthesis execution step S450F is provided. In the synthesis execution step S450F, the mask development step S451 is omitted from the synthesis execution step S450. Other steps in the operation flow S400F are the same as those of the operation flow S400 of FIG. 25.

In the sixth preferred embodiment, as shown in FIG. 52, the developed mask is generated in the supply system 11F and the developed mask is supplied to the synthesizing system 2IF as the basic mask. Further, the sixth preferred embodiment can be combined with the second preferred embodiment and the like.

In the sixth preferred embodiment, it is possible to produce the same effects as those of the first preferred embodiment and the like. Further, in the synthesizing system 21F, it is possible to reduce the computational load for the mask development process.

The Seventh Preferred Embodiment

In the first preferred embodiment, the case has been described where the whole mask for the whole range of the whole image is supplied to the synthesizing system 21. The same applies to the second to sixth preferred embodiments. Herein, in consideration of the fact that the mask has only to specify the ROI, there is a possible case where only a portion of the whole mask, which includes the ROI corresponding portion, is supplied to the synthesizing system 21. Such a case will be described in the seventh preferred embodiment.

<Overview of Synthesis>

Figure 55:
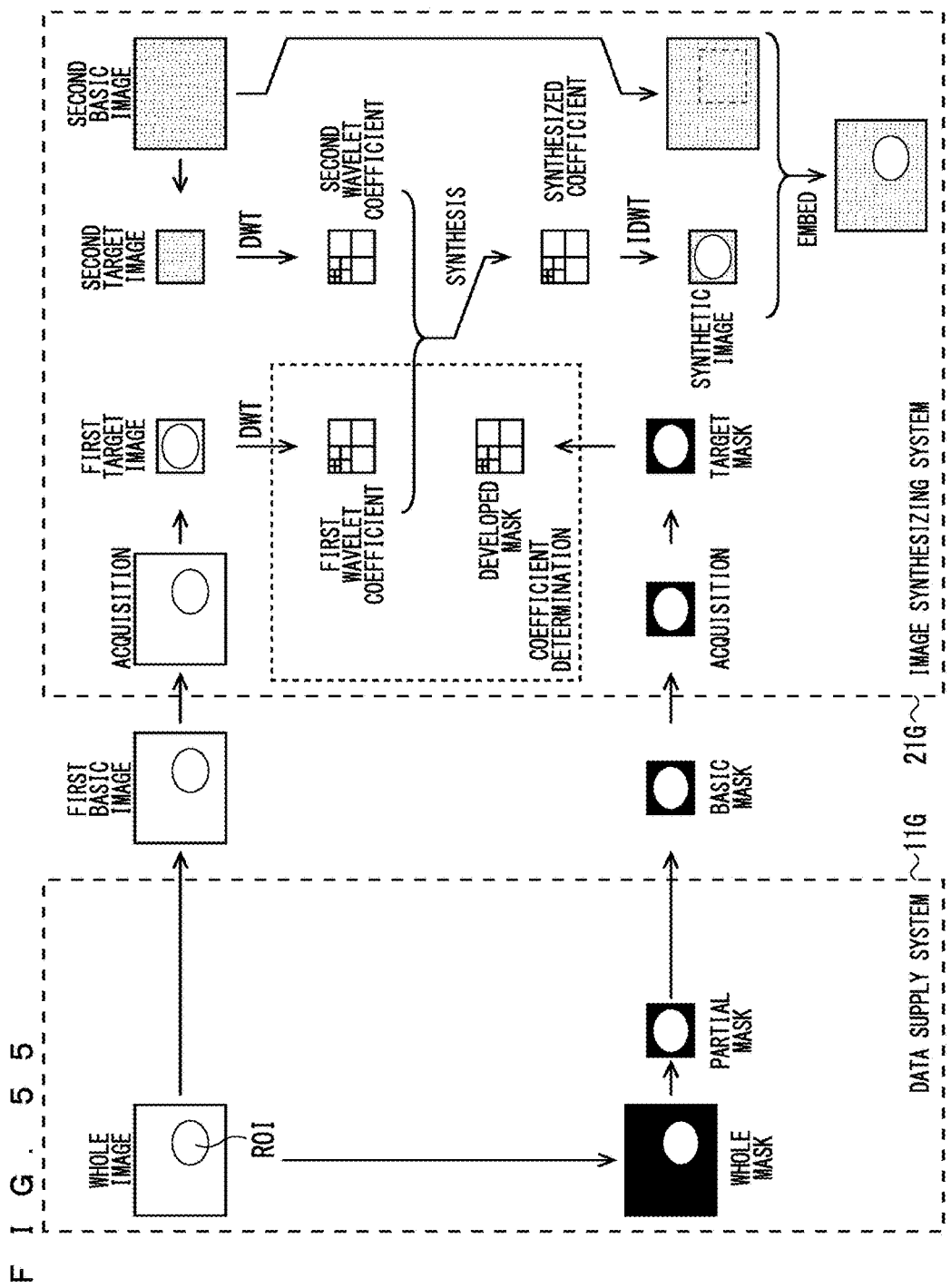
FIG. 55 is a conceptual diagram showing image synthesis in accordance with a seventh preferred embodiment.

With reference to the conceptual diagram of FIG. 55, the outline of the seventh preferred embodiment will be described. According to FIG. 55, in the supply system 11G, a portion including the ROI corresponding portion in the whole mask is cut out as a partial mask. The partial mask is outputted from the supply system 11G as the basic mask. In the synthesizing system 21G, the acquired basic mask is handled as the target mask, and the developed mask is generated on the basis of the target mask. In other words, the supply system 11G cuts out the target mask which is a mask for the range of the first target image which is to be a target for the wavelet transformation, from the whole mask. Then, the supply system 11G outputs the target mask data as the basic mask data.

Further, the synthesizing system 21G acquires the whole range of the whole image as the first basic image. Then, a range corresponding to the target mask in the first basic image is cut out as the first target image, and the wavelet transformation is performed on the first target image as a target.

Similarly, the second target image is cut out from the second basic image, and the wavelet transformation is performed on the second target image as a target. Though the second target image is cut out to have the same shape and size as those of the first target image, a position of the second target image in the second basic image can be set arbitrarily. In other words, it is not always necessary that the position of the second target image in the second basic image should be the same as that of the first target image in the whole image.

The first wavelet coefficient data generated from the first target image and the second wavelet coefficient data generated from the second target image are synthesized with each other, like in the first preferred embodiment, and the inverse wavelet transformation is performed on the synthesized coefficient data. The ROI in the first target image and the second target image are thereby synthesized with each other. Then, the synthetic image is embedded into the position of the second target image in the second basic image. As a result, the synthetic image having the same size as that of the second basic image can be obtained, like in the first preferred embodiment.

By cutting out a portion of the whole mask as the basic mask, it is possible to reduce the size of the basic mask data and therefore possible to reduce the size of the mask bit stream. Therefore, when the mask bit stream is transferred via wired or wireless communication, the reduction in size of the basic mask data leads to the reduction in the amount of communication and this contributes to the immediacy of transfer. Further, since the respective data sizes of the first target image and the second target image are reduced as the size of the basic mask data is reduced, it is possible to reduce the computational load in the synthesizing system 21G. This contributes to speed-up of the image synthesis. In consideration of these points, it is possible to increase the immediacy of the image synthesis.

<Cut-Out Range Determination Process>

Before describing an exemplary constitution of the supply system 11G and the synthesizing system 21G in accordance with the seventh preferred embodiment, description will be made on a range to be cut out as the basic mask from the whole mask.

As described above, by cutting out a portion of the whole image as the basic mask, it is possible to reduce the data size of the basic mask to be outputted from the supply system 11G. For this reason, basically, an arbitrary range including the ROI corresponding portion in the whole mask can be set as the basic mask. Then, in order to largely reduce the data size, it is preferable that the basic mask should be as small as possible.

On the other hand, it should be noted that the range to be cut out from the whole mask, as the basic mask, is also a range to be cut out from the first basic image (equivalent to the whole image in the seventh preferred embodiment), as the first target image. Specifically, since the first target image and the second target image are synthesized with each other after the wavelet transformation, it is necessary to determine a cut-out range so that the range of the ROI may not be distorted even in the wavelet coefficient data (in other words, even on the wavelet plane).

Figure 56:
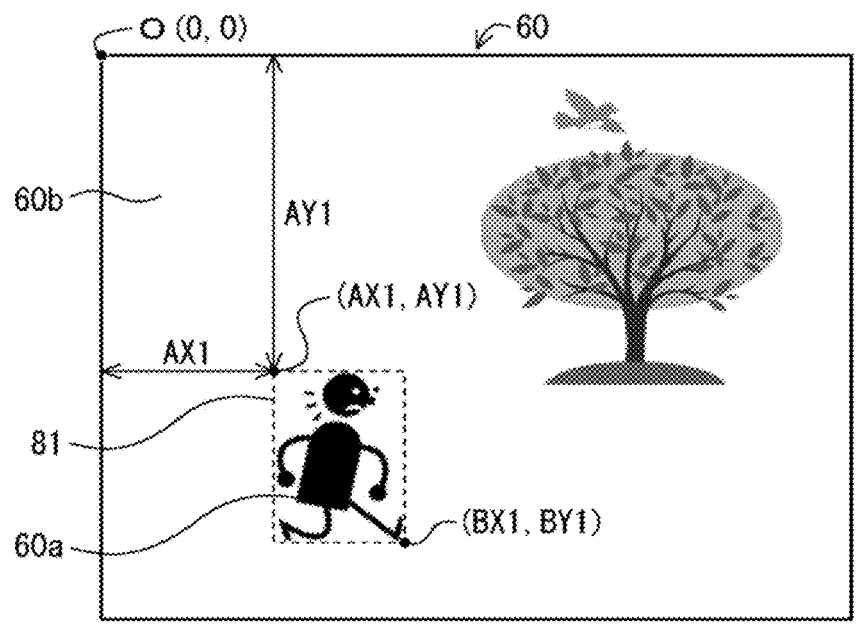
FIGS. 56 to 59 are views each showing a cut-out range in accordance with the seventh preferred embodiment.

FIGS. 56 to 59 are views each showing a cut-out range. Using the whole image 60 shown in FIG. 6, FIG. 56 shows a rectangular minimum range 81 including a ROI 60a. Since the minimum range 81 is set in a rectangular form, the position and range of the minimum range 81 can be specified by using upper-left end coordinates (AX1, AY1) and lower-right end coordinates (BX1, BY1). In FIG. 56 and the like, the upper-left end of the whole image 60 is adopted as an origin point O (0, 0) in the coordinate system, and two orthogonal axes are adopted in horizontal and vertical directions of the whole image 60.

Figure 57:
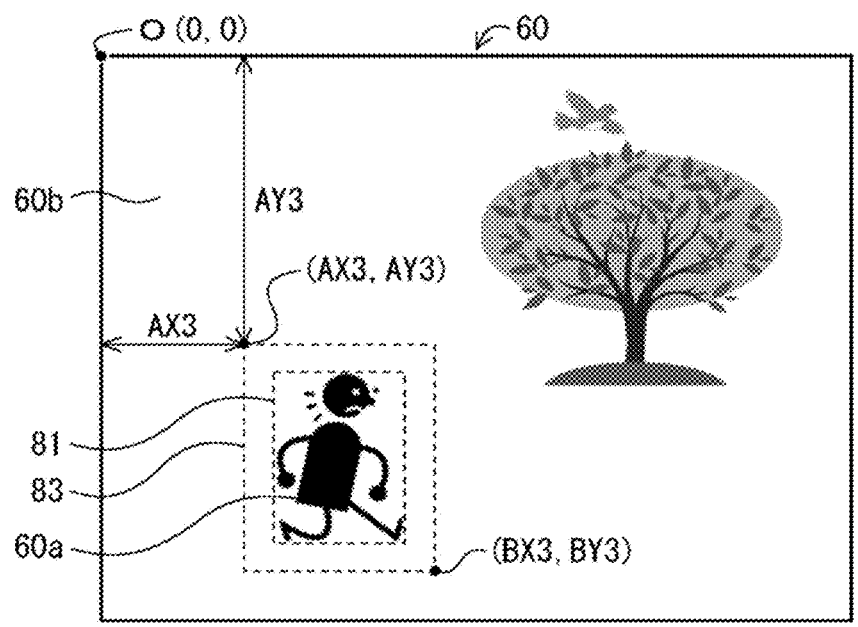

FIG. 57 shows a range 83 to be cut out as the first target image. The cut-out range 83 includes the minimum range 81 and is larger than the minimum range 81. The cut-out range 83 has upper-left end coordinates (AX3, AY3) and lower-right end coordinates (BX3, BY3).

Figure 58:
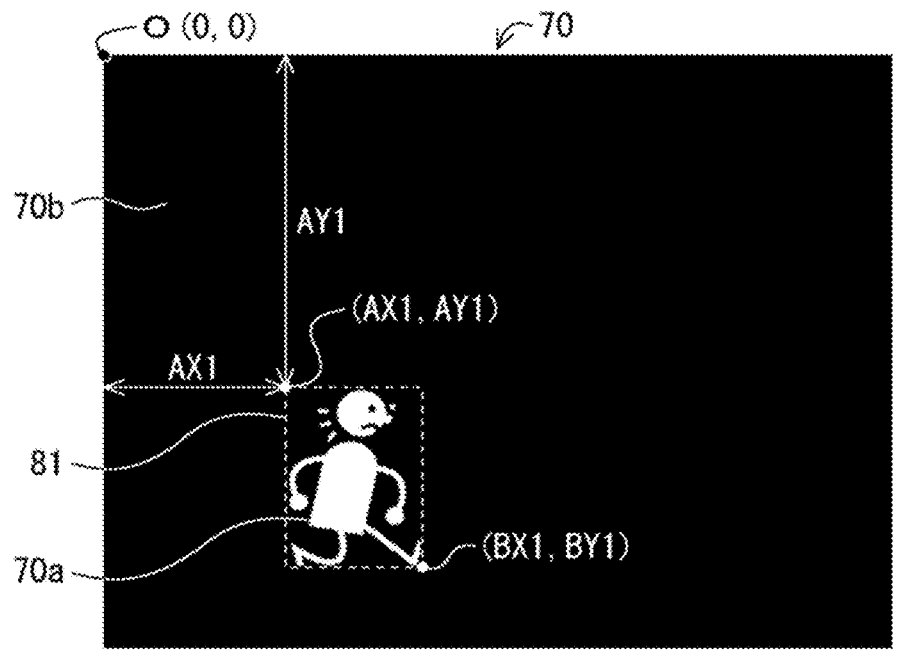
Figure 59:
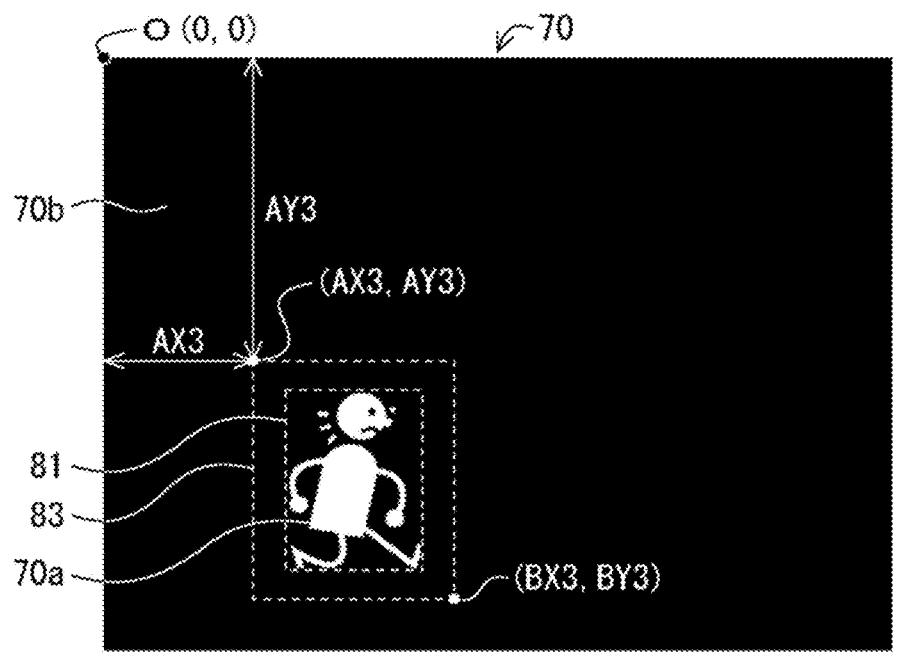

FIGS. 58 and 59 are views showing the minimum range 81 and the cut-out range 83 in the whole mask 70, respectively.

FIG. 60 is a flowchart showing a process of determining the cut-out range 83 (cut-out range determination process). In an operation flow S500 of FIG. 60, a minimum range specifying process is performed in Step S501, a tracking process is performed in Step S502, and a required range specifying process is performed in Step S503.

<Minimum Range Specifying Process>

In Step S501 for the minimum range specifying process, in the whole image 60 which is the original image before cut-out, the rectangular minimum range 81 including the ROI 60a is specified. The specification of the minimum range 81 is performed on the basis of the original mask for the whole image 60, i.e., the whole mask 70.

For example, each row of the whole mask 70 is sequentially selected from the top and it is determined whether or not the selected row has a pixel belonging to the ROI corresponding portion 70a. The position of the row which is first determined to have a pixel belonging to the ROI corresponding portion 70a corresponds to "AY1". Similarly, by sequentially selecting each row of the whole mask 70 from the bottom, "BY1" can be obtained. Further, by sequentially selecting each column of the whole mask 70 from the left, "AX1" can be obtained, and by sequentially selecting each column of the whole mask 70 from the right, "BX1" can be obtained.

<Tracking Process>

In order not to distort the range of the ROI on the wavelet plane, it is necessary to make it possible to perform the wavelet transformation on the entire minimum range 81. In the wavelet transformation, not only the data of the pixel of interest but also the data of the pixels on both sides thereof are used. For this reason, when the wavelet transformation is performed on the pixels near the outer edge of the minimum range 81, data of pixels outside the minimum range 81 are needed. Therefore, the cut-out range 83 is larger than the minimum range 81.

The method of obtaining the range of required pixels outside the minimum range 81 is shown, for example, in Japanese Patent Application Laid Open Gazette No. 2003-324613. The range of required pixels outside the minimum range 81 depends on the number of taps of a divided filter used for the wavelet transformation.

In a case of using a 5×3 filter in which a low-pass filter on the decomposition side has five taps and a high-pass filter on the decomposition side has three taps, for example, as shown in FIG. 61, in order to obtain the n-th output of the low-pass filter, data of five pixels from the {2n−2}th pixel to the {2n+2}th pixel are needed on the input side. Further, as shown in FIG. 62, in order to obtain the n-th output of the high-pass filter, data of three pixels from the 2n-th pixel to the {2n+2}th pixel are needed on the input side.

Further, in a case of using a Daubechies 9×7 filter in which a low-pass filter on the decomposition side has nine taps and a high-pass filter on the decomposition side has seven taps, as shown in FIG. 63, in order to obtain the n-th output of the low-pass filter, data of nine pixels from the {2n−4}th pixel to the {2n+4}th pixel are needed on the input side. Furthermore, as shown in FIG. 64, in order to obtain the n-th output of the high-pass filter, data of seven pixels from the {2n−2}th pixel to the {2n+4}th pixel are needed on the input side.

Further, the range of required pixels outside the minimum range 81 depends on the decomposition level of the wavelet transformation, i.e., the specified value of the decomposition level which is specified by the synthesis control data. This is because a processing using the divided filter is repeated the number of times specified by the decomposition level, for the highest-order band component (i.e., the band component which is decomposed most) on the wavelet plane.

In consideration of these points, in Step S502 for the tracking process, in the highest-order band component on the final wavelet plane (in other words, the wavelet plane of the specified decomposition level which is specified by the synthesis control data C50), a range corresponding to the minimum range 81 is specified as a tracked minimum range.

Figure 65:
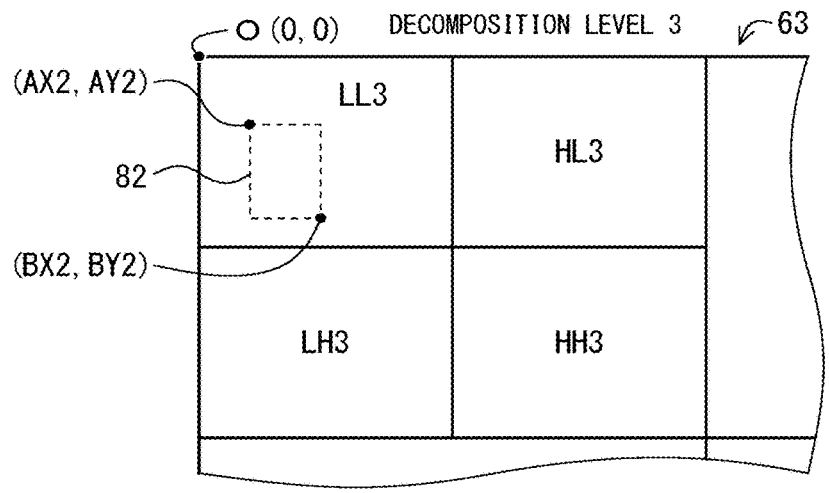
FIG. 65 is a view showing a tracked minimum range in accordance with the seventh preferred embodiment.

FIG. 65 is a view showing the tracked minimum range. FIG. 65 enlargedly shows the highest-order band components LL3, HL3, LH3, and HH3 in the wavelet plane 63 of decomposition level 3. Further, FIG. 65 shows a case of specifying the tracked minimum range 82 corresponding to the minimum range 81 in the lowest-frequency band component LL3 among the highest-order band components LL3, HL3, LH3, and HH3. Furthermore, an origin point O (0, 0) in the wavelet plane corresponds to an origin point O of the original image (i.e., the whole image 60). In the tracked minimum range 82 on the wavelet plane 63, it is assumed that the upper-left end coordinates are (AX2, AY2) and the lower-right end coordinates are (BX2, BY2).

Figure 66:
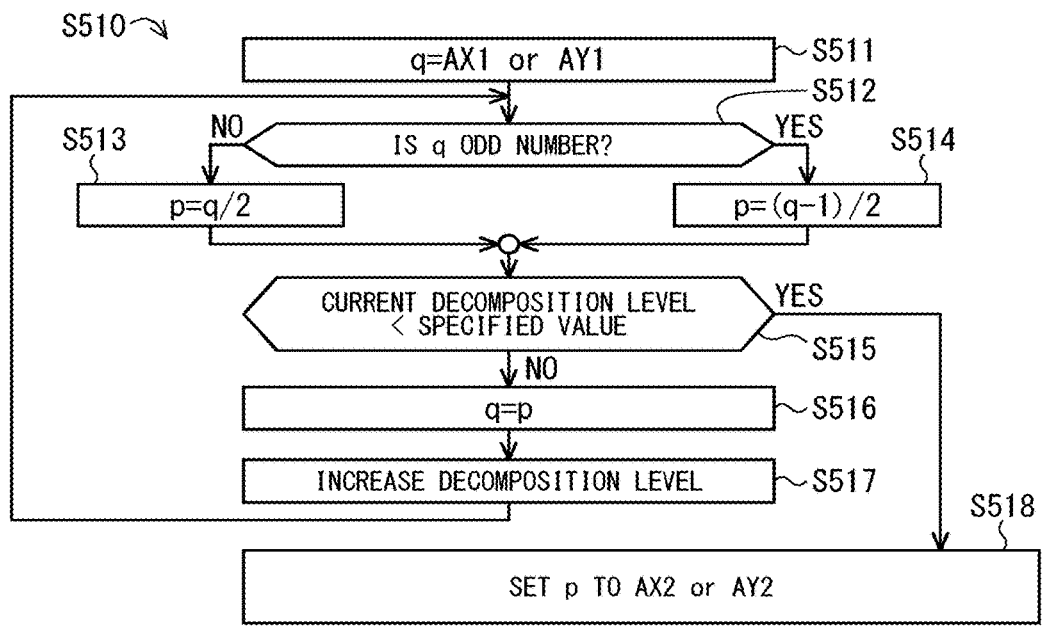
FIG. 66 is a flowchart showing how to obtain upper-left end coordinates of the tracked minimum range in accordance with the seventh preferred embodiment ( 5×3 filter)
Figure 67:
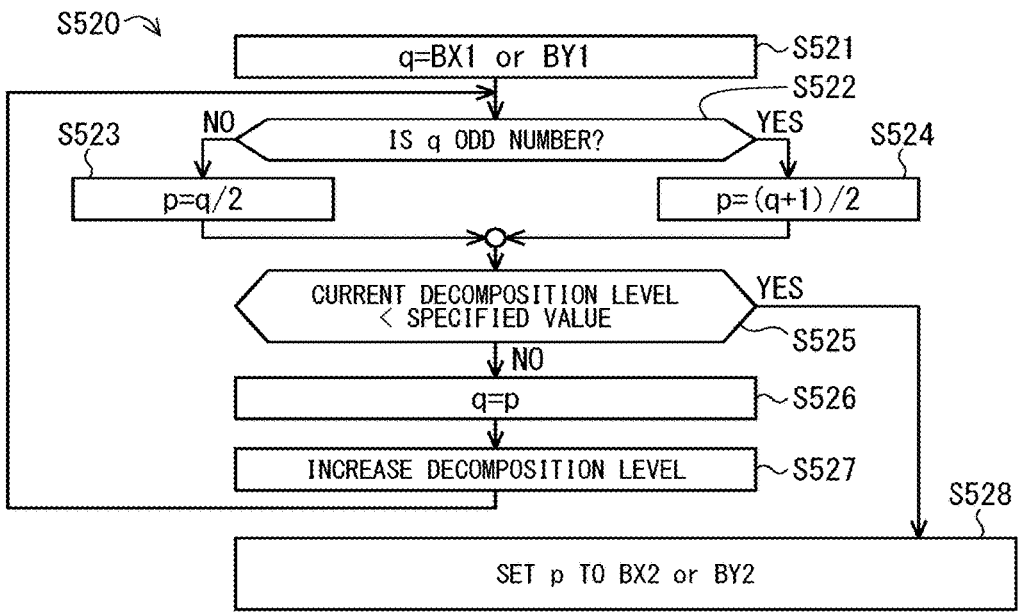
FIG. 67 is a flowchart showing how to obtain lower-right end coordinates of the tracked minimum range in accordance with the seventh preferred embodiment ( 5×3 filter)

FIGS. 66 and 67 are flowcharts for obtaining the tracked minimum range 82 in the case of using the 5×3 filter for the wavelet transformation. Further, FIG. 66 shows how to obtain the upper-left end coordinates (AX2, AY2) and FIG. 67 shows how to obtain the lower-right end coordinates (BX2, BY2).

In an operation flow S510 of FIG. 66, either coordinate value of the upper-left end coordinates (AX1, AY1) of the minimum range 81 is set to a parameter q in Step S511. Herein, it is assumed that it is first set that q=AX1.

When it is determined in Step S512 that q is an even number, it is set that a parameter p=q/2 in Step S513. On the other hand, when it is determined in Step S512 that q is an odd number, it is set that p=(q−1)/2 in Step S514.

Then, when it is determined in Step S515 that the current decomposition level does not reach the decomposition level specified by the synthesis control data C50, the current value of p is set to a new value of q (q=p) in Step S516. After that, the decomposition level is increased in Step S517 and the process goes back to Step S512.

On the other hand, when it is determined in Step S515 that the current decomposition level reaches the specified decomposition level, the value of p at that point in time is set to AX2 of the tracked minimum range 82 in Step S518.

By setting q=AY1 in Step S511, AY2 of the tracked minimum range 82 can be obtained in Step S518.

In an operation flow S520 of FIG. 67, BX2 of the tracked minimum range 82 can be obtained from BX1 of the minimum range 81, and BY2 of the tracked minimum range 82 can be obtained from BY1 of the minimum range 81. The operation flow S520 is basically the same as the operation flow S510 of FIG. 66 except computation in Step S524. Specifically, when it is determined in Step S522 that q is an odd number, it is set that p=(q+1)/2 in Step S524.

In consideration of the operation flows S510 and S520, the tracking process in the case of using the 5×3 filter for the wavelet transformation can be also expressed as follows.

A process (referred to as a first recursive process) in which when AX1 is an even number, AX1/2 is set to new AX1 and when AX1 is an odd number, {AX1−1}/2 is set to the new AX1 is performed the specified number of times which is specified by the synthesis control data C50, and the AX1 that is finally obtained is set to AX2.

A process (referred to as a second recursive process) in which when AY1 is an even number, AY1/2 is set to new AY1 and when AY1 is an odd number,{AY1−1}/2 is set to the new AY1 is performed the above-described specified number of times, and the AY1 that is finally obtained is set to AY2.

A process (referred to as a third recursive process) in which when BX1 is an even number, BX 1/2 is set to new BX1 and when BX1 is an odd number, {BX1+1}/2 is set to the new BX1 is performed the above-described specified number of times, and the BX1 that is finally obtained is set to BX2.

A process (referred to as a fourth recursive process) in which when BY1 is an even number, BY 1/2 is set to new BY1 and when BY1 is an odd number, {BY1+1}/2 is set to the new BY1 is performed the above-described specified number of times, and the BY1 that is finally obtained is set to BY2.

Figure 68:
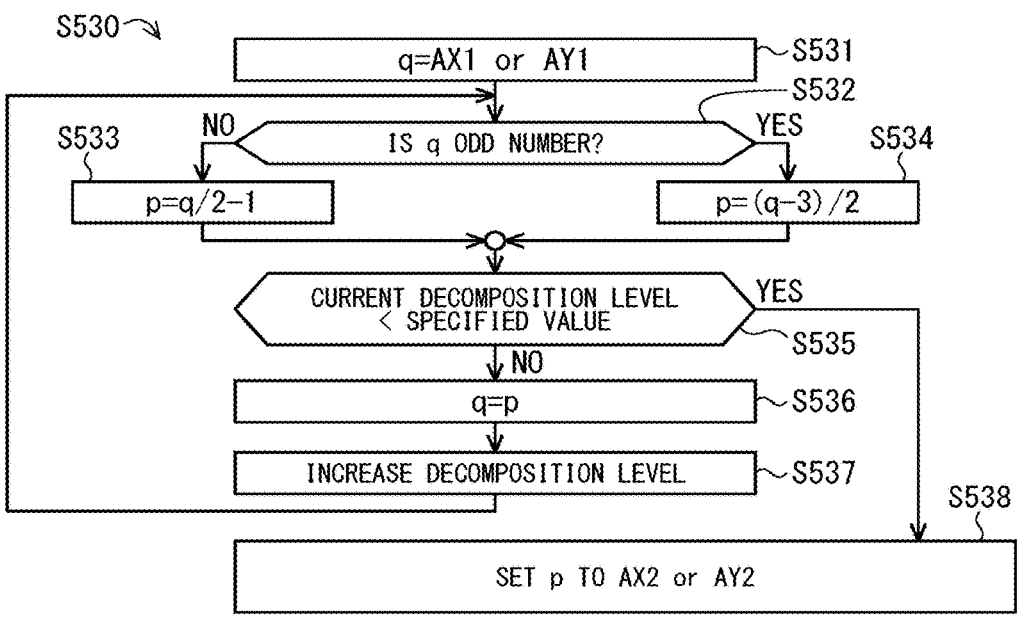
FIG. 68 is a flowchart showing how to obtain upper-left end coordinates of the tracked minimum range in accordance with the seventh preferred embodiment (Daubechies 9×7 filter)
Figure 69:
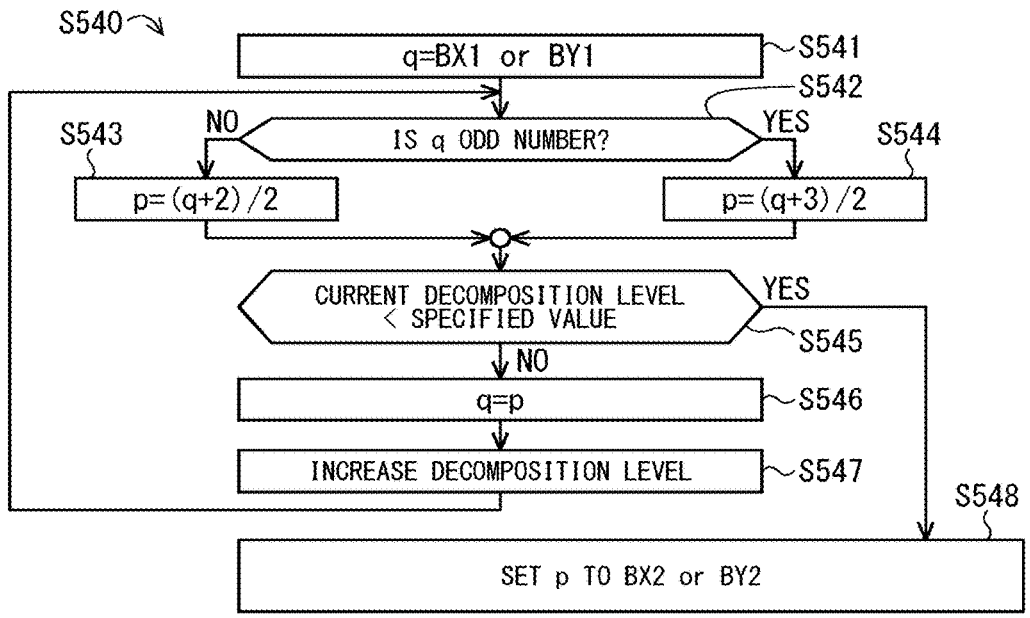
FIG. 69 is a flowchart showing how to obtain lower-right end coordinates of the tracked minimum range in accordance with the seventh preferred embodiment (Daubechies 9×7 filter)

FIGS. 68 and 69 are flowcharts for obtaining the tracked minimum range 82 in the case of using the Daubechies 9×7 filter for the wavelet transformation. Further, FIG. 68 shows how to obtain the upper-left end coordinates (AX2, AY2) and FIG. 69 shows how to obtain the lower-right end coordinates (BX2, BY2).

In an operation flow S530 of FIG. 68, AX2 of the tracked minimum range 82 can be obtained from AX1 of the minimum range 81, and AY2 of the tracked minimum range 82 can be obtained from AY1 of the minimum range 81. The operation flow S530 is basically the same as the operation flow S510 of FIG. 66 except computations in Steps S533 and S534. Specifically, when it is determined in Step S532 that q is an even number, it is set that p=q/2−1 in Step S533. On the other hand, when it is determined in Step S532 that q is an odd number, it is set that p=(q−3)/2 in Step S534.

In an operation flow S540 of FIG. 69, BX2 of the tracked minimum range 82 can be obtained from BX1 of the minimum range 81, and BY2 of the tracked minimum range 82 can be obtained from BY1 of the minimum range 81. The operation flow S540 is basically the same as the operation flow S510 of FIG. 66 except computations in Steps S543 and S544. Specifically, when it is determined in Step S542 that q is an even number, it is set that p=(q+2)/2 in Step S543. On the other hand, when it is determined in Step S542 that q is an odd number, it is set that p=(q+3)/2 in Step S544.

In consideration of the operation flows S530 and S540, the tracking process in the case of using the Daubechies 9×7 filter for the wavelet transformation can be also expressed as follows.

A process (referred to as a ninth recursive process) in which when AX1 is an even number, {AX1/2−1} is set to new AX1 and when AX1 is an odd number, {AX1−3}/2 is set to the new AX1 is performed the specified number of times which is specified by the synthesis control data C50, and the AX1 that is finally obtained is set to AX2.

A process (referred to as a tenth recursive process) in which when AY1 is an even number, {AY1/2−1} is set to new AY1 and when AY1 is an odd number, {AY1−3}/2 is set to the new AY1 is performed the above-described specified number of times, and the AY1 that is finally obtained is set to AY2.

A process (referred to as an eleventh recursive process) in which when BX1 is an even number, {BX1+2}/2 is set to new BX1 and when BX1 is an odd number, {BX1+3}/2 is set to the new BX1 is performed the above-described specified number of times, and the BX1 that is finally obtained is set to BX2.

A process (referred to as a twelfth recursive process) in which when BY1 is an even number, {BY1+2}/2 is set to new BY1 and when BY1 is an odd number, {BY1+3}/2 is set to the new BY1 is performed the above-described specified number of times, and the BY1 that is finally obtained is set to BY2.

Further, the computations in Steps S513, S514, S523, S524, S533, S534, S543, and S544 are determined in accordance with the number of taps of the filter. Furthermore, for easy computations, a carry is made to an even-numbered unit.

<Required Range Specifying Process>

With reference back to FIG. 60, in Step S503 for the required range specifying process, specified is a range in the whole image 60 before the cut-out, in which data required to calculate the wavelet coefficient in the tracked minimum range 82 are present. The specified required range is the cut-out range 83.

Figure 70:
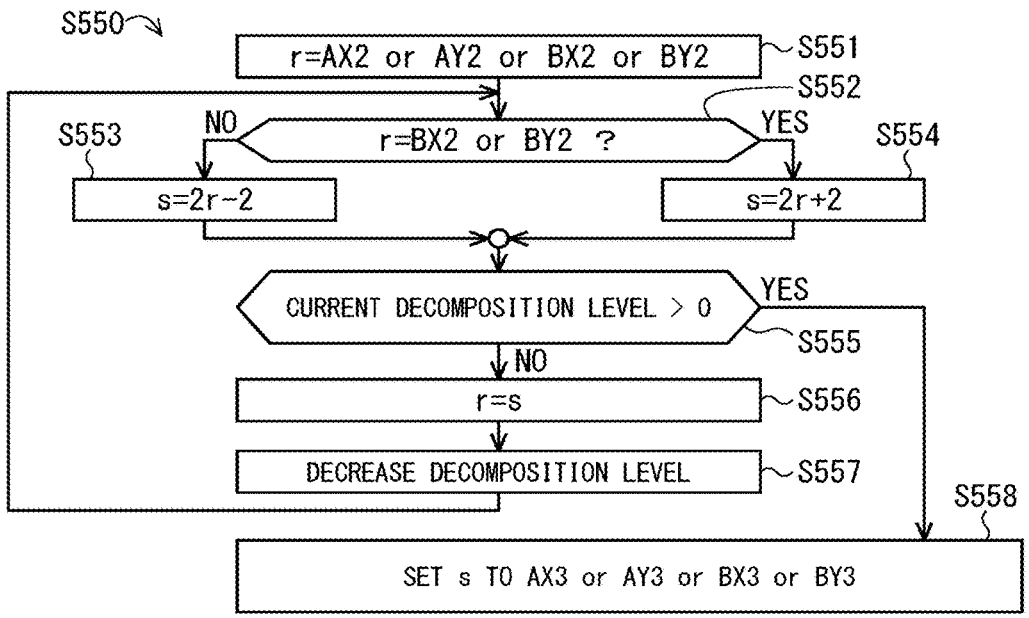
FIG. 70 is a flowchart showing how to obtain a required range (cut-out range) in accordance with the seventh preferred embodiment ( 5×3 filter)

FIG. 70 is a flowchart for obtaining the cut-out range 83 from the tracked minimum range 82 in the case of using the 5×3 filter for the wavelet transformation.

In an operation flow S550 of FIG. 70, AX2, AY2, BX2, or BY2 of the tracked minimum range 82 is set to a parameter r in Step S551. Herein, it is assumed that it is first set that r=AX2.

When it is determined in Step S552 that r is not BX2 or BY2 (in other words, it is determined that r is a coordinate value of the upper-left end coordinates of the tracked minimum range 82), it is set that a parameter s=2r−2 in Step S553. On the other hand, when it is determined in Step S552 that r is BX2 or BY2 (in other words, it is determined that r is a coordinate value of the lower-right end coordinates of the tracked minimum range 82), it is set that s=2r+2 in Step S554.

Then, when it is determined in Step S555 that the current decomposition level does not reach 0, the current value of s is set to a new value of r (r=s) in Step S556. After that, the decomposition level is decreased in Step S557 and the process goes back to Step S552.

On the other hand, when it is determined in Step S555 that the current decomposition level reaches 0, the value of s at that point in time is set to AX3 of the cut-out range 83 in Step S558.

By setting r=AY2, BX2, or BY2 in Step S551, AY3, BX3, or BY3 of the cut-out range 83 can be obtained in Step S558.

In consideration of the operation flow S550, the required range specifying process in the case of using the 5×3 filter for the wavelet transformation can be also expressed as follows.

A process (referred to as a fifth recursive process) in which {AX2×2−2} is set to new AX2 is performed the specified number of times which is specified by the synthesis control data C50, and the AX2 that is finally obtained is set to AX3.

A process (referred to as a sixth recursive process) in which {AY2×2−2} is set to new AY2 is performed the above-described specified number of times, and the AY2 that is finally obtained is set to AY3.

A process (referred to as a seventh recursive process) in which {BX2×2+2} is set to new BX2 is performed the above-described specified number of times, and the BX2 that is finally obtained is set to BX3.

A process (referred to as an eighth recursive process) in which {BY2×2+2} is set to new BY2 is performed the above-described specified number of times, and the BY2 that is finally obtained is set to BY3.

Figure 71:
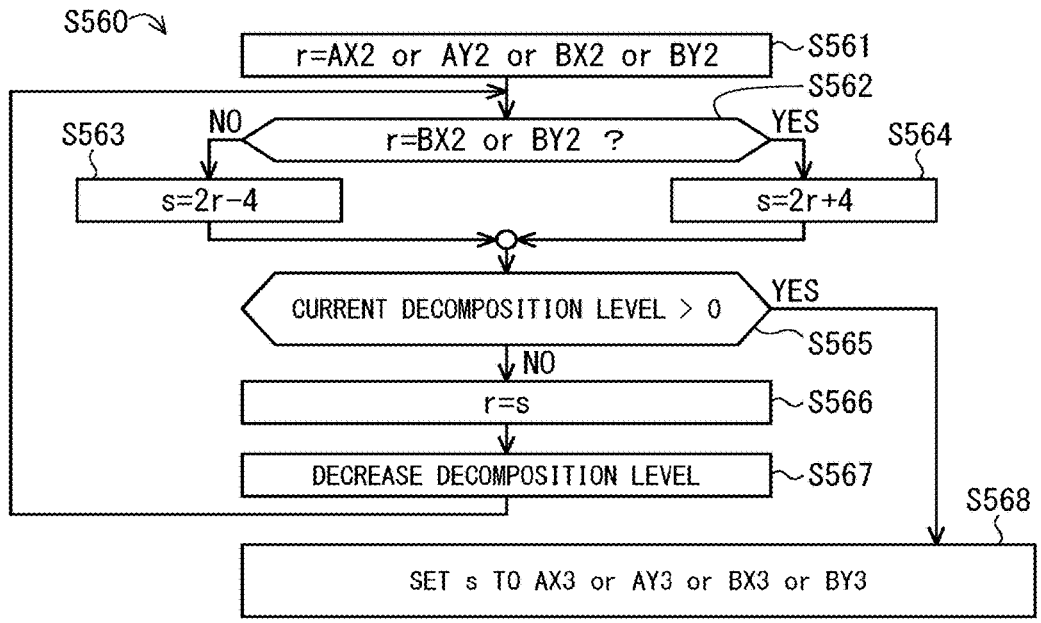
FIG. 71 is a flowchart showing how to obtain a required range (cut-out range) in accordance with the seventh preferred embodiment (Daubechies 9×7 filter)

FIG. 71 is a flowchart for obtaining the cut-out range 83 from the tracked minimum range 82 in the case of using the Daubechies 9×7 filter for the wavelet transformation.

An operation flow S560 of FIG. 71 is basically the same as the operation flow S550 of FIG. 70 except computations in Steps S563 and S564. Specifically, when it is determined in Step S562 that r is not BX2 or BY2, it is set that s=2r−4 in Step S563. On the other hand, when it is determined in Step S562 that r is BX2 or BY2, it is set that s=2r+4 in Step S564.

In consideration of the operation flow S560, the required range specifying process in the case of using the Daubechies 9×7 filter for the wavelet transformation can be also expressed as follows.

A process (referred to as a thirteenth recursive process) in which {AX2×2−4} is set to new AX2 is performed the specified number of times which is specified by the synthesis control data C50, and the AX2 that is finally obtained is set to AX3.

A process (referred to as a fourteenth recursive process) in which {AY2×2−4} is set to new AY2 is performed the above-described specified number of times, and the AY2 that is finally obtained is set to AY3.

A process (referred to as a fifteenth recursive process) in which {BX2×2+4} is set to new BX2 is performed the above-described specified number of times, and the BX2 that is finally obtained is set to BX3.

A process (referred to as a sixteenth recursive process) in which {BY2×2+4} is set to new BY2 is performed the above-described specified number of times, and the BY2 that is finally obtained is set to BY3.

<Supply System 11G>

Figure 72:
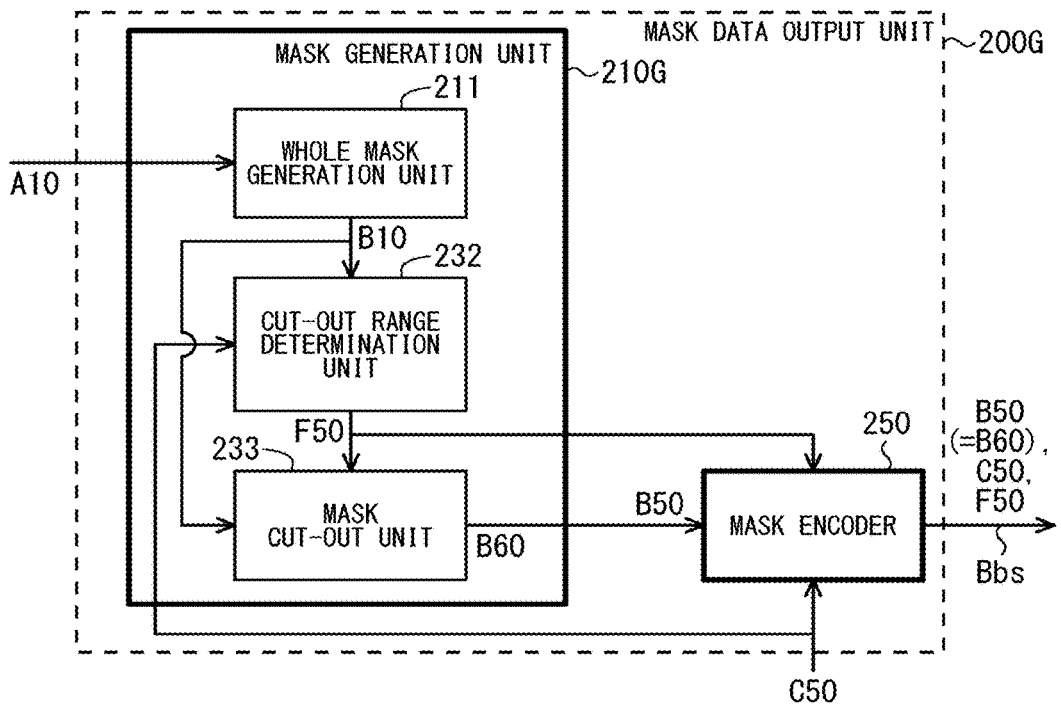
FIG. 72 is a block diagram showing a mask data output unit in accordance with the seventh preferred embodiment.

FIG. 72 shows an exemplary constitution of a mask data output unit 200G in accordance with the seventh preferred embodiment. Herein, combination of the mask data output unit 200G and the already-described image data output unit 100 constitutes the supply system 11G. Instead of the supply system 11 in accordance with the first preferred embodiment, the supply system 11G can be applied to the image processing system 1, 10, or the like.

As shown in FIG. 72, the mask data output unit 200G includes a mask generation unit 210G and the already-described mask encoder 250. The mask generation unit 210G includes the already-described whole mask generation unit 211, a cut-out range determination unit 232, and a mask cut-out unit 233.

The cut-out range determination unit 232 determines the cut-out range 83 (a range of the first target image in the whole image, i.e., a range of the target mask in the whole mask). Specifically, the cut-out range determination unit 232 performs the cut-out range determination process S500 (see FIG. 60) on the basis of the whole mask data B10 and the synthesis control data C50. Then, the cut-out range determination unit 232 generates cut-out range specifying data F50 which are data to be used for specifying the cut-out range 83. Specifically, the cut-out range specifying data F50 are data of the upper-left end coordinates (AX3, AY3) and the lower-right end coordinates (BX3, BY3) of the cut-out range 83.

The mask cut-out unit 233 cuts out data within the cut-out range 83 in the whole mask data B10, for the basic mask data, on the basis of the cut-out range specifying data F50. Particularly, in the seventh preferred embodiment, the data within the cut-out range 83 in the whole mask data B10 are cut out as the basic mask data B50. Further, the cut-out data constitute the target mask data B60.

In other words, the mask encoder 250 acquires the target mask data B60 as the basic mask data B50 and codes the target mask data B60, to thereby generate the mask bit stream Bbs. Further, the mask encoder 250 embeds the synthesis control data C50 and the cut-out range specifying data F50 into the mask bit stream Bbs.

<Synthesizing System 21G>

Figure 73:
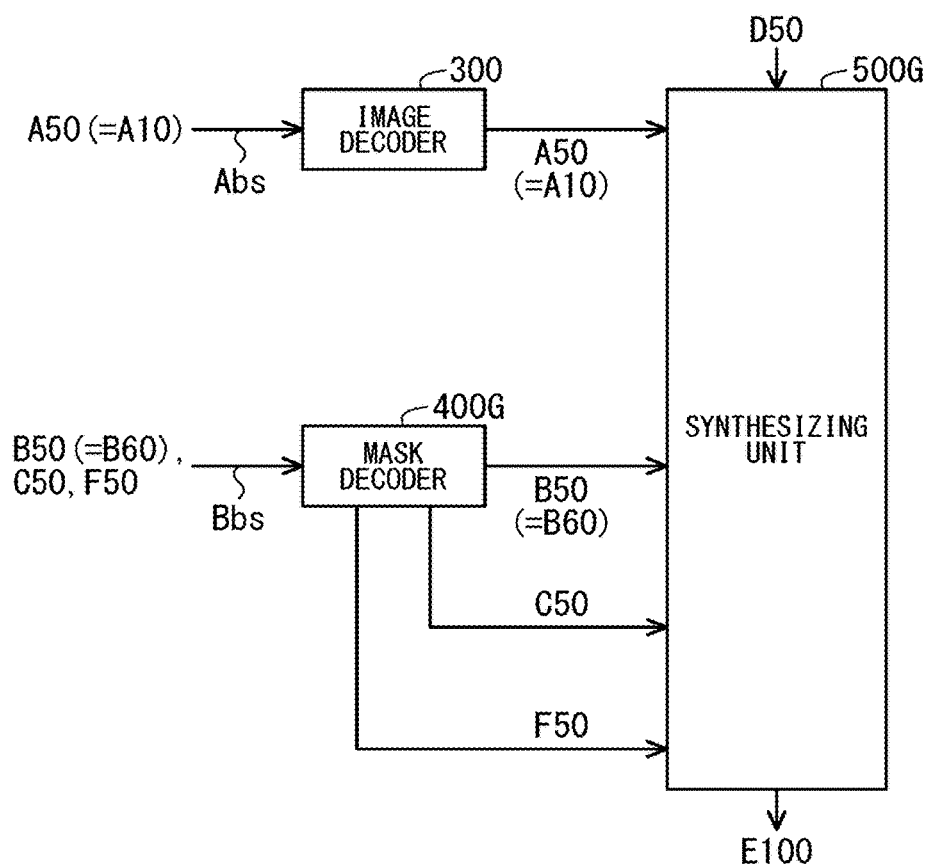
FIG. 73 is a block diagram showing an image synthesizing system in accordance with the seventh preferred embodiment.

FIG. 73 shows an exemplary constitution of the synthesizing system 21G in accordance with the seventh preferred embodiment. Instead of the synthesizing system 21 in accordance with the first preferred embodiment, the synthesizing system 21G can be applied to the image processing system 1, 20, or the like. In the synthesizing system 21G, a mask decoder 400G and a synthesizing unit 500G are provided, instead of the mask decoder 400 and the synthesizing unit 500, respectively. Other constituent elements in the synthesizing system 21G are identical to those of the synthesizing system 21 in accordance with the first preferred embodiment.

The mask decoder 400G extracts the synthesis control data C50 and the cut-out range specifying data F50 from the mask bit stream Bbs. Further, as described above, the mask decoder 400G decodes the mask bit stream Bbs, to thereby acquire the basic mask data B50. The basic mask data B50, the synthesis control data C50, and the cut-out range specifying data F50 are supplied to the synthesizing unit 500G.

Figure 74:
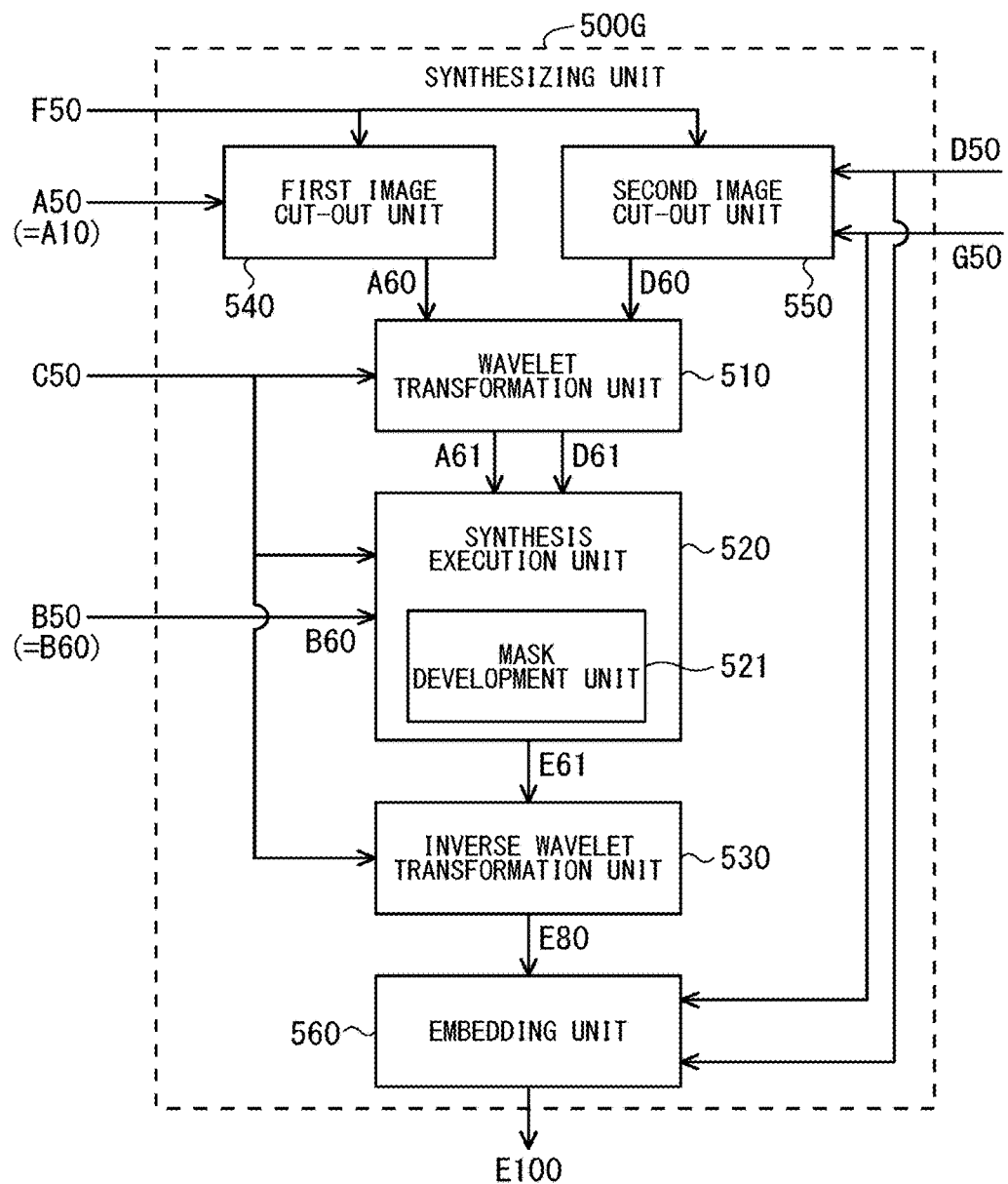
FIG. 74 is a block diagram showing a synthesizing unit in accordance with the seventh preferred embodiment.

FIG. 74 shows an exemplary constitution of the synthesizing unit 500G. As can be seen from the comparison of FIG. 74 with FIG. 13, the synthesizing unit 500G has a constitution in which a first image cut-out unit 540, a second image cut-out unit 550, and an embedding unit 560 are added in the synthesizing unit 500 of the first preferred embodiment. Other constituent elements of the synthesizing unit 500G are identical to those of the synthesizing unit 500 of the first preferred embodiment.

The first image cut-out unit 540 acquires the first basic image data A50 and the cut-out range specifying data F50. Then, the first image cut-out unit 540 cuts out data within the cut-out range 83 in the first basic image data A50 (herein, the whole image data A10) on the basis of the cut-out range specifying data F50 (see FIG. 55). The cut-out data are supplied to the wavelet transformation unit 510 as the first target image data A60.

The second image cut-out unit 550 acquires the second basic image data D50, the cut-out range specifying data F50, and synthesis position specifying data G50. The synthesis position specifying data G50 are data to be used to specify a position at which the ROI in the first target image is synthesized in the second basic image. The synthesis position specifying data G50 can be understood, for example, as data for an embedding position for the synthetic image data E80 as described later. More specifically, the embedding position of the synthetic image data E80 can be specified by an upper-left end position of an embedding range of the synthetic image data E80, a center position of the embedding range, or the like. The synthesis position specifying data G50 are supplied to the synthesizing unit 500G when a user of the synthesizing system 21G inputs the data to the operation unit 42 (see FIG. 2) provided on the side of the synthesizing system 21G.

The second image cut-out unit 550 sets a synthesis target range in the second basic image on the basis of the synthesis position specifying data G50. The synthesis target range is a range having the same shape and size as those of the first target image and therefore is congruent with the first target image. Alternatively, it can be also expressed that the synthesis target range is a similar figure range to the first target image with a similarity ratio of 1. It is herein assumed that the synthesis target range is specified by the cut-out range specifying data F50. Instead of the cut-out range specifying data F50, a range having the same shape and size as those of the first target image may be specified directly from the first target image data A60. The second image cut-out unit 550 cuts out data within the synthesis target range in the second basic image data D50. The cut-out data are supplied to the wavelet transformation unit 510 as the second target image data D60.

The wavelet transformation unit 510, the synthesis execution unit 520, and the inverse wavelet transformation unit 530 operate in the same manner in the first preferred embodiment. The synthetic image data E80 are thereby generated from the first target image data A60 and the second target image data D60 which are cut out as described above.

The embedding unit 560 embeds the synthetic image data E80 which are generated by the inverse wavelet transformation unit 530, into the synthesis target range in the second basic image data D50. The second basic image data D50 with the synthetic image data E80 embedded therein are outputted as the synthetic image data E100 which are output data from the synthesizing unit 500G.

<Operation>

FIG. 75 is a flowchart showing an operation of the supply system 11G. An operation flow S100G shown in FIG. 75 is basically the same as the operation flow S100 (see FIG. 9) in accordance with the first preferred embodiment but has the following different points. In the operation flow S100G, basic mask generation step S122G is provided, instead of the basic mask generation step S122. Further, data embedding step S124G is provided, instead of the data embedding step S124.

According to the basic mask generation step S122G, in whole mask generation step S141, the whole mask generation unit 211 generates the whole mask data B10. In cut-out step S142, the cut-out range determination unit 232 and the mask cut-out unit 233 generate the target mask data B60 from the whole mask data B10. After that, the target mask data B60 are handled as the basic mask data B50. Specifically, in the next step S123, the target mask data B60 are coded and the mask bit stream Bbs is thereby generated.

In the data embedding step S124G, the mask encoder 250 embeds the synthesis control data C50 and the cut-out range specifying data F50 into the mask bit stream Bbs.

FIG. 76 is a flowchart showing an operation of the synthesizing system 21G. An operation flow S400G shown in FIG. 76 is basically the same as the operation flow S400 (see FIG. 25) in accordance with the first preferred embodiment but has the following different points. In the operation flow S400G, data acquisition step S410G is provided, instead of the data acquisition step S410 (see FIG. 25). Further, image embedding step S480 is added.

In the data acquisition step S410G, data extraction step S432G is provided, instead of Step S432, and cut-out step S470 is added. In the data extraction step S432G, the mask decoder 400G extracts the synthesis control data C50 and the cut-out range specifying data F50 from the mask bit stream Bbs. In the cut-out step S470, the first image cut-out unit 540 cuts out the first target image data A60 from the first basic image data A50, and the second image cut-out unit 550 cuts out the second target image data D60 from the second basic image data D50.

In the image embedding step S480, the embedding unit 560 embeds the synthetic image data E80 generated by the inverse wavelet transformation unit 530 into the synthesis target range in the second basic image data D50.

<Effects>

In the seventh preferred embodiment, it is possible to produce the same effects as those of the first preferred embodiment and the like.

In the seventh preferred embodiment, particularly, the supply system 11G cuts out the basic mask from the whole mask and outputs the cut-out basic mask as the mask bit stream Bbs. For this reason, it is possible to reduce the size of the basic mask data B50 and therefore possible to reduce the size of the mask bit stream Bbs. Therefore, when the mask bit stream is transferred via wired or wireless communication, the amount of communication can be reduced and this contributes to the immediacy of transfer. Further, since the respective sizes of the first target image and the second target image are reduced as the size of the basic mask is reduced, it is possible to reduce the computational load in the synthesizing system 21G. This contributes to speed-up of the image synthesis. In consideration of these points, it is possible to increase the immediacy of the image synthesis.

Further, the seventh preferred embodiment can be combined with the second preferred embodiment and the like.

<Consideration on Tracking Process>

Herein, in consideration that the wavelet transformation adopts the method of recursively decomposing the lowest-frequency band component included in the wavelet plane of each decomposition level, it is assumed in the above description that the highest-order band component to be processed in the tracking process is the lowest-frequency band component LL3 in the final wavelet plane. On the other hand, when the wavelet transformation adopts the method of recursively decomposing the highest-frequency band component in the wavelet plane, for example, the highest-frequency band component in the final wavelet plane is a target to be processed in the tracking process.

Further, in the above description, only the lowest-frequency band component LL3 among the four highest-order band components LL3, HL3, LH3, and HH3 is a target to be processed in the tracking process. In other words, only the output from the low-pass filter is a target to be processed in the tracking process. The reason why no high-pass filter is needed in the tracking process will be described below.

<As to Step S514 in FIG. 66 (5×3 Filter)>

In Step S512 of FIG. 66, when it is determined that the parameter q, i.e., the left-end coordinate AX1 of the minimum range 81 or the upper-end coordinate AY1 thereof is an odd number, assuming with reference to FIG. 21 that the output on the left side (which corresponds to the upper side) of the low-frequency component is p, $$q=2n+1 \qquad \text{(Eq. 1)}$$

$$p=n \qquad \text{(Eq. 2)}$$

By solving the above equations, $p=(q-1)/2$... (Eq. 3). This is the above equation which is set in Step S514.

Herein, with reference to FIG. 21, the high-frequency component (i.e., the high-pass filter side) is also considered. Assuming that the output on the left side (which corresponds to the upper side) of the high-frequency component is p, $$q=2n+1 \qquad \text{(Eq. 4)}$$

$$p=n-1 \qquad \text{(Eq. 5)}$$

By solving the above equations, $p=(q-3)/2$... (Eq. 6).

<As to Step S513 in FIG. 66 (5×3 Filter)>

In Step S512 of FIG. 66, when it is determined that the parameter q, i.e., the left-end coordinate AX1 of the minimum range 81 or the upper-end coordinate AY1 thereof is an even number, assuming with reference to FIG. 21 that the output on the left side (which corresponds to the upper side) of the low-frequency component is p, $$q=2n \qquad \text{(Eq. 7)}$$

$$p=n \qquad \text{(Eq. 8)}$$

By solving the above equations, $p=q/2$... (Eq. 9). This is the above equation which is set in Step S513.

Herein, with reference to FIG. 21, the high-frequency component (i.e., the high-pass filter side) is also considered. Assuming that the output on the left side (which corresponds to the upper side) of the high-frequency component is p, $$q=2n \qquad \text{(Eq. 10)}$$

$$p=n-1 \qquad \text{(Eq. 11)}$$

By solving the above equations, $p=q/2-1$... (Eq. 12).

Herein, considering the Mallat type in a case where the high-frequency component is not recursively inputted, the output on the high-frequency side does not become the input. Therefore, as to the high-frequency component, only the final decomposition level has to be considered. When the low-frequency component is recursively inputted, only the input side has to be considered.

<As to Step S553 in FIG. 70 (5×3 Filter)>

It is assumed that the low-frequency component is inputted to the low-pass filter having five taps shown in FIG. 61. Further, in FIG. 61, it is assumed that n=p. In Step S551 of FIG. 70, when the left-end coordinate AX2 of the tracked minimum range 82 or the upper-end coordinate AY2 thereof is inputted (see Step S552), $$r=p \qquad \text{(Eq. 13)}$$

$$s=2p-2 \qquad \text{(Eq. 14)}$$

By solving the above equations, $s=2r-2$... (Eq. 15). This is the above equation which is set in Step S553.

It is assumed that the high-frequency component is inputted to the high-pass filter having three taps shown in FIG. 62. Further, in FIG. 62, it is assumed that n=p. In Step S551 of FIG. 70, when the left-end coordinate AX2 of the tracked minimum range 82 or the upper-end coordinate AY2 thereof is inputted (see Step S552), $$r=p \qquad \text{(Eq. 16)}$$

$$s=2p \qquad \text{(Eq. 17)}$$

By solving the above equations, $s=2r$... (Eq. 18).

Herein, as described above, in Step S512 of FIG. 66, when it is determined that the parameter q, i.e., the left-end coordinate AX1 of the minimum range 81 or the upper-end coordinate AY1 thereof is an odd number, as to the low-frequency component, from Eqs. 13 and 3, obtained is $r=(q-1)/2$... (Eq. 19). Further, from Eqs. 19 and 15, obtained is $s=q-3$... (Eq. 20). On the other hand, as to the high-frequency component, from Eqs. 16 and 6, obtained is $r=(q-3)/2$... (Eq. 21). Further, from Eqs. 21 and 18, obtained is s=q−3... (Eq. 22). As can be seen from Eqs. 20 and 22, as to both the low-frequency component and the high-frequency component, the same result is obtained.

Furthermore, as described above, in Step S512 of FIG. 66, when it is determined that the parameter q, i.e., the left-end coordinate AX1 of the minimum range 81 or the upper-end coordinate AY1 thereof is an even number, as to the low-frequency component, from Eqs. 13 and 9, obtained is r=q/2... (Eq. 23). Further, from Eqs. 23 and 15, obtained is s=q−2... (Eq. 24). On the other hand, as to the high-frequency component, from Eqs. 16 and 12, obtained is r=q/2−1... (Eq. 25). Further, from Eqs. 25 and 18, obtained is s=q−2... (Eq. 26). As can be seen from Eqs. 24 and 26, as to both the low-frequency component and the high-frequency component, the same result is obtained.

Thus, considering the Mallat type in a case where the high-frequency component is not recursively inputted, even when any one of the low-frequency component and the high-frequency component is tracked, the same result is obtained. For this reason, in the operation flows S510, S520, and S550 of FIGS. 66, 67, and 70, respectively, in the case of using the 5×3 filter for the wavelet transformation, attention is paid only to the low-frequency component.

<As to Step S534 in FIG. 68 (9×7 Filter)>

In Step S532 of FIG. 68, when it is determined that the parameter q, i.e., the left-end coordinate AX1 of the minimum range 81 or the upper-end coordinate AY1 thereof is an odd number, assuming with reference to FIG. 22 that the output on the left side (which corresponds to the upper side) of the low-frequency component is p, $$q=2n+1 \quad \text{(Eq. 27)}$$

$$p=n-1 \quad \text{(Eq. 28)}$$

By solving the above equations, p=(q−3)/2... (Eq. 29). This is the above equation which is set in Step S534.

Herein, with reference to FIG. 22, the high-frequency component (i.e., the high-pass filter side) is also considered. Assuming that the output on the left side (which corresponds to the upper side) of the high-frequency component is p, $$q=2n+1 \quad \text{(Eq. 30)}$$

$$p=n-2 \quad \text{(Eq. 31)}$$

By solving the above equations, p=(q−5)/2... (Eq. 32).

<As to Step S533 in FIG. 68 (9×7 Filter)>

In Step S532 of FIG. 68, when it is determined that the parameter q, i.e., the left-end coordinate AX1 of the minimum range 81 or the upper-end coordinate AY1 thereof is an even number, assuming with reference to FIG. 22 that the output on the left side (which corresponds to the upper side) of the low-frequency component is p, $$q=2n \quad \text{(Eq. 33)}$$

$$p=n-1 \quad \text{(Eq. 34)}$$

By solving the above equations, p=q/2−1... (Eq. 35). This is the above equation which is set in Step S533.

Herein, with reference to FIG. 22, the high-frequency component (i.e., the high-pass filter side) is also considered. Assuming that the output on the left side (which corresponds to the upper side) of the high-frequency component is p, $$q=2n \quad \text{(Eq. 36)}$$

$$p=n-2 \quad \text{(Eq. 37)}$$

By solving the above equations, p=q/2−2... (Eq. 38).

Herein, considering the Mallat type in a case where the high-frequency component is not recursively inputted, the output on the high-frequency side does not become the input. Therefore, as to the high-frequency component, only the final decomposition level has to be considered. When the low-frequency component is recursively inputted, only the input side has to be considered.

<As to Step S563 in FIG. 71 (9×7 Filter)>

It is assumed that the low-frequency component is inputted to the low-pass filter having nine taps shown in FIG. 63. Further, in FIG. 63, it is assumed that n=p. In Step S561 of FIG. 71, when the left-end coordinate AX2 of the tracked minimum range 82 or the upper-end coordinate AY2 thereof is inputted (see Step S562), $$r=p \quad \text{(Eq. 39)}$$

$$s=2p-4 \quad \text{(Eq. 40)}$$

By solving the above equations, s=2r−4... (Eq. 41). This is the above equation which is set in Step S563.

It is assumed that the high-frequency component is inputted to the high-pass filter having seven taps shown in FIG. 64. Further, in FIG. 64, it is assumed that n=p. In Step S561 of FIG. 71, when the left-end coordinate AX2 of the tracked minimum range 82 or the upper-end coordinate AY2 thereof is inputted (see Step S562), $$r=p \quad \text{(Eq. 42)}$$

$$s=2p-2 \quad \text{(Eq. 43)}$$

By solving the above equations, s=2r−2... (Eq. 44).

Herein, as described above, in Step S532 of FIG. 68, when it is determined that the parameter q, i.e., the left-end coordinate AX1 of the minimum range 81 or the upper-end coordinate AY1 thereof is an odd number, as to the low-frequency component, from Eqs. 39 and 29, obtained is r=(q−3)/2... (Eq. 45). Further, from Eqs. 45 and 41, obtained is s=q−7... (Eq. 46). On the other hand, as to the high-frequency component, from Eqs. 42 and 32 obtained is r=(q−5)/2... (Eq. 47). Further, from Eqs. 47 and 44, obtained is s=q−7... (Eq. 48). As can be seen from Eqs. 46 and 48, as to both the low-frequency component and the high-frequency component, the same result is obtained.

Furthermore, as described above, in Step S532 of FIG. 68, when it is determined that the parameter q, i.e., the left-end coordinate AX1 of the minimum range 81 or the upper-end coordinate AY1 thereof is an even number, as to the low-frequency component, from Eqs. 39 and 35 obtained is r=q/2... (Eq. 49). Further, from Eqs. 49 and 41, obtained is s=q−6... (Eq. 50). On the other hand, as to the high-frequency component, from Eqs. 42 and 38, obtained is r=q/2−2... (Eq. 51). Further, from Eqs. 51 and 44, obtained is s=q−6... (Eq. 52). As can be seen from Eqs. 50 and 52, as to both the low-frequency component and the high-frequency component, the same result is obtained.

Thus, considering the Mallat type in a case where the high-frequency component is not recursively inputted, even when any one of the low-frequency component and the high-frequency component is tracked, the same result is obtained. For this reason, in the operation flows S530, S540, and S560 of FIGS. 68, 69, and 71, respectively, in the case of using the 9×7 filter for the wavelet transformation, attention is paid only to the low-frequency component.

The Eighth Preferred Embodiment

FIG. 77 is a conceptual diagram showing the image synthesis in the supply system 11H and the synthesizing system 21H in accordance with the eighth preferred embodiment. Instead of the supply system 11 and the synthesizing system 21 in accordance with the first preferred embodiment, the supply system 11H and the synthesizing system 21H can be applied to the image processing system 1, 10, 20, or the like. As can be seen from the comparison of FIG. 77 with FIG. 55, the supply system 11H of the eighth preferred embodiment performs the cut-out of the whole image as well as the whole mask.

In other words, like in the seventh preferred embodiment, the supply system 11H cuts out the target mask which is a mask for the range of the first target image which is to be a target of the wavelet transformation, from the whole mask, and outputs the target mask data B60 as the basic mask data B50. Further, the supply system 11H cuts out the first target image from the whole image and outputs the first target image data A60 as the first basic image data A50.

Figure 78:
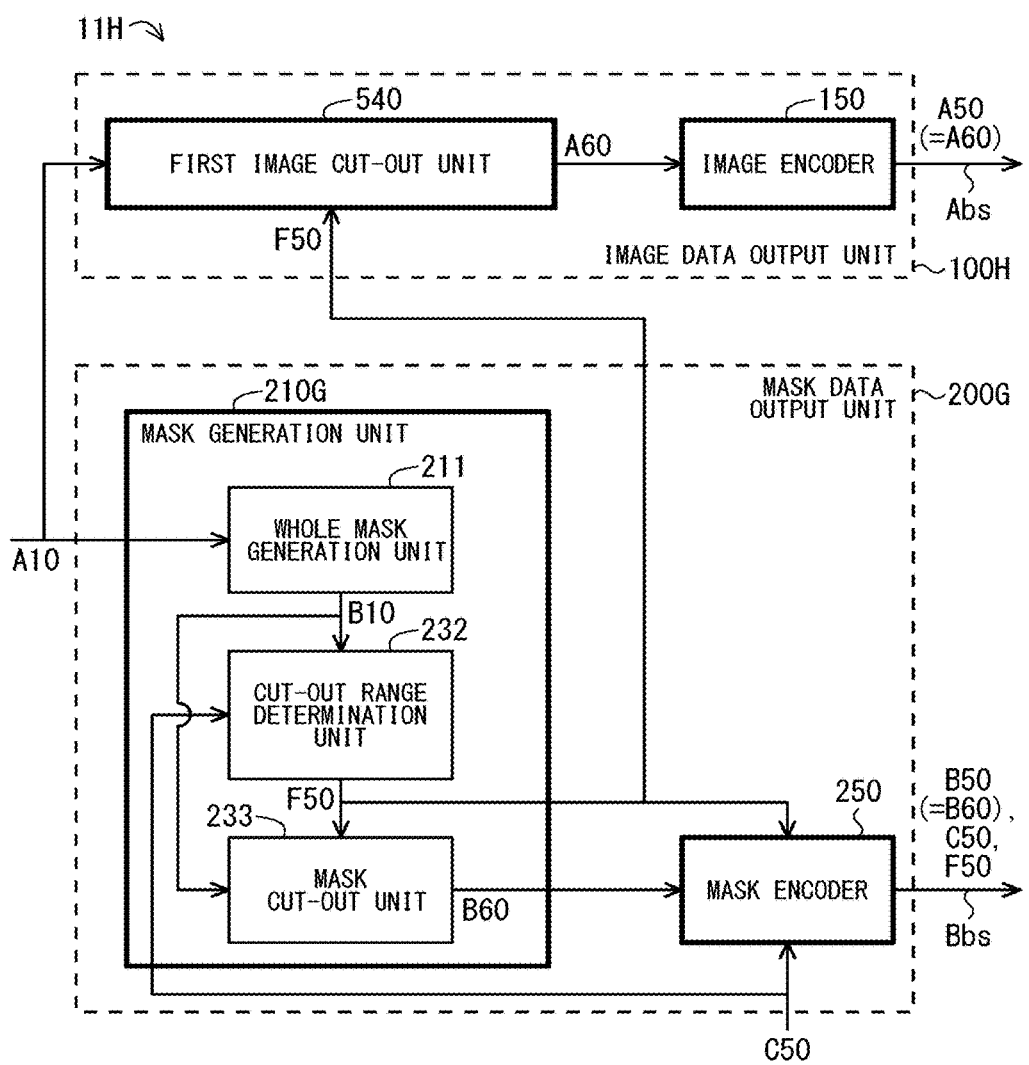
FIG. 78 is a block diagram showing a data supply system in accordance with the eighth preferred embodiment.

FIG. 78 shows an exemplary constitution of the supply system 11H. The supply system 11H includes an image data output unit 100H of the eighth preferred embodiment and the mask data output unit 200G of the seventh preferred embodiment. The image data output unit 100H includes the first image cut-out unit 540 which is provided in the synthesizing system 21G in the seventh preferred embodiment, and the already-described image encoder 150.

In the supply system 11H, the first image cut-out unit 540 acquires the whole image data A10 and acquires the cut-out range specifying data F50 from the cut-out range determination unit 232. Then, the first image cut-out unit 540 cuts out data within the cut-out range 83 in the whole image data A10 on the basis of the cut-out range specifying data F50. The cut-out partial image data are the first target image data A60 which are to be a target of the wavelet transformation in the synthesizing system 21H.

The first target image data A60 are supplied to the image encoder 150 as the first basic image data A50. The first target image data A60 are thereby outputted from the supply system 11H as the first basic image data A50 in the image bit stream Abs.

Corresponding to the constitution of the supply system 11H, a synthesizing unit 500H (see FIG. 79) in the synthesizing system 21H has a constitution in which the first image cut-out unit 540 is omitted from the synthesizing unit 500G (see FIG. 74) of the seventh preferred embodiment.

Figure 80:
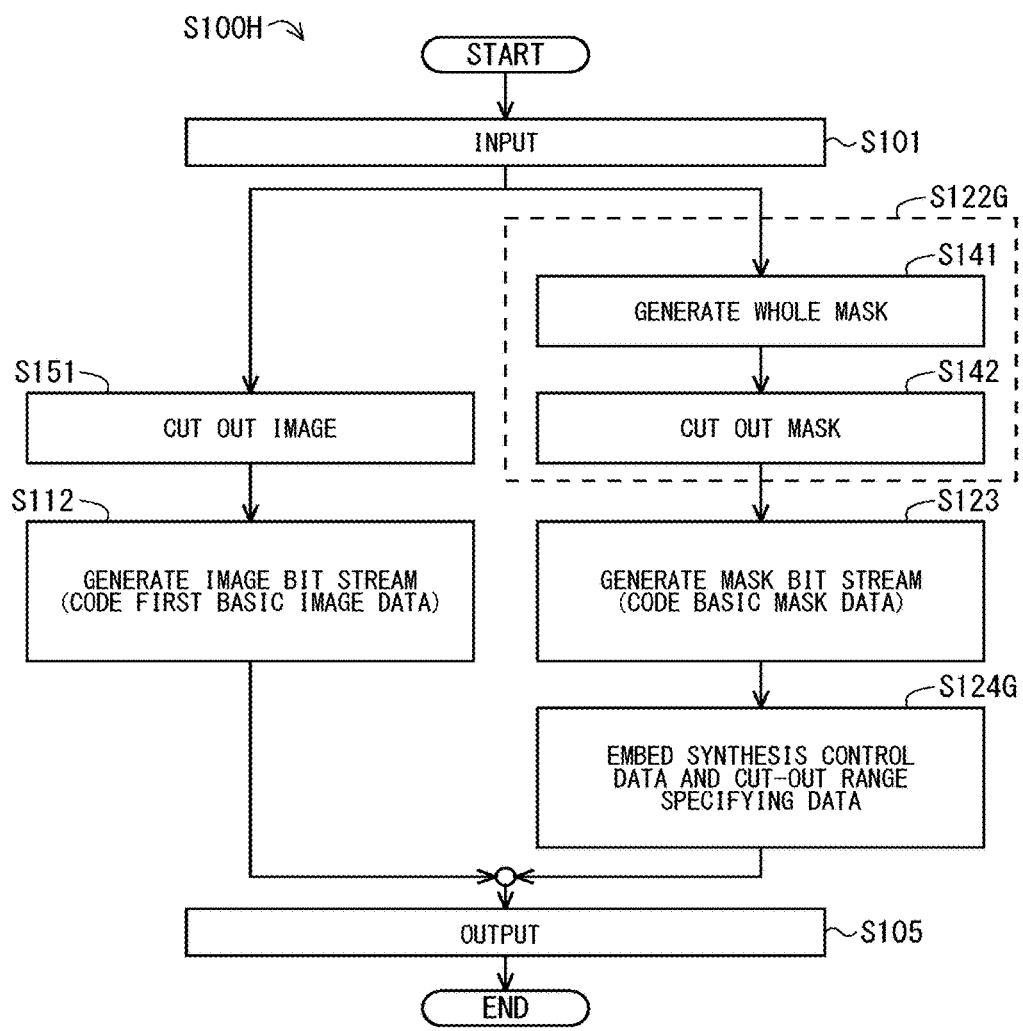
FIG. 80 is a flowchart showing an operation of a data supply system in accordance with the eighth preferred embodiment.

FIG. 80 is a flowchart showing an operation of the supply system 11H. In an operation flow S100H of FIG. 80, cut-out step S151 is added to the operation flow S100G of FIG. 75. In the cut-out step S151, the first image cut-out unit 540 cuts out the first target image data A60 form the whole image data A10 on the basis of the cut-out range specifying data F50 generated in the cut-out step S142.

The first target image data A60 cut out in Step S151 are processed as the first basic image data A50 in Step S112. In other words, the image encoder 150 generates the image bit stream Abs of the first basic image data A50 from the first target image data A60.

Figure 81:
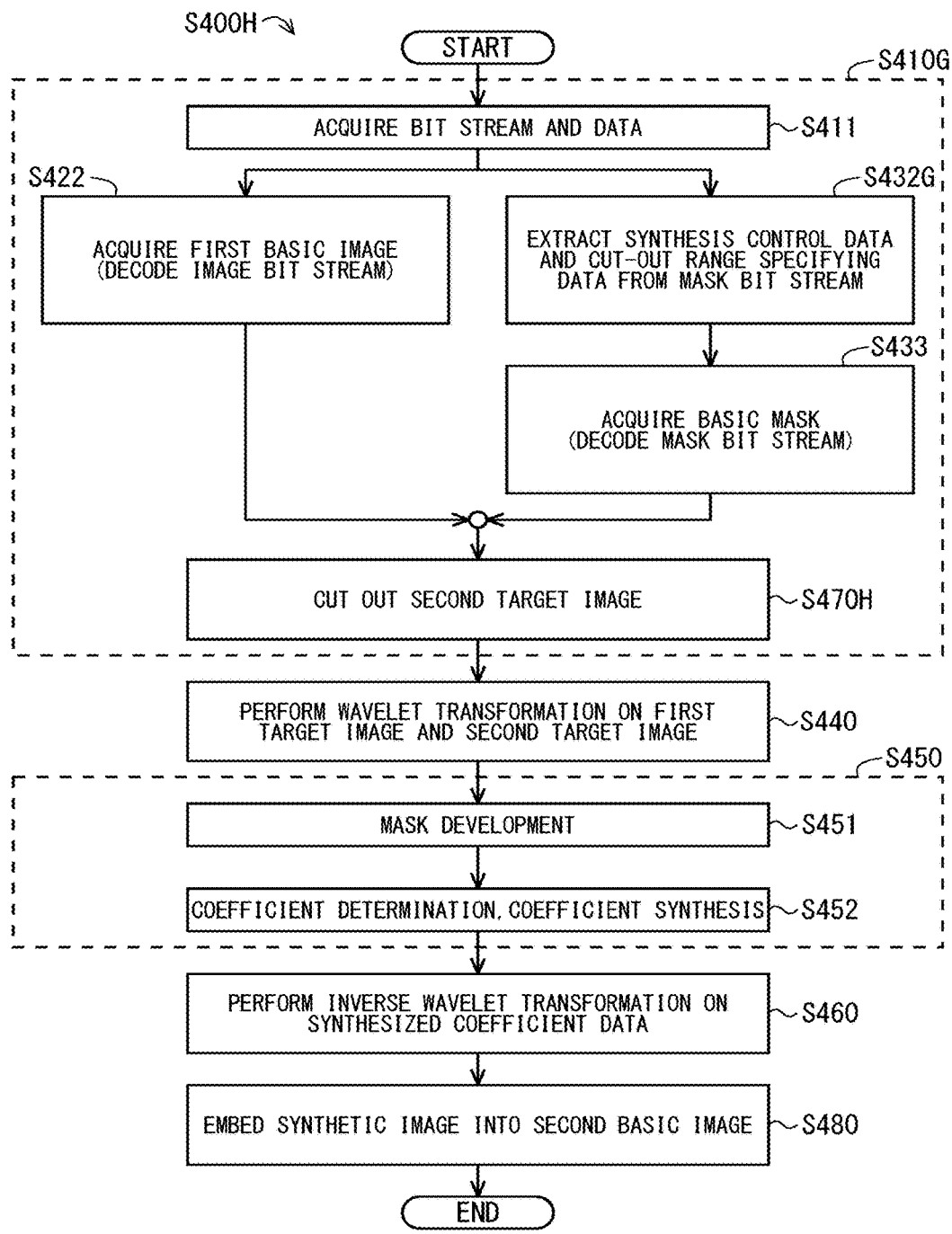
FIG. 81 is a flowchart showing an operation of an image synthesizing system in accordance with the eighth preferred embodiment.

FIG. 81 is a flowchart showing an operation of the synthesizing system 21H. An operation flow S400H of FIG. 81 is basically the same as the operation flow S400G of FIG. 76 except that Step S470H is provided instead of Step S470.

In Step S470 (see FIG. 76) of the seventh preferred embodiment, the first target image and the second target image are cut out from the first basic image and the second basic image, respectively. On the other hand, in the eighth preferred embodiment, since the first basic image is supplied as the first target image, only the second target image is cut out in Step S470H.

It is assumed above that the cut-out range specifying data F50 are supplied from the supply system 11H to the synthesizing system 21H and used in the second image cut-out unit 550, like in the seventh preferred embodiment. In the eighth preferred embodiment, however, there may be a case where the cut-out range specifying data F50 are not supplied from the supply system 11H to the synthesizing system 21H.

This is because it is not necessary to cut out the first target image in the synthesizing system 21H and therefore the cut-out range specifying data F50 are not used for the first target image in the eighth preferred embodiment. Further, as described in the seventh preferred embodiment, this is also because it is possible to cut out the second target image to have the same shape and size as those of the first target image even when the first target image data A60 are referred to, instead of the cut-out range specifying data F50, in cutting out the second target image.

In the eighth preferred embodiment, it is possible to produce the same effects as those of the seventh preferred embodiment.

Particularly, in the eighth preferred embodiment, the supply system 11H cuts out the first basic image from the whole image and the cut-out first basic image is outputted as the image bit stream Abs. For this reason, it is possible to reduce the data size of not only the basic mask data B50 but also the first basic image data A50. Therefore, when the image bit stream Abs and the mask bit stream Bbs are transferred via wired or wireless communication, the amount of communication can be reduced and this contributes to the immediacy of transfer.

Further, the eighth preferred embodiment can be combined with the second preferred embodiment and the like.

The Ninth Preferred Embodiment

Figure 82:
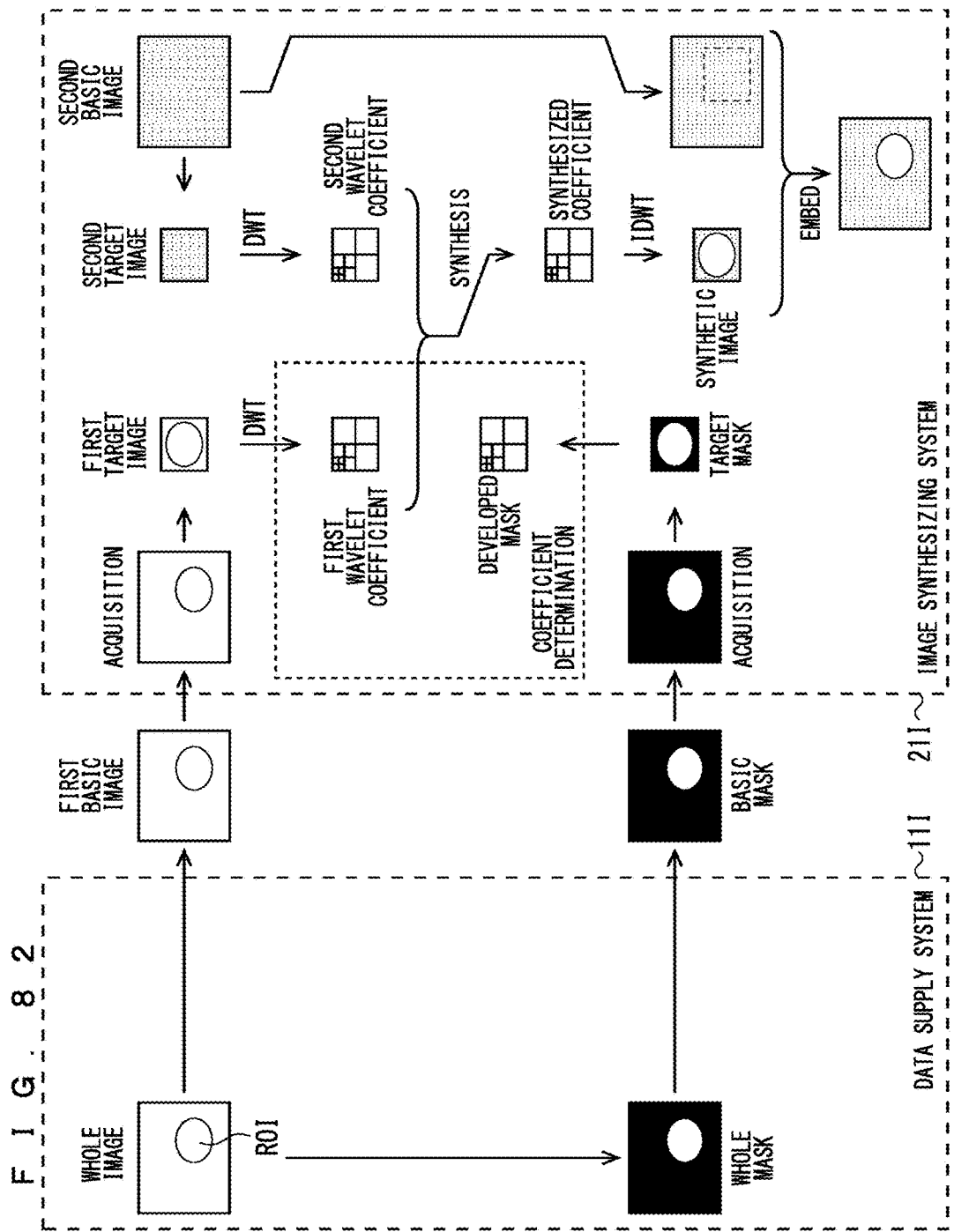
FIG. 82 is a conceptual diagram showing image synthesis in accordance with a ninth preferred embodiment.

FIG. 82 is a conceptual diagram showing the image synthesis in the supply system 11I and the synthesizing system 21I in accordance with the ninth preferred embodiment. Instead of the supply system 11 and the synthesizing system 21 in accordance with the first preferred embodiment, the supply system 11I and the synthesizing system 21I can be applied to the image processing system 1, 10, 20, or the like. As can be seen from the comparison of FIG. 82 with FIG. 55, in the ninth preferred embodiment, the cut-out from the whole mask and the whole image is performed by the synthesizing system 21I.

In other words, like in the first preferred embodiment, the supply system 11I outputs the whole image data A10 which are data of the whole image whose portion includes the first target image, as the first basic image data A50, and generates and outputs the basic mask data B50 for the range of the whole image. Further, the supply system 11I generates and outputs the cut-out range specifying data F50, like in the seventh preferred embodiment.

On the other hand, the synthesizing system 21I cuts out a range specified by the cut-out range specifying data F50 from each of the first basic image and the basic mask and uses the portions cut-out from the first basic image and the basic mask as the first target image and the target mask, respectively. Further, the synthesizing system 21I cuts out the second target image from the second basic image.

Figure 83:
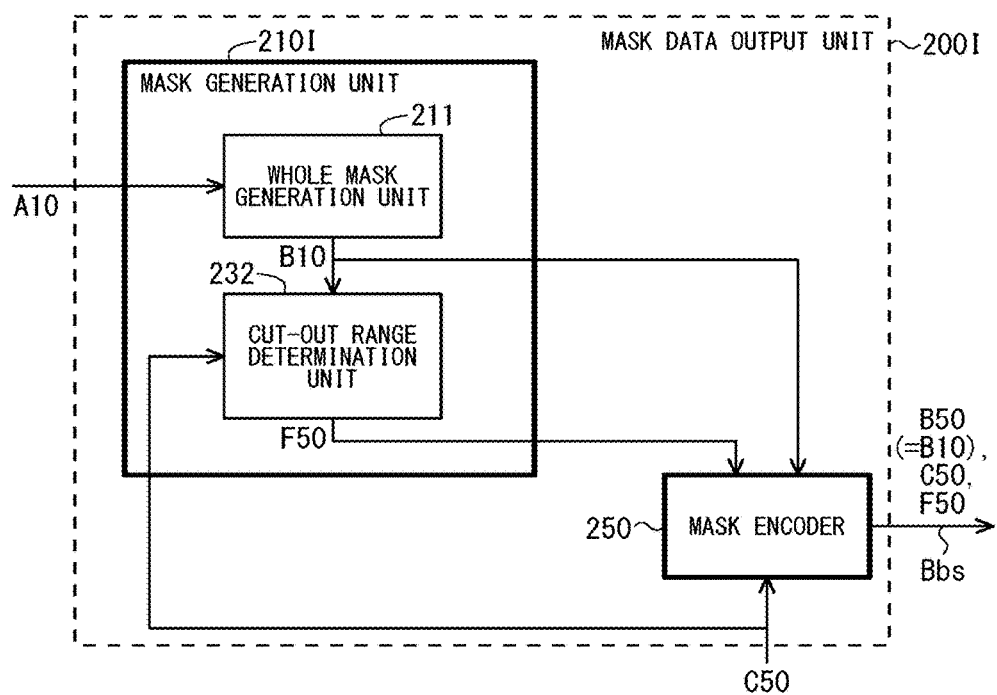
FIG. 83 is a block diagram showing a mask data output unit in accordance with the ninth preferred embodiment.

FIG. 83 shows an exemplary constitution of a mask data output unit 200I of the supply system 11I. Herein, it is assumed that the mask data output unit 200I is combined with the image data output unit 100 (see FIG. 3) of the first preferred embodiment, to constitute the supply system 11I. The mask data output unit 200I includes a mask generation unit 210I of the ninth preferred embodiment and the already-described mask encoder 250.

The mask generation unit 210I has a constitution in which the mask cut-out unit 233 is omitted from the mask generation unit 210G (see FIG. 72) of the seventh preferred embodiment. For this reason, the mask generation unit 210I supplies the whole mask data B10 to the mask encoder 250 as the basic mask data B50. The cut-out range determination unit 232 performs the cut-out range determination process and supplies the cut-out range specifying data F50 to the mask encoder 250, like in the seventh preferred embodiment.

Figure 84:
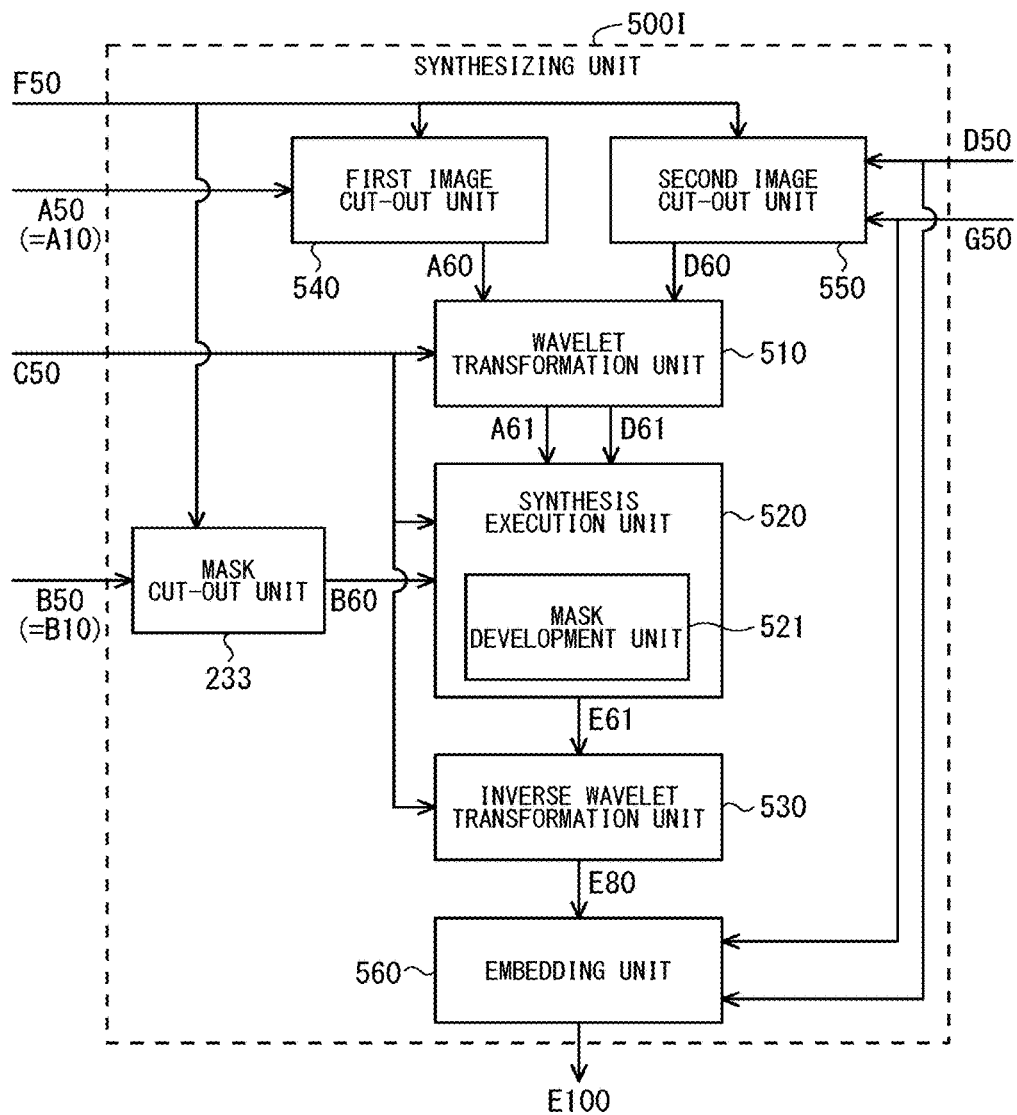
FIG. 84 is a block diagram showing a synthesizing unit in accordance with the ninth preferred embodiment.

Corresponding to the constitution of the supply system 11I, a synthesizing unit 500I (see FIG. 84) in the synthesizing system 21I has a constitution in which the mask cut-out unit 233 is added in the synthesizing unit 500G (see FIG. 74) of the seventh preferred embodiment. The mask cut-out unit 233 acquires the whole mask data B10 as the basic mask data B50 and acquires the cut-out range specifying data F50. Then, the mask cut-out unit 233 cuts out the target mask data B60 from the whole mask data B10 on the basis of the cut-out range specifying data F50, like in the seventh preferred embodiment. The target mask data B60 are supplied to the synthesis execution unit 520.

Figure 85:
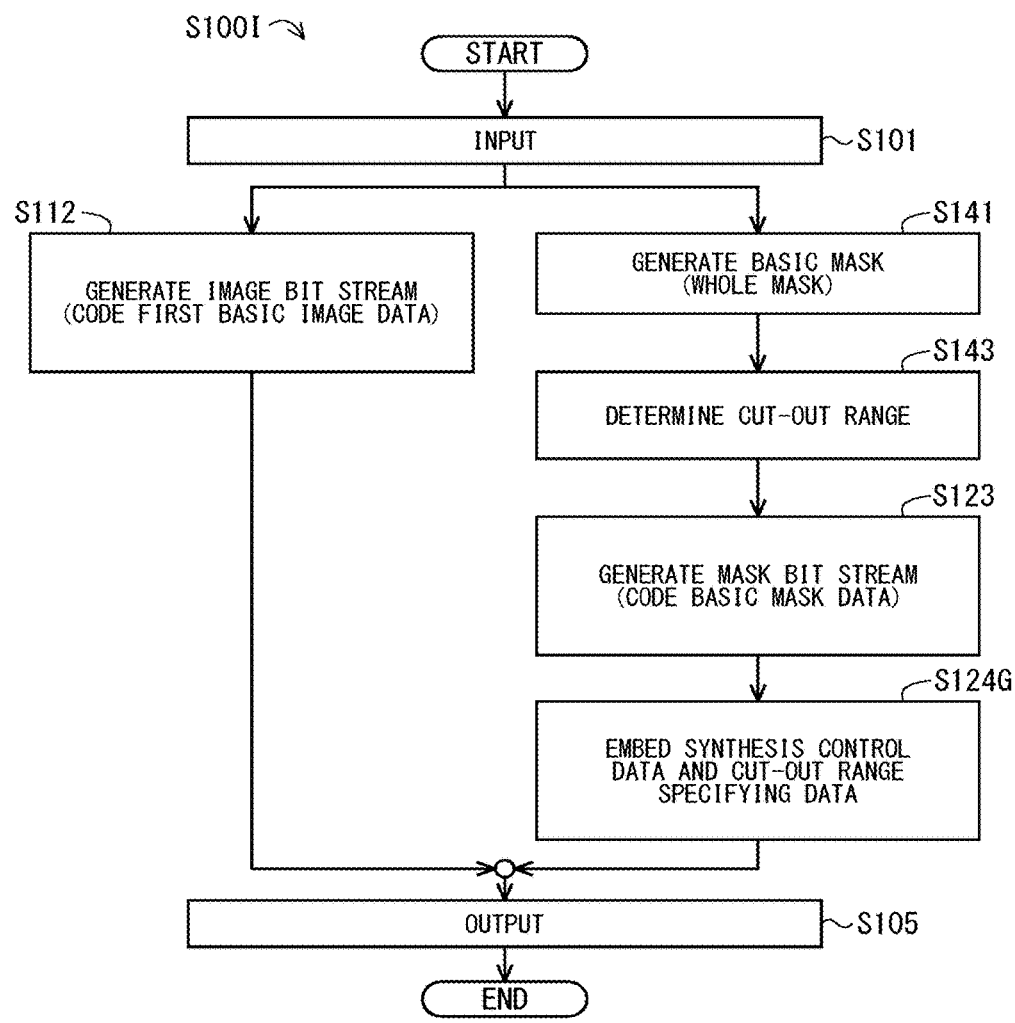
FIG. 85 is a flowchart showing an operation of a data supply system in accordance with the ninth preferred embodiment.

FIG. 85 is a flowchart showing an operation of the supply system 11I. In an operation flow S100I of FIG. 85, cut-out range determination step S143 is provided, instead of the cut-out step S142, in the operation flow S100G of FIG. 75. In the cut-out range determination step S143, the cut-out range determination unit 232 generates the cut-out range specifying data F50.

Figure 86:
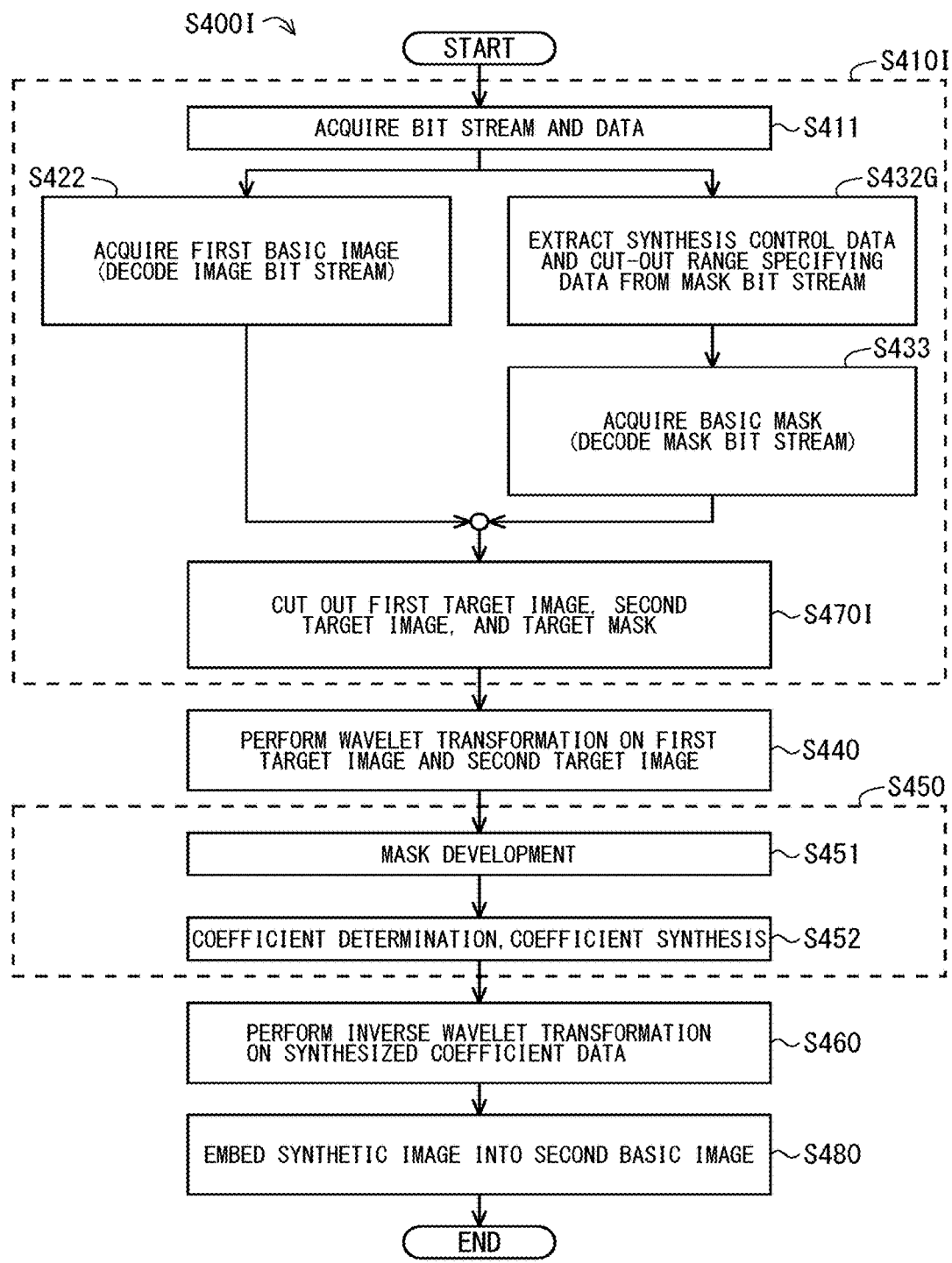
FIG. 86 is a flowchart showing an operation of an image synthesizing system in accordance with the ninth preferred embodiment.

FIG. 86 is a flowchart showing an operation of the synthesizing system 21I. In data acquisition step S410I of an operation flow S400I of FIG. 86, cut-out step S470I is provided, instead of the cut-out step S470, in the data acquisition step S410G of the operation flow S400G (see FIG. 76) in the seventh preferred embodiment.

In the cut-out step S470I, the first image cut-out unit 540 cuts out the first target image data A60 from the first basic image data A50, the second image cut-out unit 550 cuts out the second target image data D60 from the second basic image data D50, and the mask cut-out unit 233 cuts out the target mask data B60 from the basic mask data B50.

In the ninth preferred embodiment, it is possible to produce the same effects as those of the first preferred embodiment and the like.

In the ninth preferred embodiment, like in the seventh preferred embodiment, since the respective sizes of the first target image and the second target image are reduced, it is possible to reduce the computational load in the synthesizing system 21G. This contributes to speed-up of the image synthesis.

Further, in the ninth preferred embodiment, the cut-out of the target mask and the first target image is not performed in the supply system 11I. For this reason, it is possible to reduce the computational load in the supply system 11I.

Further, the ninth preferred embodiment can be combined with the second preferred embodiment and the like.

The Tenth Preferred Embodiment

Figure 87:
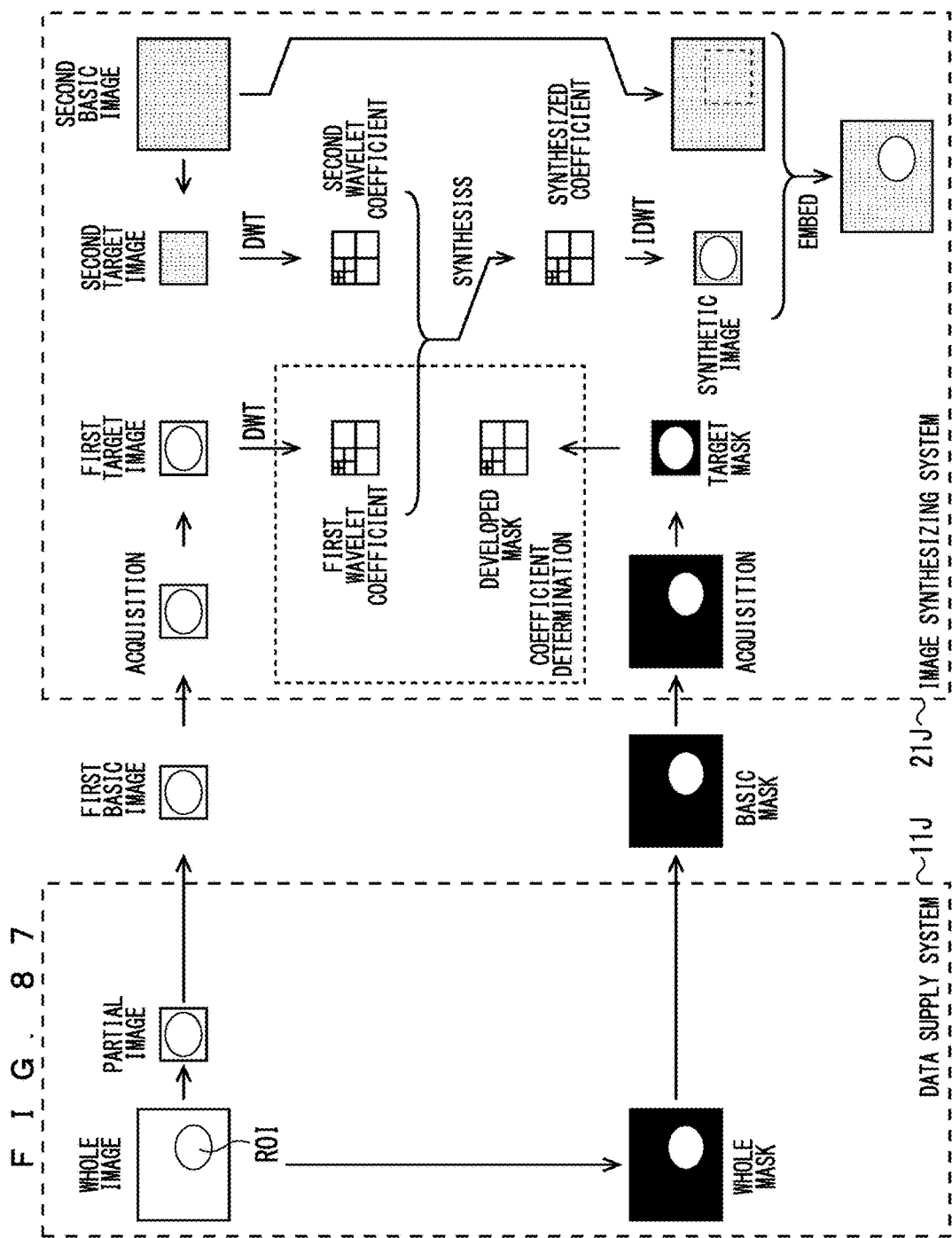
FIG. 87 is a conceptual diagram showing image synthesis in accordance with a tenth preferred embodiment.

FIG. 87 is a conceptual diagram showing the image synthesis in the supply system 11J and the synthesizing system 21J in accordance with the tenth preferred embodiment. Instead of the supply system 11 and the synthesizing system 21 in accordance with the first preferred embodiment, the supply system 11J and the synthesizing system 21J can be applied to the image processing system 1, 10, 20, or the like. As can be seen from the comparison of FIG. 87 with FIG. 55, in the tenth preferred embodiment, the synthesizing system 21J performs the cut-out from the whole mask and the supply system 11J performs the cut-out from the whole image.

In other words, like in the eighth preferred embodiment (see FIG. 77), the supply system 11J cuts out th first target image from the whole image and outputs the first target image data A60 as the first basic image data A50. Further, like in the ninth preferred embodiment (see FIG. 82), the supply system 11J generates and outputs the basic mask data B50 for the range of the whole image.

On the other hand, like in the eighth preferred embodiment (see FIG. 77), the synthesizing system 21J uses the whole range of the first basic image which is acquired, as the first target image. Further, like in the ninth preferred embodiment (see FIG. 82), the synthesizing system 21J cuts out a range specified by the cut-out range specifying data F50, from the acquired basic mask, and uses the cut-out portion as the target mask.

Figure 88:
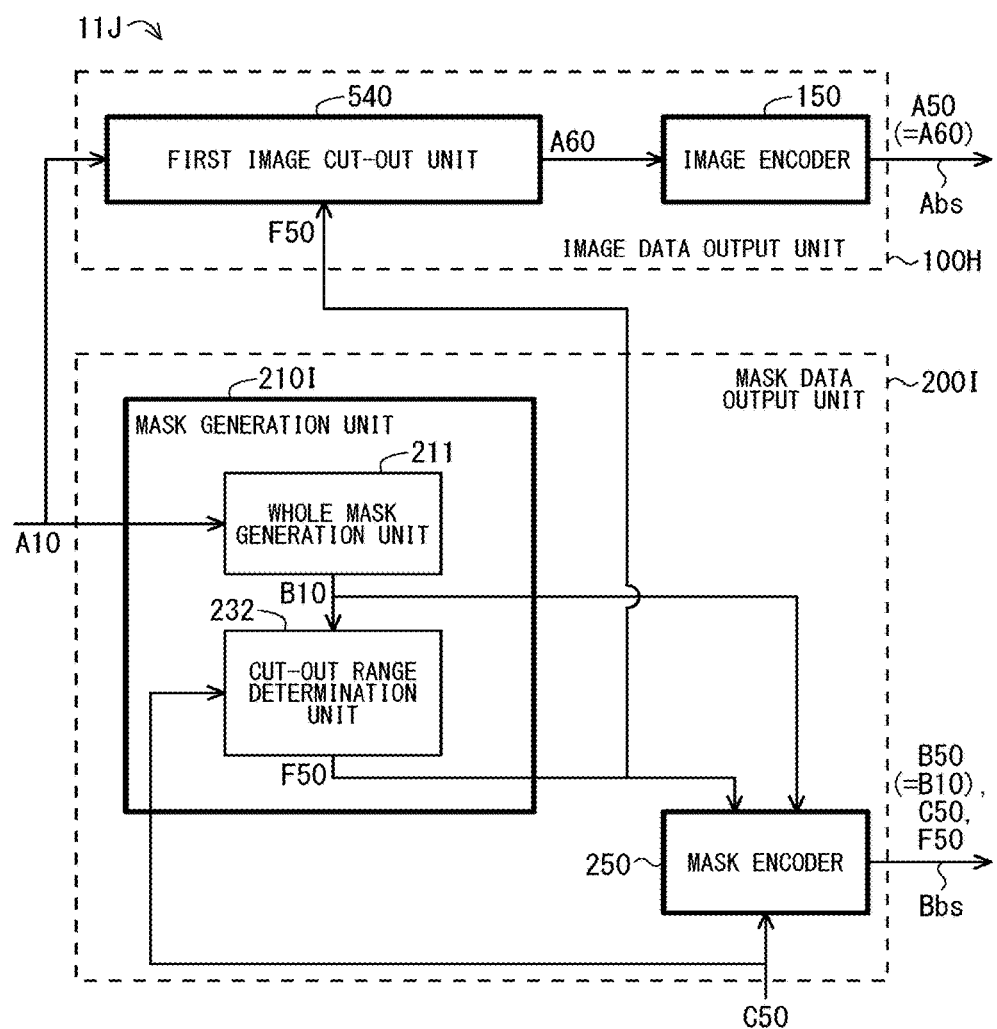
FIG. 88 is a block diagram showing a data supply system in accordance with the tenth preferred embodiment.

FIG. 88 shows an exemplary constitution of the supply system 11J. As shown in FIG. 88, the supply system 11J is constituted of the combination of the image data output unit 100H (see FIG. 78) of the eighth preferred embodiment and the mask data output unit 200I (see FIG. 83) of the ninth preferred embodiment.

Figure 89:
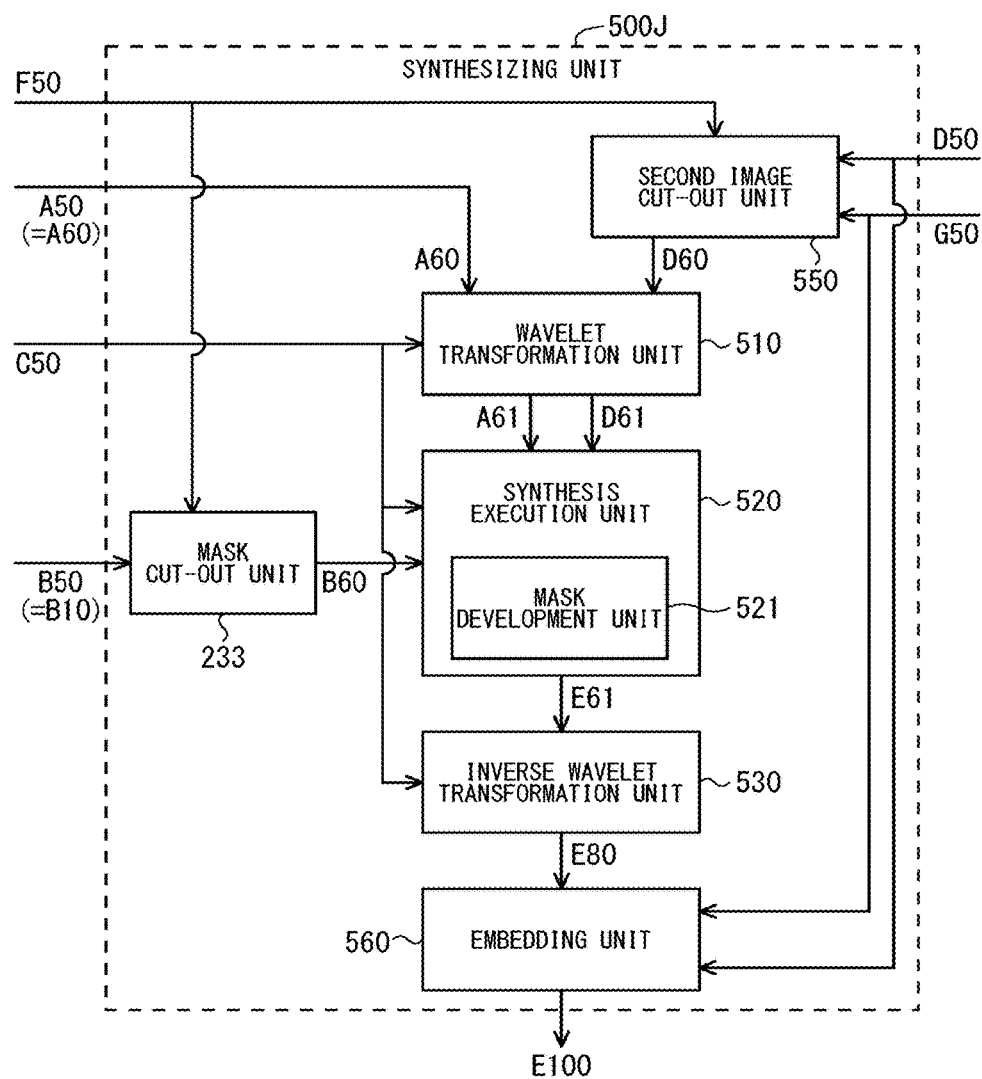
FIG. 89 is a block diagram showing a synthesizing unit in accordance with the tenth preferred embodiment.

FIG. 89 shows an exemplary constitution of a synthesizing unit 500J of the synthesizing system 21J. Herein, it is assumed that the synthesizing unit 500J is combined with the image decoder 300 and the mask decoder 400G (see FIG. 73) of the seventh preferred embodiment, to constitute the synthesizing system 21J. As shown in FIG. 89, the synthesizing unit 500J has a constitution in which the first image cut-out unit 540 is omitted from the synthesizing unit 500I (see FIG. 84) of the ninth preferred embodiment.

Figure 90:
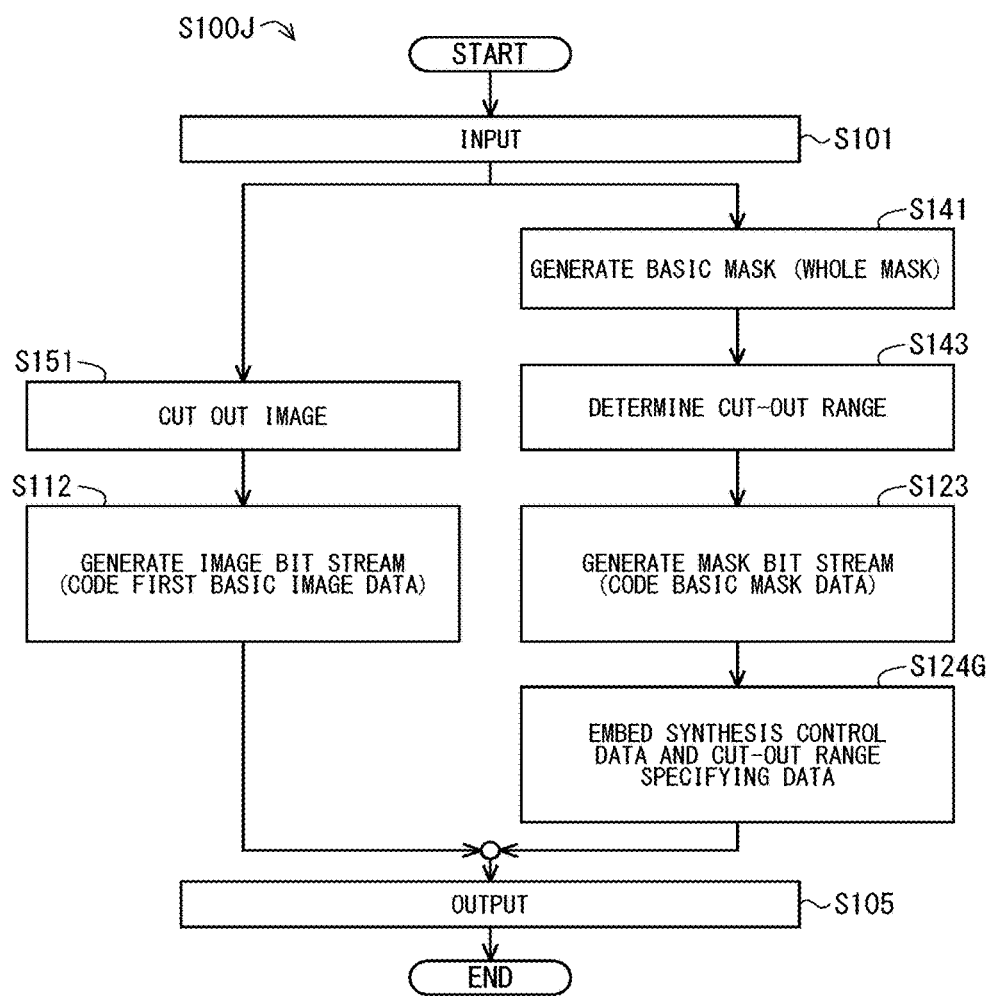
FIG. 90 is a flowchart showing an operation of a data supply system in accordance with the tenth preferred embodiment.

FIG. 90 is a flowchart showing an operation of the supply system 11J. In an operation flow S100J of FIG. 90, the cut-out step S151 (see FIG. 80) of the eighth preferred embodiment is added in the operation flow S100I (see FIG. 85) of the ninth preferred embodiment. In other words, in the cut-out step S151, the first image cut-out unit 540 cuts out the first target image from the whole image, as the first basic image, on the basis of the cut-out range specifying data F50 generated in Step S143.

Figure 91:
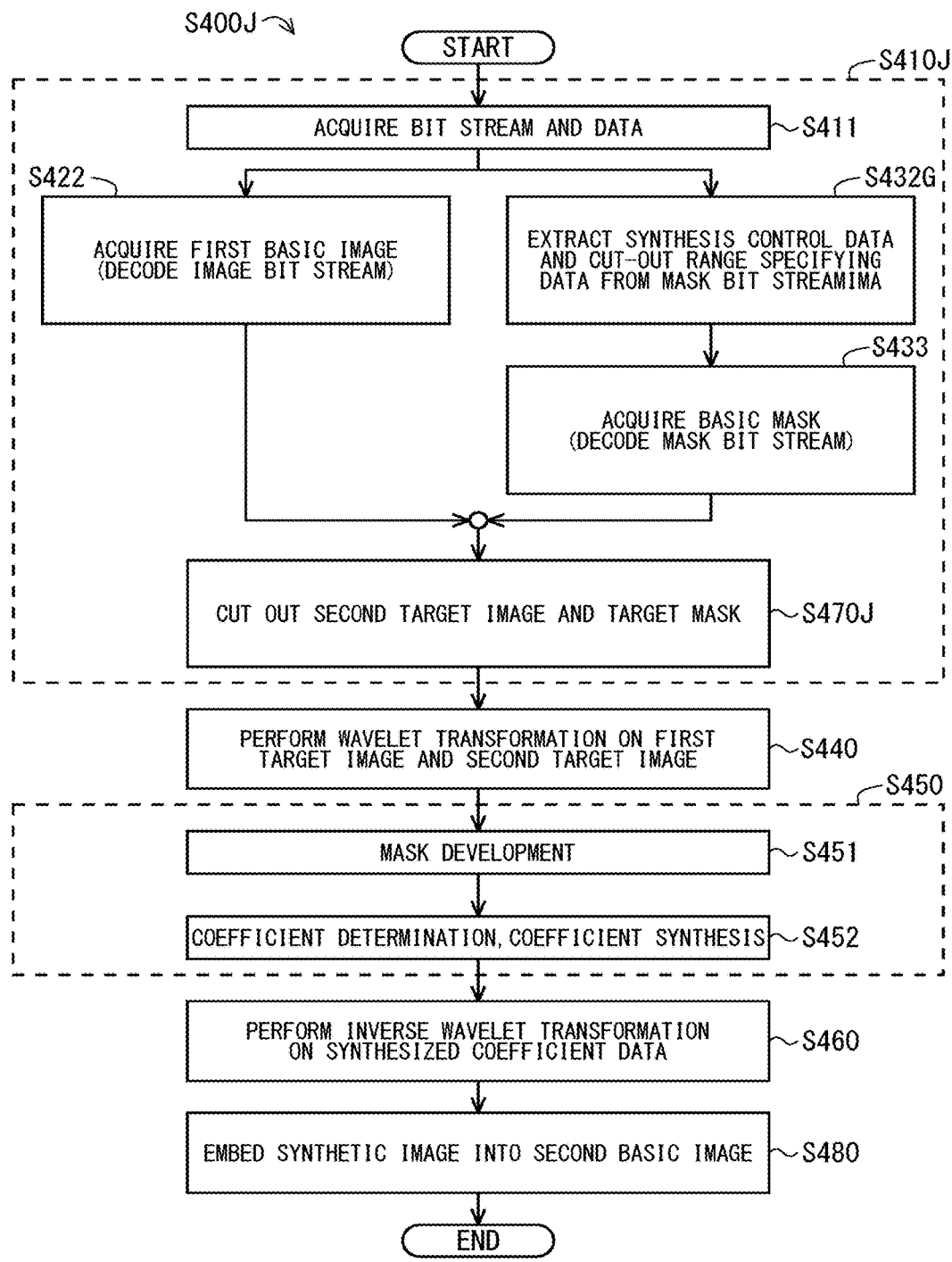
FIG. 91 is a flowchart showing an operation of an image synthesizing system in accordance with the tenth preferred embodiment.

FIG. 91 is a flowchart showing an operation of the synthesizing system 21J. In data acquisition step S410J of an operation flow S4007 of FIG. 91, cut-out step S470J is provided, instead of the cut-out step S470I, in the data acquisition step S410I of the operation flow S400I (see FIG. 86) in the ninth preferred embodiment.

In the cut-out step S470J, the second image cut-out unit 550 cuts out the second target image data D60 from the second basic image data D50, and the mask cut-out unit 233 cuts out the target mask data B60 from the basic mask data B50.

In the tenth preferred embodiment, it is possible to produce the same effects as those of the first preferred embodiment and the like.

Particularly, in the tenth preferred embodiment, like in the seventh preferred embodiment, since the respective sizes of the first target image and the second target image are reduced, it is possible to reduce the computational load in the synthesizing system 21J. This contributes to speed-up of the image synthesis.

Further, like in the eighth preferred embodiment, it is possible to reduce the data size of the first basic image data A50. Therefore, when the image bit stream Abs is transferred via wired or wireless communication, the amount of communication can be reduced and this contributes to the immediacy of transfer.

Furthermore, the tenth preferred embodiment can be combined with the second preferred embodiment and the like.

The Eleventh Preferred Embodiment

Figure 92:
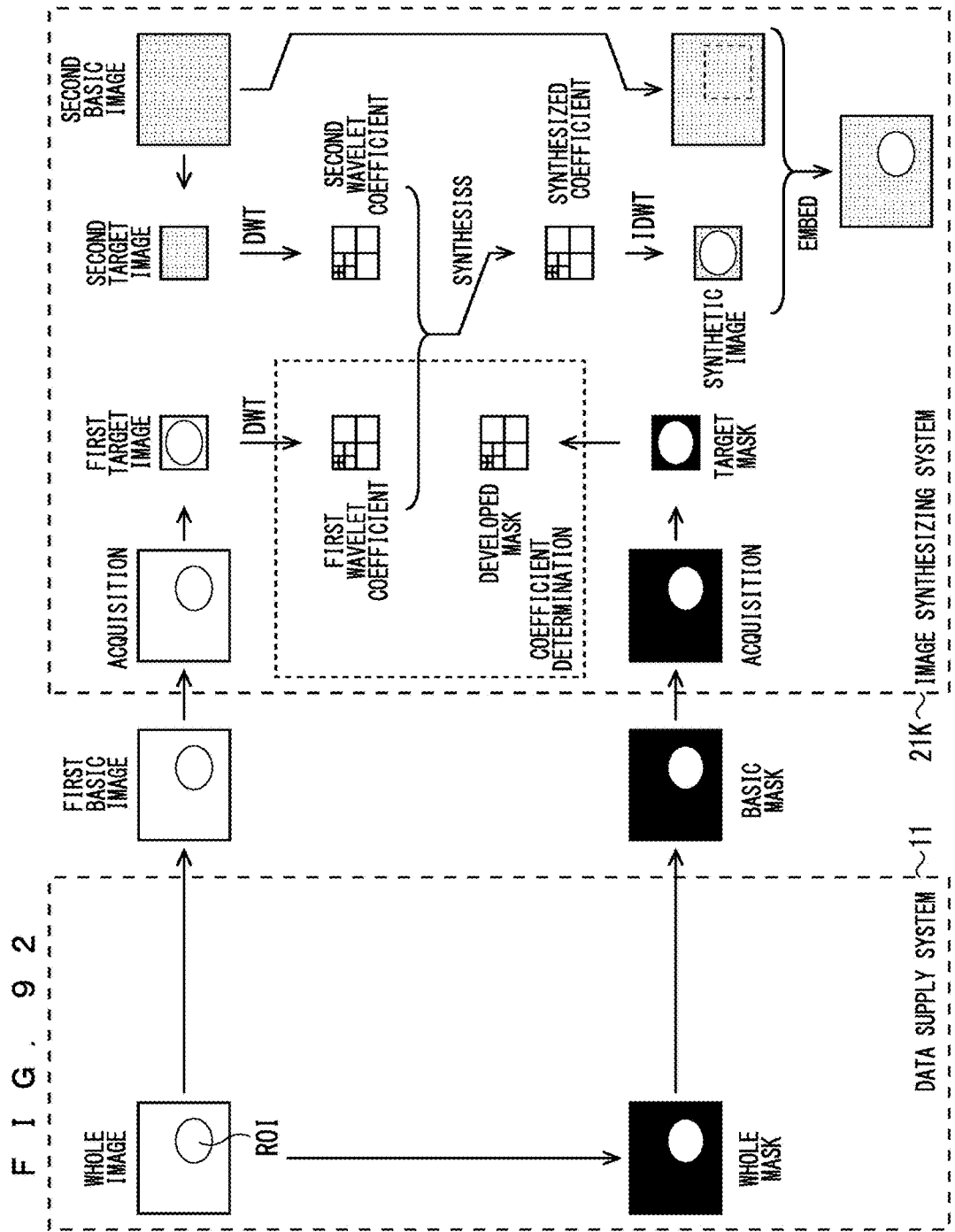
FIG. 92 is a conceptual diagram showing image synthesis in accordance with an eleventh preferred embodiment.

In the seventh to tenth preferred embodiments, it is assumed that the cut-out range determination process is performed in the supply systems 11G to 11J. In the eleventh preferred embodiment, a case will be described, where the cut-out range determination process is performed in the synthesizing system. FIG. 92 is a conceptual diagram showing the image synthesis in accordance with the eleventh preferred embodiment. Herein, it is assumed that a synthesizing system 21K of the eleventh preferred embodiment is combined with the supply system 11 of the first preferred embodiment. Instead of the synthesizing system 21 in accordance with the first preferred embodiment, the synthesizing system 21K can be applied to the image processing system 1, 20, or the like.

FIG. 93 shows an exemplary constitution of a synthesizing unit 500K of the synthesizing system 21K. Herein, it is assumed that the synthesizing unit 500K is combined with the image decoder 300 and the mask decoder 400G (see FIG. 73) of the seventh preferred embodiment, to constitute the synthesizing system 21K. As shown in FIG. 93, the synthesizing unit 500K has a constitution in which the already-described cut-out range determination unit 232 is added in the synthesizing unit 500I (see FIG. 84) of the ninth preferred embodiment.

In the synthesizing unit 500K, the cut-out range determination unit 232 performs the cut-out range determination process on the basis of the whole mask data B10 (supplied to the synthesizing system 21K as the basic mask data B50) and the synthesis control data C50, to thereby generate the cut-out range specifying data F50. The cut-out range specifying data F50 are supplied to the first image cut-out unit 540, the second image cut-out unit 550, and the mask cut-out unit 233.

Figure 94:
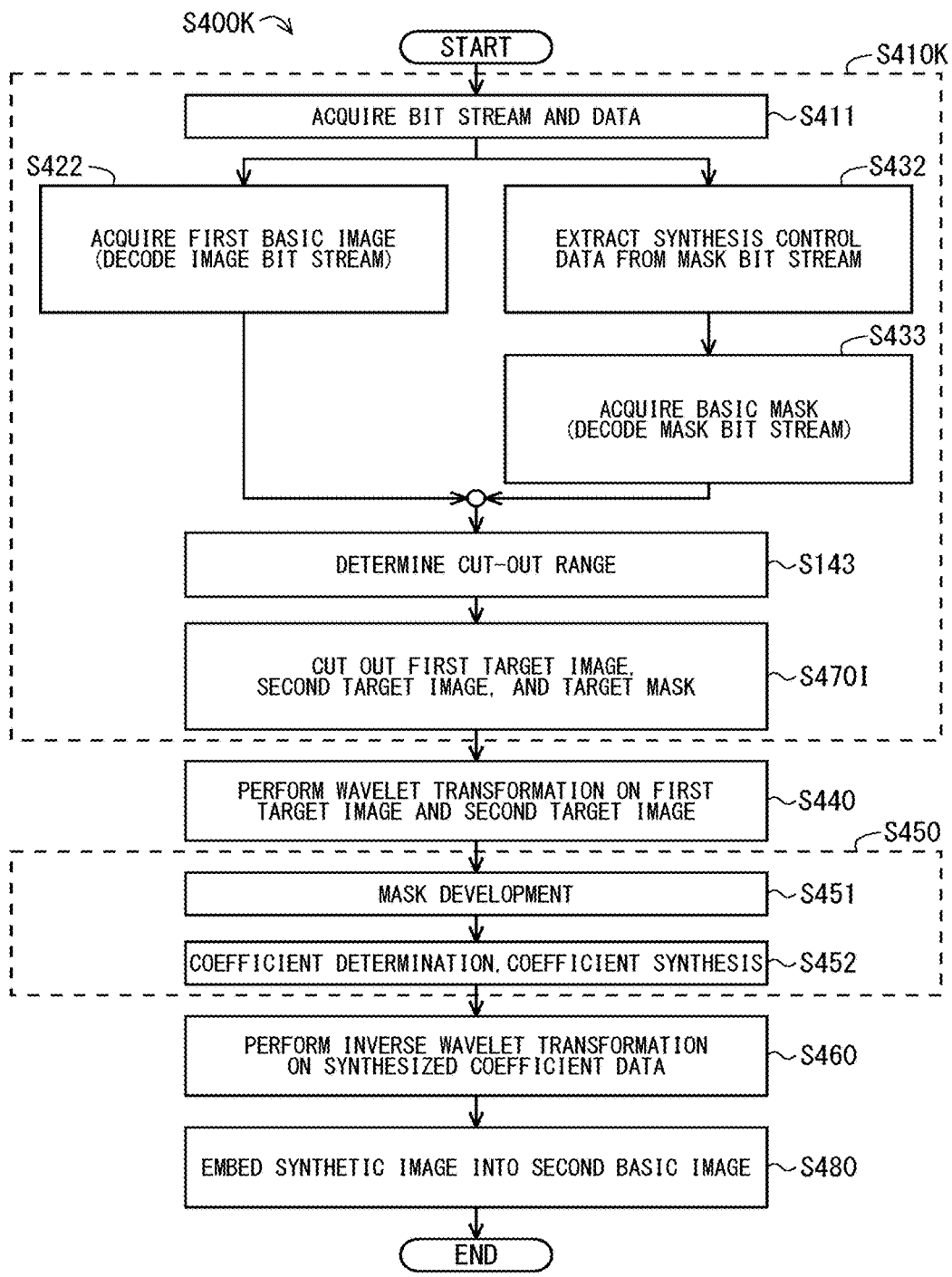
FIG. 94 is a flowchart showing an operation of an image synthesizing system in accordance with the eleventh preferred embodiment.

FIG. 94 is a flowchart showing an operation of the synthesizing system 21K. An operation flow S400K shown in FIG. 94 is basically the same as the operation flow S400I (see FIG. 86) in accordance with the ninth preferred embodiment but has the following different points.

In data acquisition step S410K of the operation flow S400K of FIG. 94, the already-described data extraction step S432 for extracting the synthesis control data C50 from the mask bit stream Bbs is provided, instead of Step S432G. This is because the cut-out range specifying data F50 are generated inside the synthesizing system 21K and therefore the cut-out range specifying data F50 are not embedded in the mask bit stream Bbs.

Further, in the data acquisition step S410K, the already-described cut-out range determination step S143 is added. In this step S143, the cut-out range determination unit 232 performs the cut-out range determination process, to thereby generate the cut-out range specifying data F50.

In the eleventh preferred embodiment, it is possible to produce the same effects as those of the ninth preferred embodiment and the like. Particularly, unlike in the ninth preferred embodiment, the cut-out range determination process is performed in the synthesizing system 21K. For this reason, it is possible to avoid an increase in the computational load in the supply system 11.

Further, the eleventh preferred embodiment can be combined with the second preferred embodiment and the like.

The Twelfth Preferred Embodiment

Figure 95:
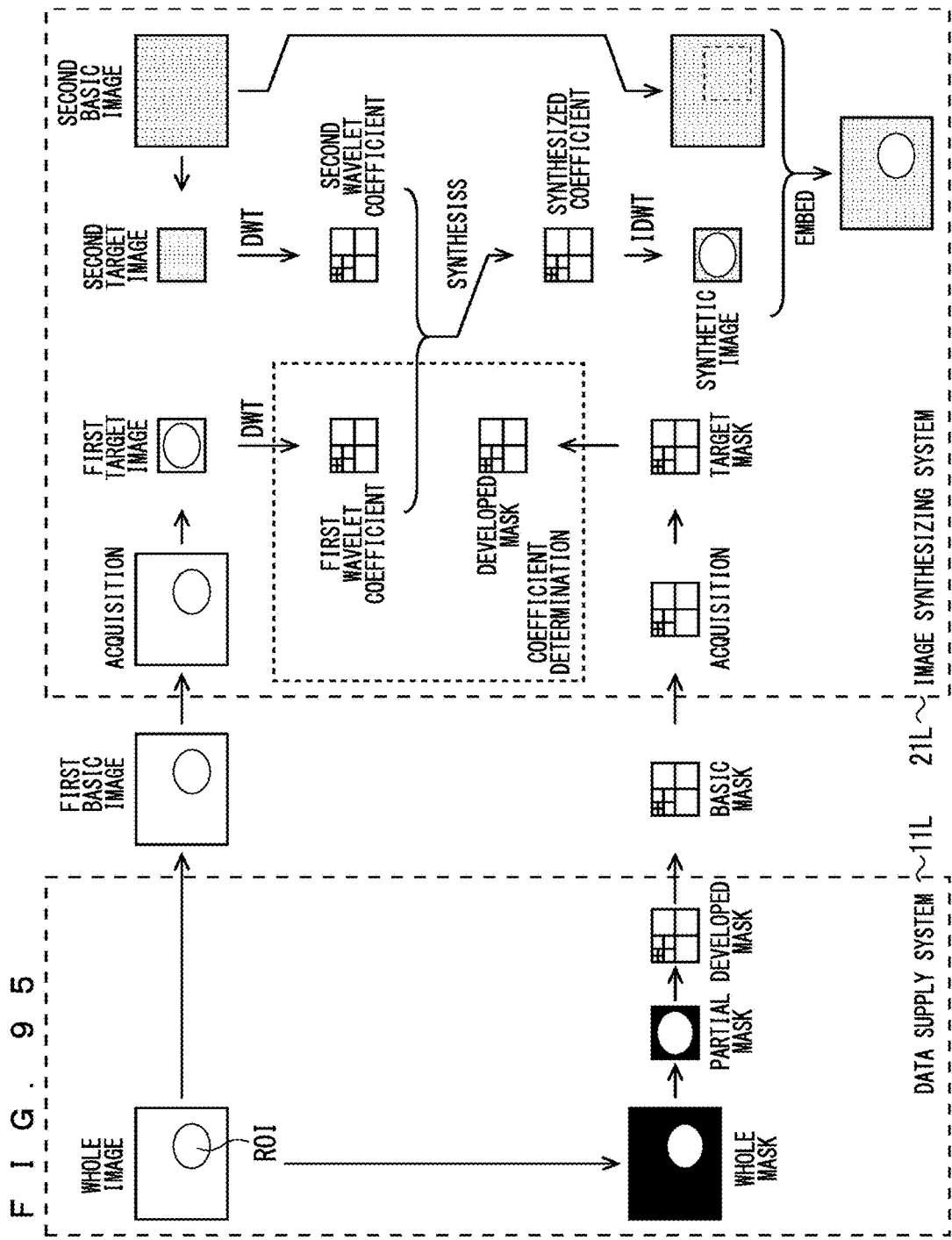
FIG. 95 is a conceptual diagram showing image synthesis in accordance with a twelfth preferred embodiment.

The seventh to eleventh preferred embodiments can be combined with the second preferred embodiment and the like, as described above. In the twelfth preferred embodiment, an exemplary combination of the seventh preferred embodiment and the sixth preferred embodiment, among these combinations, will be described. FIG. 95 is a conceptual diagram showing the image synthesis in the supply system 11L and the synthesizing system 21L in accordance with the twelfth preferred embodiment. Instead of the supply system 11 and the synthesizing system 21 in accordance with the first preferred embodiment, the supply system 11L and the synthesizing system 21L can be applied to the image processing system 1, 10, 20, or the like. As can be seen from the comparison of FIG. 95 with FIGS. 52 and 55, in the twelfth preferred embodiment, the supply system 11L performs the cut-out and development of the mask.

FIG. 96 shows an exemplary constitution of a mask data output unit 200L of the supply system 11L. Herein, it is assumed that the mask data output unit 200L is combined with the already-described image data output unit 100, to constitute the supply system 11L.

As shown in FIG. 96, the mask data output unit 200L is constituted of a mask generation unit 210L and the already-described mask encoder 250. The mask generation unit 210L includes an original mask generation unit 220L and the mask development unit 521, like the mask generation unit 210F (see FIG. 50) of the sixth preferred embodiment.

The original mask generation unit 220L of the twelfth preferred embodiment has the same constitution as that of the mask generation unit 210G (see FIG. 72) of the seventh preferred embodiment. Specifically, the original mask generation unit 220L includes the whole mask generation unit 211, the cut-out range determination unit 232, and the mask cut-out unit 233. The original mask generation unit 220L thereby generates the original mask for the range of the first target image on the basis of the whole image.

Then, the mask development unit 521 performs the mask development process on the original mask, to thereby generate the developed mask for the range of the first target image. The generated developed mask data B21 are outputted from the mask data output unit 200L as the basic mask data B50 in the mask bit stream Bbs.

Herein, the mask cut-out unit 233 cuts out data within the cut-out range 83 in the whole mask data B10, for the basic mask data, like in the seventh preferred embodiment. Unlike in the seventh preferred embodiment, however, since the cut-out data are used for the mask development process as described above, the cut-out data does not become the basic mask data B50.

FIG. 97 shows an exemplary constitution of a synthesizing unit 500L of the synthesizing system 21L. Herein, it is assumed that the synthesizing unit 500L is combined with the image decoder 300 and the mask decoder 400G (see FIG. 73) of the seventh preferred embodiment, to constitute the synthesizing system 21L. The synthesizing unit 500L is basically the same as the synthesizing unit 500G (see FIG. 74) of the seventh preferred embodiment but has the following different points. In the synthesizing unit 500L, the synthesis execution unit 520F not having the mask development unit 521 (see FIG. 51 of the sixth preferred embodiment) is provided, instead of the synthesis execution unit 520.

Figure 98:
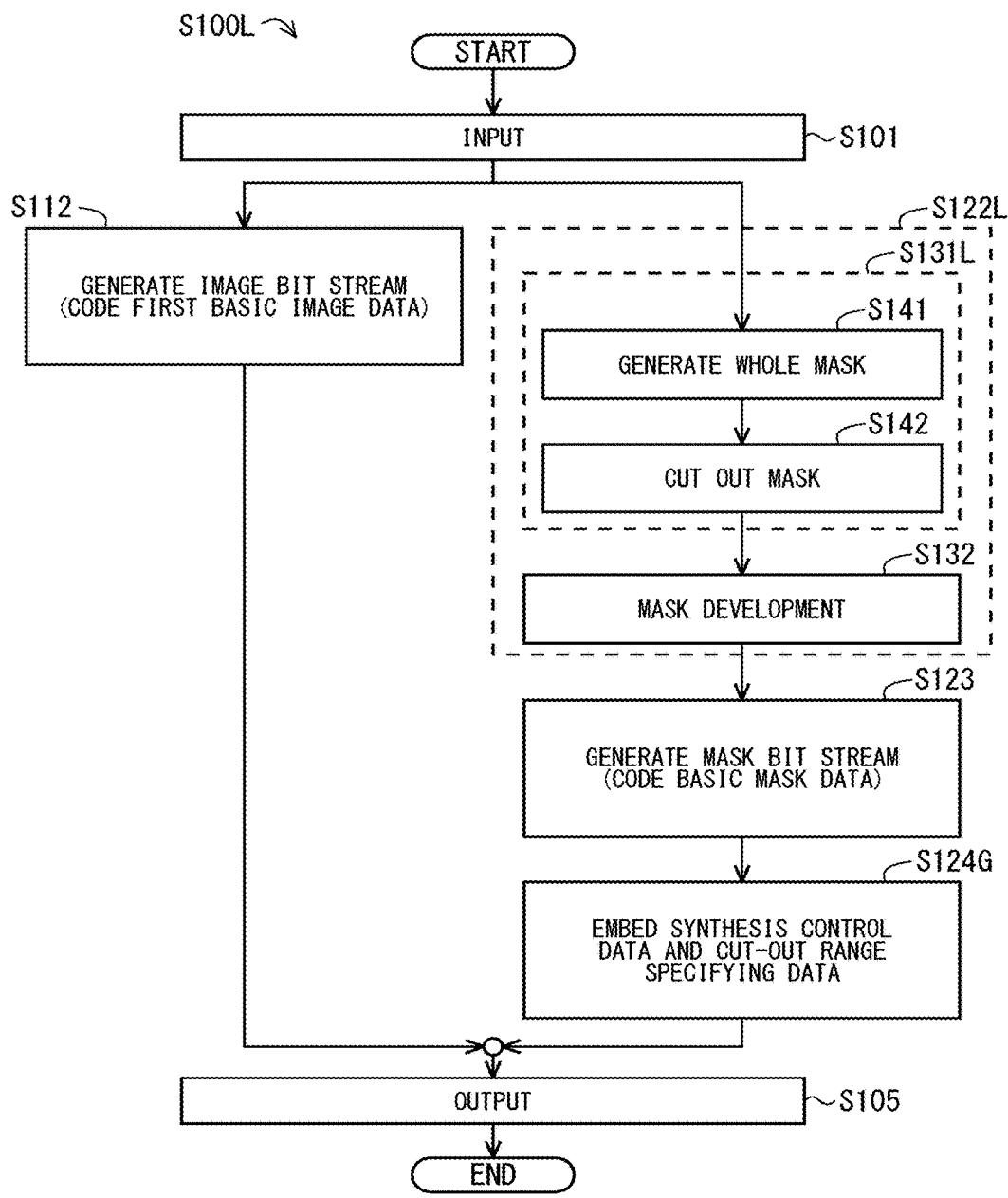
FIG. 98 is a flowchart showing an operation of a data supply system in accordance with the twelfth preferred embodiment.

FIG. 98 is a flowchart showing an operation of the supply system 11L. An operation flow S100L of FIG. 98 is basically the same as the operation flow S100G (see FIG. 75) of the seventh preferred embodiment but has the following different points. In the operation flow S100L, basic mask generation step S122L is provided, instead of the basic mask generation step S122G.

The basic mask generation step S122L is broadly divided into original mask generation step S131L and the mask development step S132, like the basic mask generation step S122F (see FIG. 53) of the sixth preferred embodiment. The original mask generation step S131L of the twelfth preferred embodiment is constituted of the whole mask generation step S141 and the mask cut-out step S142 (see FIG. 75) of the seventh preferred embodiment. The mask development step S132 has been described above.

Figure 99:
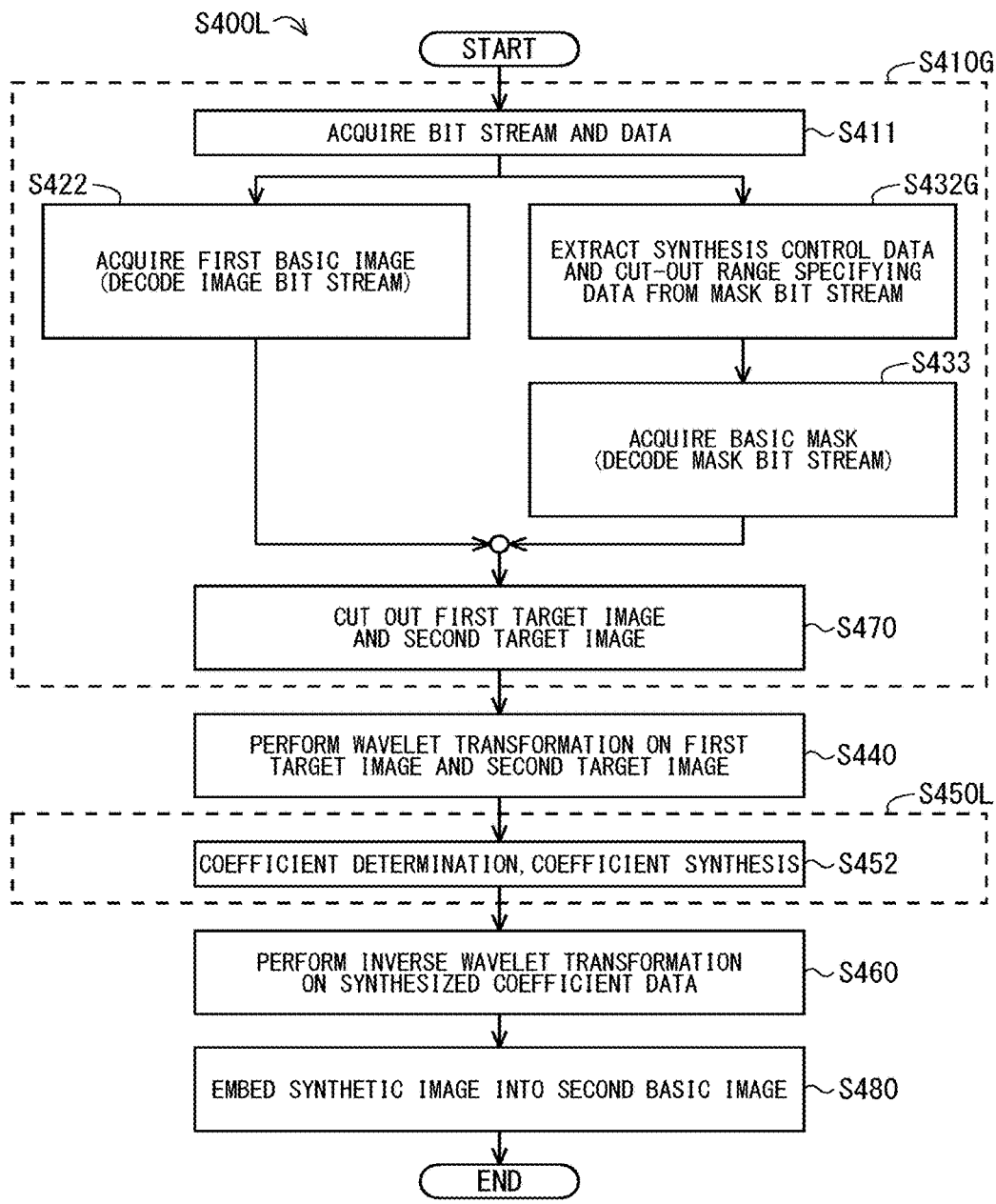
FIG. 99 is a flowchart showing an operation of an image synthesizing system in accordance with the twelfth preferred embodiment.

FIG. 99 is a flowchart showing an operation of the synthesizing system 21L. An operation flow S400L of FIG. 99 is basically the same as the operation flow S400G (see FIG. 76) of the seventh preferred embodiment but has the following different points. In operation flow S400L, synthesis execution step S450L is provided instead of the synthesis execution step S450. In the synthesis execution step S450L, the mask development step S451 is omitted from the synthesis execution step S450.

In the twelfth preferred embodiment, it is possible to produce the same effects as those of the sixth and seventh preferred embodiments. Further, though the exemplary combination of the seventh and sixth preferred embodiments has been described in the twelfth preferred embodiment, the sixth preferred embodiment can be combined with any other preferred embodiment.

Variation of The Seventh to Twelfth Preferred Embodiments

In the seventh to twelfth preferred embodiments, it is assumed that the second basic image is larger than the first target image and than the second target image. The second basic image itself, however, may have the same size as that of the first target image and that of the second target image. In this case, the second image cut-out unit 550 may be omitted. By providing the second image cut-out unit 550, however, it is possible to respond to various sizes of the second basic image and increase the convenience.

The Thirteenth Preferred Embodiment

As described above, the lowest-frequency band component LL1 at the decomposition level 1 can provide an image obtained by reducing the original image with a reduction ratio of 1/2 (in other words, an image having a size that is 1/4 the original image). In the method of recursively decomposing the lowest-frequency band component LL, the band component LL2 at the decomposition level 2 can provide an image obtained by reducing the image provided by the band component LL1 before the decomposition, with a reduction ratio of 1/2, and therefore can provide an image obtained by reducing the original image with a reduction ratio of $1/4\ (=2^2)$.

Figure 100:
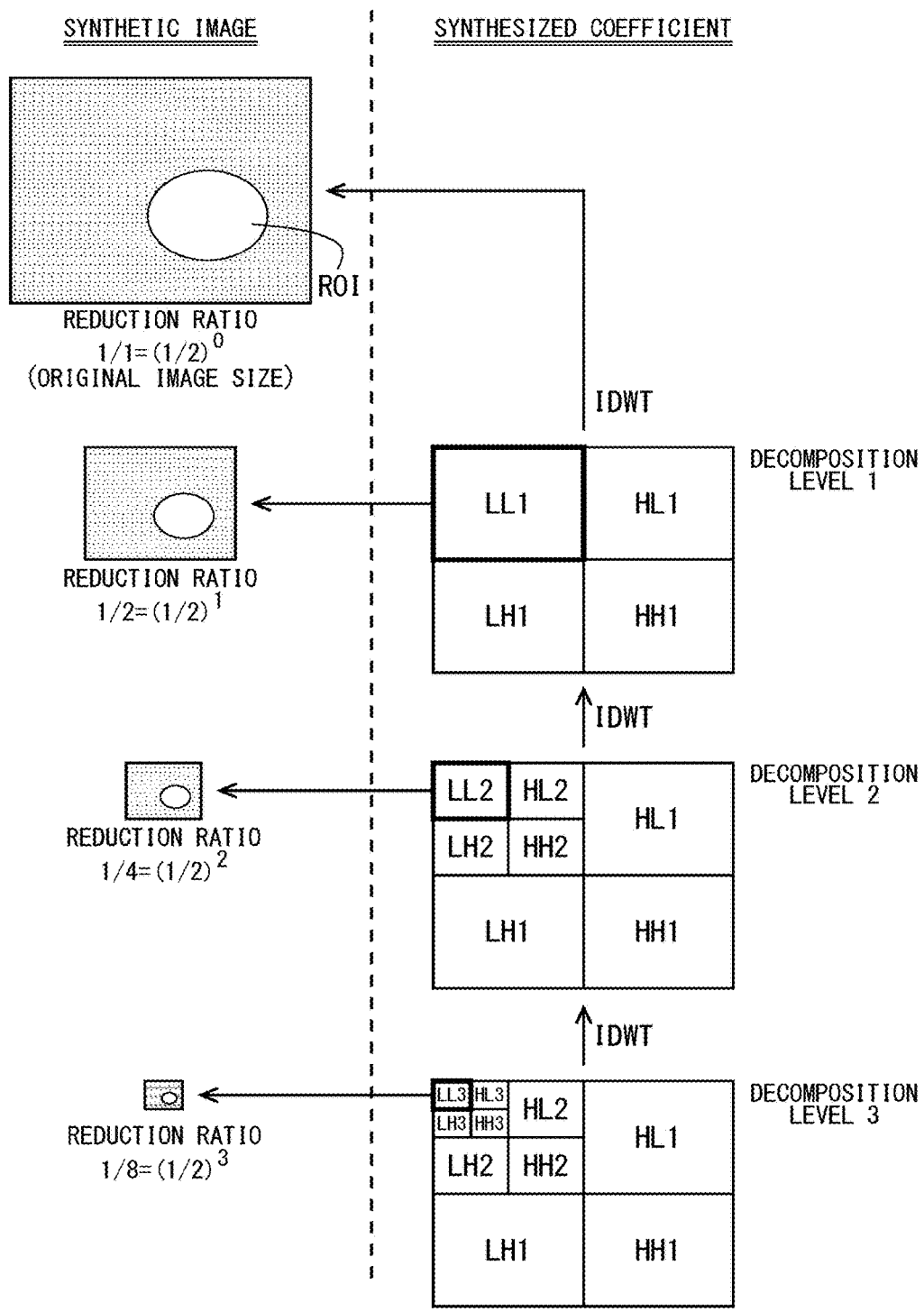
FIG. 100 is a conceptual diagram showing image synthesis in accordance with a thirteenth preferred embodiment.

In generalized notation, the lowest-frequency band component LLm at the decomposition level m can provide an image obtained by reducing the original image with a reduction ratio of $1/2^m$ (see FIG. 100). Further, when the original image without being subjected to the wavelet transformation is made correspond to the decomposition level 0, as described above, m is an integer not smaller than 0.

Conversely, the image size in a case where the original image is reduced with the reduction ratio of $1/2^m$ is equal to the image size provided by the lowest-frequency band component LLm in a case where the original image is decomposed to the decomposition level m. For this reason, it can be expressed that the size of an image obtained by reduction with the ratio of $1/2^m$ is an image size which corresponds to the decomposition level m. Further, the expression on the image size can be used in a case where the reduced image is compared with any other image having the same image size as that of the original image.

Figure 101:
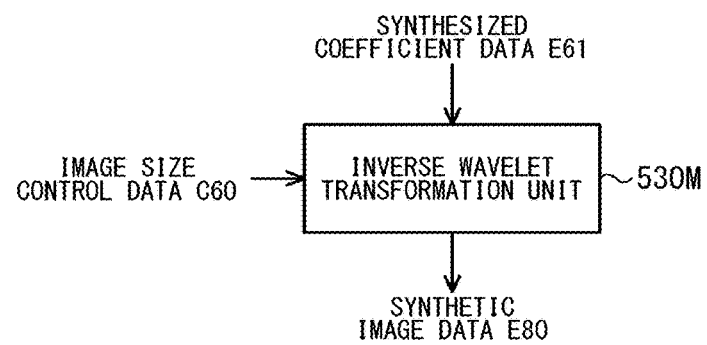
FIG. 101 is a block diagram showing an inverse wavelet transformation unit in accordance with the thirteenth preferred embodiment.

In consideration of the above point, as shown in the conceptual diagram of FIG. 100, it is possible to control the image size of a synthetic image by the number of executions of the inverse wavelet transformation. FIG. 101 is a block diagram showing an inverse wavelet transformation unit 530M in accordance with the thirteenth preferred embodiment. Instead of the inverse wavelet transformation unit 530 (see FIG. 13 or the like), the inverse wavelet transformation unit 530M can be applied to the first to sixth preferred embodiments.

The inverse wavelet transformation unit 530M performs, in the inverse wavelet transformation process step (see Step S460 of FIG. 25), the inverse wavelet transformation on the synthesized coefficient data E61 until the decomposition level becomes a predetermined end level and sets the lowest-frequency band component LL in the data after being subjected to the inverse wavelet transformation to the synthetic image data E80. The end level of the inverse wavelet transformation, in other words, the image size of the synthetic image is instructed by image size control data C60 to the inverse wavelet transformation unit 530M. Herein, it is assumed that the image size control data C60 are inputted to the synthesizing system by a user of the synthesizing system. The image size control data C60, however, may be supplied from the supply system, like the synthesis control data C50 (see FIGS. 3, 38, 45, and 49).

The image size control data C60 give, for example, a numerical value which directly indicates the end level of the inverse wavelet transformation. Alternatively, the image size control data C60 may be data from which the end level of the inverse wavelet transformation can be derived. As exemplary data from which the end level of the inverse wavelet transformation can be derived, used is a numerical value indicating the number of executions of the inverse wavelet transformation, a numerical value indicating the reduction ratio to the original image size, or the like.

The end level of the inverse wavelet transformation may be set in a range not smaller than the decomposition level 0 and not larger than the decomposition level of the synthesized coefficient data E61 (i.e., the decomposition level specified by the synthesis control data C50). When the end level of the inverse wavelet transformation is set to the decomposition level 0, a synthetic image having the original image size can be obtained, like in the first to sixth preferred embodiments. In other words, the first to sixth preferred embodiments are each an exemplary case where the end level of the inverse wavelet transformation is fixed to 0, and the present thirteenth preferred embodiment is an exemplary case where the end level of the inverse wavelet transformation is variable. On the other hand, when the end level of the inverse wavelet transformation is set to the same level as the decomposition level of the synthesized coefficient data E61, the inverse wavelet transformation is not performed and the lowest-frequency band component LL in the synthesized coefficient data E61 is extracted as the synthetic image data E80.

In the thirteenth preferred embodiment, it is possible to control the image size of a synthetic image and obtain a synthetic image having not only the same size as that of the original image but also a size smaller than that of the original image.

The Fourteenth Preferred Embodiment

Figure 102:
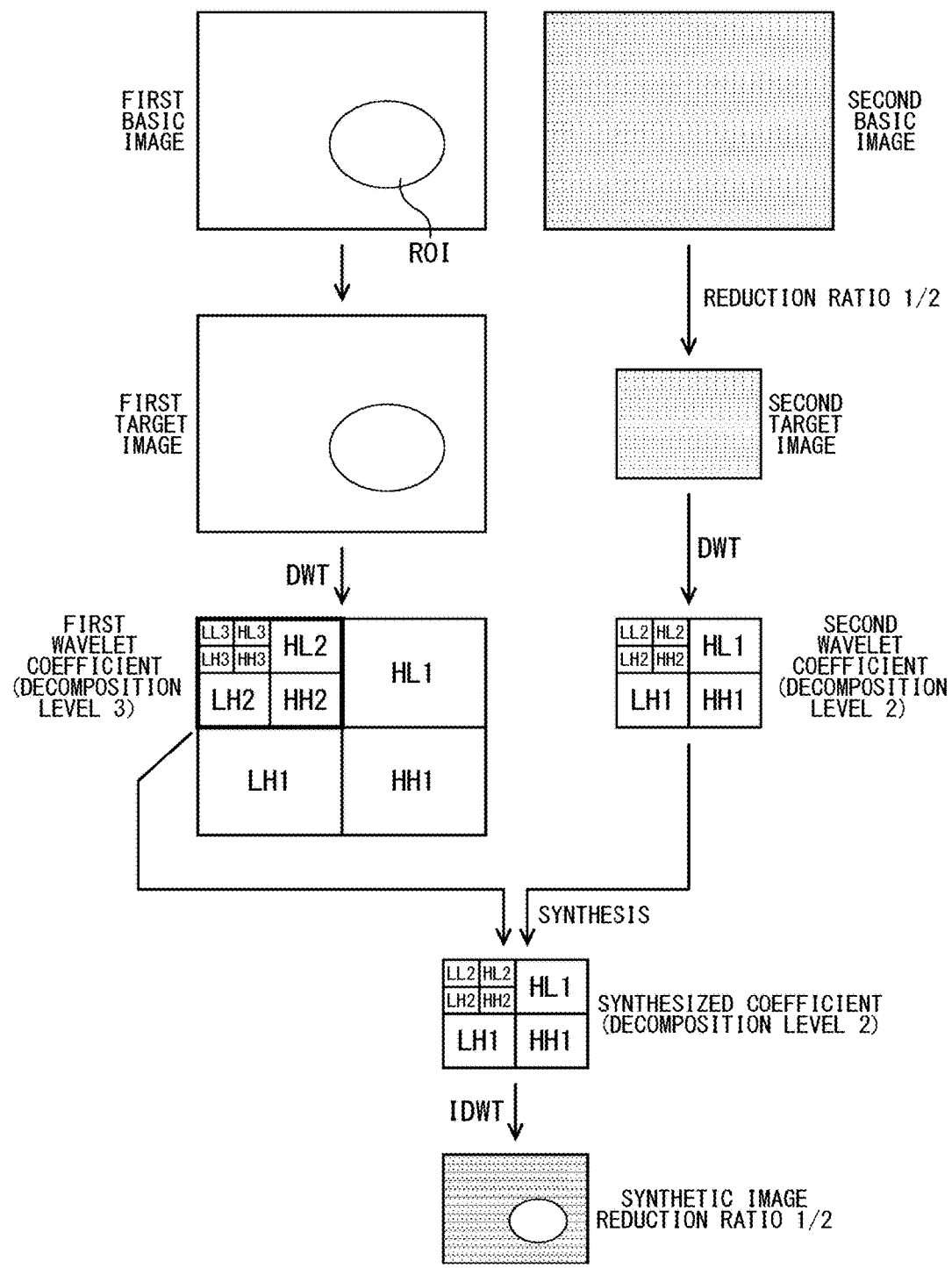
FIGS. 102 to 104 are conceptual diagrams each showing image synthesis in accordance with a fourteenth preferred embodiment.

The fourteenth preferred embodiment shows an exemplary case where the image size of the synthetic image is controlled by a method different from that in the thirteenth preferred embodiment. FIG. 102 is a conceptual diagram showing image synthesis in accordance with the fourteenth preferred embodiment. In FIG. 102, the first basic image itself is used as the first target image, and first wavelet coefficient data are generated from the first target image. Herein, an exemplary case will be shown where the decomposition level of the first wavelet coefficient data is 3.

On the other hand, the whole of the second basic image is reduced and the reduced image is used as the second target image. In the exemplary case of FIG. 102, the second basic image has the same size and shape as those of the first basic image (in other words, the second basic image is congruent with the first basic image), and the whole of the second basic image is reduced with a reduction ratio of 1/2. Specifically, the reduction ratio of the second target image to the second basic image and the first basic image is 1/2. In other words, the image size of the second target image is 1/4 with respect to the second basic image or the first basic image.

Then, second wavelet coefficient data are generated from the second target image. Herein, the decomposition level of the second wavelet coefficient data is 2 which is one-level lower than the decomposition level (=3) of the first wavelet coefficient data.

Next, the first wavelet coefficient data and the second wavelet coefficient data are synthesized with each other, like in the first preferred embodiment. Since the image size of the first target image and that of the second target image are different from each other, however, the synthesis is performed in conformity with the range of the second target image having a smaller image size, in other words, the range of the second wavelet coefficient data. Specifically, part of the first wavelet coefficient data (part corresponding to the second wavelet coefficient data) and the whole of the second wavelet coefficient data are used for the coefficient synthesis process. In the exemplary case of FIG. 102, as the above part of the first wavelet coefficient data, used are the band components LL3, HL3, LH3, and HH3 which are decomposed most (i.e., the highest-order band components) and the band components HL2, LH2, and HH2 which are one-level lower than the highest-order band components out of the first wavelet coefficient data.

By performing such synthesis, generated are synthesized coefficient data having the same decomposition level (herein, decomposition level 2) as that of the second wavelet coefficient data. Then, the inverse wavelet transformation is performed on the synthesized coefficient data until the decomposition level becomes 0, to thereby generate synthetic image data. This synthetic image data provides a synthetic image having the same size and shape as those of the second target image, in other words, a synthetic image reduced with the reduction ratio of 1/2 to the second basic image or the whole image.

Figure 103:
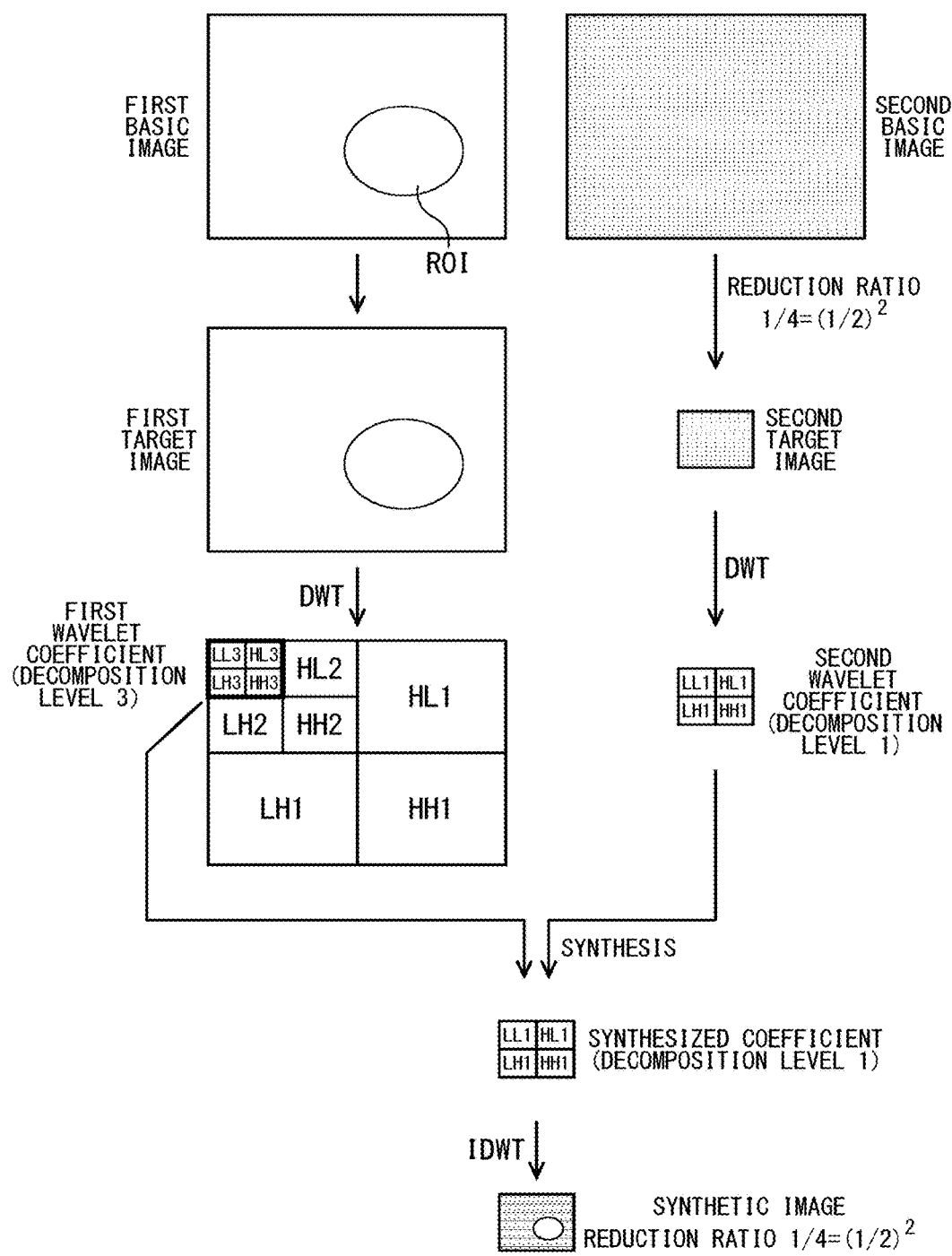

FIG. 103 shows an exemplary case where the reduction ratio of the second target image to the second basic image is 1/4 (1/2$^2$). Also in FIG. 103, the first basic image itself is used as the first target image, and first wavelet coefficient data of decomposition level 3 are generated from the first target image. On the other hand, second wavelet coefficient data of decomposition level 1 are generated from the second target image. In this case, the decomposition level (=1) of the second wavelet coefficient data is two-level lower than the decomposition level (=3) of the first wavelet coefficient data.

Next, the first wavelet coefficient data (the highest-order band components LL3, HL3, LH3, and HH3 out of the first wavelet coefficient data in the exemplary case of FIG. 103) and the second wavelet coefficient data are synthesized with each other.

By performing such synthesis, generated are synthesized coefficient data having the same decomposition level (herein, decomposition level 1) as that of the second wavelet coefficient data. Then, the inverse wavelet transformation is performed on the synthesized coefficient data until the decomposition level becomes 0, to thereby generate synthetic image data. This synthetic image data provides a synthetic image having the same image size as that of the second target image, in other words, a synthetic image reduced with the reduction ratio of 1/4 (=1/2$^2$) to the second basic image or the first basic image.

Figure 104:
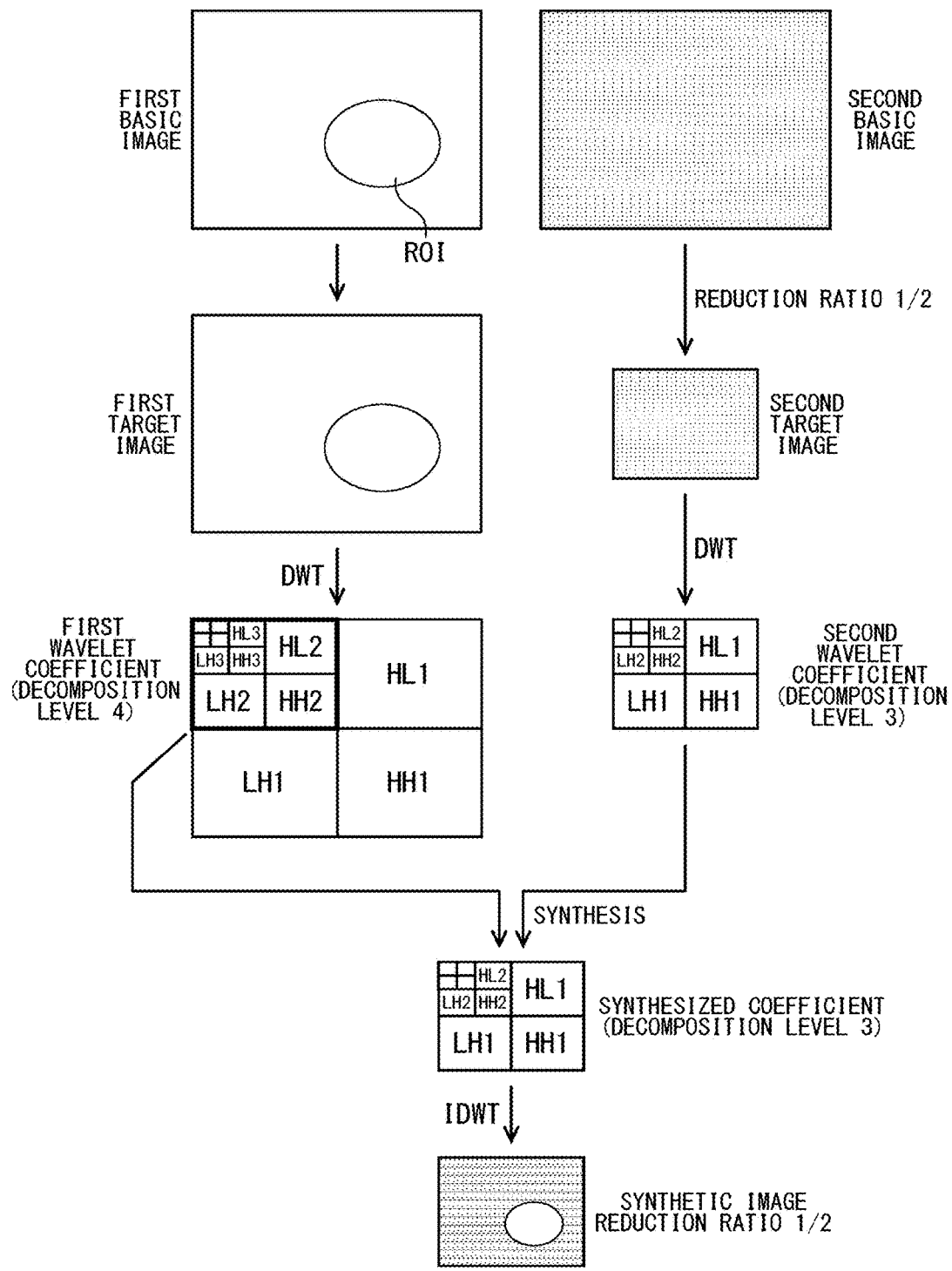

FIG. 104 shows an exemplary case where the decomposition level of the first wavelet coefficient data is 4 and the reduction ratio of the second target image to the second basic image is 1/2. In this case, the decomposition level of the second wavelet coefficient data is 3 and one-level lower than the decomposition level (=4) of the first wavelet coefficient data. In the exemplary case of FIG. 104, data in a range from the highest-order band components LL4, HL4, LH4, and HH4 to the band components HL2, LH2, and HH2 which are two-level lower than the highest-order band components out of the first wavelet coefficient data are used for the synthesis. Then, a synthetic image is provided to have the same image size as that of the second target image, in other words, to be reduced with the reduction ratio of 1/2 to the second basic image or the first basic image.

As can be seen from FIGS. 102 to 104, by controlling the image size of the second target image, it is possible to control the image size of the synthetic image. The following findings can be obtained from the exemplary cases of FIGS. 102 to 104.

The second target image is a similar figure to the first target image and the similarity ratio of the second target image to the first target image is smaller than 1. Further, the similarity ratio smaller than 1 may be termed as a reduction ratio. The decomposition level of the second wavelet coefficient data depends on the decomposition level of the first wavelet coefficient data and the above similarity ratio. Specifically, in a case where the decomposition level of the first wavelet coefficient data is assumed to be P1, the decomposition level of the second wavelet coefficient data is assumed to be P2, and the similarity ratio of the second target image to the first target image is $1/2^{P3}$, it holds that P2=P1−P3. Herein, P1, P2, and P3 are natural numbers.

Further, as described above, the coefficient synthesis process is performed in conformity with the range of the second wavelet coefficient data. For this reason, as to the first wavelet coefficient data, used are band component data in a range from the highest-order band components to band components which are lower than the highest-order band components by the number of predetermined levels, and the number of predetermined levels is given by a numerical value indicating the decomposition level of the second wavelet coefficient data.

Since the coefficient synthesis process is performed in conformity with the range of the second wavelet coefficient data, the decomposition level of the synthesized coefficient data is the same as that of the second wavelet coefficient data. By performing the inverse wavelet transformation on the synthesized coefficient data until the decomposition level becomes 0, the synthetic image having the same image size as that of the second target image can be obtained.

FIG. 105 is a block diagram showing a synthesizing unit 500N as an exemplary case where the above findings are applied to the first preferred embodiment. The synthesizing unit 500N has a constitution in which an image reduction unit 570 is added in the synthesizing unit 500 of the first preferred embodiment (see FIG. 13). The image reduction unit 570 acquires the second basic image data D50 and reduces the second basic image, to thereby generate the second target image which is a similar figure to the first target image. The generated second target image data D60 are supplied to the wavelet transformation unit 510.

When the second basic image is reduced to $1/2^{P3}$, for example, the image reduction unit 570 performs the wavelet transformation on the second basic image data D50 by the method of recursively decomposing the lowest-frequency band component LL until the decomposition level becomes P3. Then, the image reduction unit 570 extracts the lowest-frequency band component LL at the decomposition level P3 as the second target image data D60.

Alternatively, the image reduction unit 570 may be configured to generate the second target image by a general image reduction process using an average filter. In such a case, the reduction with the reduction ratio of 1/2 may be performed P3 times, or the reduction with the reduction ratio of $1/2^3$ may be performed at one time.

The image size of the second target image, in other words, the image size of the synthetic image is instructed by image size control data C70 to the image reduction unit 570. Herein, it is assumed that the image size control data C70 are inputted to the synthesizing system by a user of the synthesizing system. The image size control data C70, however, may be supplied from the supply system, like the synthesis control data C50 (see FIGS. 3 38, 45, and 49).

It is assumed herein, for easy explanation, that the image size control data C70 give a value of P3 in a case where the similarity ratio of the second target image to the first target image is expressed as $1/2^{P3}$ as described above. Alternatively, the image size control data C70 may be data from which the value of P3 can be derived. As exemplary data from which the value of P3 can be derived, used is a value of the above similarity ratio ($1/2^{P3}$) or the like.

The image size control data C70 are also supplied to the wavelet transformation unit 510. The wavelet transformation unit 510 can acquire the specified decomposition level for the first wavelet coefficient data A61, i.e., a value of the above PI, from the already-described synthesis control data C50. The wavelet transformation unit 510 thereby calculates the decomposition level P2 (=P1−P3) of the second wavelet coefficient data D61 on the basis of P1 and P3 which are obtained from the synthesis control data C50 and the image size control data C70. Then, the wavelet transformation unit 510 performs the wavelet transformation on the second target image data D60 until the decomposition level becomes a decomposition level indicated by the obtained P2.

The image size control data C70 are also supplied to the synthesis execution unit 520 in the exemplary constitution of FIG. 105 and used to specify the range in the first wavelet coefficient data A61 to be used for the coefficient synthesis process. The range in the first wavelet coefficient data A61 depends on a numerical value indicating the decomposition level P2 of the second wavelet coefficient data as described above. In exemplary constitution of FIG. 105, it is assumed that the synthesis execution unit 520 calculates the value of P2. The synthesis execution unit 520, however, may acquire the calculated value of P2 from the wavelet transformation unit 510. In such a case, the supply of the image size control data C70 to the synthesis execution unit 520 may be omitted.

The image size control data C70 are also supplied to the inverse wavelet transformation unit 530 and used to set the number of executions of the inverse wavelet transformation, in other words, to find the decomposition level of the synthesized coefficient data E61.

Figure 106:
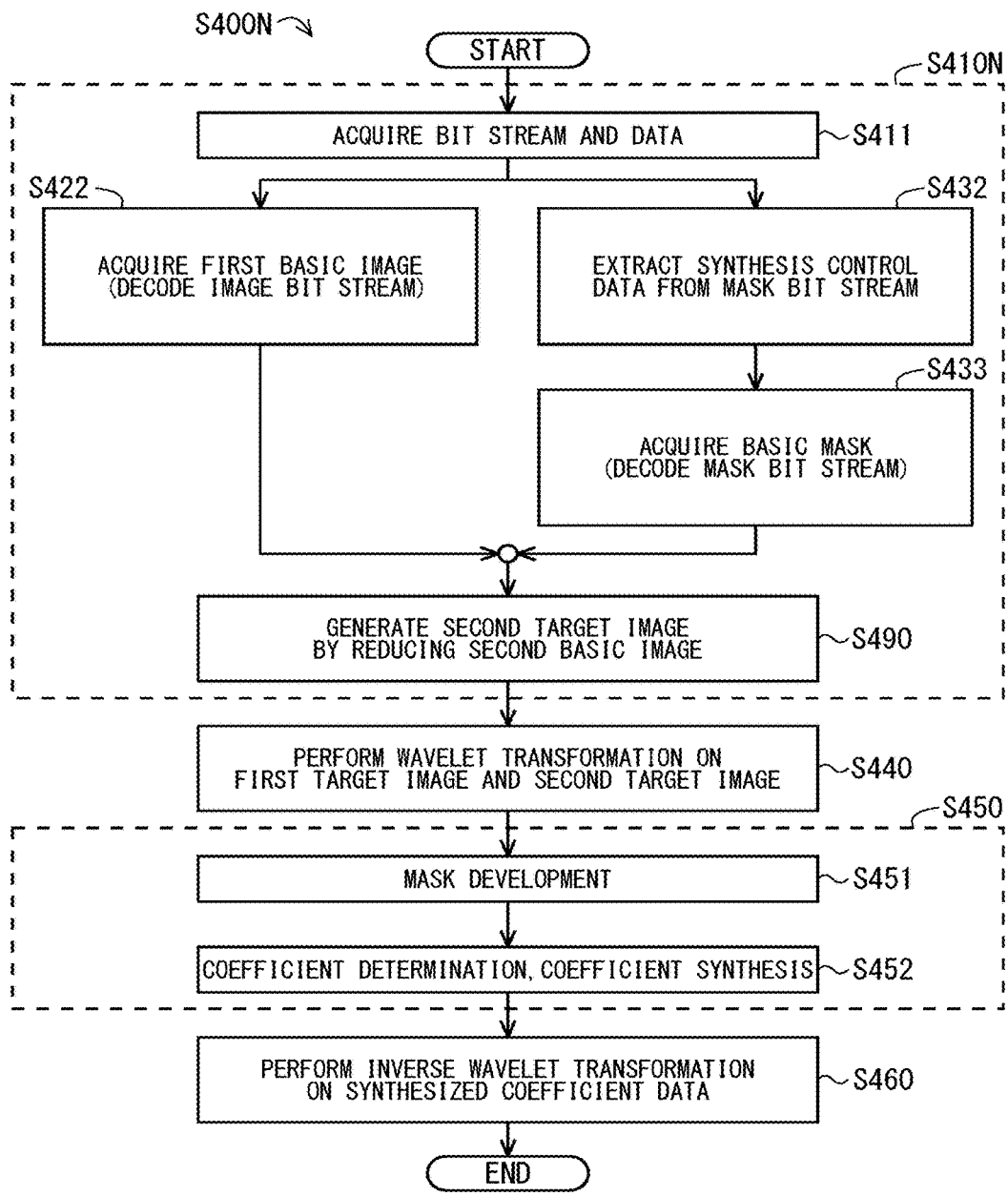
FIG. 106 is a flowchart showing an operation of an image synthesizing system in accordance with the fourteenth preferred embodiment.

FIG. 106 is a flowchart showing an operation of the synthesizing system in a case where the synthesizing unit 500N is applied to the first preferred embodiment. An operation flow S400N of FIG. 106 is basically the same as the operation flow S400 (see FIG. 25) of the first preferred embodiment, but data acquisition step S410N in which Step S490 is added is provided, instead of the data acquisition step S410. In Step S490, the image reduction unit 570 reduces the second basic image, to thereby generate the second target image. Other steps in the operation flow S400N are basically identical to those in the operation flow S400 of FIG. 25.

Further, when the image size control data C70 to be used to control the size of the second target image are not acquired from the supply system, unlike in the exemplary case of FIG. 106, Step S490 may be performed concurrently with Steps S411, S422, S432, and S433.

In the fourteenth preferred embodiment, it is possible to control the image size of a synthetic image and obtain a synthetic image having a size smaller than that of the original image. Further, instead of the synthesizing unit 500 or the like, the synthesizing unit 500N can be also applied to any of the second to sixth, and thirteenth preferred embodiments.

In the above description, it is assumed that the whole of the second basic image is reduced, to thereby generate the second target image. Only if the second target image is a similar figure to the first target image, however, the second target image can be generated by reducing part of the second basic image. Similarly, the second basic image before the reduction may not be a similar figure to the first target image. When the second basic image is not a similar figure to the first target image and the whole of the second basic image is reduced, respective reduction ratios in horizontal and vertical directions of the second basic image have only to be different from each other.

Further, in the above description, it is assumed that the similarity ratio of the second target image to the first target image is smaller than 1. In other words, it is assumed that when the similarity ratio is expressed as $1/2^{P3}$, P3 is a natural number. Even when the similarity ratio is 1 (P3 is 0 in this case), in other words, even when the second target image is congruent with the first target image, the synthesizing unit 500N can be used.

When the second basic image is congruent with the first basic image and the first target image and the value of P3, which is given by the image size control data C70, is 0, for example, the image reduction unit 570 may supply the second basic image to the wavelet transformation unit 510 without reducing the image. In this case, like in the first to sixth preferred embodiments, a synthetic image having the original image size can be obtained. In other words, the first to sixth preferred embodiments each show an example specialized in the case where the similarity ratio of the second target image to the first target image is 1. On the other hand, the fourteenth preferred embodiment can be applied to the case where the similarity ratio is not larger than 1.

The Fifteenth Preferred Embodiment

In the fourteenth preferred embodiment, by reducing at least part of the second basic image, the second target image which is a similar figure to the first target image is generated (see FIGS. 102 to 104). On the other hand, in the fifteenth preferred embodiment, as shown in FIG. 107, a case will be described, where part of the second basic image is cut out as the second target image which is a similar figure to the first target image. In other words, only if the second target image is a similar figure to the first target image, it is possible to generate the second target image by the cut-out.

FIG. 108 is a block diagram showing a synthesizing unit 500P in accordance with the fifteenth preferred embodiment. The synthesizing unit 500P has a constitution in which a second image cut-out unit 570P is provided, instead of the image reduction unit 570, in the synthesizing unit 500N (see FIG. 105) of the fourteenth preferred embodiment. Other constituent elements in the synthesizing unit 500P are identical to those of the synthesizing unit 500N in accordance with the fourteenth preferred embodiment.

The second image cut-out unit 570P acquires the second basic image data D50, sets a similar figure range in the second basic image, which is a similar figure to the first target image, with the above similarity ratio (i.e., the similarity ratio of the second target image to the first target image), and cuts out data within the similar figure range in the second basic image data D50, as the second target image data D60. The generated second target image data D60 are supplied to the wavelet transformation unit 510.

The image size of the second target image, in other words, the image size of the synthetic image is instructed by the image size control data C70 to the second image cut-out unit 570P. Further, in the fifteenth preferred embodiment, it is assumed that the image size control data C70 also include data indicating the position of the above similar figure range to be cut out as the second target image.

Figure 109:
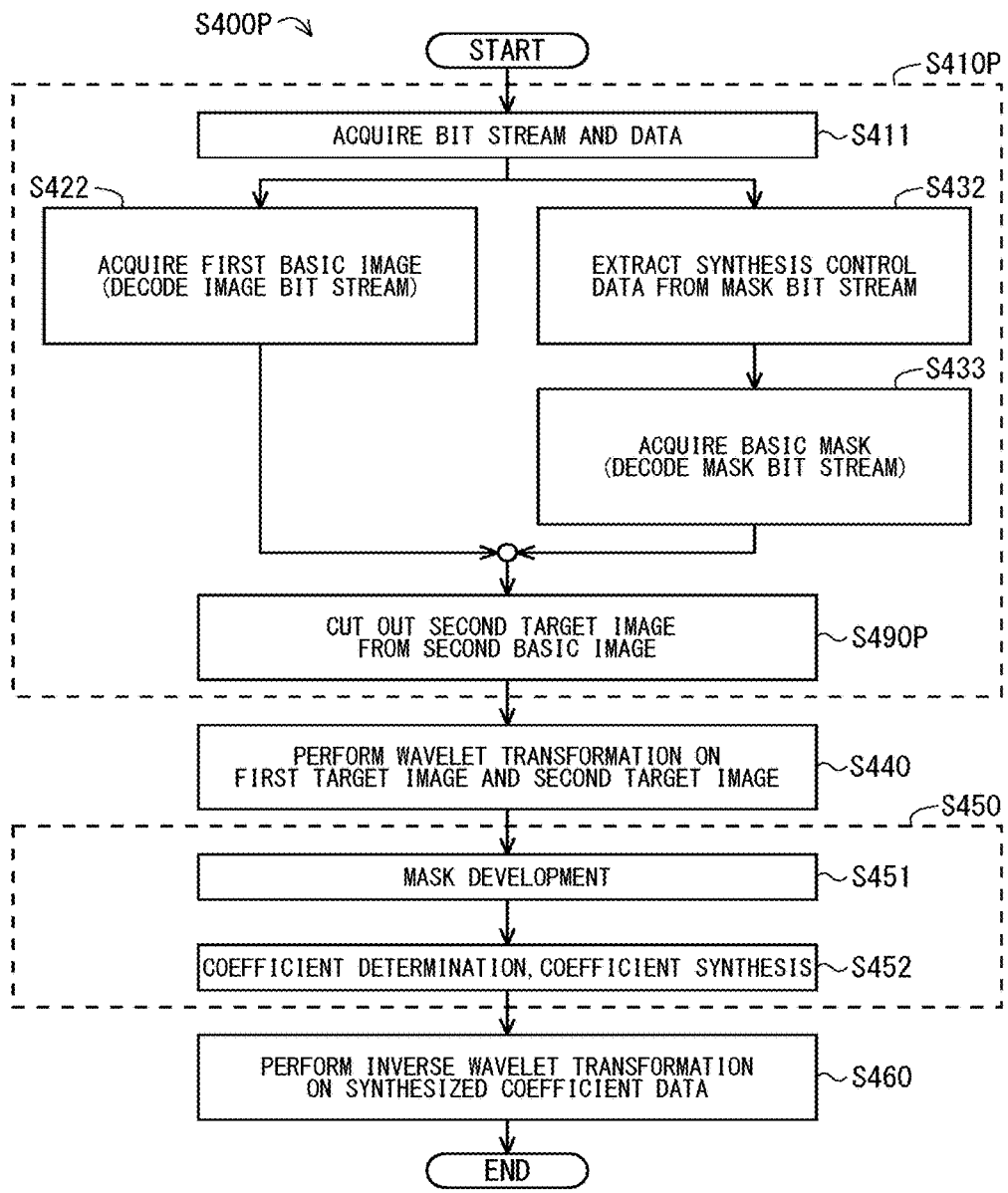
FIG. 109 is a flowchart showing an operation of an image synthesizing system in accordance with the fifteenth preferred embodiment.

FIG. 109 is a flowchart showing an operation of the synthesizing system in a case where the synthesizing unit 500P is applied to the first preferred embodiment. In an operation flow S400P of FIG. 109, as can be seen from the comparison with the operation flow S400N (see FIG. 106) of the fourteenth preferred embodiment, data acquisition step S410P is provided instead of the data acquisition step S410N, and Step S490P is provided instead of Step S490. In Step S490P, the second image cut-out unit 570P cuts out the second target image data D60 from the second basic image data D50 as described above. Other steps in the operation flow S400P are identical to those in the operation flow S400N of FIG. 106.

Further, when the image size control data C70 to be used to control the size of the second target image are not acquired from the supply system, unlike in the exemplary case of FIG. 109, Step S490P may be performed concurrently with Steps S411, S422, S432, and S433.

In the fifteenth preferred embodiment, it is possible to control the image size of a synthetic image and obtain a synthetic image having a size smaller than that of the original image. Further, instead of the synthesizing unit 500 or the like, the synthesizing unit 500P can be also applied to any of the second to sixth, and thirteenth preferred embodiments.

Further, like in the fourteenth preferred embodiment, the synthesizing unit 500P can be used not only when the similarity ratio is smaller than 1 but also when the similarity ratio is not larger than 1. When the second basic image is congruent with the first basic image and the first target image and the value of P3 given by the image size control data C70 is 0, for example, the second image cut-out unit 570P may supply the second basic image to the wavelet transformation unit 510 without performing the cut-out. In this case, like in the first to sixth preferred embodiments, a synthetic image having the original image size can be obtained.

The Sixteenth Preferred Embodiment

Figure 110:
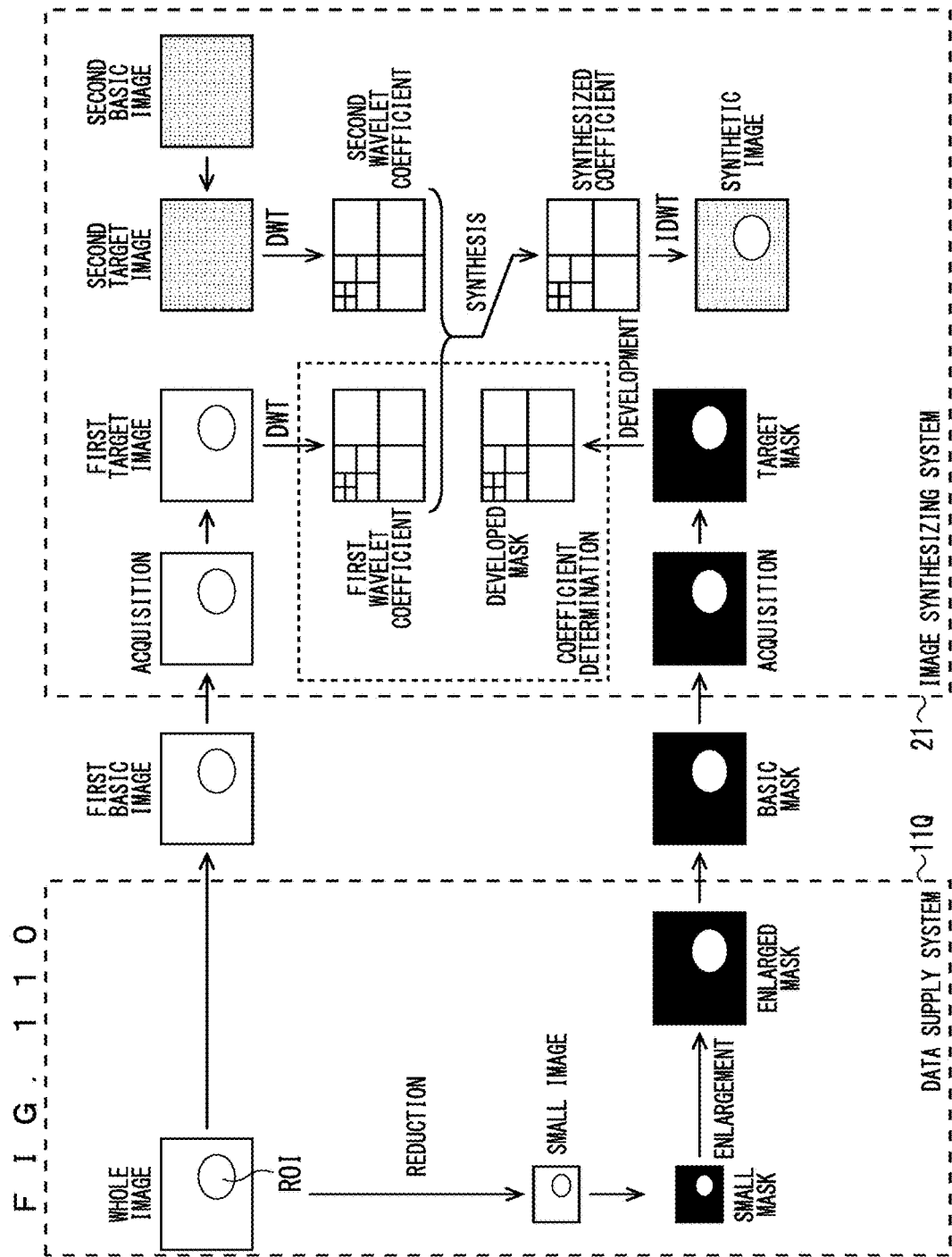
FIG. 110 is a conceptual diagram showing image synthesis in accordance with a sixteenth preferred embodiment.

FIG. 110 is a conceptual diagram showing image synthesis in accordance with the sixteenth preferred embodiment. It is assumed herein that a supply system 11Q of the sixteenth preferred embodiment is combined with the synthesizing system 21 of the first preferred embodiment. Instead of the supply system 11 in accordance with the first preferred embodiment, the supply system 11Q can be applied to the image processing system 1, 10, or the like.

Figure 111:
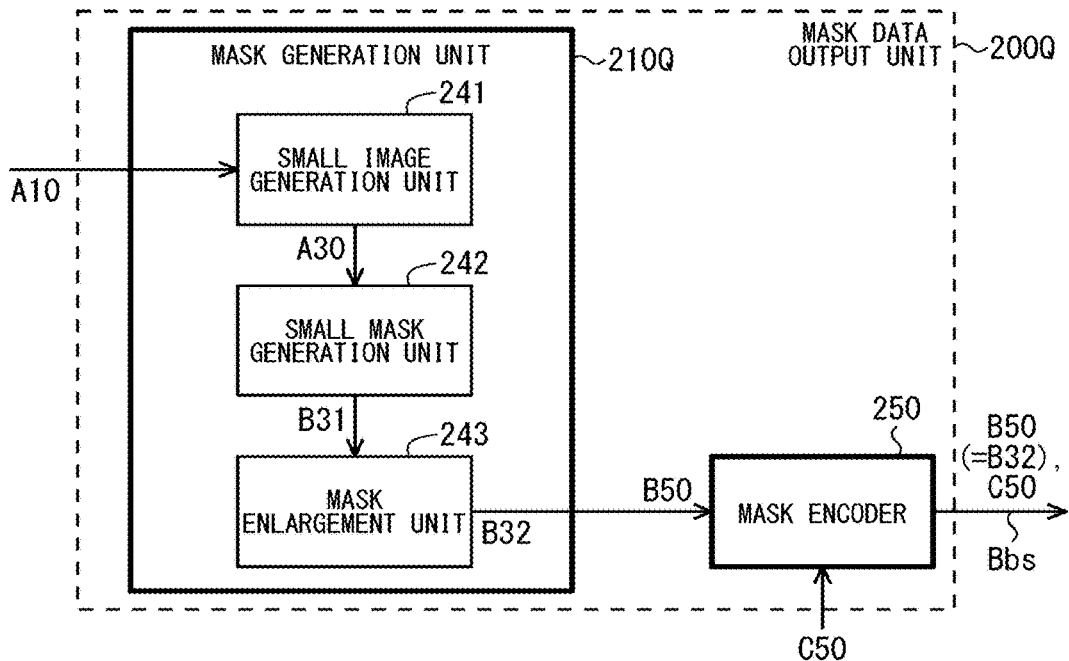
FIG. 111 is a block diagram showing a mask data output unit in accordance with the sixteenth preferred embodiment.

Further, FIG. 111 is a block diagram showing a mask data output unit 200Q in accordance with the sixteenth preferred embodiment. It is assumed herein that the mask data output unit 200Q is applied to the supply system 11 of the first preferred embodiment, instead of the mask data output unit 200. The mask data output unit 200Q includes a mask generation unit 210Q and the already-described mask encoder 250. The mask generation unit 210Q includes a small image generation unit 241, a small mask generation unit 242, and a mask enlargement unit 243.

<Small Image Generation Unit 241>

The small image generation unit 241 acquires the whole image data A10 and reduces the whole image, to thereby generate a small image (see FIG. 110). Herein, a case will be described, where the small image generation unit 241 reduces the whole image with a reduction ratio of $1/2^R$ to generate the small image (R is a natural number). The reduction ratio of $1/2^R$ may be fixed or may be changeable.

For example, the small image generation unit 241 performs the wavelet transformation on the whole image data A10 by using the method of recursively decomposing the lowest-frequency band component LL until the decomposition level becomes R. Then, the small image generation unit 241 extracts the lowest-frequency band component LL at the decomposition level R, as small image data A30 which are data of the small image.

Alternatively, the small image generation unit 241 may be configured to generate the small image by a general image reduction process using an average filter. In such a case, the reduction with the reduction ratio of 1/2 may be performed R times, or the reduction with the reduction ratio of $1/2^R$ may be performed at one time.

<Small Mask Generation Unit 242>

The small mask generation unit 242 acquires the small image data A30 from the small image generation unit 241 and generates a small mask which is a mask whose target is the small image (see FIG. 110). The small mask generation unit 242 can be configured to be identical to the already-described whole mask generation unit 211 (see FIG. 3). In other words, since only the image size of the target to be subjected to the mask generation is different, the same mask generation technique can be used.

<Mask Enlargement Unit 243>

The mask enlargement unit 243 acquires small mask data B31 which are data of the small mask from the small mask generation unit 242 and enlarges the small mask to the same image size as that of the whole image, to thereby generate an enlarged mask (see FIG. 110). In the sixteenth preferred embodiment, enlarged mask data B32 which are data of the enlarged mask are outputted from the mask generation unit 210Q as the basic mask data B50.

Figure 112:
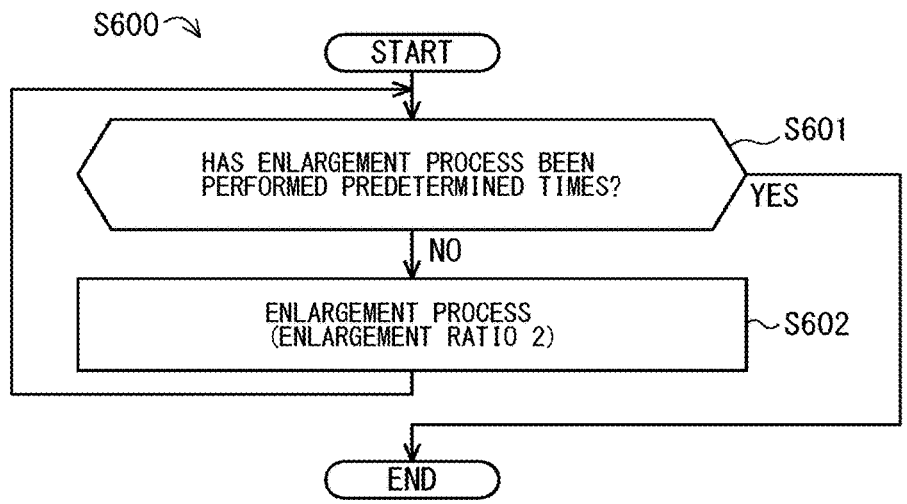
FIG. 112 is a flowchart showing a mask enlargement process in accordance with the sixteenth preferred embodiment.

Herein, a case will be described, where the mask enlargement unit 243 performs the enlargement process on the small mask R times with the enlargement ratio of 2, to thereby generate an enlarged mask. FIG. 112 is a flowchart showing such a mask enlargement process. In an operation flow S600 of FIG. 112, the enlargement process with an enlargement ratio of 2 is performed in Step S602. The processing of Step S602 is executed until it is determined in Step S601 that the enlargement process with the enlargement ratio of 2 has been performed predetermined times (herein R times).

FIG. 113 is a diagram showing the enlargement process with the enlargement ratio of 2. In FIG. 113, when the i-th (i is an integer) data in the mask before being enlarged is associated with the ROI, it is estimated that the {2i−1}th data to the {2i+1}th data in the mask after being enlarged with the enlargement ratio of 2 are associated with the ROI.

When the estimation rule of FIG. 113 is two-dimensionally developed, as shown in FIG. 114, the estimation rule of FIG. 113 is applied to each of a vertical direction and a horizontal direction of the mask image. Specifically, when the data at a point at the coordinates (I, J) in the mask before being enlarged are associated with the ROI, it is estimated that the data in a range of 3×3 points around the coordinates (2I, 2J) in the mask after being enlarged by one level (in other words, with an enlargement ratio of $2^1$) are associated with the ROI. In other words, the data in a rectangular range with diagonal points of the coordinates (2I−1, 2J−1) and (2I+1, 2J+1) are associated with the ROI. Similarly, in the mask after being enlarged by two levels (in other words, with an enlargement ratio of $2^2$), the data in a range of 5×5 points around the coordinates (4I, 4J), in other words, in a rectangular range with diagonal points of the coordinates (4I−2, 4J−2) and (4I+2, 4J+2) are associated with the ROI. FIG. 115 shows more specific illustration.

Further, unlike in the operation flow S600 of FIG. 112, enlargement can be performed by $1/2^R$ at once.

<Smoothing Process>

After the enlargement process, a smoothing process may be performed on the mask image. Since the mask image is a binary image, the smoothing process for binary image can be used. For example, the morphology processing in which combination of dilation and erosion is executed several times can be used. Dilation is a processing in which if at least one pixel is white within a surrounding region around a pixel of interest, the pixel of interest is replaced with a white pixel. Conversely, erosion is a processing in which if at least one pixel is black within the surrounding region, the pixel of interest is replaced with a black pixel. As the surrounding region, a range of 3×3, 5×5, 7×7, or the like is set. By performing the morphology processing, the mask image can be smoothed (the jaggy can be reduced and smoothed). Further, the morphology processing is effective in removal of isolated points (in other words, filling in a blank) and the like.

The mask enlargement unit 243 performs the smoothing process on the mask after being enlarged at the point in time when the enlargement process is finished at least once among the R-times executions. According to an operation flow S600B of FIG. 116, after the R-th (i.e., last) enlargement process, smoothing process step S603 is performed. Further, according to an operation flow S600C of FIG. 117, after each enlargement process, the smoothing process step S603 is performed. The execution timing and the number of executions of the smoothing process step S603 are not limited to the exemplary cases shown in FIGS. 116 and 117.

Figure 119:
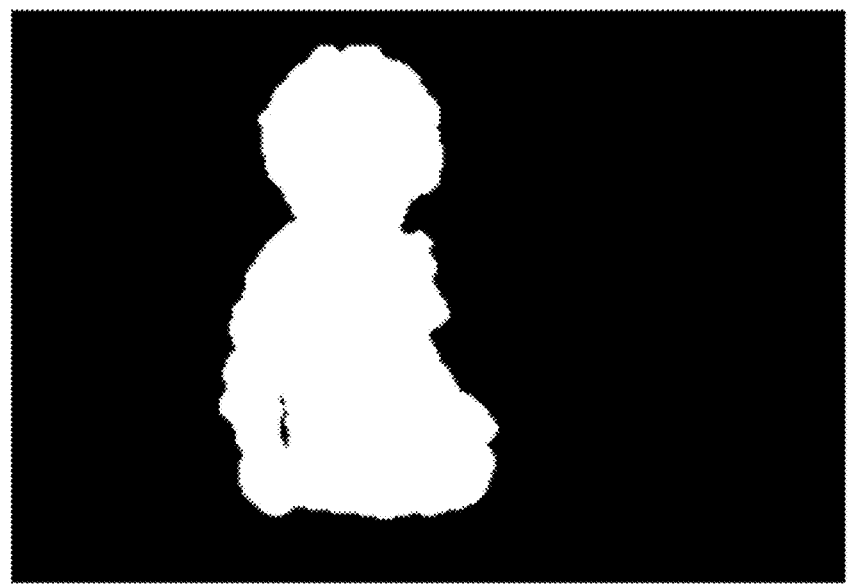
FIG. 119 is a view showing another exemplary enlarged mask in accordance with the sixteenth preferred embodiment (in a case where a dilation process is performed twice)
Figure 120:
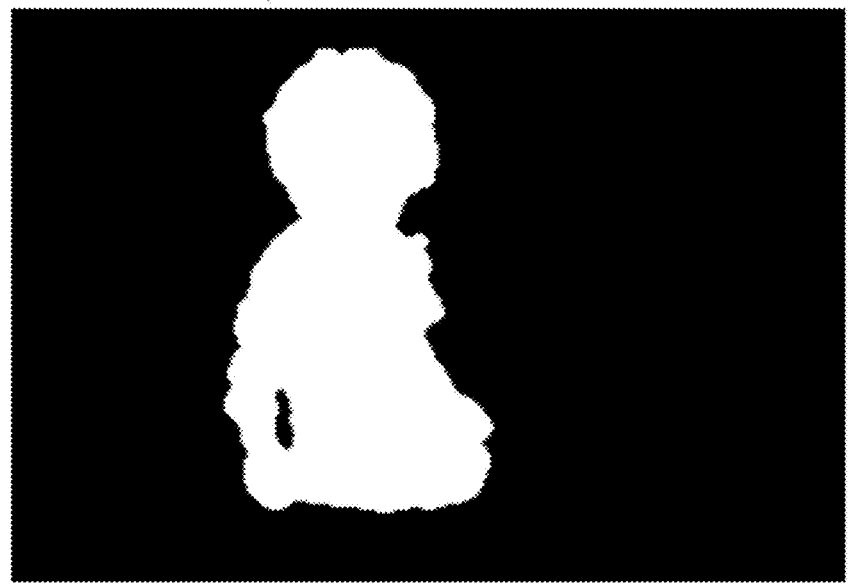
FIG. 120 is a view showing still another exemplary enlarged mask in accordance with the sixteenth preferred embodiment (in a case where a dilation process is performed twice and then an erosion process is performed twice)

FIG. 118 shows an exemplary enlarged mask obtained by enlargement to the same image size of that of the whole image in a case where no smoothing process is performed. Further, FIG. 119 shows an exemplary enlarged mask in a case where a dilation process is performed twice on the enlarged mask shown in FIG. 118. Furthermore, FIG. 120 shows an exemplary enlarged mask in a case where an erosion process is performed twice on the enlarged mask shown in FIG. 119. FIGS. 119 and 120 show the enlarged masks generated in the operation flow S600B of FIG. 116, and a range of 7×7 is set as the surrounding region in the dilation process and the erosion process. From FIG. 120, it can be seen that the jaggy is smoothed as compared with FIG. 118.

<Operation of Supply System Q>

Figure 121:
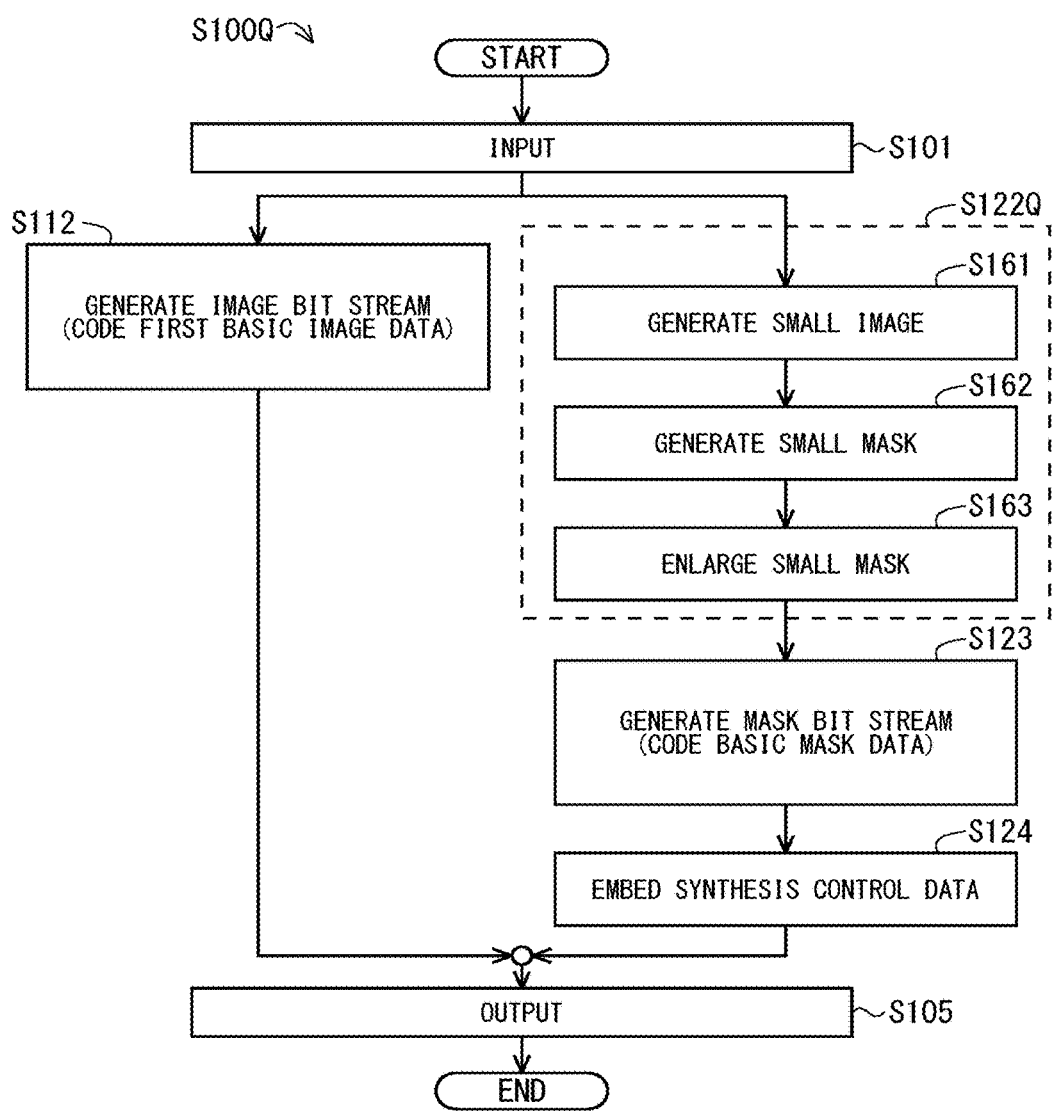
FIG. 121 is a flowchart showing an operation of a data supply system in accordance with the sixteenth preferred embodiment.

FIG. 121 is a flowchart showing an operation of the supply system 11Q. In an operation flow S100Q of FIG. 121, basic mask generation step S122Q is provided, instead of the basic mask generation step S122 in the operation flow S100 of FIG. 9.

According to the basic mask generation step S122Q, the small image generation unit 241 reduces the whole image to generate the small image in Step S161, and the small mask generation unit 242 generates the small mask whose target is the small image in Step S162. Then, in Step S163, the mask enlargement unit 243 enlarges the small mask to the same image size as that of the whole image, to thereby generate the enlarged mask. Further, in Step S163, the smoothing process may be adopted.

The enlarged mask generated by the mask enlargement unit 243 is thereafter processed as the basic mask. Specifically, in the next step S123, the enlarged mask data B32 are coded and the mask bit stream Bbs is thereby generated.

Further, in the supply system 11Q, as shown in FIG. 110, the whole image is outputted to the synthesizing system 21 as the first basic image and the small image is not outputted to the synthesizing system 21.

It is assumed herein, as described above, that the supply system 11Q is combined with the synthesizing system 21 of the first preferred embodiment. In other words, the synthesizing system 21 operates in accordance with the operation flow S400 (see FIG. 25) of the first preferred embodiment.

<Effects>

In the sixteenth preferred embodiment, the mask is generated by using the small image, not the whole image, as a target. For this reason, it is possible to reduce the amount of computation for mask generation as compared with the mask generation using the whole image as a target. Further, unlike the above exemplary case, the reduction ratio may be set to any value other than $1/2^R$, and the same effects can be produced in such a case.

Furthermore, by adopting the smoothing process, it is possible to smooth the jaggy of the contour of the ROI corresponding portion which is caused by the enlargement of the small mask. When the ROI in the whole image is set by a curved line such as an outer shape of a person, for example, the ROI corresponding portion of the mask can be formed by a smooth curved line. As a result, the ROI having a smooth outer shape can be shown in the synthetic image.

Herein, also in the sixteenth preferred embodiment, the image synthesis is performed by using the wavelet plane, i.e., using the first wavelet coefficient data and the second wavelet coefficient data. For this reason, even when the ROI and the ROI corresponding portion have jaggies, a more excellent synthetic image can be achieved as compared with the case where the first target image data and the second target image data themselves are synthesized. Therefore, by adopting the smoothing process, a more excellent synthetic image can be achieved. Whether to adopt the smoothing process may be determined in consideration of the amount of computation in the system, the smoothness required for the synthetic image, and the like.

Further, in the sixteenth preferred embodiment, as to the same configuration as that of the first preferred embodiment, the same effects as those of the first preferred embodiment can be produced. Furthermore, the sixteenth preferred embodiment can be combined with the second to fifteenth preferred embodiments.

The Seventeenth Preferred Embodiment

FIG. 122 is a conceptual diagram showing the image synthesis in the supply system 11R and the synthesizing system 21R in accordance with the seventeenth preferred embodiment. Instead of the supply system 11 and the synthesizing system 21 in accordance with the first preferred embodiment, the supply system 11R and the synthesizing system 21R can be applied to the image processing system 1, 10, 20, or the like. As can be seen from the comparison of FIG. 122 with FIG. 110, in the seventeenth preferred embodiment, the supply system 11R outputs the small mask as the basic mask, and the synthesizing system 21R enlarges the small mask to thereby generate the target mask.

Figure 123:
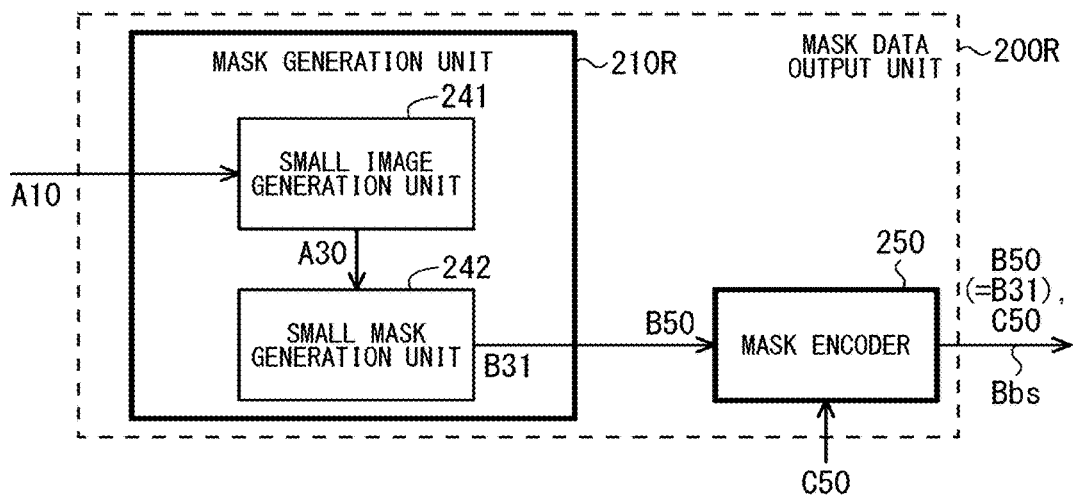
FIG. 123 is a block diagram showing a mask data output unit in accordance with the seventeenth preferred embodiment.
Figure 124:
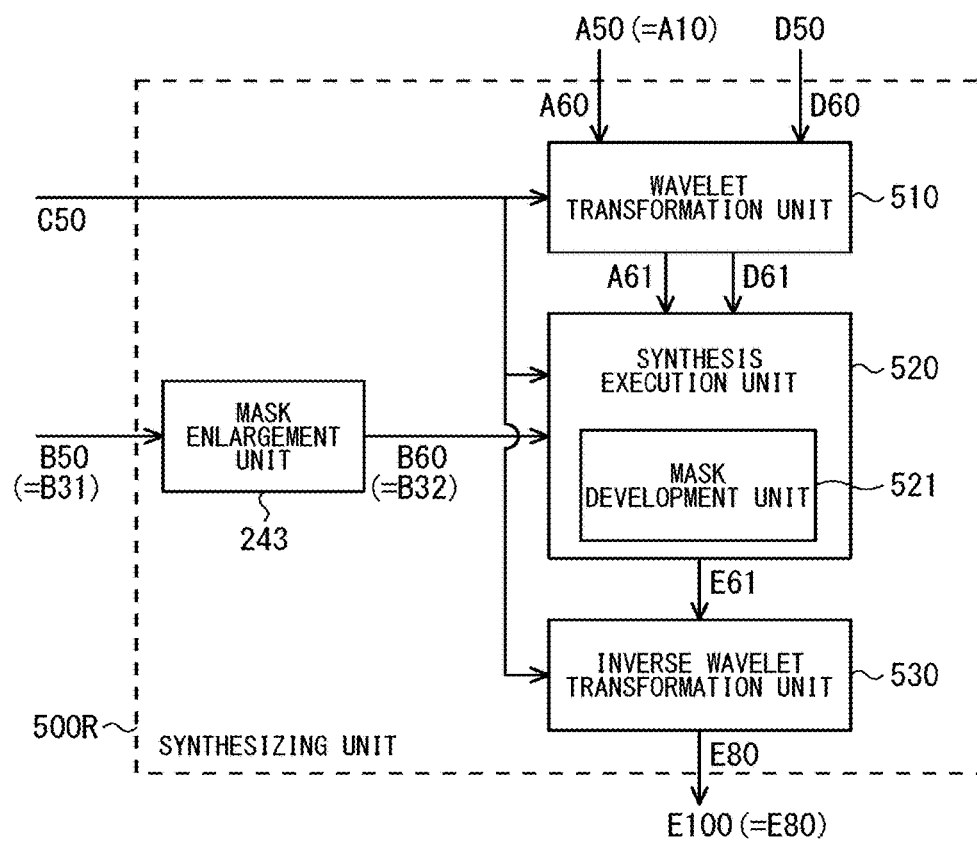
FIG. 124 is a block diagram showing a synthesizing unit in accordance with the seventeenth preferred embodiment.

FIG. 123 is a block diagram showing a mask data output unit 200R and FIG. 124 is a block diagram showing a synthesizing unit 500R in accordance with the seventeenth preferred embodiment. It is assumed herein that the mask data output unit 200R is applied, instead of the mask data output unit 200, in the supply system 11 of the first preferred embodiment. Similarly, the synthesizing unit 500R is applied, instead of the synthesizing unit 500, in the synthesizing system 21 of the first preferred embodiment.

As shown in FIG. 123, the mask data output unit 200R includes a mask generation unit 210R and the already-described mask encoder 250. The mask generation unit 210R has a constitution in which the mask enlargement unit 243 is omitted from the mask generation unit 210Q (see FIG. 111) of the sixteenth preferred embodiment. With this constitution, the small mask data B31 are outputted from the mask generation unit 210R as the basic mask data B50.

On the other hand, as shown in FIG. 124, the synthesizing unit 500R has a constitution in which the mask enlargement unit 243 is added in the already-described synthesizing unit 500 (see FIG. 13). More specifically, the mask enlargement unit 243 acquires the small mask data B31 as the basic mask data B50 and enlarges the small mask to the image size of the first target image, to thereby generate the enlarged mask. Then, the mask enlargement unit 243 supplies the enlarged mask data B32 to the synthesis execution unit 520 as the target mask data B60.

Figure 125:
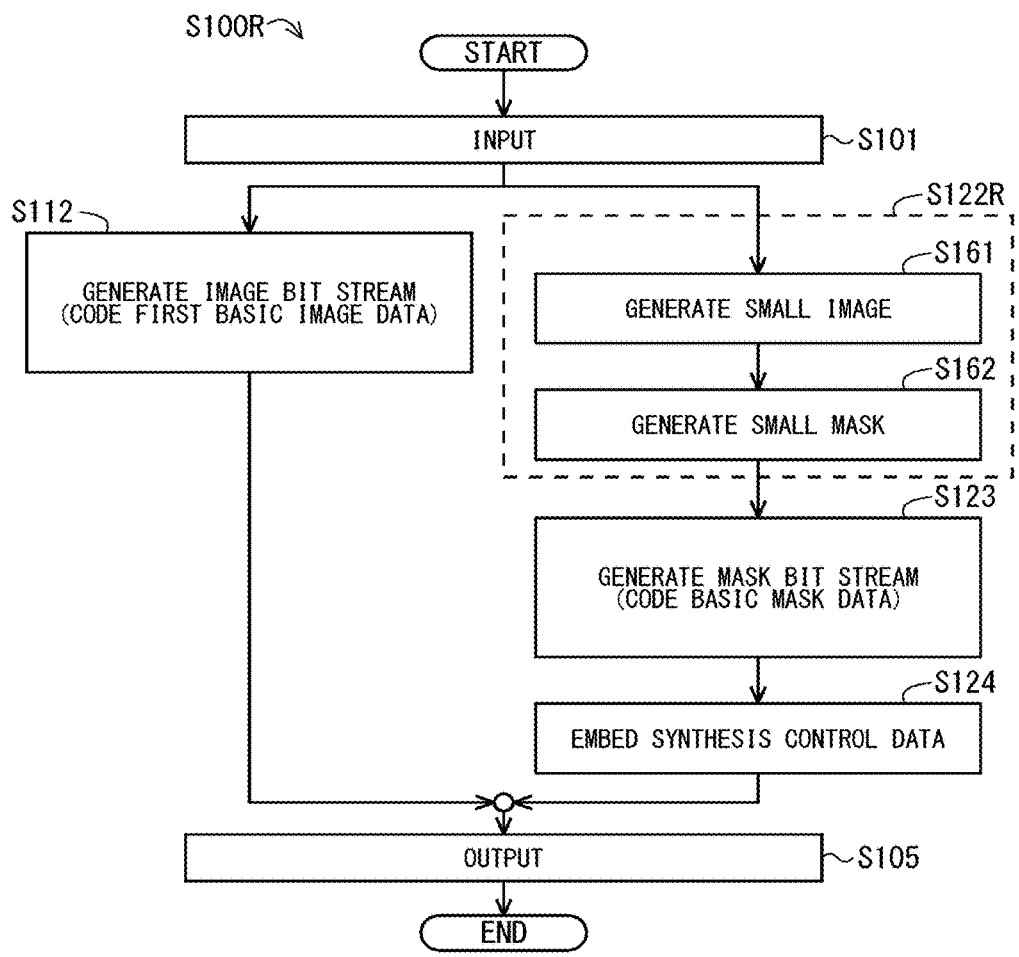
FIG. 125 is a flowchart showing an operation of a data supply system in accordance with the seventeenth preferred embodiment.

FIG. 125 is a flowchart showing an operation of the supply system 11R. According to an operation flow S100R of FIG. 125, basic mask generation step S122R is provided, instead of the basic mask generation step S122Q, in the operation flow S100Q (see FIG. 121) of the sixteenth preferred embodiment. The basic mask generation step S122R has a constitution in which the mask enlargement step S163 is omitted from the basic mask generation step S122Q of FIG. 121.

With this constitution, the small mask generated in Step S162 is supplied to the mask encoder 250 as the basic mask and coded in Step S123, and the mask bit stream Bbs is thereby generated. Though it is assumed that the data on the reduction ratio of the small mask, together with the small mask data B31, are supplied to the synthesizing system 21R, this is only one exemplary case.

Herein, as shown in FIG. 122, in the supply system 11R, the whole image is outputted as the first basic image. For this reason, the small mask which is the basic mask is a mask corresponding to a reduced image of the first basic image. Further, also in the supply system 11R, the small image is not outputted to the synthesizing system 21R.

Figure 126:
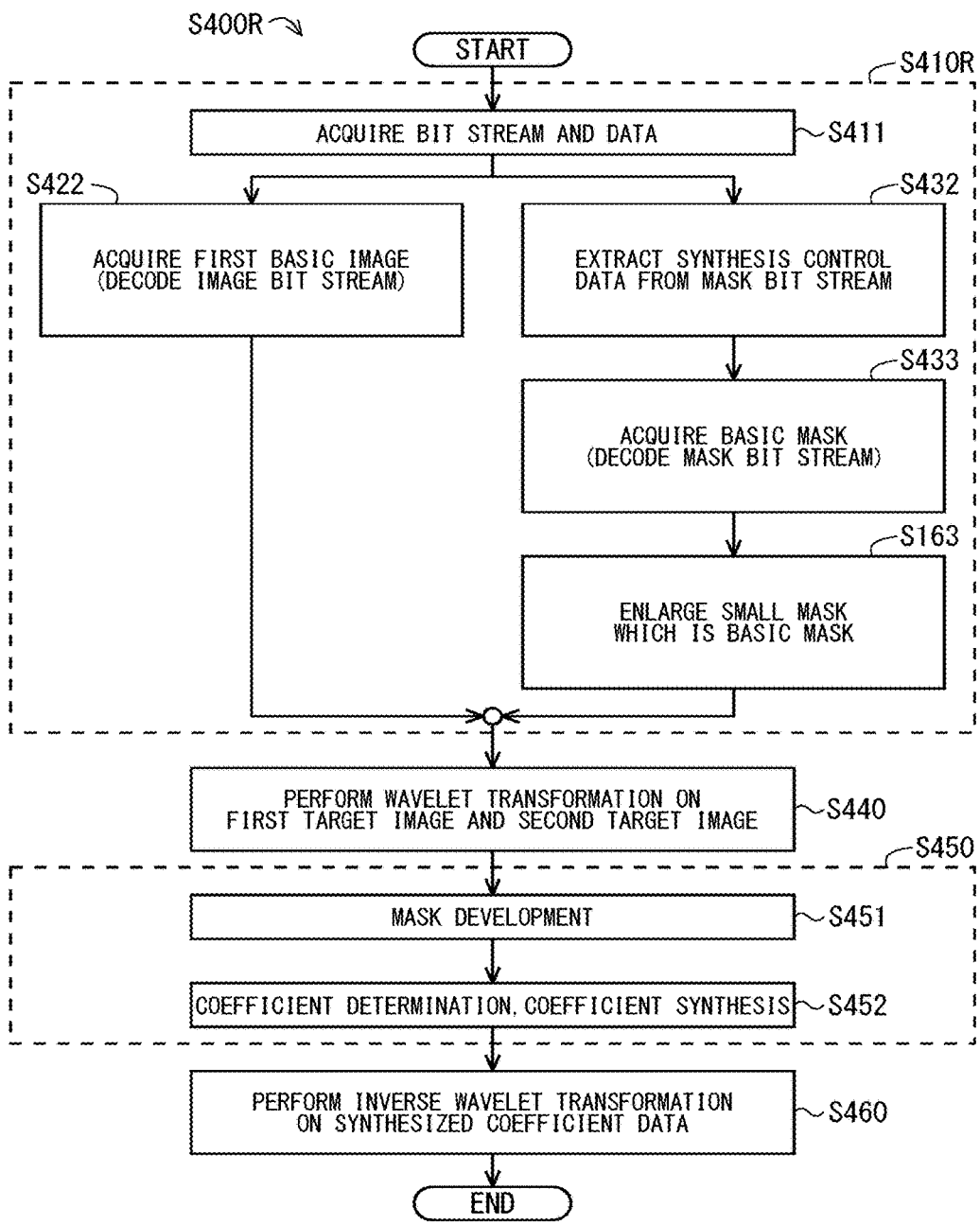
FIG. 126 is a flowchart showing an operation of an image synthesizing system in accordance with the seventeenth preferred embodiment.

FIG. 126 is a flowchart showing an operation of the synthesizing system 21R. According to an operation flow S400R of FIG. 126, data acquisition process step S410R is provided, instead of the data acquisition process step S410, in the operation flow S400 (see FIG. 25) of the first preferred embodiment. The data acquisition process step S410R has a constitution in which the mask enlargement step S163 is added next to Step S433 in the data acquisition process step S410 of FIG. 25.

In Step S163, as described above, the mask enlargement unit 243 enlarges the small mask which is acquired as the basic mask to the image size of the first target image and supplies the enlarged mask to the synthesis execution unit 520 as the target mask.

In the seventeenth preferred embodiment, since the basic mask is the small mask, it is possible to reduce the amount of data of the basic mask and therefore reduce the amount of communication. Since the mask is a binary image, when 1 bit is assigned to each pixel of the mask, for example, a mask of XGA (eXtended Graphics Array) has a data size of {1024×768 pixels}×1 bit=786432 bits=96 Kbytes. On the other hand, a small mask obtained with a reduction ratio of 1/2 has a data size of 24 Kbytes which is 1/4 the above size. Similarly, with a reduction ratio of $1/2^2$, the data size becomes 6 Kbytes, and with a reduction ratio of $1/2^3$, the data size becomes 1.5 Kbytes. Further, with a reduction ratio of $1/2^3$, the image size of the small mask is 128×96 pixels.

Thus, in consideration that the data size of the basic mask can be reduced, even the transfer of the basic mask data without being coded can be achieved actually. In such a case, it is possible to reduce the amount of computation for coding and decoding.

FIG. 127 shows an exemplary constitution of a supply system 11RB and a synthesizing system 21RB in a case where the basic mask data are transferred without being coded. A mask data output unit 200RB in the supply system 11RB has a constitution in which a mask bit stream generation unit 25ORB is provided, instead of the mask encoder 250, in the mask data output unit 200R of FIG. 123. On the other hand, in the synthesizing system 21RB, a mask data restoration unit 400RB is provided instead of the mask decoder (see the mask decoder 400 of FIG. 3).

The mask bit stream generation unit 250RB generates a bit stream of the basic mask data B50 (herein, the small mask data B31) as the mask bit stream Bbs in accordance with the bit stream generation specification without coding. On the other hand, the mask data restoration unit 400RB restores the basic mask data B50 (herein, the small mask data B31) from the mask bit stream Bbs in accordance with the data restoration specification without decoding.

Further, since the constitution of FIG. 127 uses that of FIG. 3, the mask bit stream generation unit 250RB embeds the synthesis control data C50 into the mask bit stream Bbs, and the mask data restoration unit 400RB extracts the synthesis control data C50 from the mask bit stream Bbs.

Further, in the seventeenth preferred embodiment, as to the same configuration as that of the first preferred embodiment, the same effects as those of the first preferred embodiment can be produced. Furthermore, the seventeenth preferred embodiment can be combined with any of the second to fifth, seventh, eighth, and thirteenth to fifteenth preferred embodiments.

The Eighteenth Preferred Embodiment

In the eighteenth preferred embodiment, exemplary combination of the seventeenth preferred embodiment and the seventh preferred embodiment will be described. In the seventeenth preferred embodiment, as shown in FIG. 122, the small mask, not the whole mask, is supplied to the synthesizing system. Further, in the seventh preferred embodiment, as shown in FIG. 55, only a portion of the whole mask, which includes the ROI corresponding portion, is supplied to the synthesizing system. Then, in the eighteenth preferred embodiment, as shown in the conceptual diagram of FIG. 128, only a portion of the small mask, which includes the ROI corresponding portion, is supplied to the synthesizing system.

<Exemplary Constitution of System>

Figure 129:
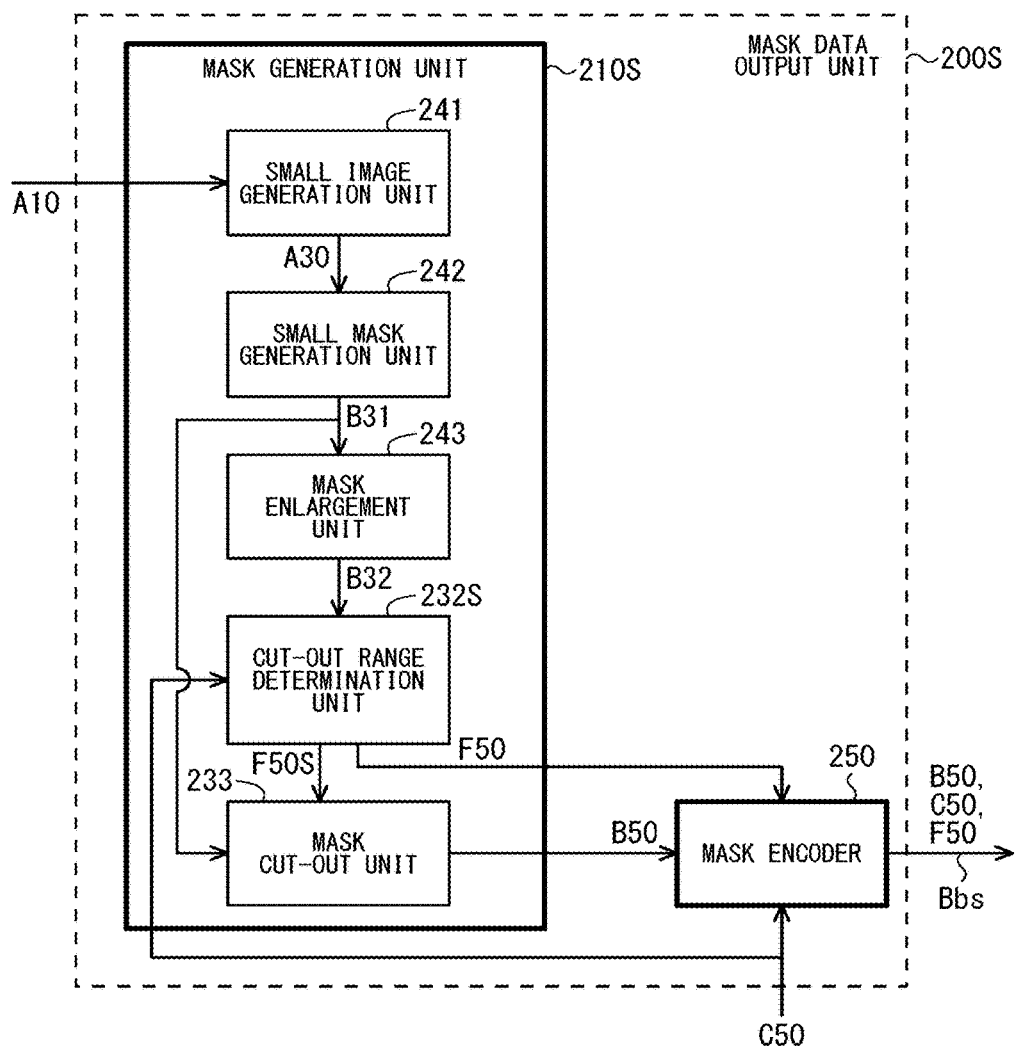
Figure 130:
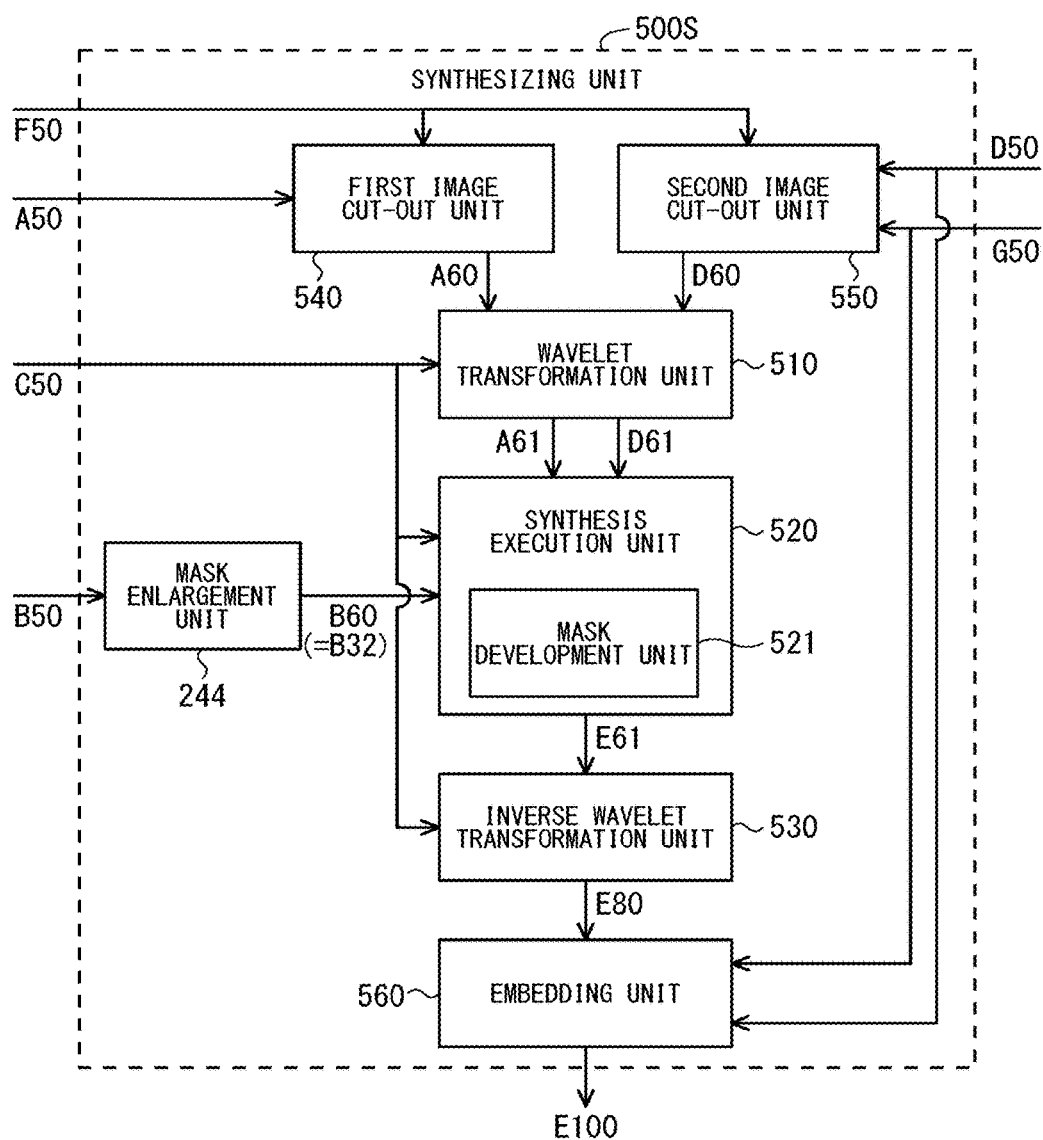

FIG. 129 is a block diagram showing a mask data output unit 200S and FIG. 130 is a block diagram showing a synthesizing unit 500S in accordance with the eighteenth preferred embodiment. It is assumed herein that the mask data output unit 200S is applied, instead of the mask data output unit 200G (see FIG. 72), in the supply system 11G of the seventh preferred embodiment, to constitute a supply system 11S (see FIG. 128) of the eighteenth preferred embodiment. Similarly, the synthesizing unit 500S is applied, instead of the synthesizing unit 500G (see FIGS. 73 and 74) in the synthesizing system 21G of the seventh preferred embodiment, to constitute a synthesizing system 21S (see FIG. 128) of the eighteenth preferred embodiment.

As shown in FIG. 129, the mask data output unit 200S includes a mask generation unit 210S and the already-described mask encoder 250. The mask generation unit 210S basically has a constitution in which the small image generation unit 241, the small mask generation unit 242, and the mask enlargement unit 243 which are already described are provided, instead of the whole mask generation unit 211, in the mask data output unit 200G (see FIG. 72). Instead of the already-described cut-out range determination unit 232, however, provided is a cut-out range determination unit 232S which is a variation for determining the cut-out range for the small mask.

As shown in FIG. 130, the synthesizing unit 500S has a constitution in which a mask enlargement unit 244 is added in the synthesizing unit 500G (see FIG. 74). The mask enlargement unit 244 operates in the same manner as the mask enlargement unit 243 of the seventeenth preferred embodiment. Specifically, the mask enlargement unit 244 acquires data of a partial mask (in other words, a portion of the small mask which is cut out in the supply system 11S) as the basic mask data B50. The mask enlargement unit 244 enlarges the partial mask to the image size of the first target image, to thereby generate the enlarged mask. Then, the mask enlargement unit 244 supplies the enlarged mask data B32 to the synthesis execution unit 520 as the target mask data B60. <Cut-Out Range Determination Unit 232S>

Figure 131:
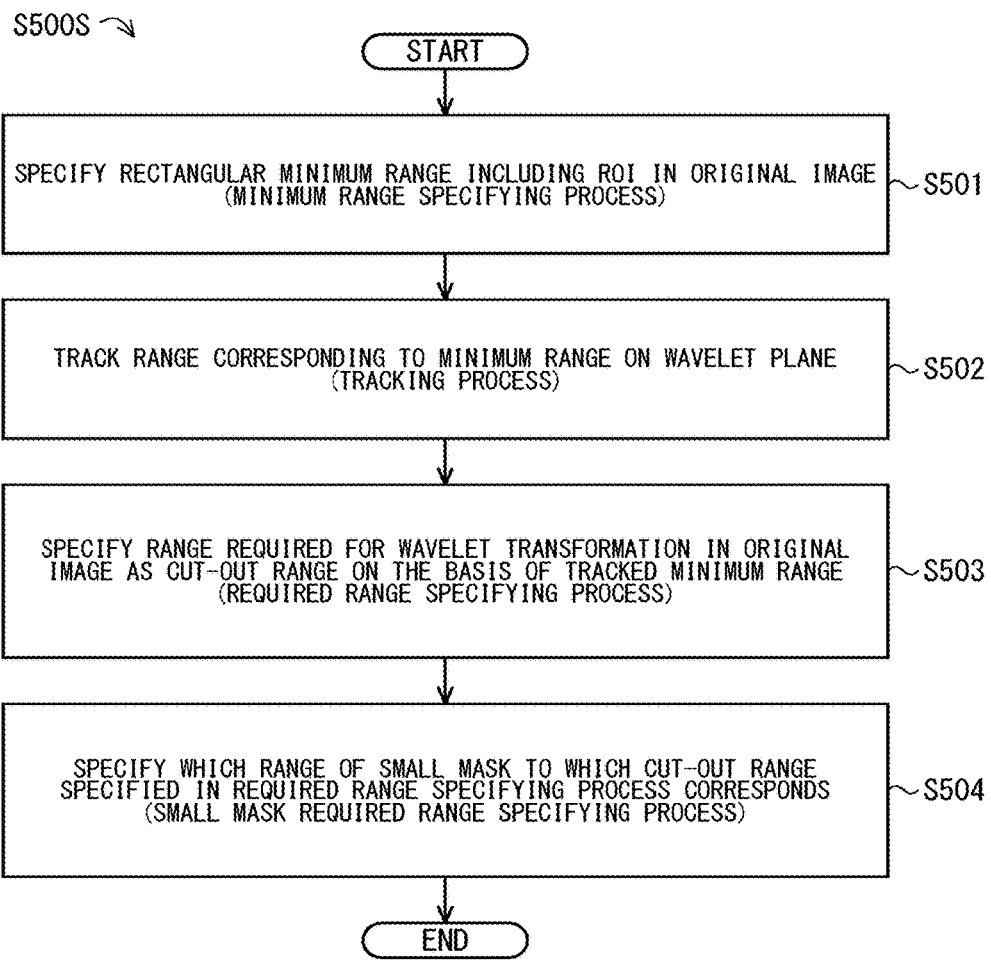

With reference to FIG. 131 additionally to FIG. 129, an operation of the cut-out range determination unit 232S will be described. As shown in FIG. 131, an operation flow S500S for the cut-out range determination process includes Steps S501 to 5503 (see FIG. 60) described in the seventh preferred embodiment. For this reason, the cut-out range determination unit 232S executes Steps S501 to S503 to determine the cut-out range 83 (see FIG. 57) which is a range of the first target image in the whole image.

Though the minimum range 81 is determined on the basis of the whole mask 70 (see FIG. 58) in Step S501 for the minimum range specifying process in the seventh preferred embodiment, however, in the eighteenth preferred embodiment, the enlarged mask is used instead of the whole mask. The enlarged mask has the same image size as that of the whole mask (in other words, the same image size as that of the whole image), and is generated by the small image generation unit 241, the small mask generation unit 242, and the mask enlargement unit 243 and supplied to the cut-out range determination unit 232S.

As shown in FIG. 131, the operation flow S500S for the cut-out range determination process further includes Step S504. In Step S504, the cut-out range determination unit 232S performs a small mask required range specifying process which is a process for specifying which range in the small mask to which the cut-out range 83 specified by the required range specifying process in Step S503 corresponds.

In other words, in the seventh preferred embodiment, since the whole mask has the same image size as that of the whole image, the cut-out range 83 specified in Step S503 is common to the whole mask and the whole image. On the other hand, in the eighteenth preferred embodiment, since the small mask, not the whole mask, is cut out, the small mask required range specifying process of Step S504 is needed.

FIG. 132 is a conceptual diagram showing the small mask required range specifying process. Though an exemplary small mask 70S obtained with a reduction ratio of 1/2 is shown in FIG. 132, the small mask is not limited to this example. In FIG. 132, the reference sign 70aS represents the ROI corresponding portion and the reference sign 70b S represents the non-ROI corresponding portion. Further, the reference sign 83S represents a small mask cut-out range corresponding to the cut-out range 83 in the whole image. Furthermore, for easy explanation, the cut-out range 83 specified in Step S503 is hereinafter sometimes referred to as an image cut-out range 83.

As can be seen from FIG. 132, upper-left end coordinates (AX4, AY4) and lower-right end coordinates (BX4, BY4) of the small mask cut-out range 83S have the following relation with respect to upper-left end coordinates (AX3, AY3) and lower-right end coordinates (BX3, BY3) of the image cut-out range 83. Specifically, AX4=AX3/2, AY4=AY3/2, BX4=BX3/2, and BY4=BY3/2. In generalized notation, AX4, AY4, BX4, and BY4 can be obtained by multiplying AX3, AY3, BX3, and BY3 by the reduction ratio of the small mask 70S to the whole image.

Herein, when the reduction ratio of the small mask 70S is $1/2^R$, the above multiplication can be achieved by bit shift. Specifically, by shifting a value of AX3 (more specifically, a bit string indicating the value of AX3) to the right by R bits, a value of AX4 is obtained. The same applies to respective values of AY3, BX3, and BY3.

Figure 133:
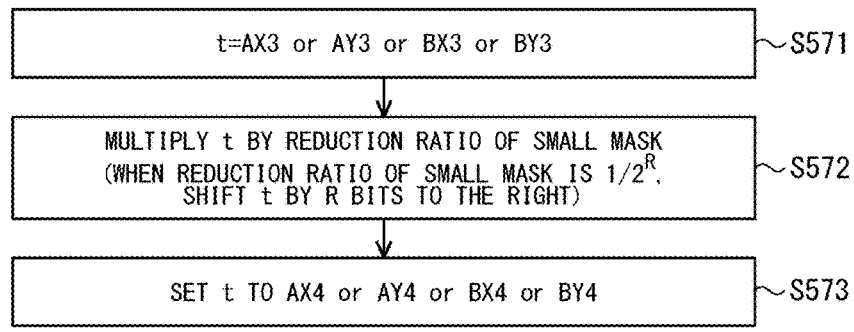

The above operations are included in an operation flow S570 of FIG. 133. Specifically, in Step S571, any one of AX3, AY3, BX3, and BY3 of the image cut-out range 83 is set to a parameter t. Herein, it is assumed that it is first set that t=AX3. Next, in Step S572, t is multiplied by the reduction ratio of the small mask 70S. As described above, when the reduction ratio of the small mask 70S is $1/2^R$, the bit string of t is right-shifted by R bits. Then, in Step S573, t after the computation is set to AX4 of the small mask cut-out range 83S. Similarly, in Step S571, AY3, BX3, and BY3 are sequentially set to t, and in Step S573, AY4, BX4, and BY4 are thereby obtained.

As shown in FIG. 129, small mask cut-out range specifying data F5OS to be used to specify the small mask cut-out range 83S are supplied to the mask cut-out unit 233. In the eighteenth preferred embodiment, the mask cut-out unit 233 acquires the small mask data B31 and cuts out data within the small mask cut-out range 83S in the small mask data B31, for the basic mask data B50, on the basis of the small mask cut-out range specifying data F50S.

On the other hand, the cut-out range specifying data F50 to be used to specify the image cut-out range 83 are supplied to the mask encoder 250 and embedded into the mask bit stream Bbs, like in the seventh preferred embodiment. Further, the small mask cut-out range specifying data F5OS may be also embedded into the mask bit stream Bbs and supplied to the synthesizing system 21S.

<Operation of System>

Figure 134:
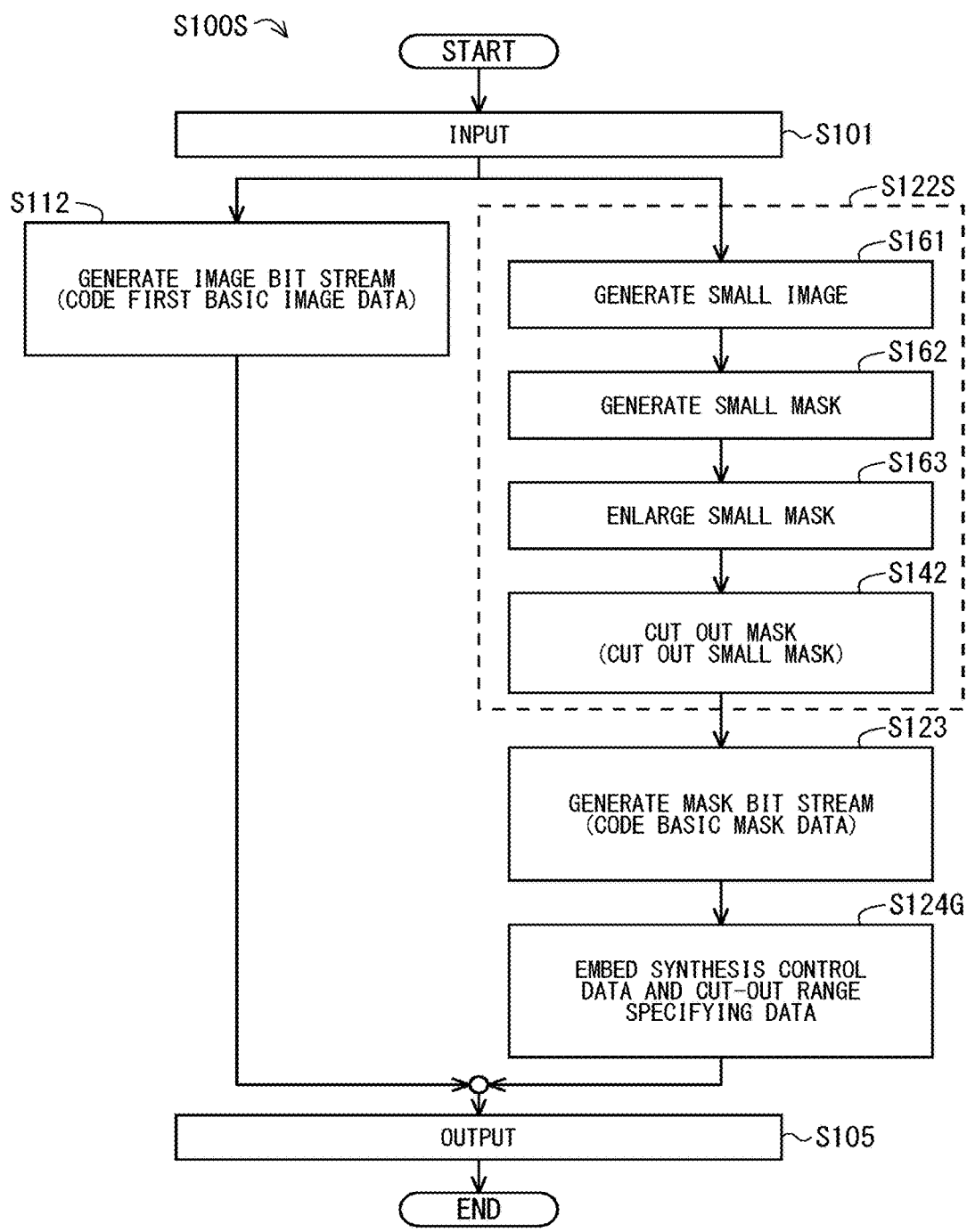

FIG. 134 is a flowchart showing an operation of the supply system 11S. According to an operation flow S100S of FIG. 134, basic mask generation step S122S is provided, instead of the basic mask generation step S122G, in the operation flow S100G (see FIG. 75) of the seventh preferred embodiment. The basic mask generation step S122S has a constitution in which the small image generation step S161, the small mask generation step S162, and the mask enlargement step S163 which are already described are provided in this order, instead of the whole mask generation step S141, in the basic mask generation step S122G (see FIG. 75).

Figure 135:
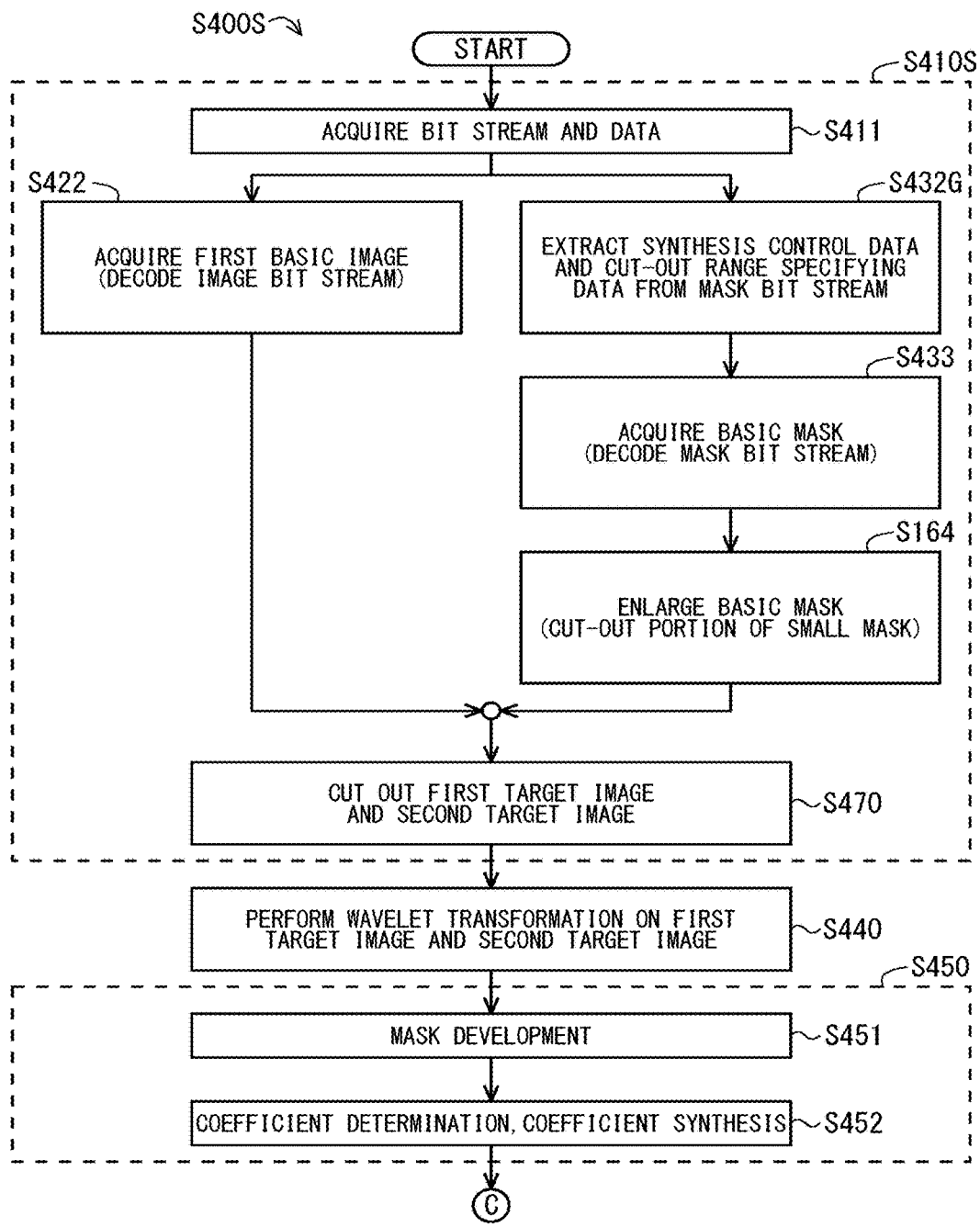
Figure 136:
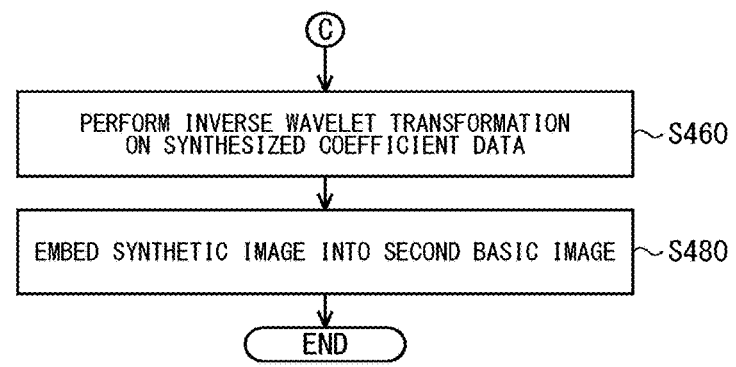

FIGS. 135 and 136 are flowcharts showing an operation of the synthesizing system 21S. The flows of FIGS. 135 and 136 are connected to each other with a connector C. According to an operation flow S400S of FIGS. 135 and 136, data acquisition process step S410S is provided, instead of the data acquisition process step S410G, in the operation flow S400G (see FIG. 76) of the seventh preferred embodiment. The data acquisition process step S410S has a constitution in which a mask enlargement step S164 is added next to Step S433 in the data acquisition process step S410G of FIG. 76.

In Step S164, as described above, the mask enlargement unit 244 enlarges the partial mask (in other words, the portion of the small mask which is cut out in the supply system 11S) which is acquired as the basic mask to the image size of the first target image. The enlarged mask is supplied to the synthesis execution unit 520 as the target mask.

<Effects>

In the eighteenth preferred embodiment, it is possible to further reduce the amount of data of the basic mask and therefore further reduce the amount of communication. For this reason, like in FIG. 127, the mask bit stream generation unit 250RB may be used instead of the mask encoder, and the mask data restoration unit 400RB may be used instead of the mask decoder. In such a case, it is possible to reduce the amount of computation for coding and decoding.

Figure 137:
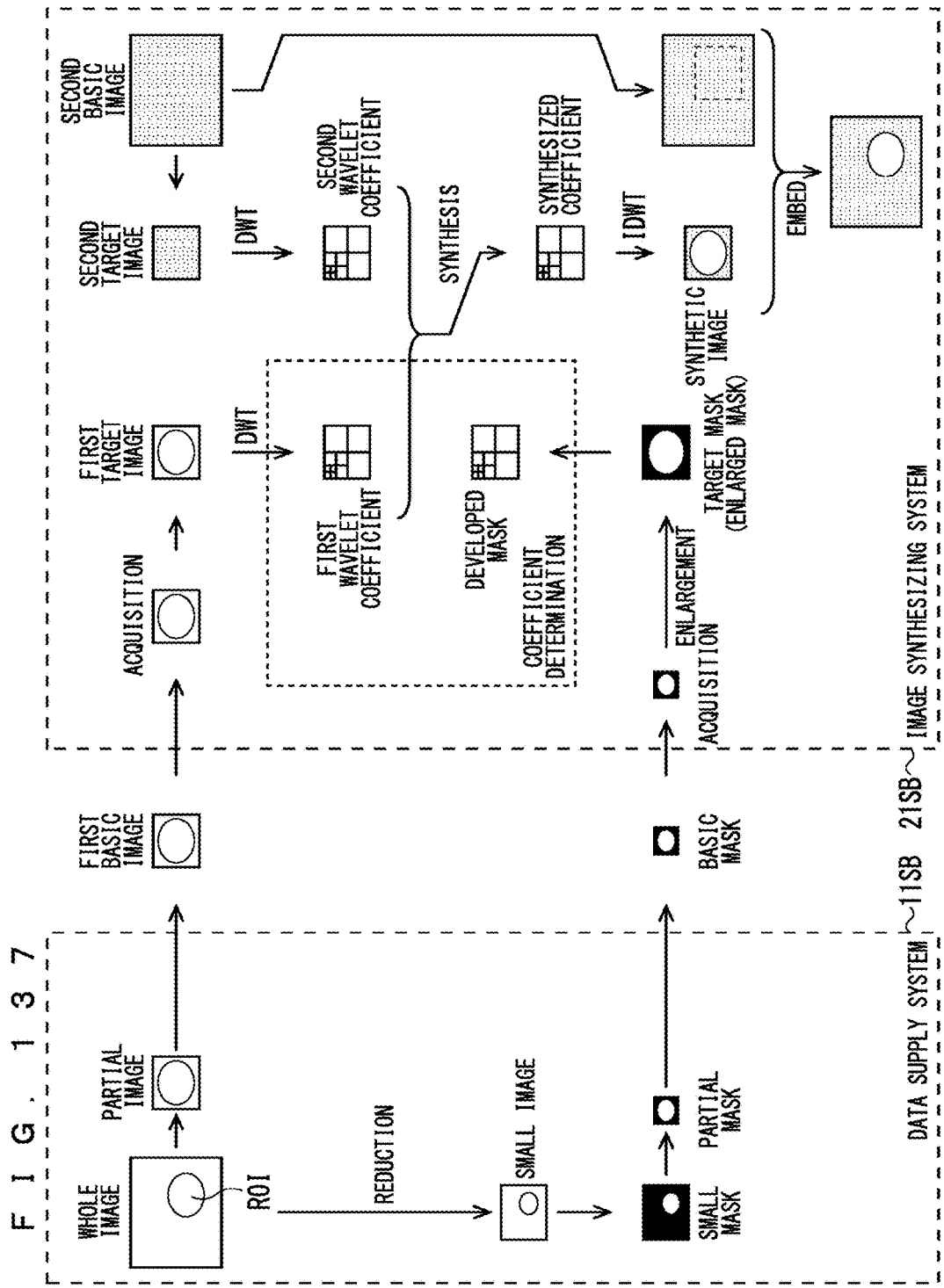

The above description has been made on the exemplary combination of the seventeenth preferred embodiment and the seventh preferred embodiment. This example may be modified into combination of the seventeenth preferred embodiment and the eighth preferred embodiment (see FIG. 77). Specifically, the first image cut-out unit 540 (see FIG. 130) is omitted from the synthesizing unit 500S of the synthesizing system 21S and added to the image data output unit of the supply system 11S (see the image data output unit 100H of the eighth preferred embodiment shown in FIG. 78). With this constitution, as shown in the conceptual diagram of FIG. 137, the portion of the whole image, which corresponds to the image cut-out range 83, can be supplied as the first basic image from the supply system 11SB to the synthesizing system 21SB. Further, other constituent elements of the supply system 11SB and the synthesizing system 21SB are herein identical to those of the supply system 11S and the synthesizing system 21S described above.

The Nineteenth Preferred Embodiment

Figure 138:
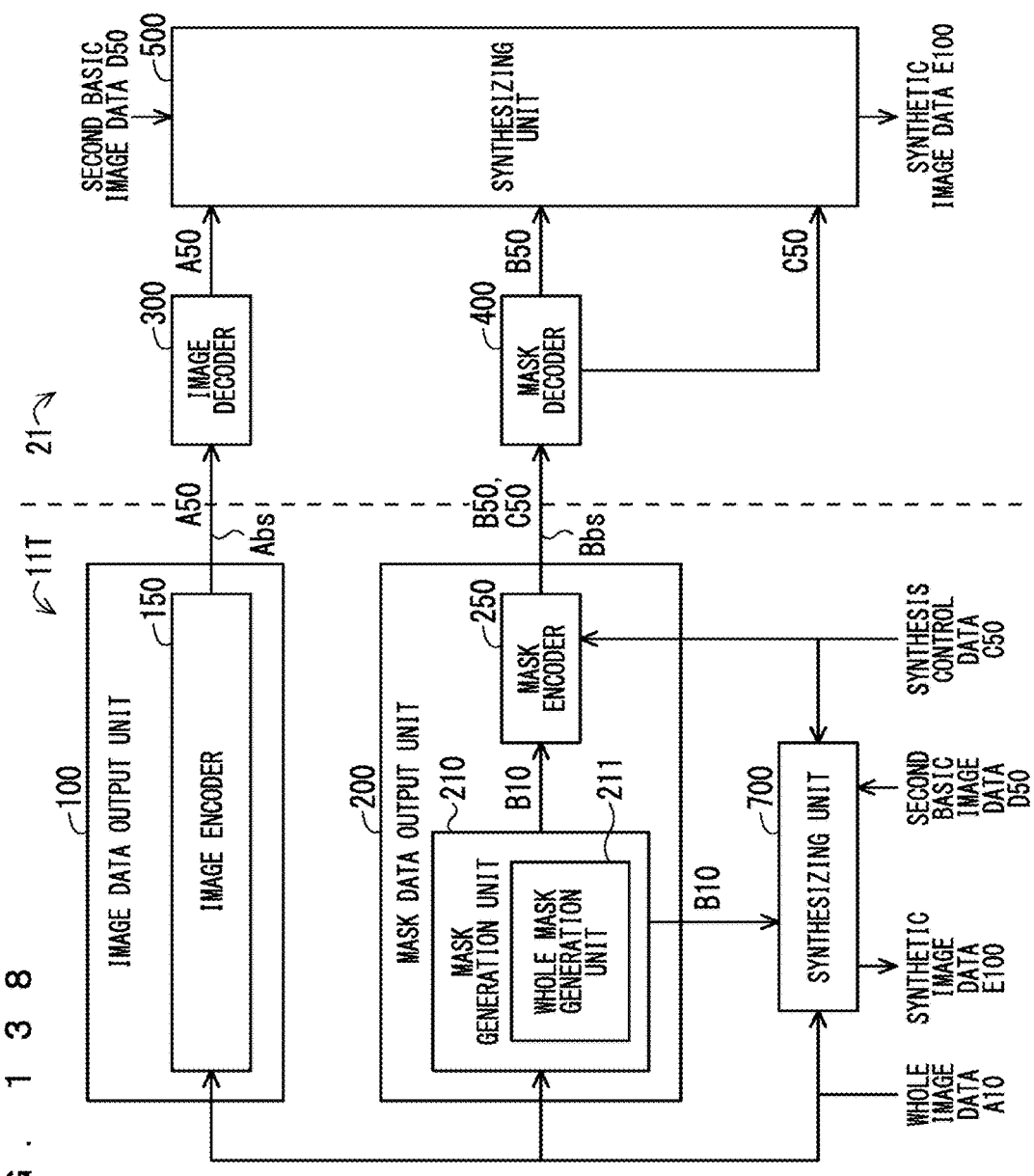

FIG. 138 is a block diagram showing an image processing system in accordance with the nineteenth preferred embodiment. In FIG. 138, a supply system 11T of the nineteenth preferred embodiment is combined with the synthesizing system 21 of the first preferred embodiment. Instead of the supply system 11 in accordance with the first preferred embodiment, the supply system 11T can be applied to the image processing system 1, 10, or the like. The supply system 11T has a constitution in which a synthesizing unit 700 is added in the supply system 11 of the first preferred embodiment.

The synthesizing unit 700 has the same constitution as that of the synthesizing unit 500 of the synthesizing system 21, and acquires the first basic image data A50 (equivalent to the whole image data A10 in the first preferred embodiment), the synthesis control data C50, and the second basic image data D50. Further, the second basic image data D50 can be acquired, for example, from the synthesizing system 21. Furthermore, the synthesizing unit 700 acquires the basic mask data B50 from the mask generation unit 210. The synthesizing unit 700 can thereby operate in the same manner as the synthesizing unit 500, to generate the synthetic image data E100.

By causing the display 31 (see FIG. 2) on the side of the supply system 11T to perform a display operation on the basis of the synthetic image data E100 generated by the synthesizing unit 700, the synthetic image between the ROI in the first target image and the second target image can be displayed. For this reason, for example, before supplying the mask bit stream Bbs to the synthesizing system 21, the synthetic image can be checked on the side of the supply system 11T. Particularly, it is possible to check the state of synthesis in accordance with the synthesis control data C50.

Herein, by adding the synthesizing unit 700, the supply-side apparatus 30 (see FIG. 2) can be applied by itself as an image processing apparatus having an image synthesizing function. A hardware configuration of such an image processing apparatus 30T is shown in FIG. 139.

Figure 139:
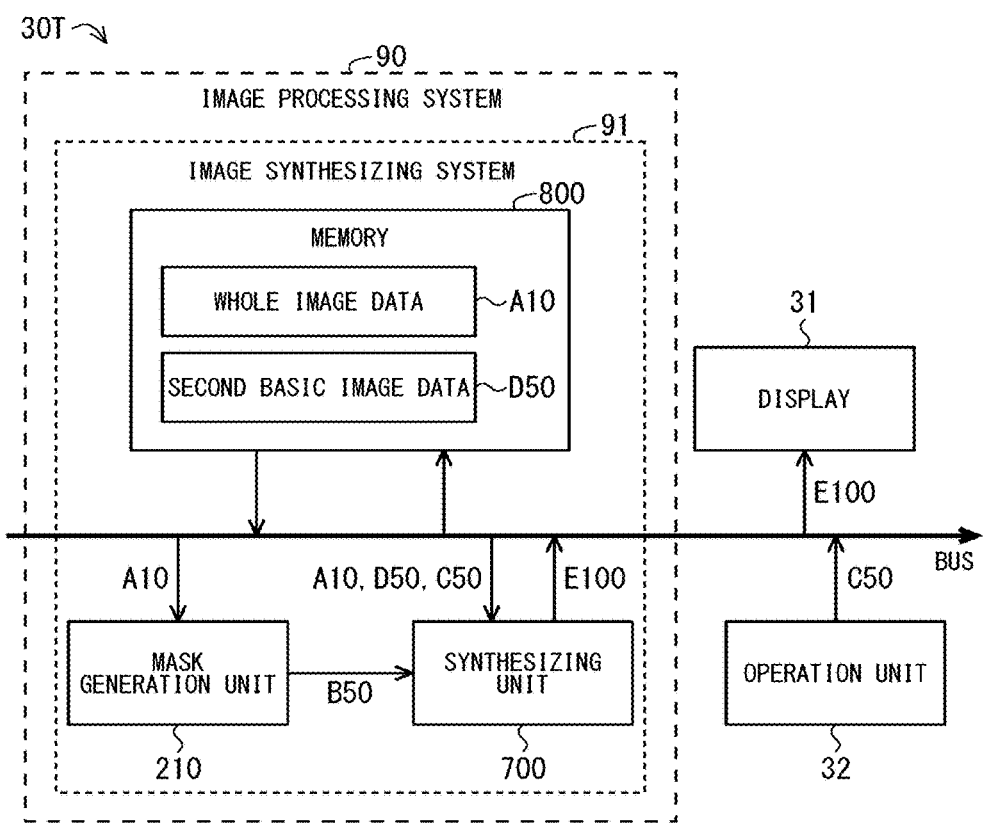

In FIG. 139, the image processing apparatus 30T includes an image processing system 90, the display 31, and the operation unit 32. Following the supply-side apparatus 30, the image processing apparatus 30T may include one or both of the I/F 33 and the image input unit 34. The image processing system 90 includes an image synthesizing system 91, and the image synthesizing system 91 includes the already-described mask generation unit 210, the synthesizing unit 700, and a semiconductor memory (referred to also as a memory) 800. The mask generation unit 210, the synthesizing unit 700, and the memory 800 are connected to one another via a bus (an exemplary wired communication medium). The image processing system 90 may be formed as a single semiconductor integrated circuit, in other words, a single chip. The image processing system 90 may be constituted only of the image synthesizing system 91 or may further include any other processing system.

The memory 800 stores therein the whole image data A10 and the second basic image data D50 which are supplied to the image synthesizing system 91. The mask generation unit 210 thereby reads the whole image data A10 out from the memory 800 and generates the basic mask data B50 on the basis of the whole image data A10. Further, the synthesizing unit 700 reads the whole image data A10 and the second basic image data D50 out from the memory 800 and uses the data for the image synthesis.

The synthesis control data C50 are supplied to the synthesizing unit 700 by user input to the operation unit 32. Further, display 31 displays the synthetic image on the basis of the synthetic image data E100 generated by the synthesizing unit 700.

Furthermore, the constitution of any one of the synthesizing units 500F to 500L, 500N, 500P, 500R, and 500S of the sixth to twelfth, fourteenth, fifteenth, seventeenth, and eighteenth preferred embodiments can be adopted as the synthesizing unit 700.

Herein, the system constituted of the memory 800 and the mask generation unit 210 can be regarded as a data supply system for supplying the whole image data A10 and the basic mask data B50. In this case, when the synthesizing unit 700 is further regarded as an image synthesizing system, the configuration of FIG. 139 can be regarded that the data supply system and the image synthesizing system are connected to each other via a bus (an exemplary wired communication medium as described above).

Further, in consideration of the exemplary constitution of FIG. 139, for example, the combination of the data supply system 11 and the synthesizing system 21 can be formed of a single semiconductor integrated circuit. In such a case, the data supply system 11 and the synthesizing system 21 are connected to each other via a bus. In the single semiconductor integrated circuit, though the data supply system 11 and the synthesizing system 21 perform communication not via the external I/F 33 or 43 unlike in FIG. 2, but via the above bus which corresponds to the medium 50. Further, when data are transferred in the single semiconductor integrated circuit (particularly, when data are transferred in a series of processings for the image synthesis function), it is possible to omit coding and decoding of the transferred data. Specifically, it is possible to eliminate the necessity of using the image encoder 150, the image decoder 300, the mask encoder 250, and the mask decoder 400. Alternatively, it is possible to omit the image encoder 150, the image decoder 300, the mask encoder 250, and the mask decoder 400. Similarly, any other combination of the data supply system 11B or the like and the synthesizing system 21B or the like can be formed of a single semiconductor integrated circuit.

<Notes>
While the invention has been shown and described in detail, the foregoing description is in all aspects illustrative and not restrictive. It is therefore understood that not-illustrated numerous modifications and variations can be devised without departing from the scope of the invention.

What is claimed is:

1. An image processing system comprising:
   image synthesizing circuitry configured to synthesize an ROI (Region Of Interest) in a first target image and a second target image,
   wherein said second target image is a similar figure to said first target image and the similarity ratio of said second target image to said first target image is not larger than 1,
   said image synthesizing circuitry is further configured to acquire
      first basic image data which are data of a first basic image that is a source of said first target image,
      basic mask data which are data of a basic mask that is a source of a target mask to be used to determine said ROI and a non-ROI in a range of said first target image,
      second basic image data which are data of a second basic image that is a source of said second target image, and
      synthesis control data to be used to control the state of synthesis, and said image synthesizing circuitry is further configured to
   generate first wavelet coefficient data by performing wavelet transformation on first target image data which are data of said first target image until a decomposition level becomes a specified decomposition level specified by said synthesis control data; and
   generate second wavelet coefficient data by performing said wavelet transformation on second target image data which are data of said second target image until a decomposition level becomes a decomposition level which depends on said specified decomposition level and said similarity ratio,
   and wherein when it is assumed that said specified decomposition level of said first wavelet coefficient data is P1, said decomposition level of said second wavelet coefficient data is P2, and said similarity ratio is $1/2^{P3}$, P2=P1−P3, and
   said image synthesizing circuitry is further configured to
      generate synthesized coefficient data having the same image size and decomposition level as those of said second wavelet coefficient data by performing a coefficient determination process and a coefficient synthesis process, said coefficient determination process being a process for determining an ROI coefficient related to said ROI and a non-ROI coefficient related to said non-ROI in said first wavelet coefficient data on the basis of target mask data which are data of said target mask, said coefficient synthesis process being a process for synthesizing said ROI coefficient in said first wavelet coefficient data and a wavelet coefficient in said second wavelet coefficient data; and
      generate synthetic image data by performing inverse wavelet transformation on said synthesized coefficient data until the decomposition level becomes a predetermined end level.

2. The image processing system according to claim 1, further comprising:

data supply circuitry configured to output said first basic image data and said basic mask data.

3. The image processing system according to claim 1, wherein
said image synthesizing circuitry is configured to acquire said synthesis control data through the same medium as that used to supply said first basic image data and said basic mask data.

4. The image processing system according to claim 1, wherein
said image synthesizing circuitry is configured to selectively use one of a plurality of pieces of synthesis control data.

5. The image processing system according to claim 1, wherein
said image synthesizing circuitry is configured to
acquire an image bit stream which is a coded bit stream of said first basic image data;
acquire said first basic image data by decoding said image bit stream;
acquire a mask bit stream which is a bit stream of said basic mask data; and
restore said basic mask data from said mask bit stream by using an algorithm independent of the decoding of said image bit stream, and
said image synthesizing circuitry is further configured to acquire said image bit stream and said mask bit stream as different bit streams.

6. The image processing system according to claim 5, further comprising:
data supply circuitry configured to output said first basic image data and said basic mask data,
wherein said data supply circuitry is further configured to
generate said image bit stream by coding said first basic image data;
generate said basic mask data by using an algorithm independent of the coding of said first basic image data; and
generate said mask bit stream from said basic mask data,
and wherein said first basic image data are outputted from said data supply circuitry as said image bit stream,
said basic mask data are outputted from said data supply circuitry as said mask bit stream, and
said data supply circuitry is further configured to output said image bit stream and said mask bit stream as different bit streams.

7. The image processing system according to claim 5, wherein
said synthesis control data are supplied to said image synthesizing circuitry, being embedded in a region in said mask bit stream, which has no effect on said basic mask data, and
said image synthesizing circuitry is configured to extract said synthesis control data from said mask bit stream.

8. The image processing system according to claim 1, wherein
said image synthesizing circuitry is configured to
acquire an image bit stream which is a coded bit stream of said first basic image data;
acquire said first basic image data by decoding said image bit stream;
acquire a mask bit stream which is a bit stream of said basic mask data; and
restore said basic mask data from said mask bit stream by using an algorithm independent of the decoding of said image bit stream, and wherein said mask bit stream is supplied to said image synthesizing circuitry, being embedded in a region in said image bit stream, which has no effect on said first basic image data, and
said image synthesizing circuitry is further configured to extract said mask bit stream from said image bit stream.

9. The image processing system according to claim 8, further comprising:
data supply circuitry configured to output said first basic image data and said basic mask data,
wherein said data supply circuitry is further configured to
generate said image bit stream by coding said first basic image data;
generate said basic mask data by using an algorithm independent of the coding of said first basic image data; and
generate said mask bit stream from said basic mask data,
and wherein said first basic image data are outputted from said data supply circuitry as said image bit stream,
said basic mask data are outputted from said data supply circuitry as said mask bit stream, and
said data supply circuitry is further configured to embed said mask bit stream into said region in said image bit stream, to thereby output said image bit stream and said mask bit stream as a single bit stream.

10. The image processing system according to claim 8, wherein
said synthesis control data are supplied to said image synthesizing circuitry, being embedded in said region in said image bit stream, and
said image synthesizing circuitry is configured to extract said synthesis control data from said image bit stream.

11. The image processing system according to claim 1, wherein
said coefficient synthesis process is
a first coefficient synthesis process for substituting said non-ROI coefficient in said first wavelet coefficient data with a corresponding wavelet coefficient in said second wavelet coefficient data; or
a second coefficient synthesis process for embedding said ROI coefficient in said first wavelet coefficient data into a corresponding position in said second wavelet coefficient data.

12. The image processing system according to claim 1, wherein
said basic mask is an original mask whose target is an original image which is an image not being subjected to said wavelet transformation yet, and said original mask indicates which of said ROI and said non-ROI to which each pixel in said original image belongs and has an ROI corresponding portion corresponding to said ROI in said original image and a non-ROI corresponding portion corresponding to said non-ROI therein, and
said image synthesizing circuitry is configured to
generate a developed mask for said first wavelet coefficient data by performing a mask development process for developing said ROI corresponding portion and said non-ROI corresponding portion of said target mask included in said basic mask, for each band component included in said first wavelet coefficient data; and
perform said coefficient determination process on the basis of the distinction between said ROI corresponding portion and said non-ROI corresponding portion in said developed mask.

13. The image processing system according to claim 12, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a 5×3 filter in said wavelet transformation, where n is an integer, includes:

a first condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and a second condition that when the {2n+1}th data on said first wavelet plane are associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

14. The image processing system according to claim 12, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a Daubechies 9×7 filter in said wavelet transformation, where n is an integer, includes:

a third condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and a fourth condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

15. The image processing system according to claim 1, wherein said basic mask is a developed mask for said first wavelet coefficient data and said developed mask is a mask generated by performing a mask development process for developing an original mask whose target is an original image which is an image not being subjected to said wavelet transformation yet, for each band component included in said first wavelet coefficient data, said original mask indicates which of said ROI and said non-ROI to which each pixel in said original image belongs and has an ROI corresponding portion corresponding to said ROI in said original image and a non-ROI corresponding portion corresponding to said non-ROI therein, and said image synthesizing circuitry is configured to perform said coefficient determination process on the basis of the distinction between said ROI corresponding portion and said non-ROI corresponding portion which are developed into said developed mask.

16. The image processing system according to claim 15, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a 5×3 filter in said wavelet transformation, where n is an integer, includes:

a first condition that when the 2n-th data on said first wavelet plane are associated with said ROI by said first mask, said second mask is formed so that the n-th data of a low-frequency component and the {n−1}th data and the n-th data of a high-frequency component on said second wavelet plane may be associated with said ROI; and a second condition that when the {2n+1}th data on said first wavelet plane arc associated with said ROI by said first mask, said second mask is formed so that the n-th data and the {n+1}th data of said low-frequency component and the {n−1}th data to the {n+1}th data of said high-frequency component on said second wavelet plane may be associated with said ROI.

17. The image processing system according to claim 15, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a Daubechies 9×7 filter in said wavelet transformation, where n is an integer, includes:

a third condition that when the 2n-th data on said first wavelet plane are associated with said ROI by said first mask, said second mask is formed so that the {n−1}th data to the {n+1}th data of a low-frequency component and the {n−2}th data to the {n+1}th data of a high-frequency component on said second wavelet plane may be associated with said ROI; and a fourth condition that when the {2n+1}th data on said first wavelet plane are associated with said ROI by said first mask, said second mask is formed so that the {n−1}th data to the {n+2}th data of said low-frequency component and the {n−2}th data to the {n+2}th data of said high-frequency component on said second wavelet plane may be associated with said ROI.

18. The image processing system according to claim 1, wherein
said image synthesizing circuitry is configured to use a whole range of said first basic image as said first target image and use a whole range of said basic mask as said target mask.

19. The image processing system according to claim 1, wherein
said image synthesizing circuitry is configured to use part of said first basic image as said first target image and use a whole range of said basic mask as said target mask, and
said image synthesizing circuitry is further configured to
acquire cut-out range specifying data to be used to specify a cut-out range which is a range of said first target image in said first basic image; and
cut out data within said cut-out range in said first basic image data, as said first target image data, on the basis of said cut-out range specifying data.

20. The image processing system according to claim 1, wherein
said image synthesizing circuitry is configured to use part of said first basic image as said first target image and use part of said basic mask as said target mask, and
said image synthesizing circuitry is further configured to
acquire cut-out range specifying data to be used to specify a cut-out range which is a range of said first target image in said first basic image;
cut out data within said cut-out range in said basic mask data, for said target mask data, on the basis of said cut-out range specifying data; and
cut out data within said cut-out range in said first basic image data, as said first target image data, on the basis of said cut-out range specifying data.

21. The image processing system according to claim 1, wherein
said image synthesizing circuitry is configured to use a whole range of said first basic image as said first target image and use part of said basic mask as said target mask, and
said image synthesizing circuitry is further configured to
acquire cut-out range specifying data to be used to specify a cut-out range which is a range of said target mask in said basic mask; and
cut out data within said cut-out range in said basic mask data, for said target mask data, on the basis of said cut-out range specifying data.

22. The image processing system according to claim 1, wherein
said image synthesizing circuitry is configured to use part of said first basic image as said first target image and use part of said basic mask as said target mask, and
said image synthesizing circuitry is further configured to
perform a cut-out range determination process for determining a cut-out range which is a range of said first target image in said first basic image, on the basis of said basic mask data and said synthesis control data, to thereby generate cut-out range specifying data to be used to specify said cut-out range;
cut out data within said cut-out range in said basic mask data, for said target mask data, on the basis of said cut-out range specifying data; and
cut out data within said cut-out range in said first basic image data, as said first target image data, on the basis of said cut-out range specifying data.

23. The image processing system according to claim 22, wherein
said cut-out range determination process includes:
a minimum range specifying process for specifying a rectangular minimum range including said ROI, on the basis of an original mask whose target is an original image before the cut-out;
a tracking process for specifying a range corresponding to said minimum range as a tracked minimum range in a highest-order band component which is decomposed most in a final wavelet plane of said specified decomposition level specified by said synthesis control data; and
a required range specifying process for specifying which range of said original image before the cut-out, in which data required to calculate a wavelet coefficient within said tracked minimum range exist, and
said range specified in said required range specifying process is set to said cut-out range.

24. The image processing system according to claim 23, wherein
said wavelet transformation is a method of recursively decomposing a lowest-frequency band component included in a wavelet plane of each decomposition level, and
said highest-order band component is a lowest-frequency band component in said final wavelet plane.

25. The image processing system according to claim 1, further comprising:
data supply circuitry configured to output said first basic image data and said basic mask data,
wherein said data supply circuitry is further configured to
generate a small image by reducing a whole image including said ROI;
generate a small mask whose target is said small image;
generate an enlarged mask by enlarging said small mask to have the same image size as that of said whole image; and
output data of said enlarged mask as said basic mask data.

26. The image processing system according to claim 25, wherein
the reduction ratio of said small mask to said first basic image is $1/2^R$ (R is a natural number), and
said data supply circuitry is configured to generate said enlarged mask by performing an enlargement process R times with an enlargement ratio of 2 on said small mask,
and wherein in said enlargement process, when the i-th data (i is an integer) are associated with said ROI in a mask before being subjected to enlargement, the {2i−1}th data to {2i+1}th data are associated with said ROI in the mask after being subjected to enlargement.

27. The image processing system according to claim 1, wherein said basic mask is a whole of a small mask whose target is a reduced image of said first basic image or part of said small mask, which includes a ROI corresponding portion, and said image synthesizing circuitry is configured to
generate an enlarged mask by enlarging said basic mask to have the same image size as that of said first target image; and
use said enlarged mask as said target mask.

28. The image processing system according to claim 27, further comprising:
data supply circuitry configured to
generate a small image by reducing a whole image including said ROI;
generate said small mask whose target is said small image; and
output said whole of or said part of said small mask as said basic mask.

29. The image processing system according to claim 28, wherein
said data supply circuitry is configured to
perform a cut-out range determination process for determining a cut-out range which is a range of said first target image in said whole image and a small mask cut-out range which corresponds to said cut-out range in said small mask, on the basis of data of said enlarged mask and said synthesis control data, to thereby generate cut-out range specifying data to be used to specify said cut-out range and small mask cut-out range specifying data to be used to specify said small mask cut-out range; and
cut data within said small mask cut-out range in data of said small mask, for said basic mask data, on the basis of said small mask cut-out range specifying data, and
said data supply circuitry is further configured to output said cut-out range specifying data.

30. The image processing system according to claim 29, wherein
said cut-out range determination process includes:
a minimum range specifying process for specifying a rectangular minimum range including said ROI in said whole image, on the basis of said enlarged mask;
a tracking process for specifying a range corresponding to said minimum range as a tracked minimum range in a highest-order band component which is decomposed most in a final wavelet plane of said specified decomposition level specified by said synthesis control data;
a required range specifying process for specifying which range of said whole image, in which data required to calculate a wavelet coefficient within said tracked minimum range exist; and
a small mask required range specifying process for specifying which range of said small mask to which said range specified in said required range specifying process corresponds,
said range specified in said required range specifying process is set to said cut-out range, and
said range specified in said small mask required range specifying process is set to said small mask cut-out range,
and wherein assuming that
upper-left end coordinates of said cut-out range are (AX3, AY3),
lower-right end coordinates of said cut-out range are (BX3, BY3), upper-left end coordinates of said small mask cut-out range are (AX4, AY4),
lower-right end coordinates of said small mask cut-out range are (BX4, BY4), and
the reduction ratio of said small mask to said whole image is $1/2^R$ (R is a natural number),
in said small mask required range specifying process, respective values of said AX3, said AY3, said BX3, and said BY3 are right-shifted by R bits and respective values which are obtained by the right-shift are set to said AX4, said AY4, said BX4, and said BY4.

31. The image processing system according to claim 30, wherein
said wavelet transformation is a method of recursively decomposing a lowest-frequency band component included in a wavelet plane of each decomposition level, and
said highest-order band component is a lowest-frequency band component in said final wavelet plane.

32. The image processing system according to claim 28, wherein
said data supply circuitry is configured to output a coded bit stream of said basic mask data which are data of said whole of or said part of said small mask as a mask bit stream, and
said image synthesizing circuitry is configured to acquire said basic mask by decoding said mask bit stream.

33. The image processing system according to claim 28, wherein
said data supply circuitry is configured to generate a bit stream of said basic mask data as a mask bit stream without coding said basic mask data which are data of said whole of or said part of said small mask, and
said image synthesizing circuitry is configured to restore said basic mask from said mask bit stream.

34. The image processing system according to claim 27, wherein
the reduction ratio of said small mask to said first basic image is $1/2^R$ (R is a natural number), and
said image synthesizing circuitry is configured to generate said enlarged mask by performing an enlargement process R times with an enlargement ratio of 2 on said small mask,
and wherein in said enlargement process, when the i-th data (i is an integer) are associated with said ROI in a mask before being subjected to enlargement, the {2i−1}th data to {2i+1}th data are associated with said ROI in the mask after being subjected to enlargement.

35. The image processing system according to claim 1, wherein
said image synthesizing circuitry is configured to
set a similar figure range in said second basic image, which is a similar figure to said first target image with said similarity ratio; and
cut out data within said similar figure range in said second basic image data as said second target image data.

36. The image processing system according to claim 1, wherein
said image synthesizing circuitry is configured to generate said second target image by reducing at least part of said second basic image.

37. The image processing system according to claim 1, further comprising:
a memory and mask generation circuitry which are connected to said image synthesizing circuitry via a bus, wherein said memory is configured to store therein whole image data which are data of a whole image that is a source of said first basic image, and said second basic image data, and said mask generation circuitry is configured to generate said basic mask data on the basis of said whole image data.

38. An image processing system comprising:

data supply circuitry configured to output data to be used for an image synthesis process for synthesizing an ROI (Region Of Interest) in a first target image and a second target image, wherein said second target image is a similar figure to said first target image and the similarity ratio of said second target image to said first target image is not larger than 1, and said image synthesis process includes:
  a wavelet transformation process for generating first wavelet coefficient data by performing wavelet transformation on first target image data which are data of said first target image until a decomposition level becomes a specified decomposition level and generating second wavelet coefficient data by performing said wavelet transformation on second target image data which are data of said second target image until a decomposition level becomes a decomposition level which depends on said specified decomposition level and said similarity ratio, and wherein when it is assumed that said specified decomposition level of said first wavelet coefficient data is P1, said decomposition level of said second wavelet coefficient data is P2, and said similarity ratio is $1/2^{P3}$, P2=P1−P3, and said image synthesis process further includes:
  a synthesis execution process for generating synthesized coefficient data having the same image size and decomposition level as those of said second wavelet coefficient data by performing a coefficient determination process and a coefficient synthesis process, said coefficient determination process being a process for determining an ROI coefficient related to said ROI and a non-ROI coefficient related to a non-ROI in said first wavelet coefficient data on the basis of target mask data which are data of a target mask to be used to determine said ROI and said non-ROI in a range of said first target image, said coefficient synthesis process being a process for synthesizing said ROI coefficient in said first wavelet coefficient data and a wavelet coefficient in said second wavelet coefficient data; and
  an inverse wavelet transformation process for generating synthetic image data by performing inverse wavelet transformation on said synthesized coefficient data until the decomposition level becomes a predetermined end level, and wherein said data supply circuitry is further configured to
  generate an image bit stream which is a coded bit stream of first basic image data which are data of a first basic image that is a source of said first target image by coding said first basic image data;
  generate basic mask data which are data of a basic mask that is a source of said target mask by using an algorithm independent of the coding of said first basic image data; and
  generate a mask bit stream which is a bit stream of said basic mask data, and said data supply circuitry is further configured to
  output said first basic image data as said image bit stream;
  output said basic mask data as said mask bit stream; and
  output synthesis control data to be used to specify said specified decomposition level in said wavelet transformation.

39. The image processing system according to claim 38, wherein said data supply circuitry is configured to output said image bit stream and said mask bit stream as different bit streams.

40. The image processing system according to claim 38, wherein said data supply circuitry is configured to embed said mask bit stream into a region in said image bit stream, which has no effect on said first basic image data, to thereby output said image bit stream and said mask bit stream as a single bit stream.

41. The image processing system according to claim 38, wherein said basic mask is an original mask whose target is an original image which is an image not being subjected to said wavelet transformation yet, and said original mask indicates which of said ROI and said non-ROI to which each pixel in said original image belongs and has an ROI corresponding portion corresponding to said ROI in said original image and a non-ROI corresponding portion corresponding to said non-ROI therein, and said data supply circuitry is configured to
  generate said original mask for a range of said first basic image; and
  output data of said original mask as said basic mask data.

42. The image processing system according to claim 38, wherein said basic mask is a developed mask for said first wavelet coefficient data and said developed mask is a mask generated by performing a mask development process for developing an original mask whose target is an original image which is an image not being subjected to said wavelet transformation yet, for each band component included in said first wavelet coefficient data, and said data supply circuitry is configured to
  generate said original mask for a range of said first basic image; and
  generate said developed mask by performing said mask development process on said original mask; and
  output data of said developed mask as said basic mask data.

43. The image processing system according to claim 42, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a 5×3 filter in said wavelet transformation, where n is an integer, includes:

a first condition that when the 2n-th data on said first wavelet plane are associated with said ROI by said first mask, said second mask is formed so that the n-th data of a low-frequency component and the $\{n-1\}$th data and the n-th data of a high-frequency component on said second wavelet plane may be associated with said ROI; and a second condition that when the $\{2n+1\}$th data on said first wavelet plane are associated with said ROI by said first mask, said second mask is formed so that the n-th data and the $\{n+1\}$th data of said low-frequency component and the $\{n-1\}$th data to the $\{n+1\}$th data of said high-frequency component on said second wavelet plane may be associated with said ROI.

44. The image processing system according to claim 42, wherein in said mask development process, performed is a basic process for converting a first mask for a first wavelet plane into a second mask for a second wavelet plane having a decomposition level which is one-level higher than that of said first wavelet plane, on the basis of a mask development condition, and when said specified decomposition level specified by said synthesis control data is not smaller than 2, said basic process is performed recursively in accordance with a method of said wavelet transformation until said decomposition level of said second wavelet plane becomes said specified decomposition level, and wherein said mask development condition in the case of using a Daubechies 9×7 filter in said wavelet transformation, where n is an integer, includes:

a third condition that when the 2n-th data on said first wavelet plane are associated with said ROI by said first mask, said second mask is formed so that the $\{n-1\}$th data to the $\{n+1\}$th data of a low-frequency component and the $\{n-2\}$th data to the$\{n+1\}$th data of a high-frequency component on said second wavelet plane may be associated with said ROI; and a fourth condition that when the $\{2n+1\}$th data on said first wavelet plane are associated with said ROI by said first mask, said second mask is formed so that the $\{n-1\}$th data to the $\{n+2\}$th data of said low-frequency component and the $\{n-2\}$th data to the $\{n+2\}$th data of said high-frequency component on said second wavelet plane may be associated with said ROI.

45. The image processing system according to claim 38, wherein said data supply circuitry is configured to
output said first target image data as said first basic image data;
generate said target mask for a range of said first target image; and
output said target mask data as said basic mask data.

46. The image processing system according to claim 38, wherein said data supply circuitry is configured to
cut out said first target image from a whole image including said ROI;
output said first target image data as said first basic image data;
generate said target mask for a range of said first target image; and
output said target mask data as said basic mask data.

47. The image processing system according to claim 38, wherein said data supply circuitry is configured to
output whole image data which are data of a whole image whose portion includes said first target image, as said first basic image data;
generate said target mask for a range of said first target image; and
output said target mask data as said basic mask data, said data supply circuitry is further configured to
generate whole mask data which are data of a whole mask to be used to determine said ROI and said non-ROI in a range of said whole image on the basis of said whole image data;
perform a cut-out range determination process for determining a cut-out range which is a range of said first target image in said whole image, on the basis of said whole mask data and said synthesis control data, to thereby generate cut-out range specifying data to be used to specify said cut-out range; and
cut out data within said cut-out range in said whole mask data, for said basic mask data, on the basis of said cut-out range specifying data, and
said data supply circuitry is further configured to output said cut-out range specifying data.

48. The image processing system according to claim 47, wherein said cut-out range determination process includes:
a minimum range specifying process for specifying a rectangular minimum range including said ROI, on the basis of an original mask whose target is an original image before the cut-out;
a tracking process for specifying a range corresponding to said minimum range as a tracked minimum range in a highest-order band component which is decomposed most in a final wavelet plane of said specified decomposition level specified by said synthesis control data; and
a required range specifying process for specifying which range of said original image before the cut-out, in which data required to calculate a wavelet coefficient within said tracked minimum range exist, and said range specified in said required range specifying process is set to said cut-out range.

49. The image processing system according to claim 48, wherein said wavelet transformation is a method of recursively decomposing a lowest-frequency band component included in a wavelet plane of each decomposition level, and
said highest-order band component is a lowest-frequency band component in said final wavelet plane.

50. The image processing system according to claim 38, wherein said data supply circuitry is configured to
output whole image data which are data of a whole image whose portion includes said first target image, as said first basic image data; and
generate and output said basic mask data for a range of said whole image,
said data supply circuitry is further configured to
generate whole mask data which are data of a whole mask to be used to determine said ROI and said non-ROI in a range of said whole image on the basis of said whole image data; and
perform a cut-out range determination process for determining a cut-out range which is a range of said first target image in said whole image, on the basis of said whole mask data and said synthesis control data, to thereby generate cut-out range specifying data to be used to specify said cut-out range, and said data supply circuitry is further configured to output said cut-out range specifying data.

51. The image processing system according to claim 50, wherein said cut-out range determination process includes:
a minimum range specifying process for specifying a rectangular minimum range including said ROI, on the basis of an original mask whose target is an original image before the cut-out;
a tracking process for specifying a range corresponding to said minimum range as a tracked minimum range in a highest-order band component which is decomposed most in a final wavelet plane of said specified decomposition level specified by said synthesis control data; and
a required range specifying process for specifying which range of said original image before the cut-out, in which data required to calculate a wavelet coefficient within said tracked minimum range exist, and
said range specified in said required range specifying process is set to said cut-out range.

52. The image processing system according to claim 51, wherein said wavelet transformation is a method of recursively decomposing a lowest-frequency band component included in a wavelet plane of each decomposition level, and
said highest-order band component is a lowest-frequency band component in said final wavelet plane.

53. The image processing system according to claim 38, wherein said data supply circuitry is configured to
cut out said first target image from a whole image including said ROI;
output said first target image data as said first basic image data; and
generate and output said basic mask data for a range of said whole image,
said data supply circuitry is further configured to
generate whole mask data which are data of a whole mask to be used to determine said ROI and said non-ROI in a range of said whole image on the basis of whole image data which are data of said whole image;
perform a cut-out range determination process for determining a cut-out range which is a range of said first target image in said whole image, on the basis of said whole mask data and said synthesis control data, to thereby generate cut-out range specifying data to be used to specify said cut-out range; and
cut out data within said cut-out range in said whole image data, as said first basic image data, on the basis of said cut-out range specifying data, and
said data supply circuitry is further configured to output said cut-out range specifying data.

54. The image processing system according to claim 53, wherein said cut-out range determination process includes:
a minimum range specifying process for specifying a rectangular minimum range including said ROI, on the basis of an original mask whose target is an original image before the cut-out;
a tracking process for specifying a range corresponding to said minimum range as a tracked minimum range in a highest-order band component which is decomposed most in a final wavelet plane of said specified decomposition level specified by said synthesis control data; and
a required range specifying process for specifying which range of said original image before the cut-out, in which data required to calculate a wavelet coefficient within said tracked minimum range exist, and
said range specified in said required range specifying process is set to said cut-out range.

55. The image processing system according to claim 54, wherein said wavelet transformation is a method of recursively decomposing a lowest-frequency band component included in a wavelet plane of each decomposition level, and
said highest-order band component is a lowest-frequency band component in said final wavelet plane.

56. The image processing system according to claim 38, wherein said data supply circuitry is configured to
generate a small image by reducing a whole image including said ROI; and
generate a small mask whose target is said small image.

57. The image processing system according to claim 56, wherein said data supply circuitry is configured to generate an enlarged mask by enlarging said small mask to have the same image size as that of said whole image.

58. The image processing system according to claim 57, wherein said data supply circuitry is configured to
generate said small image by reducing said whole image with a reduction ratio of $1/2^R$ (R is a natural number); and
generate said enlarged mask by performing an enlargement process R times with an enlargement ratio of 2 on said small mask, and
in said enlargement process, when the i-th data (i is an integer) are associated with said ROI in a mask before being subjected to enlargement, the $\{2i-1\}$th data to $\{2i+1\}$th data are associated with said ROI in the mask after being subjected to enlargement.

59. The image processing system according to claim 38, wherein said data supply circuitry is configured to perform said wavelet transformation process, said synthesis execution process, and said inverse wavelet transformation process.

60. An image processing method comprising:

acquiring first target image data which are data of a first target image having an ROI (Region Of Interest),
target mask data which are data of a target mask to be used to determine said ROI and a non-ROI in a range of said first target image,
second target image data which are data of a second target image which is a similar figure to said first target image and has a similarity ratio not larger than 1 to said first target image, and
synthesis control data to be used to control the state of synthesis between said ROI in said first target image and said second target image;
generating first wavelet coefficient data by performing wavelet transformation on said first target image data until a decomposition level becomes a specified decomposition level specified by said synthesis control data; and generating second wavelet coefficient data by performing said wavelet transformation on said second target image data until a decomposition level becomes a decomposition level which depends on said specified decomposition level and said similarity ratio, wherein when it is assumed that said specified decomposition level of said first wavelet coefficient data is P1, said decomposition level of said second wavelet coefficient data is P2, and said similarity ratio is $1/2^{P3}$, P2=P1−P3, said image processing method further comprising:

generating synthesized coefficient data having the same image size and decomposition level as those of said second wavelet coefficient data by performing a coefficient determination process and a coefficient synthesis process, said coefficient determination process being a process for determining an ROI coefficient related to said ROI and a non-ROI coefficient related to non-ROI in said first wavelet coefficient data on the basis of said target mask data, said coefficient synthesis process being a process for synthesizing said ROI coefficient in said first wavelet coefficient data and a wavelet coefficient in said second wavelet coefficient data; and generating synthetic image data by performing inverse wavelet transformation on said synthesized coefficient data until the decomposition level becomes a predetermined end level.

61. The image processing method according to claim 60, further comprising:

supplying said first target image data and said target mask data, wherein the supply of said first target image data and said target mask data includes:

generating an image bit stream which is a coded bit stream of first basic image data which are data of a first basic image that is a source of said first target image by coding said first basic image data;

generating basic mask data which are data of a basic mask that is a source of said target mask by using an algorithm independent of the coding of said first basic image data; and generating a mask bit stream which is a bit stream of said basic mask data, and wherein said first target image data are supplied as said image bit stream, and said target mask data are supplied as said mask bit stream.

62. The image processing method according to claim 61, wherein the acquisition of said first target image data, said target mask data, said second target image data, and said synthesis control data includes:

acquiring said first basic image data by decoding said image bit stream and acquiring said first target image data from said first basic image data; and acquiring said basic mask data from said mask bit stream by using an algorithm independent of the decoding of said image bit stream and acquiring said target mask data from said basic mask data.

* * * * *